(12) United States Patent
Kiss et al.

(10) Patent No.: US 7,928,162 B2
(45) Date of Patent: Apr. 19, 2011

(54) IN-LINE PROCESS FOR PRODUCING PLASTICIZED POLYMERS AND PLASTICIZED POLYMER BLENDS

(75) Inventors: Gabor Kiss, Hampton, NJ (US); Alan Anthony Galuska, Glen Gardner, NJ (US); Robert Patrick Reynolds, Jr., Clinton, NJ (US); John W. Chu, Neshanic Station, NJ (US); Bryan R. Chapman, Annandale, NJ (US); Patrick Brant, Seabrook, TX (US); Sudhin Datta, Houston, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 34 days.

(21) Appl. No.: 12/283,045

(22) Filed: Sep. 9, 2008

(65) Prior Publication Data
US 2009/0076216 A1 Mar. 19, 2009

Related U.S. Application Data

(60) Provisional application No. 60/993,647, filed on Sep. 13, 2007.

(51) Int. Cl.
*C08F 2/12* (2006.01)
*C08F 6/00* (2006.01)
*C08L 23/02* (2006.01)

(52) U.S. Cl. .............. 525/53; 525/197; 526/65; 526/88; 524/570; 528/501

(58) Field of Classification Search .................... 526/65, 526/88; 525/197, 53; 524/570; 528/501
See application file for complete search history.

(56) References Cited

U.S. PATENT DOCUMENTS
2,153,553 A 4/1939 Fawcett et al.
(Continued)

FOREIGN PATENT DOCUMENTS
CA 2118711 3/1993
(Continued)

OTHER PUBLICATIONS

U.S. Appl. No. 11/961,583, filed Dec. 20, 2007, ExxonMobil.
(Continued)

*Primary Examiner* — Fred M Teskin
(74) *Attorney, Agent, or Firm* — Robert A. Migliorini

(57) ABSTRACT

A process for fluid phase in-line blending of plasticized polymers is provided. The process includes providing two or more reactor trains configured in parallel and a separator for product blending and product-feed separation, wherein one or more of the reactor trains produces one or more polymers and one or more of the reactor trains produces one or more plasticizers; contacting in at least one of the parallel reactor trains olefin monomers, catalyst systems, optional comonomers, optional scavengers, and optional diluents or solvents, at a temperature above the solid-fluid phase transition temperature of the polymerization system and a pressure no lower than 10 MPa below the cloud point pressure of the polymerization system and less than 1500 MPa; forming a reactor effluent including a homogeneous fluid phase polymer-monomer mixture and plasticizer-monomer mixture in each parallel reactor train; passing the reactor effluents through the separator; maintaining the temperature and pressure within the separator above the solid-fluid phase transition point but below the cloud point pressure and temperature to form a fluid-fluid two-phase system including a plasticized polymer-rich blend phase and a monomer-rich phase; and separating the monomer-rich phase from the plasticized polymer-rich blend phase. The polymer-rich blend phase is conveyed to a downstream finishing stage for further monomer stripping, drying and/or pelletizing to form a plasticized polymer product blend. Suitable plasticizers for in-line production and blending include polyalphaolefin oligomers, polybutenes, low glass transition temperature polymers and combinations thereof.

22 Claims, 29 Drawing Sheets

In-line plasticized polymer blending process with single separation vessel

U.S. PATENT DOCUMENTS

| | | | |
|---|---|---|---|
| 2,852,501 A | 9/1958 | Richard, Jr. et al. |
| 3,294,772 A | 12/1966 | Cottle |
| 3,725,378 A | 4/1973 | Chamberlin |
| 4,135,044 A | 1/1979 | Beals |
| 4,153,774 A | 5/1979 | Boettcher et al. |
| 4,252,911 A | 2/1981 | Simon |
| 4,337,142 A | 6/1982 | Kundsen et al. |
| 4,530,914 A | 7/1985 | Ewen et al. |
| 4,794,004 A | 12/1988 | Pfleger et al. |
| 4,962,262 A | 10/1990 | Winter et al. |
| 5,026,798 A | 6/1991 | Canich |
| 5,081,322 A | 1/1992 | Winter et al. |
| 5,084,534 A | 1/1992 | Welborn, Jr. et al. |
| 5,096,867 A | 3/1992 | Canich |
| 5,198,501 A | 3/1993 | Bott et al. |
| 5,236,998 A | 8/1993 | Lundeen et al. |
| 5,272,236 A | 12/1993 | Lai et al. |
| 5,324,799 A | 6/1994 | Yano et al. |
| 5,324,800 A | 6/1994 | Welborn, Jr. et al. |
| 5,326,835 A | 7/1994 | Ahvenainen et al. |
| 5,382,630 A | 1/1995 | Stehling et al. |
| 5,382,631 A | 1/1995 | Stehling et al. |
| 5,391,654 A | 2/1995 | Ahvenainen et al. |
| 5,408,017 A | 4/1995 | Turner et al. |
| 5,416,153 A | 5/1995 | Winter et al. |
| 5,504,171 A | 4/1996 | Etherton et al. |
| 5,514,761 A | 5/1996 | Etherton et al. |
| 5,635,573 A | 6/1997 | Harrington et al. |
| 5,652,308 A | 7/1997 | Merrill et al. |
| 5,670,595 A | 9/1997 | Meka et al. |
| 5,693,730 A | 12/1997 | Kuber et al. |
| 5,723,560 A | 3/1998 | Canich |
| 5,723,705 A | 3/1998 | Herrmann et al. |
| 5,756,608 A | 5/1998 | Langhauser et al. |
| 5,840,644 A | 11/1998 | Kuber et al. |
| 5,866,663 A | 2/1999 | Brookhart et al. |
| 5,882,750 A | 3/1999 | Mink et al. |
| 5,936,053 A | 8/1999 | Fukuoka et al. |
| 5,962,719 A | 10/1999 | Winter et al. |
| 5,965,674 A | 10/1999 | Moen et al. |
| 5,969,062 A | 10/1999 | Moll et al. |
| 5,998,547 A | 12/1999 | Hohner |
| 6,066,762 A | 5/2000 | Yoneda et al. |
| 6,084,041 A | 7/2000 | Andtsjo et al. |
| 6,124,231 A | 9/2000 | Fritze et al. |
| 6,143,682 A | 11/2000 | Fisher |
| 6,160,072 A | 12/2000 | Ewen |
| 6,207,756 B1 | 3/2001 | Datta et al. |
| 6,218,488 B1 | 4/2001 | Schiffino et al. |
| 6,225,432 B1 | 5/2001 | Weng et al. |
| 6,255,410 B1 | 7/2001 | Shigekauzu et al. |
| 6,300,451 B1 | 10/2001 | Mehta et al. |
| 6,355,741 B1 | 3/2002 | Marechal |
| 6,372,847 B1 | 4/2002 | Wouters |
| 6,469,188 B1 | 10/2002 | Miller et al. |
| 6,492,473 B1 | 12/2002 | Canich |
| 6,562,914 B1 | 5/2003 | Andtsjo et al. |
| 6,562,920 B2 | 5/2003 | Brant |
| 6,642,316 B1 | 11/2003 | Datta et al. |
| 6,649,707 B1 | 11/2003 | Rhodes et al. |
| 6,689,847 B2 | 2/2004 | Mawson et al. |
| 6,770,714 B2 | 8/2004 | Ommundsen et al. |
| 6,881,800 B2 | 4/2005 | Friedersdorf |
| 7,087,690 B2 | 8/2006 | Boussie et al. |
| 7,163,989 B2 | 1/2007 | Friedersdorf |
| 7,265,193 B2 | 9/2007 | Weng et al. |
| 7,279,536 B2 | 10/2007 | Brant et al. |
| 7,319,125 B2 | 1/2008 | Arjunan et al. |
| 2001/0044506 A1 | 11/2001 | Mehta et al. |
| 2002/0013440 A1 | 1/2002 | Agarwal et al. |
| 2002/0016415 A1 | 2/2002 | Laughner et al. |
| 2002/0096797 A1 | 7/2002 | Stoffelsma et al. |
| 2003/0088021 A1 | 5/2003 | Van Dun et al. |
| 2004/0024146 A1 | 2/2004 | Friedersdorf |
| 2004/0122191 A1 | 6/2004 | Arjunan et al. |
| 2004/0127654 A1 | 7/2004 | Brant et al. |
| 2004/0158010 A1 | 8/2004 | Lehmus et al. |
| 2004/0242734 A1 | 12/2004 | Lakeman et al. |
| 2005/0042294 A1 | 2/2005 | Thanoo et al. |
| 2005/0119184 A1 | 6/2005 | Khan et al. |
| 2005/0234217 A1 | 10/2005 | Bigiavi et al. |
| 2006/0009595 A1 | 1/2006 | Rix et al. |
| 2006/0025545 A1 | 2/2006 | Brant et al. |
| 2006/0096175 A1 | 5/2006 | Russell et al. |
| 2006/0134221 A1 | 6/2006 | Geall |
| 2006/0183861 A1 | 8/2006 | Harrington et al. |
| 2006/0183881 A1 | 8/2006 | Ibar |
| 2006/0189744 A1 | 8/2006 | Tse et al. |
| 2006/0189763 A1 | 8/2006 | Yang et al. |
| 2006/0211832 A1 | 9/2006 | Brant et al. |
| 2006/0247332 A1 | 11/2006 | Coffey et al. |
| 2006/0293474 A1 | 12/2006 | Brant et al. |
| 2008/0090974 A1 | 4/2008 | Brant et al. |
| 2008/0153997 A1 | 6/2008 | Casty et al. |
| 2008/0234443 A1* | 9/2008 | Kiss et al. .................. 526/64 |

FOREIGN PATENT DOCUMENTS

| | | |
|---|---|---|
| CA | 2103694 | 2/1994 |
| DE | 41 30 299 A1 | 3/1993 |
| EP | 0 480 190 B1 | 4/1992 |
| EP | 0 603 232 B1 | 9/1992 |
| EP | 0 667 359 | 8/1995 |
| EP | 0 718 324 | 6/1996 |
| EP | 0 806 436 | 11/1997 |
| EP | 0 846 696 A1 | 6/1998 |
| EP | 0 887 379 | 12/1998 |
| EP | 0 887 380 | 12/1998 |
| EP | 0 942 017 | 9/1999 |
| EP | 0 987 279 A1 | 3/2000 |
| EP | 0 129 368 B2 | 4/2002 |
| EP | 1 195 391 A1 | 4/2002 |
| EP | 1 231 226 | 8/2002 |
| EP | 1 008 607 B1 | 12/2003 |
| GB | 1443394 | 7/1976 |
| JP | 6-25357 | 2/1994 |
| JP | 9216916 A | 9/1997 |
| JP | 96-208535 | 2/1998 |
| JP | 10045834 | 2/1998 |
| JP | 342 1202 | 4/1998 |
| JP | 1998-110003 A | 4/1998 |
| WO | WO 88/04672 A1 | 6/1988 |
| WO | WO 92/14766 A1 | 9/1992 |
| WO | WO 93/05082 A1 | 6/1993 |
| WO | WO 93/11171 A1 | 6/1993 |
| WO | WO 94/00500 | 1/1994 |
| WO | WO 94/14856 A1 | 7/1994 |
| WO | WO 96/00246 A1 | 1/1996 |
| WO | WO 96/12744 A1 | 5/1996 |
| WO | WO 96/34023 A1 | 10/1996 |
| WO | WO 97/11098 A1 | 3/1997 |
| WO | WO 97/13790 A1 | 4/1997 |
| WO | WO 97/44391 | 11/1997 |
| WO | WO 97/45434 A1 | 12/1997 |
| WO | WO 97/48737 | 12/1997 |
| WO | WO 98/33823 A1 | 8/1998 |
| WO | WO 98/49229 | 11/1998 |
| WO | WO 99/02540 A1 | 1/1999 |
| WO | WO 99/11680 | 3/1999 |
| WO | WO 99/29749 A1 | 6/1999 |
| WO | WO 99/32226 A1 | 7/1999 |
| WO | WO 00/06621 | 2/2000 |
| WO | WO 00/12572 A1 | 3/2000 |
| WO | WO 00/37514 A1 | 6/2000 |
| WO | WO 00/40625 A1 | 7/2000 |
| WO | WO 00/50475 A1 | 8/2000 |
| WO | WO 00/64952 A2 | 11/2000 |
| WO | WO 01/44318 A1 | 6/2001 |
| WO | WO 01/46273 A1 | 6/2001 |
| WO | WO 02/34795 | 5/2002 |
| WO | WO 02/38628 A2 | 5/2002 |
| WO | WO 02/50145 A1 | 6/2002 |
| WO | WO 02/070572 A2 | 9/2002 |
| WO | WO 02/090399 A1 | 11/2002 |
| WO | WO 03/040095 A2 | 5/2003 |
| WO | WO 03/040201 | 5/2003 |
| WO | WO 03/040202 | 5/2003 |
| WO | WO 03/040233 A2 | 5/2003 |

| WO | WO 03/040442 A1 | 5/2003 |
| --- | --- | --- |
| WO | WO 2004/026921 | 4/2004 |
| WO | WO 2006/009976 | 1/2006 |
| WO | WO 2006/009981 | 1/2006 |
| WO | WO 2006/044149 | 4/2006 |
| WO | WO 2006/120177 A2 | 11/2006 |
| WO | WO 2007/037944 | 4/2007 |

OTHER PUBLICATIONS

U.S. Appl. No. 11/854,936, filed Sep. 13, 2007, ExxonMobil.
U.S. Appl. No. 60/993,646, filed Sep. 13, 2007, ExxonMobil.
U.S. Appl. No. 12/074,496, filed Mar. 4, 2008, commonly owned related application.
U.S. Appl. No. 12/002,509, filed Dec. 7, 2007, commonly owned related application.
U.S. Appl. No. 61/008,494, filed Dec. 20, 2007, commonly owned related application.
U.S. Appl. No. 61/008,495, filed Dec. 20, 2007, commonly owned related application.
U.S. Appl. No. 12/008,489, filed Dec. 20, 2007, commonly owned related application.
Lehmus, P. et al., Abstract, "Metallocene-PP produced under supercritical polymerization conditions", and list of posters, 1$^{st}$ BlueSky Conference on Catalytic Olefin Polymerization, Jun. 17-20, 2002, Sorrento, Italy.
Lofgren et al., Abstract, Borealis Publications, "Metallocene-PP produced under supercritical conditions", 1$^{st}$ BlueSky Conference on Catalytic Olefin Polymerization, Jun. 17-20, 2002, Sorrento, Italy (2002).
Zowade et al., Abstract, PL 159518, "Manufacturing Low-molecular-weight Isotactic Polypropylene", Sep. 10, 1989.
Alt, H.G. et al., "Effect of the Nature of Metallocene Complexes of Group IV Metals on Their Performance in Catalytic Ethylene and Propylene Polymerization", Chem. Rev. 100, 2000, pp. 1205-1221.
Akimoto, A. et al., "New Developments in the Production of Metallocene LLDPE by High Pressure Polymerization", Tosoh Corp., Metallocene-Based Polyolefins 2000 (conference proceedings), pp. 287-308 (John Wiley & Sons Ltd.).
Barnhart, R. W. et al., "Synthesis of Branched Polyolefins Using a Combination of Homogeneous Metallocene Mimics", J. Am. Chem. Soc. 1998, vol. 120, pp. 1082-1083.
Bergemann, C. R. et al., "Copolymerization of Ethylene and 1,5-Hexadiene under High Pressure Catalyzed by a Metallocene", J. Mol. Catal. A: Chemical 116, 1997, pp. 317-322 (Elsevier).
Bergemann, C. R. et al., "Copolymerization of Ethylene and Linear α-Olefins with a Metallocene Catalyst System under High Pressure, Part II. Comparison of Propene, 1-Butene, 1-Hexene and .1-Decene", J. Mol. Catal. A: Chemical 105, 1996, pp. 87-91 (Elsevier).
Britovsek, G. J. P. et al., "The Search for New-Generation Olefin Polymerization Catalysts: Life Beyond Metallocenes", Chemie Intl. Edn., 1999, vol. 38, pp. 428-447.
Bujadoux, G. K., "Use of Bridged and Non-Bridged Metallocene Catalysts in High Pressure/High Temperature Ethylene/α-Olefin Copolymerization", Metallocenes 95 Intl. Congr., Metallocene Polym. 1995, pp. 375-402, Schotland Bus. Rsrch. Publ.
Chen, E. Y.-X, et al., "Cocatalysts for Metal-Catalyzed Olefin Polymerization: Activators, Activation Processes, and Structure-Activity Relationships", Chem. Rev. 2000, vol. 100, pp. 1391-1434.
Coates, G. W., "Precise Control of Polyolefin Stereochemistry Using Single Site Metal Catalysis", Chem. Rev. 100, 2000, pp. 1223-1252.
Cottom, W. P., "Waxes", in Encyclo. Chem. Tech., vol. 25, pp. 614-626, Fourth edition, 1998.
Eckstein, A. et al., "Determination of Plateau Moduli and Entanglement Molecular Weights of Isotactic, Syndiotactic, and Atactic Polypropylenes Synthesized with Metallocene Catalysts", Macromolecules 31, 1998, pp. 1335-1340.
Ewen, J. A. et al., "Syndiospecific Propylene Polymerizations with Group 4 Metallocenes", J. Am. Chem. Soc., 1988, vol. 110, pp. 6255-6256.
Gotz, C. et al., "MAO-Free Metallocene Based Catalysts in High Pressure Polymerisation of Ethylene and 1-Hexene", Chem. Eng. Technol., 21, 1998, pp. 954-957 (Wiley-VCH Verlag GmbH).
Hauptman, E. et al., "Stereoblock Polypropylene: Ligand Effects on the stereospecificity of 2-Arylindene Zirconocene Catalysts", J. Am. Chem. Soc. 1995, vol. 117, pp. 11586-11587.

Ittel, S. D. et al., "Late Metal Catalysts for Ethylene Homo- and Copolymerization", Chem. Rev. 2000, vol. 100, pp. 1169-1203.
Janiak, C., "Metallocene Catalysts for Olefin Polymerization", Metallocenes, Synthesis, Reactivity and Applications, vol. 2, Wiley-VCH, 1998, pp. 547-614, A. Togni and R. L. Halterman, editors.
Luft, G., "Development of Metallocene Catalysts and Their Application in the High Pressure Polymerisation Process" (Darmstadt University of Technology), PE 99, World Congress Global Technology Update Forum, Mar. 15, 16, 1999, Zurich, Switzerland.
Resconi, L. et al., "Selectivity in Propene Polymerization with Metallocene Catalysts", Chem. Rev. 2000, vol. 100, pp. 1253-1345.
Schaverien, C. J. et al., "Ethylene Bis(2-indenyl) Zirconocenes: A New Class of Diastereomeric Metallocenes for the (Co)Polymerization of α-Olefins", Organometallics 2001, vol. 20, No. 16, pp. 3436-3452 (ACI, Columbus, Ohio), Aug. 2001.
Scollard, J. D. et al., "Polymerization of α-Olefins by Chelating Diamide Complexes of Titanium", Macromolecules, 1996, vol. 29, p. 5241-5243.
Smith, B. D. et al., "Thermodynamic Data for Pure Compounds Part A, Hydrocarbons and Ketones Physical Sciences Data", vol. 25, Elsevier, New York, 1986, pp. 308-309.
Stephenson et al., "Handbook of the Thermodynamics of Organic Compounds", Elsevier Science Publ. NY, p. 75, 1987.
Stratton, A. W., "Waxes", in Encyclo. Polymer Science and Eng., vol. 17, pp. 784-795, Second Edition, 1985.
Suzuki, N. et al., "Olefin Polymerization Using Highly Congested Ansa-Metallocenes Under High Pressure: Formation of Superhigh Molecular Weight Polyolefins", Macromolecules, 2000, vol. 33, No. 3, pp. 754-759.
Yano., A. et al., "Homo- and Copolymerization of Ethylene at High Temperature with Cationic Zirconocene Catalysts", Macromol. Chem. Phys. 200, No. 4, pp. 917-923 (Wiley-VCH Verlag GmbH).
Yano, A. et al., Homo- and Copolymerization of Ethylene by Cationic Hafnocene Catalysts based on Tetrakis(pentafluorophenyl), Macromol. Chem. Phys. 200, No. 4, 1999, pp. 924-932 (Wiley-VCH Verlag Gmb).
Yano, A. et al., "Novel Zirconocene Catalysts for the Production of High Molecular Weight LLDPE in High Temperature Polymerization", Macromol. Chem. Phys. 200, No. 4, 1999, pp. 933-941 (Wiley-VCH Verlag GmbH).
Hackmann et al., "Functional Olefin Copolymers: Uniform Architectures of Propene/7-Methyl-1,6-Octadiene Copolymers by ATR-FTIR Spectroscopy Control of Monomer Composition", Macromolecules, American Chemical Society, Easton, US, vol. 33, No. 5, Mar. 7, 2000, pp. 1524-1529 (Germany).
Hackmann, M. et al., "Zirconocene-MAO Catalyzed Homo- and Copolymerizations of Linear Assymetrically Substituted Dienes with Propene: A Novel Strategy of Functional (co)poly(α-olefin)s", Macromol. Chem. Phys., pp. 1511-1517, 1998 (Germany).
Lee et al., "Copolymerizations of Olefins and Dienes with Homogeneous and Heterogeneous Catalysts", Eur. Polym. J., vol. 33(4), pp. 447-451, 1997 (Great Britain).
Dassaud, J. P. et al., "Copolymerization of Propene-Nonconjugated Dienes: Derivatization Through Hydroboration and Epoxydation", Polym. Adv. Technol., 4(7), pp. 457-464, 1993 (France).
Resconi, L. et al., "Effect of Monomer Concentration on Propene Polymerization with the rac-[Ethylenebis(1-indenyl)]zirconium Dichloride/Methylaluminoxane Catalyst", Macromol. 1995, 28, pp. 6667-6676.
Spalek, W. et al., "The Influence of Aromatic Substituents on the Polymerization Behavior of Bridged Zirconocene Catalysts", Organometallics 1994, 13, pp. 954-963.
Resconi, L. et al., "Highly Regiospecific Zirconocene Catalysts for the Isospecific Polymerization of Propene", J. Amer. Chem. Soc. 1998, 120, pp. 2308-2321.
Resconi, L. et al., "rac-[Methylene(3-tert-butyl-1-indenyl)$_2$]ZrCl$_2$: A Simple, High-Performance Zirconocene Catalyst for Isotactic Polypropene", Organometallics 2000, 19, pp. 420-429.
Kirby, C. F. et al., "Phase Behavior of Polymers in Supercritical Fluid Solvents", Chem. Rev. 1999, 99, pp. 565-602.
Lahelin et al., Propylene Polymerization with rac-SiMe$_2$(2-ME-4-PhInd)$_2$ZrMe$_2$/MAO: Polymer Characterization and Kinetic Models, Macromol. Chem. Phys., 2003, vol. 204, pp. 1323-1337.

* cited by examiner

Production of polymer blends in two-stage series reactor configuration
(Prior Art)

Graphical Depiction of the Thermodynamic Definition of Binodal and Spinodal Boundaries

IN-LINE PROCESS FOR PRODUCING PLASTICIZED POLYMERS AND PLASTICIZED POLYMER BLENDS

CROSS-REFERENCE TO RELATED APPLICATIONS

This is a Non-Provisional Application that claims priority to U.S. Provisional Application 60/993,647 filed Sep. 13, 2007, which is herein incorporated by reference.

FIELD

The present disclosure relates to the field of polymer blending. It more particularly relates to a process for in-line blending of polyolefin-based polymers and plasticizers in the fluid phase. Still more particularly, the present disclosure relates to a process for fluid-phase in-line blending of high molecular weight olefin polymers low molecular weight, low glass transition temperature polyolefins acting as plasticizers in the product-feed separator section of an integrated polymerization plant operating with two or more parallel reactor trains.

BACKGROUND

Polyolefins, such as polyethylene or polypropylene, are widely used in a number of everyday articles, machines, consumer goods, and the like. Polyolefins are relatively inexpensive to produce and are capable of providing a number of useful functions. Polyolefins may be formed into various shapes, films, laminates, and the like. Polyolefins may be coated on, or co-extruded with various substrates. Polyolefins may also be combined with other materials to form a structure having a plurality of layers, each layer having a specific purpose. Laminates, for example, may comprise a plurality of layers, such as a configurationally rigid core layer, an outer liquid-tight layer, an oxygen gas barrier such as a mid-layer of aluminum foil, and/or other layers depending on application needs. However, polyolefins may be too rigid and hard for the target applications, or cannot be extended without tear, or difficult to process due to their high viscosity at the processing temperature, or become brittle at colder temperatures due to their relatively high glass transition temperatures. These properties may render various polyolefins brittle, hard, inflexible, and thus unsuitable for particular uses, particularly uses at lower temperatures or may lead to slower processing speeds and/or excessive rejects during processing. Many applications of polyolefins would benefit from a polyolefin having useful properties over a wide range of temperatures, and under a variety of conditions. It would also be beneficial if the viscosity of melts could be reduced affording better and higher speed processability in common polymer processing plants, such as extruders, melt blowers, etc. Such useful properties may include both high- and low-temperature performance in the areas of impact strength, toughness, flexibility, and the like. The ability to adjust the stiffness-toughness balance and processability of polyolefins is important to meeting the needs of a broad range of applications at a lower cost and thus to expanding the potential of polyolefins in delivering desired performance at a reduced cost.

In some instances, the stiffness-toughness balance may be tailored by changing the molecular structure of polymers or by changing their composition (i.e. making copolymers), stereoregularity, molecular weight, etc. The stiffness-toughness balance may also be readily shifted by making blends of polymers with different stiffness and toughness or by blending polymers and plasticizing agents, such as polyolefin fluids and low molecular weight polymers, particularly low glass transition temperature polyolefin fluids and polymers. A plasticizer added to high molecular weight, highly crystalline stiff polyolefins softens the structure to improve the toughness of such materials. Plasticizers with low glass transition temperature also extend the flexibility of plastics to lower temperatures by lowering the glass transition temperature of the polymer-plasticizer blend. Plasticizers are also beneficial during polymer processing due to improvements in a number of characteristics, such as lubricity, viscosity, ease of fusion, etc. The concept of plasticization, the benefits of using plasticizers, and the different methods of using plasticizers are discussed in detail in J. K. Sears, J. R. Darby, THE TECHNOLOGY OF PLASTICIZERS, Wiley, New York, 1982. Although this monograph focuses on the plasticization of poly(vinyl chloride), PVC, the concepts and benefits are analogous to those applicable to plasticized polyolefins.

Since the plasticizers are often fluids at ambient temperature, plasticized polymer blends are sometimes also referred to herein as fluid-enhanced polyolefins or fluid-enhanced polymers. These plasticized polymers may be made by a variety of methods. Plasticized polyolefins are traditionally made by starting with polyolefin polymers and plasticizer fluids made in separate plants. Since the polymer is in its essentially pure, fully recovered solid state, it is difficult and expensive to blend it with a plasticizer fluid. A flexible but expensive process of making them starts with the high molecular weight polymer resin component in its solid, essentially pure, fully recovered state. In one prior art process, the one or more solid polymers are first melted and then blended with the plasticizing fluid or low molecular weight resin, which is commonly referred to as a melt-blending process. In another prior art process, the one or more solid polymers are put into solution with a suitable solvent before being blended with the plasticizing fluid or low molecular weight resin, which is commonly referred to as an off-line solution blending process. Off-line blending to produce plasticized polyolefins has numerous issues in that it increase processing cost. For example, melt blending is difficult requiring high-performance blenders or extruders due to the high viscosity of polymers and the low viscosity of the plasticizing fluid. Off-line solution blending is also an expensive process due to the need for redissolving the polymer and possibly the plasticizer blend components and also due to the cost of solvent handling. Also, as mentioned before, handling plasticizers requires additional special equipment.

As described above, polymer blends may be made by a variety of ways. A flexible but expensive off-line process of making polymer blends uses solid polymers as starting materials, typically outside the polymerization process that produced the polymer blend components. The polymer blend components are typically first melted or dissolved in a solvent and then blended. These processes are known as melt-blending and off-line solution blending, respectively. In melt blending, the solid, often pelletized or baled, polymer blend components are first melted and then blended together in their molten state. One of the difficulties presented by melt blending is the high viscosity of molten polymers, which makes blending of two or more polymers difficult and often imperfect on the molecular level. In solution off-line blending, the solid, often pelletized, polymer blend components are first dissolved in a suitable solvent to form a polymer solution, and then two or more polymer solutions are blended together. After blending, solution blending requires the extraction of solvent from the blend and drying of the blended polymer. Solution blending can overcome the viscosity issue associated with melt blending, but is expensive due to the need for redissolving the polymer blend components and due to the cost of solvent handling.

The common feature of both melt blending and off-line solution blending is that the polymer blending components are made in separate plants and the solid polymers then are reprocessed either in a molten or in a dissolved state to prepare the final polymer blend. In fact, these off-line blending processes are often operated by so-called compounders, generally independent of the manufacturers of the polymer blend components. These processes add considerable cost to the cost of the final polymer blend. The production and full polymer recovery in separate plants and subsequent reprocessing increases the costs of producing such blends because of the need for duplicate polymer recovery lines and because of the need for separate blending facilities and the energy associated with their operations. Off-line solution blending also requires extra solvent, and facilities for polymer dissolution and solvent recovery-recycle. Handling plasticizers for blending them with the base polymer represents a further challenge, since plasticizers are typically low molecular weight, low melting point fluids or soft materials. Compounding plants are typically equipped for handling free-flowing pelletized components, thus are not equipped for receiving, storing, and blending fluids and/or soft, baled substances. The disclosed processes blend the plasticizer fluids and/or soft polymers in the polymerization plant producing plasticized polymers for final use, or plasticized-polymer masterbatches for further compounding in stable pelletized forms, thus afford their handling in downstream processing plants without the need for special handling and without the associated investment costs. For the above-outlined reasons, substantial reprocessing costs could be saved if the polymer blends could be made in one integrated polymerization plant in-line, i.e. before the recovery and pelletizing of the solid polymer blend components. In some instances, especially when the plasticizer is liquid at ambient temperature, significant cost savings can also be achieved even if the plasticizer was produced in a separate plant by blending the liquid plasticizer with the polymer in its diluted state, i.e., before the viscosity-reducing components of the polymerization system, such as monomer and the optional inert solvent/diluent, are removed from the product polymer or polymer blend.

The disadvantages of a separate polyolefin blending plant associated with the melt blending and off-line solution blending processes is alleviated with the prior art method of in-line solution blending of polymers using a series reactor configuration. Utilizing the series reactor configuration, product blending may be accomplished in the solution polymerization reactor itself when the effluent of the first solution polymerization reactor is fed into the second reactor operating at different conditions with optionally different catalyst and monomer feed composition. Referring to the two-stage series reactor configuration of FIG. 1, the two different polymers made in the first and second reactor stages are blended in the second stage yielding a blended polymer product leaving the second reactor. Such reactor series configuration may be further expanded into more than a two-stage series configuration (three or more reactors in series). Generally, a series of n reactors may produce a blend with as many as n components or even more present in the effluent of the last reactor. Note that in principle, more than n components may be produced and blended in n reactors by, for example, using more than one catalyst or by utilizing multiple zones operating at different conditions in one or more reactors of the series reactor cascade. While mixing in the downstream reactor(s) provides good product mixing, particularly when the reactors are equipped with mixing devices, e.g., mechanical stirrers, such series reactor configuration and operation presents a number of practical process and product quality control problems due to the close coupling of the reactors in the cascade. One of the most important difficulties in commercial practice is ensuring proper blend and monomer ratios to deliver consistent blend quality. Additional complications arise when the blend components have different monomer compositions, particularly when they have different monomer pools, such as in the case of blending different copolymers or in the case of blending homo- and copolymers. As will be shown later in the detailed description of the disclosed processes, this is often the case in the production of plasticized polyolefins. In such instances, either some monomers need to be converted completely before passing the effluent to the downstream stages or need to be removed between the reactor stages. In many cases, such solutions are not practical. Also, since the monomer streams are blended, there is no option for their separate recovery and recycle mandating costly monomer separations in the monomer recycle lines.

The above-outlined issues with series reactor operations are apparent to those skilled in the art of polymer reactor engineering. These difficulties are particularly significant in polymerization because unlike in small-molecule synthesis, reactor conditions determine not only reactor productivities related to blend ratio, but also product properties related to controlling the quality of the polymer blend components. For example, FIGS. 2 and 3 show how reactor temperature and pressure affect polymer properties of fundamental importance, such as molecular weight (MW) and melting behavior. Surprisingly, we found that monomer conversion in the reactor also influences these critical product; attributes (see FIG. 4). Since in a series reactor cascade, the effluent of an upstream reactor flows into the next downstream member of the reactor cascade, the residence time, catalyst concentration, and monomer composition and thus monomer conversion in the downstream reactor cannot be adjusted independently of the operating conditions (particularly of the flow rate) of the upstream reactor. Because of this close and inherent coupling of operating regimes in the reactors of the series cascade, the correlations depicted in FIGS. 2, 3, and 4 further reduce the controllability, flexibility, and thus the usefulness of the in-line blending method in a series reactor configuration. Ultimately, this greatly reduces the number of blend products that can be made in such a series reactor cascade and makes the blend quality difficult to control.

Applying parallel reactors can overcome the disadvantages related to the direct coupling of the polymerization reactors in an in-line polymer blending applying series reactors. While production flexibility is increased, a parallel reactor arrangement necessitates the installation of blending vessels increasing the cost of the process. A need thus exists for an improved and cost-effective method of in-line blending of polymers and plasticizers to avoid the issues associated with the prior-art methods, such as melt blending and off-line solution blending. More particularly, a need exists for an improved in-line method of blending polymers and plasticizers, especially for an improved in-line method of blending polyolefins and plasticizers, where the residence time, monomer composition, catalyst choice, and catalyst concentration can be independently controlled in the polymer reactor(s) and the optional plasticizer reactor(s) prior to the blending step. There is also a need for a simplified and cost-effective polymer-plasticizer blending process to reduce the number of process steps and the associated investment and operating costs in an integrated polymer and plasticizer production and blending process employing parallel reactor trains for producing the polymer-plasticizer blend components in-line, i.e. without recovering the polymer component(s) in its/(their) solid state. Embodiments of the present invention, which follow, meet these needs.

SUMMARY

Provided is a process for fluid phase in-line blending of polymers and plasticizers.

According to the present disclosure, an advantageous process for in-line blending of plasticized polymers includes: (a) providing two or more reactor trains configured in parallel and a high-pressure separator downstream fluidly connected to the two or more reactor trains configured in parallel, wherein one or more of the reactor trains produces one or more polymers and one or more of the reactor trains produces one or more plasticizers; (b) contacting in the two or more reactor trains configured in parallel 1) olefin monomers having two or more carbon atoms 2) one or more catalyst systems, 3) optional one or more comonomers, 4) optional one or more scavengers, and 5) optional one or more diluents or solvents, wherein at least one of the reactor trains configured in parallel is at a temperature above the solid-fluid phase transition temperature of the polymerization system and a pressure no lower than 10 MPa below the cloud point pressure of the polymerization system and less than 1500 MPa, wherein the polymerization system for each reactor train is in its dense fluid state and comprises the olefin monomers, any comonomer present, any diluent or solvent present, any scavenger present, and the polymer product, wherein the catalyst system for each reactor train comprises one or more catalyst precursors, one or more activators, and optionally, one or more catalyst supports, wherein the one or more catalyst systems are chosen from Ziegler-Natta catalysts, metallocene catalysts, nonmetallocene metal-centered, heteroaryl ligand catalysts, late transition metal catalysts, and combinations thereof; (c) forming an unreduced polymer or unreduced plasticizer reactor effluent including a homogeneous fluid phase polymer-monomer mixture in one or more parallel reactor trains and a homogeneous fluid phase plasticizer-monomer mixture in one or more parallel reactor trains; (d) passing the reactor effluents comprising the homogeneous fluid phase polymer-monomer mixture and plasticizer-monomer mixture from each parallel reactor train through the high-pressure separator for product blending and product-feed separation; (e) maintaining the temperature and pressure within the high-pressure separator above the solid-fluid phase transition point but below the cloud point pressure and temperature to form a fluid-fluid two-phase system comprising a plasticized polymer-rich blend phase and a monomer-rich phase; and (f) separating the monomer-rich phase from the plasticized polymer-rich blend phase in the high pressure separator to form a plasticized polymer blend and a separated monomer-rich phase.

A further aspect of the present disclosure relates to an advantageous process for in-line blending of plasticized polymers including: (a) providing two more reactor trains configured in parallel and two or more high-pressure separators fluidly connected to the two or more reactor trains configured in parallel, wherein one or more of the reactor trains produces one or more polymers and one or more of the reactor trains produces one or more plasticizers; (b) contacting in the two or more reactor trains configured in parallel 1) olefin monomers having two or more carbon atoms 2) one or more catalyst systems, 3) optional one or more comonomers, 4) optional one or more scavengers, and 5) optional one or more diluents or solvents, wherein at least one of the reactor trains configured in parallel is at a temperature above the solid-fluid phase-transition temperature of the polymerization system and a pressure no lower than 10 MPa below the cloud point pressure of the polymerization system and less than 1500 MPa, wherein the polymerization system for each reactor train is in its dense fluid state and comprises the olefin monomers, any comonomer present, any diluent or solvent present, any scavenger present, and the polymer product, wherein the catalyst system for each reactor train comprises one or more catalyst precursors, one or more activators, and optionally, one or more catalyst supports, wherein the one or more catalyst systems are chosen from Ziegler-Natta catalysts, metallocene catalysts, nonmetallocene metal-centered, heteroaryl ligand catalysts, late transition metal catalysts, and combinations thereof; (c) forming an unreduced polymer or unreduced plasticizer reactor effluent including a homogenous fluid phase polymer-monomer mixture or plasticizer-monomer mixture in each parallel reactor train; (d) passing the reactor effluents from one or more of the parallel reactor trains through one or more high-pressure separators, maintaining the temperature and pressure within the one or more high-pressure separators above the solid-fluid phase transition point but below the cloud point pressure and temperature to form one or more fluid-fluid two-phase systems with each two-phase system comprising a polymer-enriched phase or plasticizer-enriched phase and a monomer-rich phase, and separating the monomer-rich phase from the polymer-enriched phase or plasticizer-enriched phase in each of the one or more high-pressure separators to form one or more separated monomer-rich phases, one or more polymer-enriched phases and one or more plasticizer-enriched phases; (e) passing the one or more polymer-enriched phases and one or more plasticizer-enriched phases from the one or more high-pressure separators of (d), any unreduced polymer reactor effluents from one or more parallel reactor trains through another high-pressure separator for product blending and product-feed separation; (f) maintaining the temperature and pressure within the another high pressure separator of (e) above the solid-fluid phase transition point but below the cloud point pressure and temperature to form a fluid-fluid two-phase system comprising a plasticized polymer-rich blend phase and a monomer-rich phase; and (g) separating the monomer-rich phase from the plasticized polymer-rich blend phase in the high pressure separator to form a plasticized polymer blend and a separated monomer-rich phase.

Another aspect of the present disclosure relates to an advantageous process for in-line blending of plasticized polymers including: (a) providing two or more reactor trains configured in parallel, a high-pressure separator downstream fluidly connected to the two or more reactor trains configured in parallel, and one or more storage tanks, wherein the two or more reactor trains produce one or more polymers and the one or more storage tanks store one or more off-line produced plasticizers; (b) contacting in the two or more reactor trains configured in parallel 1) olefin monomers having two or more carbon atoms 2) one or more catalyst systems, 3) optional one or more comonomers, 4) optional one or more scavengers, and 5) optional one or more diluents or solvents, wherein at least one of the reactor trains configured in parallel is at a temperature above the solid-fluid phase transition temperature of the polymerization system and a pressure no lower than 10 MPa below the cloud point pressure of the polymerization system and less than 1500 MPa, wherein the polymerization system for each reactor train is in its dense fluid state and comprises the olefin monomers, any comonomer present, any diluent or solvent present, any scavenger present, and the polymer product, wherein the catalyst system for each reactor train comprises one or more catalyst precursors, one or more activators, and optionally, one or more catalyst supports, wherein the one or more catalyst systems are chosen from Ziegler-Natta catalysts, metallocene catalysts, nonmetallocene metal-centered, heteroaryl ligand catalysts, late transition metal catalysts, and combinations thereof; (c) forming an unreduced polymer reactor effluent including a homogeneous fluid phase polymer-monomer mixture in each parallel reactor train; (d) passing the polymer reactor effluent comprising the homogeneous fluid phase polymer-monomer mixture from each parallel reactor train through the high-pressure separator for product blending and product-feed separation; (e) maintaining the temperature and pressure within the high-pressure separator above the solid-fluid phase transition point but below the cloud point pressure and temperature to form a fluid-fluid two-phase system comprising a polymer-rich blend phase and a monomer-rich phase; (f) separating the monomer-rich phase from the polymer-rich blend phase in the high pressure separator to form a polymer blend and a separated monomer-rich phase; and (g) feeding the one or more off-line produced plasticizers from the one or more storage tanks to the process after (c) to form a plasticized polymer blend.

A still further aspect of the present disclosure relates to an advantageous process for in-line blending of plasticized polymers including: (a) providing two or more reactor trains configured in parallel and two or more high-pressure separators fluidly connected to the two or more reactor trains configured in parallel, and one or more storage tanks, wherein two or more of the reactor trains produce one or more polymers and the one or more storage tanks store one or more off-line-produced plasticizers; (b) contacting in the two more reactor trains configured in parallel 1) olefin monomers having two or more carbon atoms 2) one or more catalyst systems, 3) optional one or more comonomers, 4) optional one or more scavengers, and 5) optional one or more diluents or solvents, wherein at least one of the reactor trains configured in parallel is at a temperature above the solid-fluid phase-transition temperature of the polymerization system and a pressure no lower than 10 MPa below the cloud point pressure of the polymerization system and less than 1500 MPa, wherein the polymerization system for each reactor train is in its dense fluid state and comprises the olefin monomers, any comonomer present, any diluent or solvent present, any scavenger present, and the polymer product, wherein the catalyst system for each reactor train comprises one or more catalyst precursors, one or more activators, and optionally, one or more catalyst supports, wherein the one or more catalyst systems are chosen from Ziegler-Natta catalysts, metallocene catalysts, nonmetallocene metal-centered, heteroaryl ligand catalysts, late transition metal catalysts, and combinations thereof; (c) forming an unreduced polymer reactor effluent including a homogenous fluid phase polymer-monomer mixture in each parallel reactor train; (d) passing the reactor effluents from one or more of the parallel reactor trains through one or more high-pressure separators, maintaining the temperature and pressure within the one or more high-pressure separators above the solid-fluid phase transition point but below the cloud point pressure and temperature to form one or more fluid-fluid two-phase systems with each two-phase system comprising a polymer-enriched phase and a monomer-rich phase, and separating the monomer-rich phase from the polymer-enriched phase in each of the one or more high-pressure separators to form one or more separated monomer-rich phases and one or more polymer-enriched phases; (e) passing the one or more polymer-enriched phases from the one or more high-pressure separators of (d), any unreduced polymer reactor effluents from one or more parallel reactor trains through another high-pressure separator for product blending and product-feed separation; (f) maintaining the temperature and pressure within the another high pressure separator of (e) above the solid-fluid phase transition point but below the cloud point pressure and temperature to form a fluid-fluid two-phase system comprising a polymer-rich blend phase and a monomer-rich phase; (g) separating the monomer-rich phase from the polymer-rich blend phase in the high pressure separator to form a polymer blend and a separated monomer-rich phase; and (h) feeding the one or more off-line produced plasticizers from the one or more storage tanks to the process after (c) to form a plasticized polymer blend.

These and other features and attributes of the disclosed processes for in-line blending of plasticized polymers and their advantageous applications and/or uses will be apparent from the detailed description that follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DEFINITIONS

For the purposes of this disclosure and the claims thereto:

A catalyst system is defined to be the combination of one or more catalyst precursor compounds and one or more activators. Any part of the catalyst system can be optionally supported on solid particles, in which case the support is also part of the catalyst system.

Critical Properties of Pure Substances and Mixtures:

Pure substances, including all types of hydrocarbons, can exist in either a subcritical, or supercritical state, depending on their temperature and pressure. Substances in their supercritical state possess interesting physical and thermodynamic properties, which are exploited in this invention. Most notably, as supercritical fluids undergo large changes in pressure, their density and solvency for polymers changes over a wide range. To be in the supercritical state, a substance must have a temperature above its critical temperature (Tc) and a pressure above its critical pressure (Pc). Mixtures of hydrocarbons, including mixtures of monomers, polymers, and optionally solvents, have pseudo-critical temperatures (Tc) and pseudo-critical pressures (Pc), which for many systems can be approximated by mole-fraction-weighted averages of the corresponding critical properties (Tc or Pc) of the mixture's components. Mixtures with a temperature above their pseudo-critical temperature and a pressure above their pseudo-critical pressure will be said to be in a supercritical state or phase, and the thermodynamic behavior of supercritical mixtures will be analogous to supercritical pure substances.

Phase Behavior:

The phase of a hydrocarbon, or mixture of hydrocarbons, is a key thermodynamic property. A mixture's phase may be either solid, vapor, liquid, or a supercritical fluid. For purposes of this invention, the supercritical fluid phase may at times simply be referred to as the fluid phase. A mixture is determined to be in the fluid phase when its temperature exceeds its critical, or pseudo-critical temperature (Tc) and when its pressure exceeds its critical, or pseudo-critical pressure (Pc).

Figure 29:
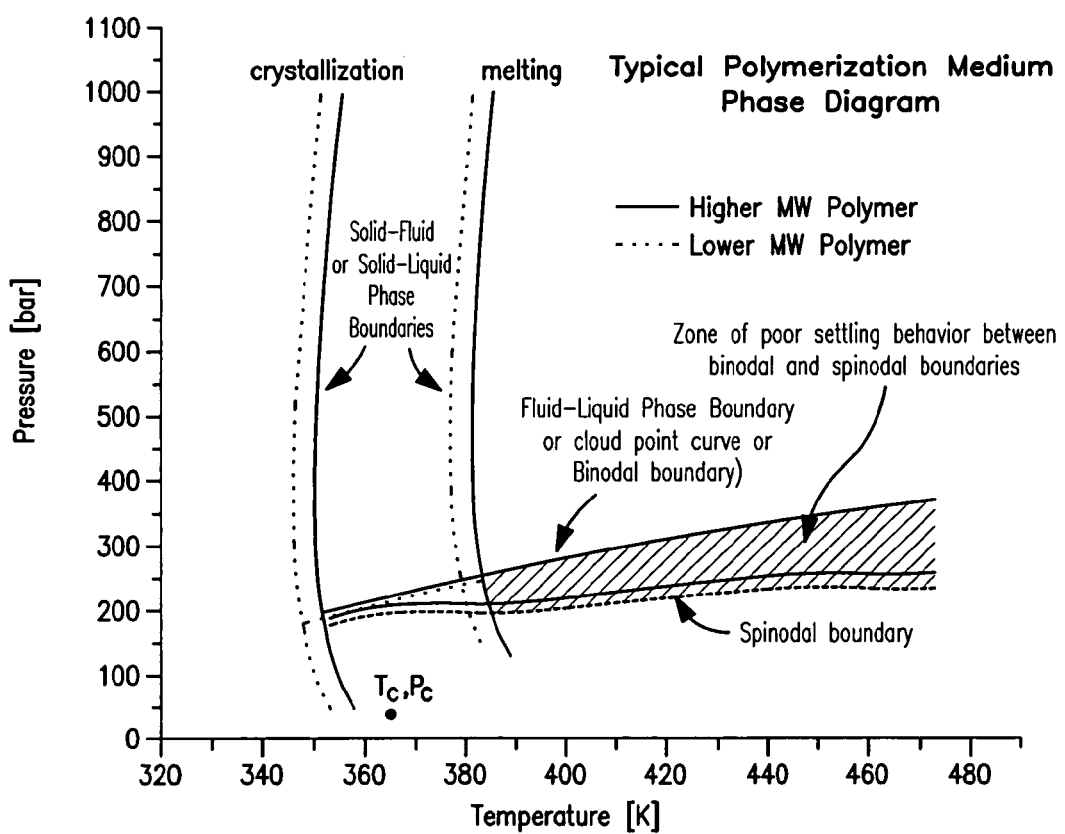
FIG. 29 presents a phase diagram for a typical polymerization medium of the current invention.

When mixtures change their phase by virtue of changes in temperature, pressure, and/or composition, they are said to cross phase boundaries, which may be represented as a locus of points (curves) on temperature-pressure diagrams, where said curves apply to a mixtures of a given composition. For purposes of this invention, the phase boundaries between fluid and liquid phases will be called fluid-liquid phase boundaries, or cloud point curves, and transitions of temperatures or pressures that cross these boundaries may be referred to as fluid-liquid transitions. A given point on the cloud point curve will be referred to by its cloud point pressure. The cloud point pressure can be experimentally determined as the pressure at which, and below which, at a given temperature, the polymerization system becomes turbid as described in J. Vladimir Oliveira, C. Dariva and J. C. Pinto, Ind. Eng, Chem. Res. 29 (2000) 4627. For purposes of this invention and the claims thereto, the cloud point is measured by shining a laser through the selected polymerization system in a cloud point cell onto a photocell and recording the pressure at the onset of rapid increase in light scattering for a given temperature. For purposes of illustration, the fluid-liquid phase boundary (cloud point curve) of a typical polymerization medium is depicted in FIG. 29. The critical temperatures (Tc) and critical pressures (Pc) are those that are found in the Handbook of Chemistry and Physics, David R. Lide, Editor-in-Chief, 82nd edition 2001-2002, CRC Press, LLC. New York, 2001. In particular, the Tc and Pc of selected molecules are:

| Name | Tc (K) | Pc (MPa) | Name | Tc (K) | Pc (MPa) |
| --- | --- | --- | --- | --- | --- |
| Hexane | 507.6 | 3.025 | Propane | 369.8 | 4.248 |
| Isobutane | 407.8 | 3.64 | Toluene | 591.8 | 4.11 |
| Ethane | 305.3 | 4.872 | Methane | 190.56 | 4.599 |
| Cyclobutane | 460.0 | 4.98 | Butane | 425.12 | 3.796 |
| Cyclopentane | 511.7 | 4.51 | Ethylene | 282.34 | 5.041 |
| 1-Butene | 419.5 | 4.02 | Propylene | 364.9 | 4.6 |
| 1-pentene | 464.8 | 3.56 | Cyclopentene | 506.5 | 4.8 |
| Pentane | 469.7 | 3.37 | Isopentane | 460.4 | 3.38 |
| Benzene | 562.05 | 4.895 | Cyclohexane | 553.8 | 4.08 |
| 1-hexene | 504.0 | 3.21 | Heptane | 540.2 | 2.74 |

273.2 K = 0° C.

Phase boundaries between solids and liquids (or solids and fluids) will be called solid-liquid (or solid-fluid) phase boundaries. Crossing solid-liquid (or solid-fluid) phase boundaries will be called solid-liquid (or solid-fluid) transitions. A single point on a solid-liquid (or solid-fluid) phase boundary may be referred to as solid-liquid (or solid-fluid) transition temperature. However, many of mixtures referred to in this invention exhibit two different solid-liquid (or solid-fluid) phase boundaries, depending on the direction of the phase change. One is for melting, ie. when the direction of phase change is from solid to liquid (or fluid), and the other is for crystallization, ie. when the direction of phase change is from liquid (or fluid) to solid. When it is necessary to differentiate between these two types of transitions, the terms melting and crystallization will be used, and a single point on the phase boundary will be referred to by its melting temperature or its crystallization temperature. For purposes of this invention and the claims thereto, solid-liquid (or solid-fluid) phase transitions of either type are determined by shining a laser through the selected polymerization medium in a cell onto a photocell and recording the temperature at the onset of rapid increase in light scattering indicating the formation of a solid phase (crystallization), or at the onset of a rapid decrease in light scattering indicating the disappearance of a solid phase (melting). For purposes of illustration, solid-liquid (or solid-fluid) phase boundaries of both the crystallization and melting types for a typical polymerization medium are depicted in FIG. 29.

Phase Densities:

As described above, the measurement of phase boundaries is determined by making cloud point pressure measurements at a variety of temperatures for a given composition mixture, using the experimental methods described in J. Vladimir Oliveira, C. Dariva and J. C. Pinto, Ind. Eng, Chem. Res. 29 (2000) 4627. These phase boundary data are all that is needed to fit Equation of State (EOS) models to predict the thermodynamic and physical properties of the individual phases, ie. fluid, liquid, solid, and/or vapor over a range of temperature and pressure. For the experimental work supporting the current invention, a version of the Statistically Associating Fluid Theory (SAFT) EOS called SAFT1 (Adidharma and Radosz, 1998) has been used for this purpose. Because phase separation experiments must be run at high temperatures and pressures, it is usually impractical to sample individual phases in multi-phase mixtures to determine their composition or physical properties, and thus the predicted properties of these phases have been used in lieu of directly measured values in support of the current invention. This approach has been validated in other instances, where material balances from pilot plants and commercial plants have been used to validate SAFT1 EOS predictions. As an example, SAFT1 EOS models of the polymerization systems and liquid-liquid separation systems described in U.S. Pat. No. 6,881,800(B2) and U.S. Pat. No. 7,163,989(B2), which include polymers, monomers, and catalysts similar to the current invention, but which include relatively large amounts of alkane solvents in the polymerization medium, and are operated at lower pressures than the current invention, have been verified by these types of material balances.

Figure 1:
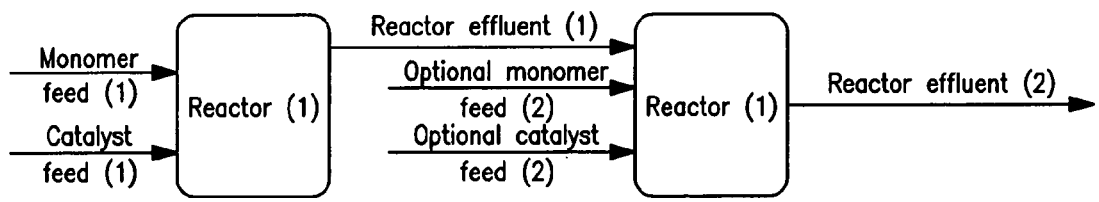
FIG. 1 presents the process for the production of polymer blends in a two-stage series reactor configuration (prior art)
Figure 2:
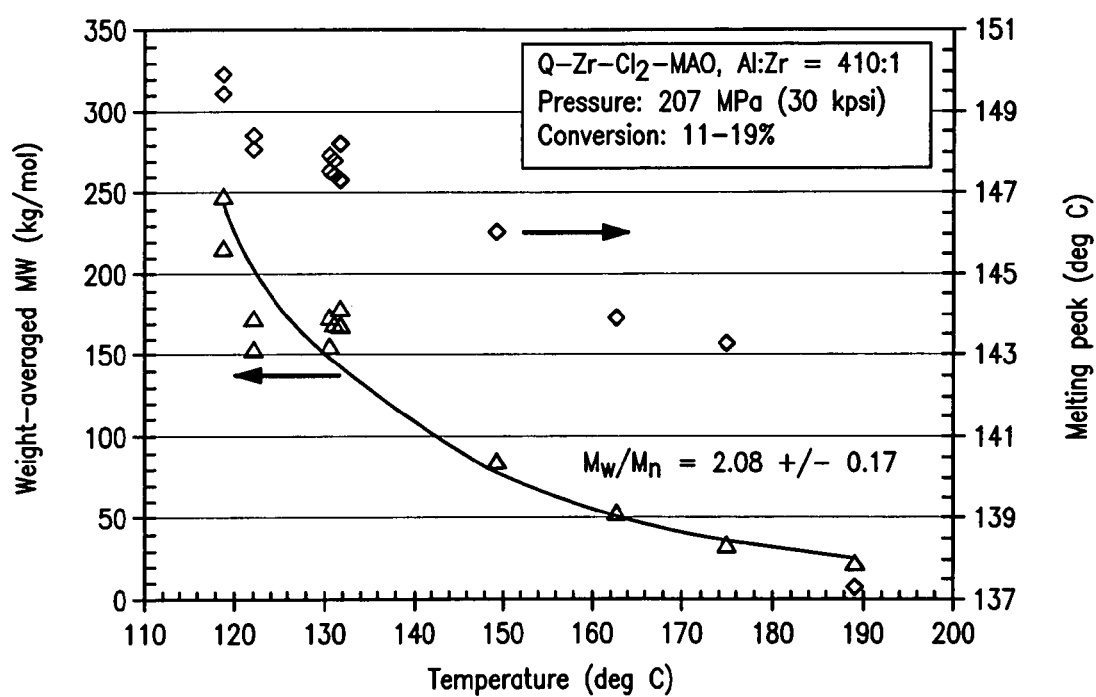
FIG. 2 presents the effect of polymerization temperature on the molecular weight and melting point of polypropylene made in supercritical polypropylene using MAO-activated (μ-dimethylsilyl)bis(2-methyl-4-phenylindenyl)zirconium dichloride (Q-Zr-MAO) catalyst at 207 MPa (30 kpsi)
Figure 28:
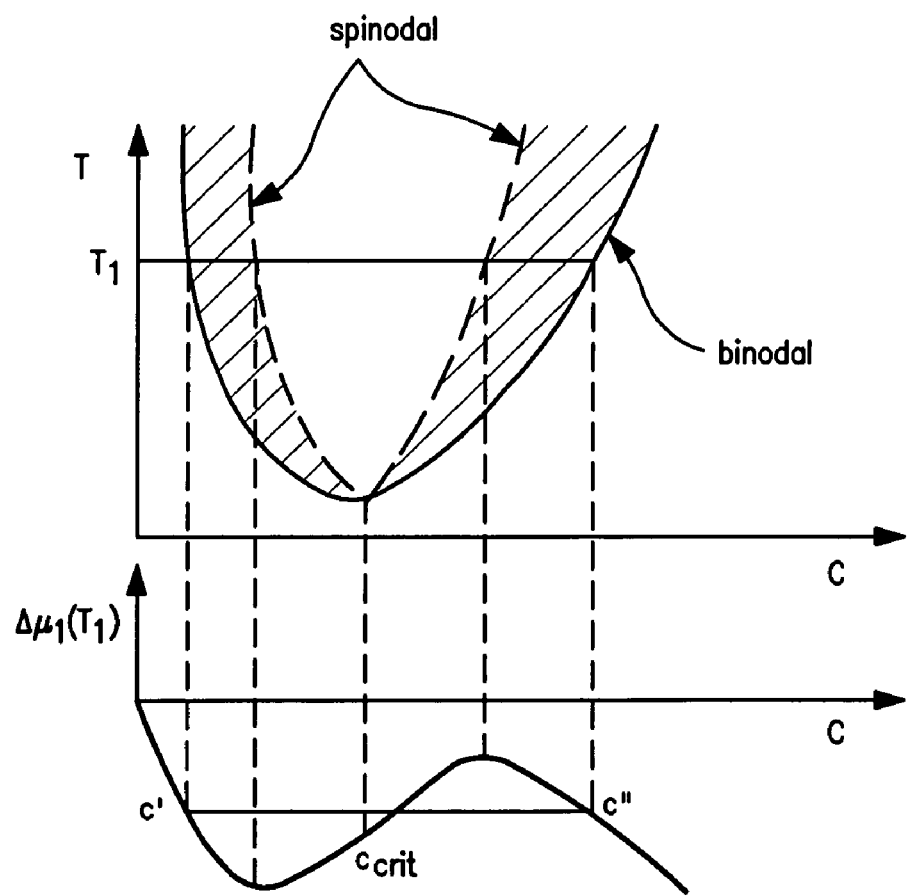
FIG. 28 presents a graphical depiction of the thermodynamic definition of binodal and spinodal boundaries.

Spinodal Decomposition:

Phase boundaries of mixtures, such as a polymerization medium, may be depicted as T, P diagrams for a constant composition mixture as illustrated in FIG. 2, or alternatively, they may be depicted as T,c diagrams for mixtures at constant pressure (as illustrated conceptually by the binodal curve in FIG. 28), or P,c diagrams for mixtures at constant temperature, where the symbol c is used to denote composition. For multi-component mixtures the composition must be designated by a series of composition variables $c_i$, where i refers to each component in the mixture, but for a binary mixture, a single variable c will adequately denote the composition. In general, the polymerization medium of the current invention is a multi-component mixture, but for our current purposes of illustration, there is no generality lost by considering the polymerization medium to be a binary mixture of polymer and a single low molecular weight hydrocarbon, and the composition variable c can be taken to denote polymer concentration. If we take by way of example a phase boundary depicted by T,c at constant P as depicted in FIG. 28, then the fluid-liquid phase boundary appears as a curve (which, following terminology commonly used in the art, we have designated as a binodal curve) where a minimum value of temperature (which is also commonly called the Lower Critical Solution Temperature, or LCST) exists at a concentration called the critical polymer concentration ($c_{crit}$). This binodal curve, which represents the two-phase (fluid-liquid) phase boundary, is a locus of points where the single phase polymerization medium is in equilibrium with a two-phase mixture of monomer-rich and polymer-rich phases. From FIG. 28, it is apparent that for any given T & P, which is represented by horizontal line at $T_1$, there are two mixture compositions that are in equilibrium with the Polymerization medium, and thus in equilibrium with each other. One of these mixture compositions is a monomer-rich composition, and the other a polymer-rich composition (these two compositions are designated as c' and c" on FIG. 28). The bottom part of FIG. 28 illustrates a curve representing the chemical potential ($\Delta\mu_1$) of the binary mixture as a function of c at a temperature equal to $T_1$ (note that a similar curve could be constructed for all other values of T). Note also that $\Delta\mu_1(c')=\Delta\mu_1(c")$, since for two mixtures to be in equilibrium, their chemical potentials must be equal. At other values of c on this curve, $\Delta\mu_1$ assumes other values, since these other compositions are not in equilibrium with c' and c". Along this $\Delta\mu_1$ curve, there are two other special points, where the first partial derivative of $\Delta\mu_1$ with respect to composition is zero ($\partial\Delta\mu_1/\partial c=0$). This is the thermodynamic criterium that defines the spinodal boundary, as is illustrated by the graphical construction in FIG. 28. For compositions on, or inside, the spinodal boundary, the compositions of the monomer-rich and polymer-rich phases differ sufficiently from equilibrium to form a thermodynamically unstable two-phase mixture, which tends to form a co-continuous morphology rather than a morphology where one of the two phases is dispersed as droplets in a continuum of the other phase. Inside the cross-hatched area in FIG. 28, the mixture tends to form a morphology where one of the two phases is dispersed in a continuum of the other phase. When the polymer concentration in the polymerization medium is higher than $c_{crit}$, the polymer-rich phase is continuous, and when the polymer concentration in the polymerization medium is lower than $c_{crit}$, the monomer-rich phase is continuous. In many embodiments of the current invention, the polymerization medium is a single phase fluid, such that its thermodynamic state (T,P,c) would place it in the single phase region outside the binodal boundary on FIG. 28. The process of spinodal decomposition refers to a process by which a rapid change in the temperature or pressure is effected to move the thermodynamic state of the system across both the binodal and spinodal boundaries to a point inside the spinodal boundary. For this change to be effective in producing the desired co-continuous morphology, the time that the thermodynamic state of the system resides in the area between the binodal and spinodal boundaries (cross-hatched area of FIG. 28) must be short enough that the undesired morphology does not have sufficient time to become established. The exact value of time that satisfies this criterium must be determined empirically for each polymerization medium. Spinodal boundaries may also be depicted on phase diagrams which plot P vs. T at constant composition, as illustrated in FIG. 29. A full treatment of this concept may be found in the paper "A Low-Energy Solvent Separation Method", T. G. Gutowski et. al., Polymer Engineering and Science, March 1983, v. 23, No. 4.

Dense fluids are defined as fluid media in their liquid or supercritical state with densities greater than 300 kg/m$^3$.

Solid-fluid phase transition temperature is defined as the temperature at and below which a solid polymer phase separates from the polymer-containing fluid medium at a given pressure. The solid-fluid phase transition temperature can be determined by temperature reduction starting from temperatures at which the polymer is fully dissolved in the fluid reaction medium.

Solid-fluid phase transition pressure is defined as the pressure at and below which a solid polymer phase separates from the polymer-containing fluid medium at a given temperature. The solid-fluid phase transition pressure can be determined by pressure reduction at constant temperature starting from pressures at which the polymer is fully dissolved in the fluid reaction medium.

A higher α-olefin or higher alpha-olefin is defined as an α-olefin having five or more carbon atoms.

The new numbering scheme for the Periodic Table Groups is used as published in CHEMICAL AND ENGINEERING NEWS, 63(5), 27 (1985).

The term "polymer" describes chain-like molecules synthesized from one or more repeat units, or monomers, and is meant to encompass homopolymers and copolymers, and includes any polymer having two or more different monomers in the same chain, including random copolymers, statistical copolymers, interpolymers, and block copolymers.

Polymerization encompasses any polymerization reaction such as homopolymerization and copolymerization. Copolymerization encompasses any polymerization reaction of two or more monomers.

When a polymer is referred to as comprising an olefin, the olefin present in the polymer is the polymerized form of the olefin. A "polyolefin" is a polymer comprising at least 50 mol % of one or more olefins. Advantageously, a polyolefin comprises at least 60 mol %, or at least 70 mol %, or at least 80 mol %, or at least 90 mol %, or at least 95 mol %, or 100 mol % of one or more olefins, preferably 1-olefins, having carbon numbers of 2 to 20, preferably 2 to 16, or 2 to 10, or 2 to 8, or 2 to 6.

A "high molecular weight" polymer has a Mw of 30 kg/mol or more. Advantageously, a high molecular weight polymer has a weight-averaged molecular weight (Mw) of 50 kg/mol or more, or 75 kg/mol or more, or 100 kg/mol or more, or 125 kg/mol or more, or 150 kg/mol or more.

An "oligomers" or "low molecular weight" polymer is a polymer having a Mw of less than 30 kg/mol. Advantageously, oligomers have a Mw of less than 20 kg/mol, or less than 10 kg/mol, or less than 5 kg/mol, or less than 4 kg/mol, or less than 3 kg/mol, or less than 2 kg/mol, or less than 1 kg/mol. A "polyolefin oligomers" is a polyolefin that meets the definition of an oligomer.

A "high crystallinity" polymer has a heat of fusion ($H_f$) of greater than 70 J/g. Advantageously, a high crystallinity polymer has a $H_f$ of greater than 80 J/g, or greater than 90 J/g, or greater than 100 J/g, or greater than 110 J/g, or greater than 120 J/g.

A "low crystallinity" polymer has a $H_f$ of 70 J/g or less. Advantageously, a low crystallinity polymer has a $H_f$ of 60 J/g or less, or 50 J/g or less, or 40 J/g or less, or 30 J/g or less, or 20 J/g or less, or 10 J/g or less, or 5 J/g or less, or an $H_f$ that is too small to measure reliably.

A "base polymer" or "base resin" is a polyolefin or polyolefin blend the properties of which are modified by blending them with one or more plasticizers. Typically, a base polymer is a high crystallinity, high molecular weight polyolefin.

A "soft" polymer is a low crystallinity high molecular weight polymer. Typically, a soft polymer has a glass transition temperature (Tg) of less than 0° C. Preferably, a soft polymer has a Tg of less than −10° C., or less than −20° C., or less than −30° C., or less than −40° C. A "soft polyolefin" is a polyolefin that meets the definition of a soft polymer. Examples of soft polyolefins include "plastomers" which comprise a majority of ethylene (ethylene plastomers) or a majority of propylene (propylene plastomers) with crystallizable sequences of the majority monomer, and "elastomers" which have a Mw of 100 kg/mol or more (such as EP elastomers which comprise ethylene, propylene, and optionally one or more dienes).

Plasticizers are defined as per J. K. Sears, J. R. Darby, THE TECHNOLOGY OF PLASTICIZERS, Wiley, New, York, 1982, stating that "Plasticizer is a material incorporated in a plastic to increase its workability and its flexibility or distensibility (elongation). Addition of the plasticizer may lower the melt viscosity, temperature or the second-order transition, or the elastic modulus of the plastic." Plasticizers have a lower glass transition temperature and/or lower modulus and/or lower crystallinity and/or lower Mw than the base polymer. They may be oligomers, soft polymers, or other fluids.

A series reactor cascade includes two or more reactors connected in series, in which the effluent of an upstream reactor is fed to the next reactor downstream in the reactor cascade. Besides the effluent of the upstream reactor(s), the feed of any reactor can be augmented with any combination of additional monomer, catalyst, scavenger, or solvent fresh or recycled feed streams.

Reactor train or reactor branch or reactor leg refers to a polymerization reactor or to a group of polymerization reactors of the in-line blending process disclosed herein that produces a single blend component. If the reactor train contains more than one reactor, the reactors are arranged in a series configuration within the train. The need for having more than one reactor in a reactor train may, for example, arise when an in-line blend component cannot be produced at the desired rate economically in a single reactor but there could be also reasons related to blend component quality, such as molecular weight or composition distribution, etc. Since a reactor train can comprise multiple reactors and/or reactor zones in series, the single blend component produced in a reactor train may itself be a polymer blend of polymeric components with varying molecular weights and/or compositions. However, in order to simplify the description of different embodiments of the in-line blending processes disclosed herein, the polymeric product of a reactor train is referred to simply as blend component or polymeric blend or plasticizer blend component regardless of its molecular weight and/or compositional dispersion. For the purpose of defining the process of the present invention, parallel reactors will be always considered as separate reactor trains even if they produce essentially the same in-line blend component. Also, spatially separated, parallel reaction zones that do not exchange or mix reaction mixtures by, for example, pump-around loops, or by other recirculation methods, will be considered as separate parallel reactor trains even when those parallel zones are present in a common shell and fall within the in-line blending process disclosed herein.

Reactor bank refers to the combination of all polymerization reactors in the polymerization section of the in-line polymer blending process disclosed herein.

A parallel reactor configuration includes two or more reactors or reactor trains connected (also referred to as fluidly connected) in parallel. A reactor train, branch, or leg may include one reactor or alternatively more than one reactor configured in a series configuration. For example, a reactor train may include two, or three, or four, or more reactors in series. The entire parallel reactor configuration of the polymerization process disclosed herein, i.e., the combination of all parallel polymerization reactor trains forms the reactor bank.

Monomer recycle ratio refers to the ratio of the amount of recycled monomer fed to the reactor divided by the total (fresh plus recycled) amount of monomer fed to the reactor.

Polymerization system is defined to be monomer(s) plus optional comonomer/s) plus polymer(s) plus optional inert solvent(s)/diluent(s) plus optional scavenger(s). Note that for the sake of convenience and clarity, the catalyst system is always addressed separately in the present discussion from other components present in a polymerization reactor. In this regard, the polymerization system is defined here narrower than customary in the art of polymerization that typically considers the catalyst system as part of the polymerization system. By the current definition, the mixture present in the polymerization reactor and in its effluent is composed of the polymerization system plus the catalyst system. Dense fluid polymerization systems have greater than 300 kg/m$^3$ fluid phase density, all of their components listed above, i.e., the monomer(s) plus optional comonomer(s) plus polymer(s) plus optional inert solvent(s)/diluent(s) plus optional scavenger(s), are in fluid state, or stating differently, none of their components is in solid state. Note that these qualifications, may be different for the catalyst system since it is not part of the polymerization system.

A homogeneous polymerization system contains all of its components dispersed and mixed on a molecular scale. In our discussions, homogeneous polymerization systems are meant to be in their dense fluid (liquid or supercritical) state. Note that our definition of the polymerization system does not include the catalyst system, thus the catalyst system may or may not be homogeneously dissolved in the polymerization system. A homogeneous system may have regions with concentration gradients, but there would be no sudden, discontinuous changes of composition on a micrometer scale within the system. In practical terms, a homogeneous polymerization system has all of its components in a single dense fluid phase. Apparently, a polymerization system is not homogeneous when it is partitioned to more than one fluid phase or to a fluid and a solid phase. The homogeneous fluid state of the polymerization system is represented by the single fluid region in its phase diagram.

A homogeneous polymerization process operates with a homogeneous polymerization system. Note that the catalyst system is not part of the polymerization system, thus it is not necessarily dissolved homogeneously in the polymerization system. A reactor in which a homogeneous polymerization process is carried out will be referred to as homogeneous polymerization reactor.

The following abbreviations are used: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is tri-isobutylaluminum, MAO is methylaluminoxane, pMe is para-methyl, flu is fluorenyl, cp is cyclopentadienyl.

By continuous is meant a system that operates (or is intended to operate) without interruption or cessation. For example, a continuous process to produce a polymer would be one where the reactants are continually introduced into one or more reactors and polymer product is continually withdrawn.

Slurry polymerization refers to a polymerization process in which particulate, solid polymer (e.g., granular) forms in a dense fluid or in a liquid/vapor polymerization medium. The dense fluid polymerization medium can form a single or two fluid phases, such as liquid, supercritical fluid, or liquid/liquid, or supercritical fluid/supercritical fluid, polymerization medium. In the liquid/vapor polymerization medium, the polymer resides in the liquid (dense) phase.

Solution polymerization refers to a polymerization process in which the polymer is dissolved in a liquid polymerization system in which the solvent for the polymeric product is an inert solvent(s) or the monomer(s) or their blends. Solution polymerization comprises a liquid polymerization system. Solution polymerization may be performed at conditions where a vapor and a liquid phase are present, in which case the polymerization system comprises the liquid phase. Advantageously, solution polymerization is performed with liquid-filled reactors, in the substantial absence of a vapor phase. Liquid-filled reactor operations are characterized by reactor pressures that are at or above the bubble point of the polymerization system. Bubble point is defined as the pressure at which a liquid starts forming vapor bubbles at a given temperature. Bubble point pressures of hydrocarbon blends can be readily determined by standard techniques known in the art of chemical engineering. Methods suitable for conducting such calculations are equation of state methods, such as Peng Robinson or Suave Redlich Kwong. Bubble point of liquids can be also readily measured by methods such as disclosed in T. Tsuji et al., Fluid Phase Equilibria 219 (2004) 87-92 or in R. W. et al., U.S. Pat. No. 6,223,588 (2001). The bubble point of a liquid can be conveniently determined by reducing the pressure at constant temperature of a compressed fluid until the first vapor bubble is formed. Solution polymerization typically performed in a single homogeneous liquid phase, but solution polymerization comprising two liquid phases are also known. In the latter case, the polymerization system is below of its cloud point pressure but above of its solid-fluid phase transition pressure and temperature. In these two-phase liquid polymerizations systems, the polymerization system is typically partitioned into two liquid phases, a polymer-lean and a polymer-rich liquid phase. In a well-stirred polymerization reactor, these two phases are finely dispersed. Note, however, that these two-phase liquid polymerizations systems have none of their components in solid state.

Supercritical polymerization refers to a polymerization process in which the polymerization system is in its dense supercritical state, i.e. when the density of the polymerization system is above 300 g/L and its temperature and pressure are above the corresponding critical values. Supercritical polymerization is typically performed in a single homogeneous supercritical phase, but supercritical polymerization comprising two supercritical fluid phases is also contemplated. In the latter case, the polymerization system is below of its cloud point pressure but above of its solid-fluid phase transition pressure and temperature. In these two-phase supercritical fluid polymerizations systems, the polymerization system is typically partitioned into two fluid phases, a polymer-lean and a polymer-rich fluid phase. In a well-stirred polymerization reactor, these two phases are finely dispersed. Note, however, that these two-phase supercritical fluid polymerizations systems have none of their components in solid state.

Bulk polymerization refers to a polymerization process in which the dense fluid polymerization system contains less than 40 wt %, or less than 30 wt %, or less than 20 wt %, or less than 10 wt %, or less than 5 wt %, or less than 1 wt % of inert solvent or diluent. The product polymer may be dissolved in the dense fluid polymerization system or may form a solid phase. In this terminology, slurry polymerization, in which solid polymer particulates form in a dense fluid polymerization system containing less than 40 wt % of inert solvent or diluent, will be referred to as a bulk slurry polymerization process or bulk heterogeneous polymerization process. The polymerization process in which the polymeric product is dissolved in a single-hase dense fluid polymerization system containing less than 40 wt % of inert solvent or diluent will be referred to as bulk homogeneous polymerization process. The polymerization process in which the polymeric product is dissolved in a liquid polymerization system containing less than 40 wt %, or less than 30 wt %, or less than 20 wt %, or less than 10 wt %, or less than 5 wt %, or less than 1 wt % of inert solvent or diluent will be referred to as bulk solution polymerization process. The polymerization process in which the polymeric product is dissolved in a single-phase supercritical polymerization system containing less than 40 wt %, or less than 30 wt %, or less than 20 wt %, or less than 10 wt %, or less than 5 wt %, or less than 1 wt % of inert solvent or diluent will be referred to as bulk homogeneous supercritical polymerization process.

Homogeneous supercritical polymerization refers to a polymerization process in which the polymer is dissolved in a single-phase dense supercritical fluid polymerization medium, such as an inert solvent or monomer or their blends in their supercritical state. As described above, when the supercritical fluid polymerization system contains less than 40 wt %, or less than 30 wt %, or less than 20 wt %, or less than 10 wt %, or less than 5 wt %, or less than 1 wt % of inert solvent and the polymer is dissolved in the dense supercritical fluid, the process is referred to as a bulk homogeneous supercritical polymerization process. Homogeneous supercritical polymerization should be distinguished from heterogeneous supercritical polymerizations, such as for example, supercritical slurry processes, the latter of which are performed in supercritical fluids but form solid polymer particulates in the polymerization reactor. Similarly, bulk homogeneous supercritical polymerization should be distinguished from bulk solution polymerization, the latter of which is performed in a liquid as opposed to in a supercritical polymerization system.

Single-pass conversion of monomer i in reactor train j is defined by the following formula: Single pass conversion of monomer i in reactor train j (%)=100×[(reactor train j effluent flow rate in weight per hour)×(polymer product concentration in the effluent of reactor train j in weight fraction)×(monomer i concentration in the polymer product made in reactor train j in weight fraction)]/[(reactor train j feed flow rate, including fresh and recycled, in weight per hour)×(monomer i concentration in the feed of reactor train j, including fresh and recycled, in weight fraction)].

Overall conversion of monomer i in reactor train j is defined by the following formula: Overall conversion of monomer i in reactor train j (%)=100×[(reactor train j effluent flow rate in weight per hour)×(polymer product concentration in the effluent of reactor train j in weight fraction)×(monomer i concentration in the polymer product made in reactor train j in weight fraction)]/[(reactor train j fresh feed flow rate, excluding recycled, in weight per hour)×(monomer i concentration in the fresh feed of reactor train j, excluding recycled, in weight fraction)].

The total monomer feed rate of a given train is equal to the sum of fresh (make up) monomer feed rate plus recycled monomer feed rate in weight per hour.

The flow (feed, effluent, recycle, purge etc. flow) rate of monomer component i in weight per hour is equal to the total flow (feed, effluent, recycle, purge etc. flow) rate in weight per hour multiplied by the weight fraction of monomer component i.

Conversion rate of monomer i in reactor train j expressed in weight per hour is equal to [(reactor train j effluent flow rate in weight per hour)×(polymer product concentration in the effluent of reactor train j in weight fraction)×(monomer i concentration in the polymer product made in reactor train j in a single pass in weight fraction)].

Unreduced reactor effluent refers to the whole effluent stream emerging from a reactor train, leg, or branch that has yet to undergo phase separation in one or more high pressure separators, i.e., it contains the entire unreduced polymerization system as it emerges from the reactor train, leg, or branch. As opposed to unreduced reactor effluents, reduced reactor effluents are the polymer-containing streams derived from the unreduced reactor effluents. Reduced reactor effluents contain less than the entire, unreduced polymerization system as it emerges from the reactor train, leg, or branch. In practical terms, reduced effluents are formed by separating and removing a part of the monomer and the optional inert solvent/diluent content in the form of a monomer-rich stream. In the practice of the present disclosure, the separation of the said monomer-rich effluent and thus the reduction of the unreduced reactor effluent is performed by phase separation that generates the said monomer-rich stream and the said reduced reactor effluent, the latter of which in the form of a polymer-enriched stream. Stating it yet another way, the unreduced reactor effluent is the whole reactor effluent before any split of that effluent occurs, while a reduced effluent is formed after at least one split in which some of the light components (monomers and the optional inert solvents/diluents) are removed from the whole, unreduced reactor effluent.

Base polymers, base polymer components or base resins are polyolefins the properties of which are modified by blending them with one or more plasticizers and optionally other additives, such as waxes, antioxidants, nucleating and clarifying agents, slip agents, flame retardants, heat and UV stabilizers, antiblocking agents, fillers, reinforcing fibers, antistatic agents, lubricating agents, coloring agents, foaming agents, etc.

An in-line blending process disclosed herein refers to one where the polymerization and the polymer blending processes are integrated in a single process and at least one of the polymerization trains operates under solution or homogeneous supercritical conditions. Although in-line blending processes typically employ polymerization trains using solution or homogeneous supercritical polymerization systems, one or more of the polymerization trains may employ slurry polymerization systems, particularly bulk slurry polymerization systems. When the polymerization bank includes one or more slurry polymerization trains, the effluents of those slurry trains are always heated above their solid-fluid transition points and optionally pressurized before mixing them with the effluents of other trains to enable fluid-phase mixing.

In-line polymer blend or in-line blend disclosed herein refers to a mixture of two or more polymeric components, at least one of which is produced under either homogeneous supercritical polymerization conditions or homogeneous solution polymerization conditions. The said polymeric in-line blend components are produced internally in the in-line blending process and are mixed in the same process without recovering them in their solid state, i.e., the polymeric in-line blend components are produced and blended in-line. Optionally, the in-line blends may also contain common polymer additives which are used to impart certain desirable properties and are produced outside the invention process, such as UV stabilizers, antioxidants, nucleating agents, cross-linking agents, fillers, etc. Such additives are described in PLASTICS ADDITIVE HANDBOOK, 5th Ed.; H. Zweifel, Ed. (Hanser-Gardner, 2001) and may be present at any effective concentration but typically at less than 10 wt %, or even less than 1 wt %, by weight. The in-line blends may also contain polymeric additives/modifiers produced outside the invention process (i.e.

off-line). They are typically added in minor amounts, i.e., less than 50 wt %, or less than 40 wt %, or less than 30 wt %, or less than 20 wt %, or less than 10 wt %, or less than 5 wt %, or less than 1 wt % by weight. These optional additives may advantageously be blended in-line, i.e., before the plasticizer-polymer blend is recovered in their solid state, such as in the finishing equipment that converts the molten polymer-plasticizer blend into formulated granules, pellets, bales, or the like.

In-line polymer-plasticizer blend, or in-line-plasticized polymer or in-line-plasticized polymer blend disclosed herein refers to a mixture of one or more polymeric components (base polymer) with one or more plasticizers, wherein at least one of the polymeric components of the base polymer is produced in-line (i.e., in one or more of the reactor trains of the disclosed in-line blending processes) under either supercritical polymerization conditions or solution polymerization conditions and the one or more plasticizer components are blended with the base polymer also in-line, i.e., before the base polymer is recovered in its essentially pure, solid form. The one or more plasticizers blended in-line with the base polymer may be produced in-line, i.e., in one of the reactor trains of the reactor bank of the disclosed processes, or may be produced in a separate plant and added to a stream comprising the base polymer or a combination thereof. When none of the plasticizers comprising the in-line-plasticized polymer or in-line-plasticized polymer blend are produced in-line, the base polymer is an in-line polymer blend of two or more polymer components. When one or more plasticizer components are produced in-line, the base polymer may be either a single component or an in-line blend of two or more polymer components. Note that the one or more polymeric components constituting the base polymer are produced and mixed internally in the disclosed in-line blending processes. Furthermore, the disclosed blending processes blend the plasticizers and the base polymer in-line, i.e., before the base polymer is recovered in its essentially pure, solid form. Finally, note that the base polymer may itself be an in-line blend of polymers or alternatively may be a single polymer component. In the latter case, one or more of the plasticizer components of the in-line-plasticized polymer are also produced in-line. The blending point for combining the polymer- and plasticizer-containing streams may be anywhere downstream of the reactor bank of the disclosed in-line polymer blending processes. Advantageously, the one or more plasticizers are blended with a base polymer containing stream that still contains at least some of the low molecular weight components, such as the monomers and the optional inert solvents/diluents of the polymerization system, to facilitate the blending process by the virtue of reduced viscosity. The said advantageous mixing points of the disclosed in-line blending processes exist downstream of the reactors and upstream of the extruder or devolatizing extruder of the product finishing section of the processes disclosed herein, particularly, downstream of the reactors and upstream of or in the low-pressure separator deployed just before the said extruder or devolatizing extruder of the finishing section.

The term plasticized polyolefin masterbatch, or plasticized polymer masterbatch, is defined as a blend of one or more high molecular weight base polymer(s) and one or more plasticizer(s) made primarily for further compounding, i.e., for further blending with high molecular weight polymer to produce plasticized polymeric product. The purpose of making plasticized masterbatches essentially is to deliver plasticizers in a pelletized form and thus enable compounding in the traditional compounding facilities equipped to handle pelletized polymers but typically not equipped to handle fluids and or bales. Pelletization is afforded by blending one or more high molecular weight base polymer with one or more plasticizers, wherein the base polymer creates a matrix providing for proper processability and pellet stability. Masterbatches typically have high concentration of plasticizers for efficient delivery of the plasticizer package. The compounders blend these masterbatches in appropriate ratios with additional amounts of base polymers to adjust their properties for final use. When the plasticized polyolefin masterbatch is made in-line, i.e., when the plasticizer is blended with the base polymer in-line, the plasticized masterbatch is also referred to as in-line-plasticized polyolefin masterbatch, or in-line-plasticized polymer masterbatch.

The term mineral oil includes any fluid derived from petroleum crude oil that has been subjected to refining steps (such as distillation, solvent processing, hydroprocessing, and/or dewaxing). This also includes petroleum-based oils that are extensively purified and/or modified through severe processing treatments. It excludes synthetic oils, which have been manufactured by combining monomer units using catalysts and/or heat. In the polymer processing art, mineral oils are often called process oils, extender oils, white oils, technical oils, or food grade oils. Such fluids typically have a viscosity index less than 120, most have a viscosity index less than 110, and many have a viscosity index of 100 or less.

The American Petroleum Institute categorizes mineral oils as Group I, II, or III basestocks based upon saturates content, sulfur content, and Viscosity Index (VI). Group I basestocks are solvent-refined mineral oils. They contain the most unsaturates and sulfur of the three groups, and have the lowest viscosity indices. Group II and Group III basestocks are hydroprocessed mineral oils. The Group III basestocks contain less unsaturates, less sulfur, and have higher VIs compared to Group II basestocks. Even in cases where a mineral oil is not identified by an API Group classification, it is still possible, for purposes of this invention, to define two classes of mineral oils based on Viscosity Index: "Group I/II mineral oils" which have VI less than 120; and "Group III mineral oils" which have VI of 120 or more.

As used herein, the following terms have the indicated meanings: "naphthenic" describes cyclic (mono-ring and/or multi-ring) saturated hydrocarbons (i.e., cycloparaffins) and branched cyclic saturated hydrocarbons; "aromatic" describes cyclic (mono-ring and/or multi-ring) unsaturated hydrocarbons and branched cyclic unsaturated hydrocarbons as described in J. March, ADVANCED ORGANIC CHEMISTRY Fourth ed., Wiley, New York, 1992; "hydroisomerized" describes a catalytic process in which normal paraffins and/or slightly branched isoparaffins are converted by rearrangement into more branched isoparaffins (also known as "isodewaxing"); "wax" is a hydrocarbonaceous material existing as a solid at or near room temperature, with a melting point of 0° C. or above, and consisting predominantly of paraffinic molecules, most of which are normal paraffins; "slack wax" is the wax recovered from petroleum oils such as by solvent dewaxing, and may be further hydrotreated to remove heteroatoms.

The term paraffin includes all isomers such as normal paraffins (n-paraffins), branched paraffins, isoparaffins, cycloparaffins, and may include cyclic aliphatic species, and blends thereof.

The term isoparaffin means that the paraffin chains possess $C_1$ to $C_{18}$ (more commonly $C_1$ to $C_{10}$) alkyl branching along at least a portion of each paraffin chain, and may include cycloparaffins with branched side chains as a minor component (advantageously less than 30%, or less than 20%, or less than 10%, or 0% of carbons are in cycloparaffins structures). More particularly, isoparaffins are saturated aliphatic hydrocarbons whose molecules have at least one carbon atom bonded to at least three other carbon atoms or at least one side chain (i.e., a molecule having one or more tertiary or quaternary carbon atoms); various isomers of each carbon number (i.e. structural isomers) will typically be present. Isoparaffins with multiple alkyl branches may include any combination of regio and stereo placement of those branches.

By heterogeneous composition is meant a composition having two or more morphological phases. For example a blend of two polymers where one polymer forms discrete domains dispersed in a matrix of another polymer is said to be heterogeneous in the solid state. Heterogeneous blends also include co-continuous blends where the blend components are separately visible, but it is unclear which is the continuous phase and which is the discontinuous phase. Such heterogeneity in the composition and mophology of the blend occurs in phase of dimensions of 100 μm to less than 0.1 μm, as determined using optical microscopy, scanning electron microscopy (SEM), atomic force microscopy (AFM), or in some cases by dynamic mechanical thermal analysis (DMTA); in the event there is disagreement among the methods, then the SEM data shall be used. By continuous phase is meant the matrix phase in a heterogeneous blend. By discontinuous phase is meant the dispersed phase in a heterogeneous blend.

By homogeneous composition is meant a composition having substantially one morphological phase in the same state. For example, a blend of two polymers where one polymer is miscible with another polymer is said to be homogeneous in the solid state. Such morphology is determined using optical microscopy, SEM, AFM, or in some cases by DMTA; in the event there is disagreement among the methods, then the SEM data shall be used.

Unless noted otherwise:

Percents express a weight percent (wt %), based on the total amount of the material or component at issue;

Physical and chemical properties described are measured using the following test methods:

| | |
|---|---|
| Kinematic Viscosity (KV) | ASTM D 445 |
| Viscosity Index (VI) | ASTM D 2270 |
| Pour Point | ASTM D 97 |
| Specific Gravity and Density | ASTM D 4052 (15.6/15.6° C.) |
| Flash Point | ASTM D 92 |
| Distillation range, initial boiling point, and final boiling point | ASTM D 86 |
| Glass Transition Temperature ($T_g$) | ASTM E 1356 (10° C./min, midpoint convention) |
| Saturates Content | ASTM D 2007 |
| Sulfur Content | ASTM D 2622 |
| Melt Index (MI) | ASTM D 1238 (190° C./2.16 kg) |
| Melt Flow Rate (MFR) | ASTM D 1238 (230° C./2.16 kg) |
| Mooney Viscosity | ASTM D 1646 |
| Density | ASTM D 4052 |
| Injection Molding | ASTM D 4101 |
| DMTA Properties | ASTM D 4065 |
| Tensile Properties | ASTM D 638 (Type I bar, 5 cm/min) |
| 1% Secant Flexural Modulus | ASTM D 790 (A, 1.3 mm/min) |
| Heat Deflection Temperature | ASTM D 648 (0.45 MPa) |
| Vicat Softening Temperature | ASTM D 1525 (200 g) |
| Gardner Impact Strength | ASTM D 5420 (GC) |
| Notched Izod (NI) Impact Strength | ASTM D 256 (Method A, or Method E if "reverse notch" noted, RNI) |
| Notched Charpy Impact Strength | ASTM D 6110 |
| Multi-Axial Impact Strength | ASTM D 3763 (15 MPH) |
| Shore (Durometer) Hardness | ASTM D 2240 (A or D, 15 sec delay) |

For polymers and oligomers have a KV100° C. of greater than 10 cSt, the weight-averaged molecular weight (Mw), number-averaged molecular weight (Mn), and z-averaged molecular weight (Mz) are each determined utilizing gel permeation chromatography (GPC) based on calibration using polystyrene standards; Mn for oligomers having a KV100° C. of 10 cSt or less is determined by gas chromatography with a mass spectrometer detector;

Branched Paraffin to n-paraffin ratio, % mono-methyl species, and % side chains with X number of carbons are determined by $^{13}$C-NMR;

Composition Distribution Breadth Index (CDBI) is a measure of the composition distribution of monomer within the polymer chains and is measured by the procedure described in PCT publication WO 93/03093, published Feb. 18, 1993 including that fractions having a weight average molecular weight (Mw) below 15,000 are ignored when determining CDBI. For purposes of this invention a homopolymer is defined to have a CDBI of 100%.

Heat of fusion, $H_f$, is measured between the temperatures of 21 and 230° C. by differential scanning calorimetry (DSC) second melt;

Molecular weight distribution (MWD) is defined as the weightaverage molecular weight divided by the numberaverage molecular weight (Mw/Mn); and When melting or crystallization point is referred to and there is a range of melting or crystallization temperatures, the melting or crystallization point is defined to be the peak melting or crystallization temperature from a DSC trace, and, unless noted otherwise, when there is more than one melting or crystallization peak, it refers to the peak melting or crystallization temperature for the largest peak among principal and secondary melting peaks, as opposed to the peak occurring at the highest temperature, thereby reflecting the largest contribution to the calorimetric response of the material.

DETAILED DESCRIPTION

As disclosed in U.S. Patent Application No. 60/876,193 filed on Dec. 20, 2006, herein incorporated by reference in its entirety, an improved in-line process for blending polymers has been developed to improve blend quality and reduce the capital and operating costs associated with a combined polymerization and blending plant. The present disclosure expands the scope of U.S. Patent Application No. 60/876,193 to an in-line blending process with two or more parallel reactor trains for producing plasticized polyolefins, plasticized polyolefin blends, and plasticized polyolefin masterbatches. These plasticized polyolefin products are also referred to herein as plasticized polymers, or plasticized polymer blends, or plasticized polymer masterbatches, or in-line-plasticized polyolefins/polymers or in-line-plasticized polyolefin/polymer blends, or plasticized polyolefin/polymer masterbatches.

Disclosed herein are novel in-line blending processes for producing plasticized polymers in polymerization processes in which at least one of the reactor trains, advantageously each reactor train, operates with a fluid phase, advantageously with a homogeneous fluid phase (i.e., with a homogeneous liquid phase or homogeneous supercritical phase) polymerization system and the polymerization system in at least one of the polymerization reactor trains includes an olefin monomer that has two or more carbon atoms. More particularly, the present disclosure is related to making in-line-plasticized polymers or in-line-plasticized polymer blends when one or more of the blending components is a suitable plasticizer, such as, for example, oligomers, polymers, and copolymers of $C_5$ to $C_{20}$ alpha olefins and mixtures thereof (also called poly(alpha-olefin)s) or PAOs), oligomers and copolymers of ethylene and propylene, oligomers and copolymers of ethylene and $C_4$-$C_{20}$ olefins, oligomers and copolymers of propylene and $C_4$-$C_{20}$ olefins, paraffin oils and waxes, mineral oils, synthetic oils, synthetic and mineral lube base stocks, elastomers, plastomers, etc., acting as a plasticizer within a high molecular weight polyolefin base resin (also referred to as base polymer). The plasticizer components may be made within the same plant or may be produced off-line or combination thereof and blended in-line before the high molecular weight polyolefin base polymer component is recovered in its essentially pure solid state. The blending point for combining the polymer- and plasticizer-containing streams may be anywhere downstream of the reactor bank of the disclosed in-line polymer blending processes. Advantageously, the one or more plasticizers are blended with a base polymer containing stream that still contains at least some of the low molecular weight components, such as the monomers and the optional inert solvents/diluents of the polymerization system, to facilitate the blending process by the virtue of reduced viscosity. The said advantageous mixing points of the disclosed in-line blending processes exist downstream of the reactors and upstream of the extruder or devolatizing extruder of the product finishing section of the processes disclosed herein, particularly, downstream of the reactors and upstream of or in the low-pressure separator deployed just before the said extruder or devolatizing extruder of the finishing section, which is also referred to as the separator section of the disclosed processes. All embodiments of the disclosed processes blend the plasticizers and the base polymer (the latter may be a polymer blend itself) in-line in the separator section of the in-line blending process, i.e., before the base polymer is recovered in its essentially pure, solid form. The polyolefin-plasticizer-rich phase from the separator section of the in-line blending process is then conveyed to a downstream finishing stage for further monomer stripping, drying and/or pelletizing to form the plasticized polyolefin blend product of the in-line blending process. Plasticized polyolefin blends may be made cheaper, easier, and with improved mixing if the high molecular weight polyolefin component is present in a solution state and blended with a plasticizer also in a solution state. For example, when a supercritical polymerization process is employed to produce the base polyolefin, the blending may be performed in the production plant before the supercritical monomer acting as solvent is removed and the high molecular weight base resin is recovered.

In some embodiments of the disclosed processes, the one or more polyolefin effluent streams from the one or more parallel base polymer reactor trains and the plasticizer feed streams (produced either in-line or off-line or combination thereof) are combined downstream of the reactor bank and upstream of or in a high-pressure phase separator that simultaneously provides blending of the in-line blend components and separation of the monomer(s) and inert diluents(s) or solvents(s) from the base polyolefin blend component(s) and plasticizer blend component(s) by bringing the combined reactor effluent and plasticizer feed streams below the cloud point of the mixture while maintaining said mixed streams above the solid-fluid phase transition point by adjusting the temperature and pressure of the effluent streams individually (i.e., before the mixing point), or combined (i.e., after the mixing point); when the reactor effluents are combined upstream of a phase separator, optionally passing the mixed reactor effluent streams through one or more static mixers before entering the said separator to enhance mixing; maintaining the pressure within the separator vessel below the cloud point pressure to form two fluid phases comprising a polyolefin-plasticizer-rich fluid phase and a monomer-rich fluid phase; maintaining the temperature in the separator above the solid-fluid phase transition temperature to allow the settling to the bottom and the formation of a continuous layer at the bottom of a denser well-mixed fluid polyolefin-plasticizer-rich blend phase and allowing the rising to the top and the formation of a continuous layer of a lower-density monomer-solvent-rich phase at the top; separating a monomer-rich phase from a polyolefin-plasticizer-rich blend phase and recycling the separated monomer-rich phase directly or after further treatment to the polymerization trains; optionally, further reducing the pressure of the said first polyolefin-plasticizer-rich blend phase upstream of or in a low-pressure separator to achieve another fluid-fluid separation into a more concentrated polyolefin-plasticizer-rich fluid phase and another monomer-rich phase while maintaining the temperature above the solid-fluid phase transition temperature by optionally further heating the first polyolefin-plasticizer rich blend stream; optionally, adding catalyst killer(s), and/or polymer modifier(s) and/or additive(s) in their dense fluid state (i.e., liquid, supercritical fluid, molten, or dissolved state) to the base polyolefin- and/or plasticizer-containing effluent stream(s) at any desired point downstream of the first pressure letdown valves in any of the individual or combined effluent streams of the reactor trains in the reactor bank of the disclosed processes. The polyolefin-plasticizer-rich phase from the separator section of the in-line blending process is then conveyed to a downstream finishing stage for further monomer stripping, drying and/or pelletizing to form the plasticized polyolefin blend product of the in-line blending process.

Another embodiment of the novel in-line blending processes for plasticized polyolefins includes providing two or more reactor trains configured in parallel wherein one or more of the reactor trains produce one or more high molecular weight polyolefins (base polymers) and one or more of the reactor trains produce one or more plasticizers. For the one or more parallel reactor trains producing the one or more high molecular weight polyolefins, the process includes contacting olefin monomer(s) with catalyst systems, optional comonomer(s), optional scavenger(s), and optional diluent(s) or solvent(s). At least one of the said parallel reactor trains producing the one or more high molecular weight polyolefins, and advantageously each of them, operates at a temperature above the solid-fluid phase transition temperature of the polymerization system and at a pressure no lower than the solid-fluid phase transition pressure and no lower than 10 MPa below, or no lower than 5 MPa below, or no lower than 1 MPa below, or no lower than 0.1 MPa below, or no lower than 0.01 MPa below the cloud point pressure of the polymerization system and less than 1500 MPa, particularly between 1 and 300 MPa, still more particularly between 1 and 250 MPa, wherein the polymerization system comprises the monomer, any comonomer(s), any scavenger(s), any diluent(s) or solvent(s) present, and the polyolefin-based polymer product and where the catalyst system comprises catalyst precursor compound(s), activator(s), and optional support(s); and forming a polyolefin/polymer reactor effluent stream including a polyolefin blend component (base polymer blend component) dissolved in the effluent dense fluid polymerization system. For the one or more of the reactor parallel trains producing a plasticizer, the process includes contacting olefin monomer(s) with catalyst systems, optional comonomer(s), optional scavenger(s), and optional diluent(s) or solvent(s) at an effective reactor temperature and pressure of the plasticizer system to create a plasticizer, wherein the plasticizer system comprises the monomer, any comonomer(s), any scavenger(s), any diluent(s) or solvent(s) present, and the plasticizer product and where the catalyst system comprises catalyst precursor compound(s), activator(s), and optional support(s); and forming a plasticizer reactor effluent stream including a plasticizer blend component dissolved in the monomer and optional diluent(s) or solvent(s). Note that other aspects of the blending and separation methods and the location of advantageous blending points are not effected, and thus are the same as in other embodiments.

In some other embodiments, one or more plasticizers produced in-line, i.e., in one or more reactor trains of the disclosed processes, are fully recovered before blending them with the one or more effluent streams comprising the one or more high molecular weight polymer components of the base polymer. By fully recover, we mean to recover them in their essentially pure, solvent- and monomer-free, liquid form. Fully recovering in-line-produced plasticizer fluids before blending them with the base polymer containing streams is particularly advantageous when the combined monomer pool of the one or more plasticizer trains producing plasticizer fluids has monomer members that are not part of the combined monomer pool of the one or more polymer trains producing the base polymer due to reduced complexity and thus reduced cost of monomer recycle. Such separate recovery of the monomers and optional solvents of the one or more plasticizer trains may allow the direct recycle of the plasticizer monomers to the one or more plasticizer reactor trains. Since many plasticizers have relatively low viscosity at the blending conditions even in the absence of low molecular weight diluents, such as monomers and optional solvents present in the plasticizer reactor train effluents, they can be blended with the effluent streams comprising the high molecular weight polymer components without negatively impacting the efficiency of the blending process. Such full recovery may not be always advantageous, particularly for plasticizers with high viscosity at the blending conditions, such as in the case of some plastomers and elastomers. As for any embodiment with in-line produced plasticizers, these embodiments may optionally also employ off-line-produced plasticizers after proper conditioning, i.e., after bringing them into fluid phase by dissolving them in a proper solvent or by melting them. Note that other aspects of the blending and separation methods and the location of advantageous blending points are not effected, and thus are the same as in other embodiments employing only off-line-produced plasticizers or as in embodiments that do not fully recover any of the in-line-produced plasticizers.

Yet another embodiment of the novel in-line blending processes for plasticized polyolefins includes providing two or more reactor trains configured in parallel wherein the two or more reactor trains produce two or more high molecular weight polyolefin (base polymer) blend components and all plasticizer components are made off-line but blended in-line. For the two or more parallel reactor trains producing the two or more high molecular weight polyolefin(s), the process includes contacting olefin monomer(s) with catalyst systems, optional comonomer(s), optional scavenger(s), and optional diluent(s) or solvent(s); the polymerization performed in at least one of the two or more reactor trains, and advantageously in all reactor trains, at a temperature above the solid-fluid phase transition temperature of the polymerization system and at a pressure no lower than the solid-fluid phase transition pressure and no lower than 10 MPa below the cloud point pressure of the polymerization system and less than 1500 MPa, particularly between 10 and 300 MPa, still more particularly between 20 and 250 MPa; wherein the polymerization system comprises the monomer, any comonomer(s), any scavenger(s), any diluent(s) or solvent(s) present, and the polyolefin-based polymer product and where the catalyst system comprises catalyst precursor compound(s), activator(s), and optional support(s); and forming a polyolefin/polymer reactor effluent stream including a polyolefin blend component (base polymer blend component) dissolved in the effluent dense fluid polymerization system. The one or more off-line-produced plasticizers are pumped in their liquid, molten, or dissolved state into one or more polymer-containing effluent streams to produce an in-line-plasticized polymer blend. The blending point for combining the polymer- and plasticizer-containing streams may be anywhere downstream of the reactor bank of the disclosed in-line polymer blending processes. Advantageously, the one or more plasticizers are blended with a base polymer containing stream that still contains at least some of the low molecular weight components, such as the monomers and the optional inert solvents/diluents of the polymerization system, to facilitate the blending process by the virtue of reduced viscosity. The said advantageous mixing points of the disclosed in-line blending processes exist downstream of the reactors and upstream of the extruder or devolatizing extruder of the product finishing section of the processes disclosed herein, particularly, downstream of the reactors and upstream of or in the low-pressure separator deployed just before the said extruder or devolatizing extruder of the finishing section. Thus, this embodiment of the disclosed processes blend the plasticizers and the base polymer in-line, i.e., before the base polymer is recovered in its essentially pure, solid form but do not produce any of the employed plasticizers in-line. In some embodiments, the two or more polyolefin effluent streams from the two or more parallel reactor trains and the one or more off-line-produced plasticizer feed streams are combined downstream of the reactor bank and upstream of or in a phase separator that simultaneously provides blending of the in-line blend components and separation of the monomer(s) and inert diluents(s) or solvents(s) from the base polyolefin blend component(s) and plasticizer blend component(s) by bringing the combined reactor effluent and plasticizer feed streams below the cloud point of the mixture while maintaining said mixed streams above the solid-fluid phase transition point by adjusting the temperature and pressure of the effluent streams individually (i.e., before the mixing point), or combined (i.e., after the mixing point); when the reactor effluents are combined upstream of a phase separator, optionally passing the mixed reactor effluent streams through one or more static mixers before entering the said separator to enhance mixing; maintaining the pressure within the separator vessel below the cloud point pressure to form two fluid phases comprising a polyolefin-plasticizer-rich fluid phase and a monomer-rich fluid phase; maintaining the temperature in the separator above the solid-fluid phase transition temperature to allow the settling to the bottom and the formation of a continuous layer at the bottom of a denser well-mixed fluid polyolefin-plasticizer-rich blend phase and allowing the rising to the top and the formation of a continuous layer of a lower-density monomer-solvent-rich phase at the top; separating a monomer-rich phase from a polyolefin-plasticizer-rich blend phase and recycling the separated monomer-rich phase directly or after further treatment to the polymerization trains; optionally, further reducing the pressure of the said first polyolefin-plasticizer-rich blend phase upstream of or in a low-pressure separator to achieve another fluid-fluid separation into a more concentrated polyolefin-plasticizer-rich fluid phase and another monomer-rich phase while maintaining the temperature above the solid-fluid phase transition temperature by optionally further heating the first polyolefin-plasticizer-rich blend stream; optionally, adding catalyst killer(s), and/or polymer modifier(s) and/or additive(s) in their dense fluid state (i.e., liquid, supercritical fluid, molten, or dissolved state) to the base polyolefin- and/or plasticizer-containing effluent stream(s) at any desired point downstream of the first pressure letdown valves in any of the individual or combined effluent streams of the reactor trains to in the reactor bank of the disclosed processes. The polyolefin-plasticizer-rich phase from the separator section of the in-line blending process is then conveyed to a downstream finishing stage for further monomer stripping, drying and/or pelletizing to form the plasticized polyolefin blend product of the in-line blending process.

Note that the in-line blending processes disclosed herein comprise a polymerization section or polymerization reactor bank or reactor bank and at least one monomer-polymer separator vessel, called the separator-blending vessel, or separator-blender, or high-pressure separator or high-pressure separator-blender. In some embodiments, one or more reactor trains produce plasticizers. In those embodiments, the plasticizer-producing reactor trains also belong to the polymerization section, i.e., those reactors are also part of the polymerization reactor bank or reactor bank even if they are referred to as plasticizer trains in order to differentiate them from the reactor trains producing the high molecular weight base polymer blending components (the latter trains are sometimes referred to as polymer trains). The separator-blender serves as both a separator and a blender for the reactor effluents of the two or more parallel reactor trains in the reactor bank in which at least one of the reactor trains employs a homogeneous fluid polymerization system (i.e., defined as a homogeneous supercritical or a solution polymerization process). It is also beneficial to the proper operation of the in-line blending processes disclosed herein to bring the polymerization system in each reactor train effluent into a homogeneous state upstream of the separator-blending vessel. Thus, when one or more in-line blending components is/are produced in a particle-forming polymerization process, such as, for example bulk propylene slurry polymerization with Ziegler-Natta or supported metallocene catalysts, the so-produced solid polymer pellets need to be homogeneously dissolved in the reactor effluent before entering the separator-blending vessel. This can be accomplished by, for example, pumping the reactor effluent slurry into a higher-temperature/higher-pressure dissolution zone that brings the reactor effluent above the solid-fluid phase transition temperature creating a stream in which the reaction product is homogeneously dissolved. Although any and all combinations of reactor operation modes may be included in the in-line blending processes disclosed herein, it is advantageous that at least one reactor train operates in a homogeneous fluid phase and more advantageous if all reactor operations operate in the homogenous fluid phase for economic and process simplicity reasons. Bulk homogeneous fluid phase polymerizations such as bulk homogeneous supercritical or bulk solution polymerizations are particularly advantageous.

The methods of fluid phase in-line-plasticized polymer blending disclosed herein offer significant advantages relative to prior art methods of blending polymers and plasticizers. One or more of the advantages of the disclosed method of in-line plasticized polymer blending include, but are not limited to, improved polymer-plasticizer blend homogeneity because of molecular-level mixing of blend components, improved cost of manufacture because of savings from avoidance of the reprocessing cost associated with conventional off-line blending processes that start with the separately produced solid, pelletized polymer and plasticizer blend components, and because of the ease and simplicity of blending polymers at substantially reduced viscosities due to the presence of substantial amounts of monomers and optionally solvents in the blending step; flexibility of adjusting blend ratios and therefore blend properties in-line; flexibility in adjusting production rates of the blend components; flexibility in independently controlling for each reactor the residence time, monomer composition and conversion, catalyst choice, catalyst concentration, temperature and pressure; improved blend quality; flexibility in making a broader slate of plasticized polymer products in the same plant; reduced process cost by utilizing the monomer-polymer separator(s) for product blending and, in some embodiments, for product buffering to allow better control of blend ratio.

In-Line Blending Process Overview:

Polyolefins are used in a large number of different applications. Each of these applications requires a different balance between the stiffness, elasticity, and toughness of the polymer. Ideally, polymers would be custom-tailored to the different needs of each customer. One of the methods enabling product tailoring involves the blending of individual polymer components. The ability to adjust the stiffness-elasticity-toughness balance of polyolefins provides for the ability to meet the needs of a broad range of applications and thus to expand the potential of polyolefins in delivering desired performance at reduced cost. The stiffness-elasticity-toughness balance may be altered by changing the molecular structure of polymers by changing their composition (i.e. making copolymers), stereoregularity, molecular weight, etc. The stiffness elasticity-toughness may also be readily shifted by making blends of polymers, blends of polymers and plasticizers or by producing composites. The in-line blending processes disclosed herein relate to making polymer-plasticizer blends, also referred to as plasticized polymers. The one or more base polymer components for blending with one or more plasticizers are generally high molecular weight polyolefin resins, such as polypropylenes (particularly isotactic and syndiotactic polypropylenes), polyethylene, ethylene-propylene copolymers, copolymers of propylene and $C_4$ to $C_{20}$ olefins (particularly $C_5$ to $C_{20}$ linear alpha-olefins), copolymers of ethylene and $C_4$ to $C_{20}$ olefins (particularly $C_5$ to $C_{20}$ linear alpha-olefins), polymers with long-chain branching (LCB), and cyclic olefin copolymers (COC's) made of ethylene and a cyclic olefin, such as norbornene, cyclopentene, cyclohexene, and the like. When the base polymer comprises soft copolymer components, they are always used in combination with high molecular weight high crystallinity base polymer components, such as polypropylene or polyethylene. The one or more plasticizer components that are either produced in-line and/or off-line but always blended in-line include polyolefin oligomers, mineral oils, lubricant basestocks, and soft polyolefins. The one or more externally-produced plasticizers may be optionally used in connection with the one or more in-line-produced plasticizers. Alternatively, the one or more externally-produced plasticizers may be used for in-line blending to produce in-line-plasticized polymers without employing in-line-produced plasticizers.

Plasticizers conducive to off-line production and in-line blending include all types of useful plasticizers listed above. Plasticizers conducive to in-line production and in-line blending, on the other hand, typically represent a shorter list. Thus, for example, plasticizers produced by separation from natural resources, such as, paraffin oils and waxes, Group I, II, and III lube base stocks, etc. made from crude oil, would obviously not be produced in-line. Some synthetic plasticizers, made primarily for other markets, like phthalates, mellitates, adipates, etc. made for PVC applications, would be also produced off-line. There are also instances, when the in-line production of plasticizers is impractical for compatibility reasons due to potential cross-contamination. For example, in-line processes to make plasticizers involving superacids, and oxygen-containing compounds are typically not practical when the one or more base polymers are produced by using highly poison-sensitive single-site catalysts, such as metallocenes, Ziegler-Natta catalysts, etc., due to the high potential for catalyst poisoning and consequentially, due to the need for expensive purification methods in the feed recycle lines. Other practical reasons, for example retrofitting existing plants, or unfavorable economics in certain locations due to feedstock cost structure, etc., may also favor in-line blending of off-line-produced plasticizers even if they could be economically produced in-line at other locations. For the above reasons, the disclosed processes for in-line blending of plasticizers with base polymers to produce in-line-plasticized polymers offer three options: (1) in-line production of all employed plasticizer blending components; (2) in-line production of one or more plasticizer blending components employed in combination with one or more off-line-produced plasticizer blending components; (3) all plasticizer blending components employed produced off-line. It should be also noted that the in-line blending processes disclosed herein are deployed in combination with two or more parallel polymerization reactor trains. Consequently, by our definitions of parallel polymerization reactor trains (vide supra), the number of base polymer components may be one or more for options (1) and (2) and may be two or more for option (3). Furthermore, when all in-line-blended plasticizers are produced off-line (option (3)), the base polymer comprise two or more high molecular weight in-line polymer blending components. The processes described by options (1) and (2), on the other hand, may comprise one or more high molecular weight in-line polymer blending components. When two or more high molecular weight in-line polymer blending components are produced, these blending components may essentially be the same or may be different. The utility of making essentially the same high molecular weight in-line polymer blending components in more than one reactor trains could be increased capacity.

One of the important functions of plasticizers is their ability to reduce the glass transition temperature of polymer-plasticizer blends. They perform this function by themselves having significantly lower glass transition temperatures as compared to that of the base polymer. Another important function of plasticizers is to reduce blend viscosity during processing. Again, they perform this function by themselves having significantly lower viscosity as compared to that of the base polymers. Both of these properties strongly influenced by molecular weight. Namely, lower molecular weight lowers both and thus is advantageous. For that reason, plasticizers are advantageously low molecular weight (<30 kg/mol Mw) oligomers (i.e., have less than 76 monomer units) that are liquid at ambient conditions although for increased permanence/lower volatility, polymers are also used as plasticizers commercially.

Disclosed herein are advantageous processes for direct in-line polymer blend production in an integrated parallel multi-reactor polymerization wherein the in-line blending step of combining one or more polyolefin base polymers with one or more plasticizers is achieved downstream of the reactors and upstream of the extruder or devolatalizing extruder of the finishing section of the process and wherein at least one, advantageously all, reactor trains operate with a homogeneous polymerization system. The production of plasticized polymer blends in the polymerization plant is facilitated when the polymer and plasticizer blend components, particularly when the highly viscous polymer blend components, are dissolved in the polymerization system since the small-molecule components, such as monomers and optional solvents/diluents of the polymerization system reduce viscosity thus allowing molecular level blending in a lower-shear/lower-energy process. The presence of low molecular weight diluents also lowers the solid-fluid phase transition temperature allowing lower-temperature blending operations. Hence, using the reactor effluents wherein the polymer and plasticizer blending components are present in a dissolved dense fluid state may be advantageous to downstream blending operations. Thus, the polymerization reactors for the high molecular weight polymer and/or plasticizer advantageously may be of the homogeneous supercritical process, the solution process type, or a combination thereof in order to provide the base polymer and the plasticizer for blending in a dense fluid state in the direct reactor effluents suitable for the in-line blending process. Bulk homogeneous supercritical and bulk solution polymerization processes are particularly useful for producing base polymer and plasticizer blend components due to the simplicity of the monomer recycle loop and due to the enhancements in reactor productivity and base polymer properties, such as molecular weight and melting behavior, as will become apparent from the following discussions. The processes disclosed herein can also utilize certain other polymerization reactors making base polymer blend components, for example, in the form of a slurry, wherein the polymers form solid pellets in a dense fluid polymerization system (for an exemplary process configuration comprising a slurry polymerization reactor train see FIG. 10). In such instances, a dissolution stage is added between the polymerization reactor train and the separator-blending vessel. This dissolution stage typically consists of a pump followed by a heater to bring the reactor effluent above the solid-fluid phase transition conditions affording a stream that contains the polymer blending component homogeneously dissolved in the dense fluid polymerization system. In order to facilitate the dissolution of the polymer pellets, increased shearing may be applied, which typically is provided by stirring or by pumping. Because of the added processing and investment costs of such reactor operations, homogeneous polymerization processes, such as homogeneous supercritical or solution polymerization, are typically cost-advantaged and thus advantageous to produce the in-line polymer blending components. At least some fraction of the low molecular weight components, such as unused monomers and the optional inert solvents/diluents are separated for recycle from the product polymers and plasticizers in one or more phase separators. Other separation methods, such as distillation, vacuum drying, etc. may also be deployed, particularly in the plasticizer production trains and in the product finishing section of the disclosed processes. At least one of the one or more phase separators also serves as a blending vessel to form a polymer-plasticizer-rich phase to ultimately yield the in-line-plasticized polyolefin final product. Advantageous configurations and operation modes for the feed-product phase separation section are disclosed in U.S. Patent Application No. 60/876,193 filed on Dec. 20, 2006, herein incorporated by reference in its entirety.

One or more plasticizers for in-line blending may be produced in-line using the homogeneous fluid-phase synthesis processes disclosed herein. In particular, homogeneous dense supercritical phase or solution phase processing may be utilized to synthesize selected plasticizers disclosed herein in one or more of the parallel reactor trains of the disclosed in-line polymerization and blending processes. Advantageously, all parallel trains, i.e., both the base polymer and plasticizer trains, run with single-site catalysts as described in the section titled "Catalyst System Overview" (vide infra) but other catalyst types may also be used if so desired. When the catalyst systems of the plasticizer and base polymer reactor trains have incompatible components and/or the monomer pools of the plasticizer and base polymer reactor trains have no common monomer members, it may be advantageous to recover the one or more plasticizers in essentially pure form before blending them with the base polymer containing streams. The full recovery of the one or more plasticizer components is particularly advantageous when one of more of the above-stated conditions are met and the fully recovered plasticizer blending component is a liquid. Note, however, that in order to facilitate the in-line blending, it is always performed in a fluid phase diluted by low molecular weight components, such as unreacted monomers and optional one or more inert solvents/diluents. Therefore, it is advantageous to blend the plasticizer-containing streams before the said low molecular weight components of the polymerization system of the base polymer containing effluents are fully removed. The disclosed processes often blend the effluents of the base polymer producing reactor trains before any of the low-molecular weight components, such as the unreacted monomers and the optional inert solvents/diluents, are removed from the said base polymer containing straight reactor effluents. As stated before, at least some fraction of the low molecular weight components, such as unused monomers and the optional inert solvents/diluents, are separated for recycle from the product polymers and plasticizers in one or more phase separators. Other separation methods, such as distillation, vacuum drying, etc. may also be deployed, particularly in the plasticizer production trains and in the product finishing section of the disclosed processes. At least one of the one or more phase separators also serves as a blending vessel to form a polymer-plasticizer-rich phase to ultimately yield the in-line-plasticized polyolefin final product. Advantageous configurations and operation modes for the feed-product phase separation section are disclosed in U.S. Patent Application No. 60/876,193 filed on Dec. 20, 2006, herein incorporated by reference in its entirety.

Optionally, other plasticizers that are not conducive to in-line reacting, but are conductive to in-line blending may be further added to the polymer-plasticizer blend. These other plasticizers may be stored in one or more polymer additive storage tanks. Non-limiting exemplary plasticizers that are not conducive to in-line production, but are conducive to in-line blending include paraffin oils and waxes (n-paraffins, isoparaffins, paraffin blends), mineral oils, process oils, high purity hydrocarbon fluids, lubricant basestocks, and other synthetic or natural oils. Off-line-produced liquid plasticizers can be directly pumped to the mixing point of the in-line blending process. Solid plasticizers are typically dissolved before delivering them to the mixing point advantageously using a solvent and/or monomer that is also used in the polymerization bank. Before bringing them to the mixing point, the plasticizer feeds are typically heated to the temperature of the polymerization product stream to be blended with the plasticizer feed.

As described herein before, the disclosed in-line blending process for plasticized polymers comprises a polymerization process that provides one or more of the high molecular weight base polymers and in some embodiments one or more of the plasticizers in a homogeneous fluid state used for in-line blending. Therefore, if the polymerization reaction is carried out at conditions that form solid polymer particles, such as, for example, slurry polymerization, an additional step is required to bring the solid in-line polymer blending component into a dissolved fluid state before feeding the polymer-containing stream to the separator-blender section of the disclosed polymer-plasticizer blending process (for an exemplary process configuration comprising a slurry polymerization reactor train see FIG. 10). This can be accomplished by, for example, heating the reactor effluent comprising the solid polymeric product, unused monomer(s), and optional inert diluent(s)/solvent(s) above the solid-liquid phase transition temperature. However, for simpler and thus lower cost operations, the polymerization reaction is typically carried out at conditions where the product polymer(s) is/are dissolved in the dense fluid polymerization system comprising one or more monomers, the polymeric product(s), and—optionally—one or more inert solvents, and—optionally—one or more scavengers. Fluid-phase operations have some further advantages from certain product quality and operation stability perspectives since they do not require supported catalysts that significantly increase the ash level of the products and can cause fouling and excessive wear of downstream process hardware. The fluid reaction medium may form one single fluid phase or two fluid phases in the reactor. For more robust and simpler reactor operations, conditions affording a single fluid phase in the reactor, i.e. operating above the cloud point conditions, are advantageous.

In one embodiment of the plasticized polymer blending processes disclosed herein, the blending of the one or more polymer reactor effluent streams with the one or more plasticizer effluent streams occurs simultaneously with product separation in a single downstream separator-blending vessel. The separator-blender operates at conditions that lead to the formation of two fluid phases: the upper one essentially consisting of the low-molecular weight components of the polymerization systems, predominantly the monomer(s) and the optional solvent(s) of the polymer and plasticizer reaction processes, while the lower one is a plasticized polymer-rich phase. In order to create the conditions that lead to the formation of two fluid phases in the separator-blender, the temperatures of the reactor effluents are often first increased to provide the heat for staying above the solid-fluid phase transition temperature of the to-be-formed plasticized polymer-rich fluid phase. After adjusting the heat contents of the reactor effluents, their pressures are typically reduced to bring the temperature and pressure of the combined effluent stream to a condition that corresponds to two fluid (liquid-liquid or supercritical fluid-supercritical fluid) phases in the phase diagram. The blending process may be aided by optional static mixer(s) downstream of the mixing point of the polymer-containing and plasticizer-containing effluents but upstream of the separator-blending vessel. The homogeneous fluid blending of the individual polymer and plasticizer components and the separation of the monomer- and plasticized-polymer-rich phases are accomplished in the same vessel eliminating the need for a separate blending vessel and blending process step. The bulk of the monomer(s) and the optional solvent(s) separated from the polymer and plasticizer is then recycled back into the polymer and plasticizer polymerization reactor bank of the plant.

In another embodiment of the in-line blending processes disclosed herein, one or more reactor effluent streams containing the dissolved polymer or plasticizer blend components are fed to independent separators or separation vessels (also referred to as single-stream high-pressure separators) upstream of the separator-blending vessel for separation of a polymer-enriched or plasticizer-enriched stream from some fraction of the monomer and the optional solvent/diluent content of the said streams. Such single-stream high-pressure separators deployed upstream of the separator-blending vessel (high-pressure separator) in essence afford a partial recovery of the monomer and the optional solvent present in the reactor effluent thus allowing their recovery and recycle before being mixed with monomers and optional solvents used in other reactor trains. Such processes may be advantageous by eliminating the need for separating mixed monomer and optional solvent streams before recycling them to the appropriate reactor trains for polymer and plasticizer of the reactor bank as disclosed in U.S. Pat. Appl. No. 60/905,247 filed on Mar. 6, 2007 incorporated herein in its entirety by reference. The polymer-enriched streams and plasticizer-enriched streams from each of these single-stream separators are blended in one separator vessel that serves both as a separator for one of the reactor trains and as a blender for the entire reactor bank (separator-blending vessel). In this embodiment, the operation conditions of one or more single-stream separators upstream of the separator-blending vessel may be adjusted to yield one or more polymer-enriched streams and/or one or more plasticizer-enriched streams that still contain enough low molecular weight components, such as monomers and optional inert solvents to keep the viscosity of these streams much below that of the essentially pure molten polymers or plasticizers thus facilitating the mixing of the polymer and plasticizer components in the separator-blender. The one or more separators feeding the separator-blending vessel may also serve as buffer vessels affording an improved control of the blend ratio by compensating for the small but inevitable fluctuations in the production of the individual in-line polymer and plasticizer blend components. The buffer capacity of these vessels is defined by the volume between the maximum and minimum levels of the separated polymer-enriched or plasticizer-enriched lower phase.

The blending processes disclosed herein provide for the individual components of the plasticized polymer blend to be made in a bank of parallel reactors. One or more of the parallel reactor trains produce one or more polymer blend components and one or more of the parallel reactor trains produce one or more plasticizer blend components for subsequent downstream in-line blending. Such direct blend production may be advantageously achieved in polymerization processes that operate in a homogeneous dense fluid phase, i.e. above the fluid-solid phase transition limits. The in-line blending process disclosed has at least one reactor train making a high molecular weight base polymer blend component that operates in a homogeneous dense fluid phase. Advantageously, all reactor trains in the reactor bank of the disclosed processes operate in a homogeneous dense fluid phase. Polymerization processes that operate in a homogenous dense fluid phase use either inert solvent(s) or monomer(s) or their mixtures as a solvent/diluent in their liquid or supercritical state. Hence, such parallel reactors operate with polymerization systems in their homogeneous supercritical or in their liquid state. In both the supercritical and liquid operation modes, the process may be a bulk polymerization process operating with less than 40 wt %, or less than 30 wt %, or less than 20 wt % or less than 10 wt % or less than 5 wt % of inert solvent present in the reactor, and in some embodiments, essentially free (less than 1 wt %) of inert solvents. In one embodiment of the disclosed process, the one or more polymer reactors and one more plasticizer reactors operate at bulk homogeneous supercritical conditions as has been disclosed in U.S. patent application Ser. Nos. 11/433,889 and 11/177,004, herein incorporated by reference in their entirety.

In another embodiment, one or more polymer reactor trains and one or more plasticizer reactor trains operate at conditions where the polymer and plasticizer dissolution is substantially aided by an inert solvent (solution process where the polymerization medium contains more than 40 wt % solvent, typically more than 60 wt % solvent) as has been disclosed in PCT Publication No. WO 2006/044149, herein incorporated by reference in its entirety. In yet another embodiment, one or more of the polymer or plasticizer reactors included in the parallel bank of reactors operate in the homogeneous supercritical state and one or more of the polymer or plasticizer reactors included in the parallel bank of reactors operate in the solution state (combination of solution process and homogeneous supercritical process reactors). Both homogenous solution and homogeneous supercritical polymerization processes provide polymers dissolved in a fluid state, which is required for the downstream in-line blending of plasticized polymers. Both homogenous solution and homogeneous supercritical processes providing polymers and plasticizers in a homogeneous fluid state may be performed in a bulk monomer phase using essentially pure monomer(s) as solvent or may keep the polymer or plasticizer in the homogeneous fluid state by employing an inert solvent in substantial concentrations (i.e., 60 wt % or more). The homogenous solution process provides for a polymer- or plasticizer-containing liquid phase either in an inert solvent or in the essentially neat monomer or in their mixture in their liquid state. The homogeneous supercritical process provides for the fluid state by dissolving the polymeric base polymer or plasticizer product either in an inert solvent or in the essentially neat monomer or in their mixture in their supercritical state.

In another embodiment, one or more polymer or plasticizer reactors included in the parallel realtor bank operate in homogeneous supercritical or solution mode and one or more polymer reactor trains operate in the slurry mode (combination of slurry and homogeneous supercritical or combination of slurry and solution processes). The dense fluid phase(s) of the slurry polymerization process(es) deployed in one or more polymer trains of the disclosed in-line blending process can be either in its/their liquid or in its/their supercritical state. Before bringing the effluent(s) of the slurry train(s) to the separator-blending vessel (high-pressure separator) of the in-line blending process, the effluents are treated to fully dissolve the slurried polymer blend component. Aside this dissolution step, the other aspects of the in-line blending process disclosed herein are not affected by having a particle-forming polymerization reactors in the reactor bank. This embodiment may provide product advantages in certain applications due to the ability of the slurry process to produce certain highly crystalline homopolymer blend components, such as isotactic polypropylene made with Ziegler-Natta catalysts. It is, however, typically more expensive due to the added processing and investment cost. The optimal choice between the different reactor configurations of the disclosed process depends on the target product slate or even on some production site-specific issues, like, for example, the utilization of existing polymerization facilities. The optimal configuration can be determined by standard techniques well known in the art of chemical engineering.

The parallel reactor configuration disclosed herein permits for flexibility in independently controlling for each polymer and plasticizer reactor, the residence time, monomer composition and conversion, catalyst choice, solvent/diluent composition and concentration, and catalyst concentration. It also makes the independent control of reaction temperature and pressure easier thus enhancing the control of the synthesis processes yielding the individual in-line polymer and plasticizer blend components.

U.S. patent application Ser. Nos. 11/433,889 (U.S. Pat. No. 7,429,634) and 11/177,004 (U.S. Patent Publication No. 2006-0025545) disclose a flexible polymerization platform for the supercritical propylene polymerization process (also referred to herein as the "supercritical process"). In the referred supercritical propylene polymerization process, polymerization is carried out in a substantially supercritical monomer medium, thus it is a bulk supercritical polymerization process. The polymer is in a dissolved state in the reactor and in the reactor effluent thus making the reactor effluent suitable for a direct downstream blending operation prior to recovering the polymeric products in their solid pelletized or baled form. U.S. patent application Ser. Nos. 11/433,889 and 11/177,004 also teach that the supercritical polymerization process provides an advantageous means to the so-called solution processes in its ability to produce highly crystalline, high molecular weight (i.e. low melt-flow rate) isotactic propylene homopolymers. Unlike gas phase and slurry polymerization processes, the supercritical process may also produce ethylene-propylene copolymers and propylene homopolymers with reduced tacticity, and thus reduced polymer melting point without fouling. As previously referenced, U.S. patent application Ser. Nos. 11/433,889 (U.S. Pat. No. 7,429,634) and 11/177,004 (U.S. Patent Publication No. 2006-0025545) are incorporated by reference in their entirety herein.

Advantageous plasticized polymer blends are often composed of a blend of (a) high molecular weight highly crystalline polymer component(s) and (a) low molecular weight low crystallinity oligomer/polymer component(s). Slurry and gas phase polymerization processes may provide for high molecular weight, highly crystalline polymers, but not for low crystallinity products because the polymer pellets stick together causing fouling of the reactor. In contrast, solution polymerization processes may provide for low crystallinity products because the polymer is present in solution in the reactor, and therefore cannot foul it. However, the solution process has limitations in producing highly crystalline, high molecular weight products with higher melting point. One limitation of the solution process is that it typically cannot produce high MW products that also have high melting point, and if it could, such products tend to crystallize in the reactor and cause fouling. In contrast, the homogeneous supercritical process may provide for both high crystallinity/high melting point and low crystallinity/low melting point polymers without fouling. These products can also be made with any desired, low or high, molecular weight. It also generates the polymer blend components in a dissolved state in the polymerization system allowing direct blending without the need for a dissolution step. These attributes make it a particularly advantageous polymerization process for the in-line blending processes disclosed herein. Notwithstanding, any combination of polymerization processes operating with dense polymerization systems may be deployed in the in-line blending processes disclosed herein as long as at least one of the polymer and plasticizer reactor trains operates with a homogeneous polymerization system. Homogeneous operation is ensured by operating above the solid-fluid phase transition point, advantageously not lower than 10 MPa below the cloud point of the polymerization system.

The monomers for use in the bank of parallel reactors disclosed herein may be any olefinic compounds containing at least one aliphatic double bond. The olefin group may be unsubstituted or substituted by one or more aliphatic or aromatic group(s) and may be part of an open chain or a non-aromatic ring. Exemplary, but not limiting, olefins include alpha and internal linear or branched olefins and their blends, such as ethylene, propylene, butenes, pentenes, hexenes, heptenes, octenes, nonenes, decenes, dodecenes, styrenes, non-conjugated dienes, cyclohexene, norbornene, and the like. Exemplary, but not limiting, non-polymerizing (inert) fluid components serving as diluents/solvents include light paraffinic and aromatic hydrocarbons and their blends, such as butanes, pentanes, hexanes, heptanes, octanes, toluene, xylenes, cyclopentane, cyclohexane, fluorocarbons, hydrofluorocarbons, etc.

The conditions in the polymerization reactors of the aforementioned olefin polymerization process may be established such that the entire reactor content, including the monomer(s), optional non-polymerizing fluid, catalyst system(s), optional scavenger(s) and polymeric products, is in a homogeneous fluid, and advantageously in a single homogeneous fluid state. In certain embodiments, the conditions in the reactors of the aforementioned process may be set such that the reactor contents are in their supercritical fluid state, and advantageously in a single homogeneous supercritical fluid state.

Figure 5:
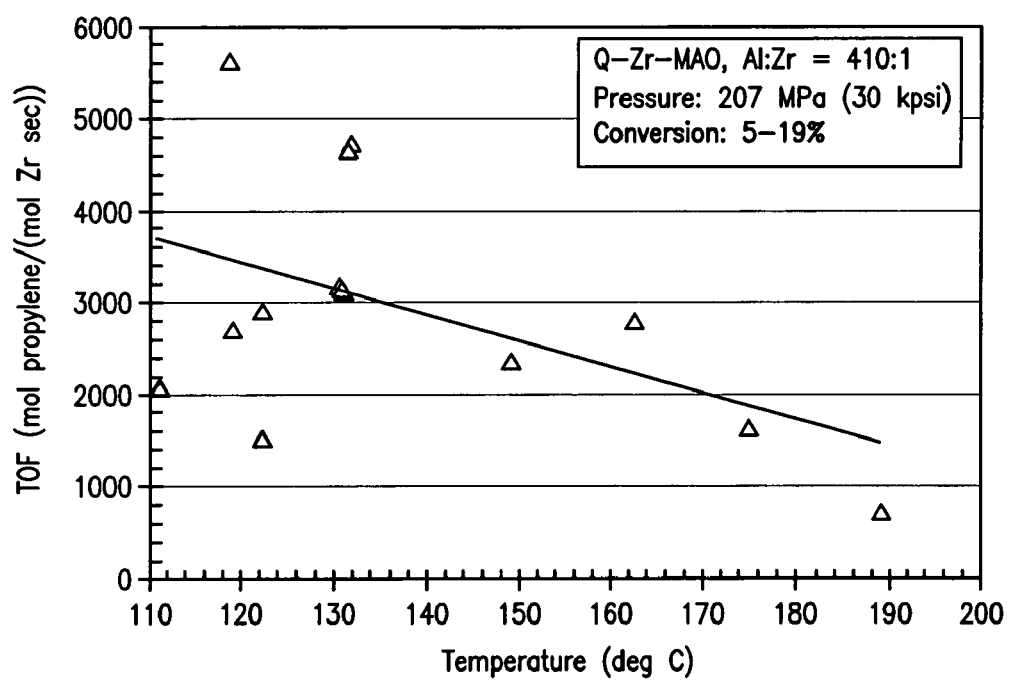
FIG. 5 presents the effect of temperature on the activity of MAO-activated (μ-dimethylsilyl)bis(2-methyl-4-phenylindenyl)zirconium dichloride (Q-Zr-MAO) catalyst in the polymerization of supercritical propylene.

The upper limit for temperature is determined by the product properties that are strongly influenced by the reaction temperature (for an example, see FIG. 2). Since polymers with higher molecular weights and/or higher melting points are desired for the base polymer blend components, high polymerization temperatures (>250° C.) are generally not advantageous. Increased temperatures can also degrade most known catalytic systems, providing another reason for avoiding excessive polymerization temperatures. However, high polymerization temperatures (>250° C.) may be advantageous for producing plasticizer components because of the desirability for low molecular weight. FIG. 5 provides an example of how catalytic activity is impacted by increasing polymerization temperature. At the current state of the art of polymerization, polymerization temperatures above 350° C. are not recommended. For the slurry polymerization processes, the upper temperature limits of polymerization are also influenced by the solid-fluid phase transition conditions since running near the solid-fluid phase transition line leads to fouling. For that reason, slurry operations not higher than 5° C. below the solid-fluid phase transition are advantageous, not higher than 10° C. below the solid-fluid phase transition are particularly advantageous.

The lower limits of reaction temperature are determined by the desired polymer and/or plasticizer properties. Lower temperatures generally favor higher crystallinity and higher molecular weight (for an example, see FIG. 2). For homogeneous polymerization processes, the lower limits of reaction temperature are also determined by the solid-fluid phase transition temperature. Running the reactors below the solid-fluid phase transition temperature of the reaction mixture may lead to operation problems due to fouling. For the production of highly crystalline polypropylenes (melting peak temperatures >150° C.) in bulk homogeneous supercritical propylene polymerization processes, the minimum operating temperature is about 95-100° C. In the production of lower melting copolymers, such as ethylene-propylene and ethylene-hexene-1 copolymers, significantly lower reactor temperatures, e.g., 90° C. or even lower, may be readily used without fouling. The application of certain inert solvents may further reduce the minimum operation temperature of the fouling-free operation regime, although, as discussed earlier, the substantial presence of inert solvents also tends to limit the product molecular weight and often the melting peak temperature. It also increases production cost due to the need for solvent handling.

The critical temperature and pressure of the polymerization systems are different from the critical values of pure components, and thus supercritical operations at temperatures lower than the critical temperature of pure propylene and $C_4$ plus monomers (e.g., 92° C. for propylene) are possible and disclosed herein. Additionally, near-amorphous and amorphous materials with low melting points may be produced without fouling even below the critical temperature of the reactor blends, i.e., at temperatures that correspond to the condensed liquid state of the polymerization system in the reactor. In these instances, the operation temperature may be below the bubble point of the reaction mixture and thus the reactor operates at what is often referred to as liquid-filled conditions. In some instances, such operation mode could be desired to achieve high molecular weight (MW) and thus low melt flow rate (MFR), particularly in the manufacture of high molecular weight copolymers, such as propylene-ethylene or ethylene-higher olefin or propylene-higher olefin copolymers. Thus, reactor operations under conditions at which the polymeric products are dissolved in the monomer or monomer blend present in its liquid state, also known as bulk solution polymerization, are also disclosed herein.

Reaction Temperature for Homogeneous Fluid Phase Polymerizations:

The reaction process temperature should be above the solid-fluid phase transition temperature of the polymer-containing and (when the plasticizer is a solid at ambient temperature) the plasticizer-containing fluid reaction systems at the reactor pressure, or at least 2° C. above the solid-fluid phase transition temperature of the polymer-containing and plasticizer-containing fluid reaction system at the reactor pressure, or at least 5° C. above the solid-fluid phase transition temperature of the polymer-containing and plasticizer-containing fluid reaction system at the reactor pressure, or at least 10° C. above the solid-fluid phase transformation point of the polymer-containing and plasticizer-containing fluid reaction system at the reactor pressure. In another embodiment, the reaction process temperature should be above the cloud point of the single-phase fluid reaction system at the reactor pressure, or 2° C. or more above the cloud point of the fluid reaction system at the reactor pressure. In still another embodiment, the reaction process temperature should be between 40 and 350° C., or between 50 and 250° C., or between 60 and 250° C., or between 70 and 250° C., or between 80 and 250° C., or between 90 and 220° C., or between 93 and 220° C. Exemplary lower reaction temperature limits are 40, or 50, or 60, or 70, or 80, or 90, or 95, or 100, or 110, or 120° C. Exemplary upper reaction temperature limits are 350, or 250, or 240, or 230, or 220, or 210, or 200° C.

In certain embodiments, polymerization is performed in a supercritical polymerization system. In such embodiments, the reaction temperature is above the critical temperature of the polymerization system. In some embodiments, some or all reactors operate at homogeneous supercritical polymerization conditions Said homogeneous supercritical polymerizations of the in-line blending processes disclosed herein may be carried out at the following temperatures: In one embodiment, the temperature is above the solid-fluid phase transition temperature of the polymer-containing and plasticizer-containing fluid reaction medium at the reactor pressure or at least 5° C. above the solid-fluid phase transition temperature of the polymer-containing and plasticizer-containing fluid reaction medium at the reactor pressure, or at least 10° C. above the solid-fluid phase transformation point of the polymer-containing and plasticizer-containing fluid reaction medium at the reactor pressure. In another embodiment, the temperature is above the cloud point of the single-phase fluid reaction medium at the reactor pressure, or 2° C. or more above the cloud point of the fluid reaction medium at the reactor pressure.

Figure 3:
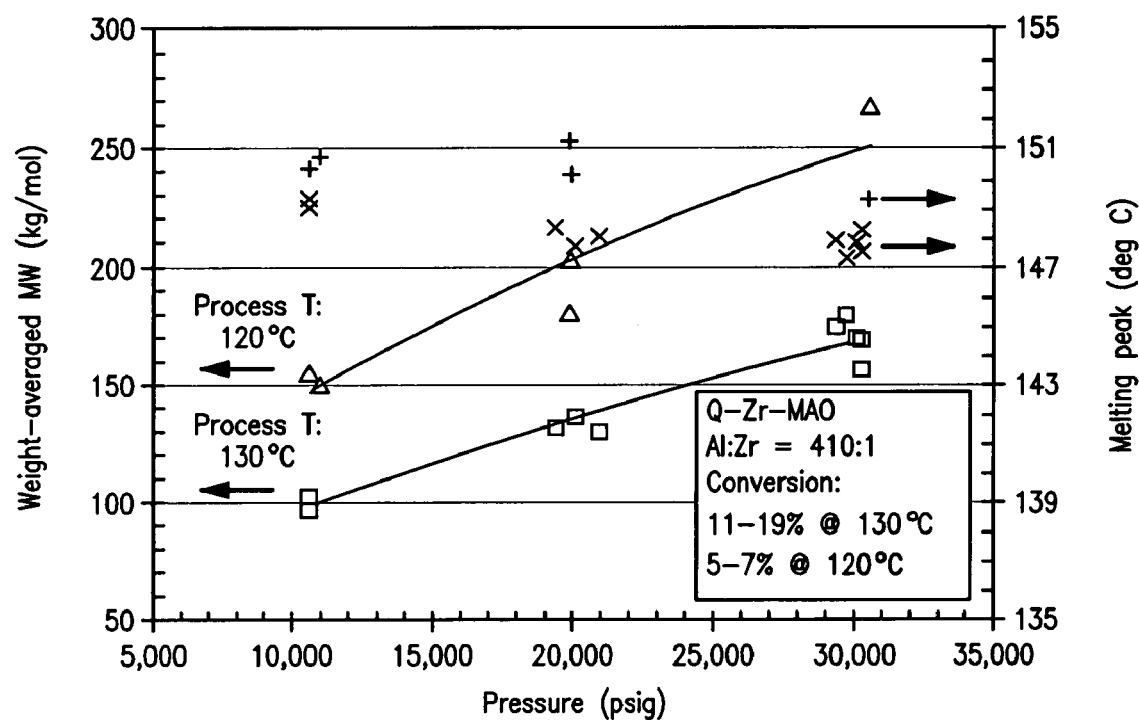
FIG. 3 presents the effect of polymerization pressure on the molecular weight and melting point of polypropylene made in supercritical propylene using MAO-activated (μ-dimethylsilyl)bis(2-methyl-4-phenylindenyl)zirconium dichloride (Q-Zr-MAO) catalyst at 120 and 130° C.

Reaction Pressure for Homogeneous Fluid Phase Polymerizations:

The maximum reactor pressure may be determined by process economics, since both the investment and operating expenses increase with increasing pressure. The minimum pressure limit for the production of the individual polymer and plasticizer blend components disclosed herein is set by the desired product properties, such as molecular weight (MW) and melt flow rate (MFR) (see, for example, FIG. 3).

Reducing process pressures in homogeneous polymerizations may lead to phase separation creating a polymer-rich or plasticizer-rich and a polymer-lean or plasticizer-lean fluid phase. In well-stirred reactors, where mass transport is sufficiently high due to efficient mixing of the two phases, product qualities may not be impacted by such fluid-fluid phase separation. Therefore, polymerization process conditions under which there is a polymer-rich or plasticizer-rich and a polymer-lean or plasticizer-lean phase are provided herein as long as both phases are above the solid-fluid phase separation limit thus preventing fouling and are well mixed thus preventing substantial mass transfer limitation leading to poorly controlled increases in molecular weight and/or compositional distributions. Generally, however, operating in a single-phase dense fluid polymerization is advantageous because it is less prone to fouling and provides better heat transfer properties.

Exemplary, but not limiting, process pressures, are between 1 MPa (0.15 kpsi) to 1500 MPa (217 kpsi), and more particularly between 1 and 500 MPa (0.15 and 72.5 kpsi). In one embodiment, the polymerization process pressure should be no lower than the solid-fluid phase transition pressure of the polymer-containing or plasticizer-containing fluid polymerization system at the reactor temperature. In another embodiment, the polymerization process pressure should be no lower than 10, or 5, or 1, or 0.1, or 0.01 MPa below the cloud point of the fluid polymerization system at the reactor temperature and less than 1500 MPa. In still another embodiment, the polymerization process pressure should be between 10 and 500 MPa, or between 10 and 300 MPa, or between 20 and 250 MPa. Exemplary lower pressure limits are 1, 10, 20, and 30 MPa (0.15, 1.45, 2.9, 4.35 kpsi, respectively). Exemplary upper pressure limits are 1500, 1000, 500, 300, 250, and 200 MPa (217, 145, 72.5, 43.5, 36.3, and 29 kpsi, respectively).

In certain embodiments, polymerization is performed in a supercritical polymerization system. In such embodiments, the reaction pressure is above the critical the pressure of the polymerization system. In some embodiments, some or all reactors operate at homogeneous supercritical polymerization conditions The supercritical polymerization process of the in-line blending processes disclosed herein may be carried out at the following pressures. In one embodiment, the pressure is no lower than the crystallization phase transition pressure of the polymer-containing and plasticizer containing fluid reaction medium at the reactor temperature or no lower than 10, or 5, or 1, or 0.1, or 0.01 MPa below the cloud point of the fluid reaction medium at the reactor temperature. In another embodiment, the pressure is between 10 and 500 MPa, between 10 and 300 MPa, or between 20 and 250 MPa. In one form, the pressure is above 10, 20, or 30 MPa. In another form, the pressure is below 1500, 500, 300, 250, or 200 MPa. In another form, the cloud point pressure is between 10 and 500 MPa, between 10 and 300 MPa, or between 20 and 250 MPa. In yet another form, the cloud point pressure is above 10, 20; or 30 MPa. In still yet another form, the cloud point pressure is below 1500, 500, 300, 250, or 200 MPa.

Figure 4:
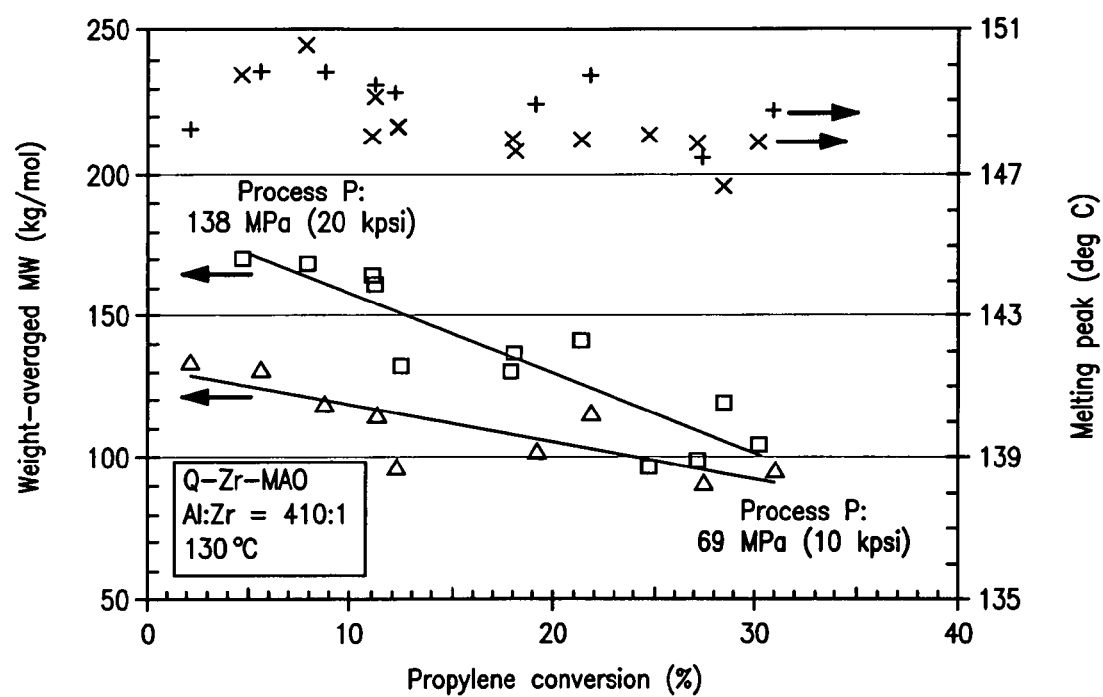
FIG. 4 presents the effect of propylene conversion in the polymerization of supercritical propylene using MAO-activated (μ-dimethylsilyl)bis(2-methyl-4-phenylindenyl)zirconium dichloride (Q-Zr-MAO) at 130° C. and 69 and 138 MPa (10 or 20 kpsi, respectively)

Total Monomer Conversion for Homogeneous Fluid Phase Reactions:

Increasing the conversion of the total monomer feed in a single-pass in the individual reactor trains of the parallel reactor bank can reduce the monomer recycle ratio thus can reduce the cost of monomer recycle. Increasing monomer recycle ratios (i.e., the ratio of recycled/total monomer feed to the reactor train) require the treatment and recycle of larger monomer volumes per unit polymer production, which increases production cost. Therefore, higher monomer conversion (lower recycle ratios) often provides for improved process economics. However, because high polymer content in the polymerization system, particularly in homogeneous polymerization systems, yields high viscosities, which correspondingly may make reactor mixing, heat transfer, and downstream product handling difficult, the monomer conversion in a single pass has practical operation limits. The viscosity of monomer-polymer blends and thus the practical conversion limits can be readily established by standard engineering methods known in the art (M. Kinzl, G. Luft, R. Horst, B. A. Wolf, J. Rheol. 47 (2003) 869). Single-pass conversions also depend on operating conditions and product properties. For example, FIG. 4 shows how increasing conversion reduces the polymer molecular weight. Therefore, monomer conversion may also be constrained by the desire to increase the molecular weight of the blend component made in the given reactor train, particularly in the reactor trains producing the high molecular weight base polymer in-line blending components. Exemplary, but not limiting, total monomer single pass conversions are below 90%, more particularly below 80% and still more particularly below 60%. Total monomer conversion is defined as the weight of polymer or plasticizer made in a reactor or in a reactor train divided by the combined weight of monomers and comonomers in the feed to the reactor or reactor train. It should be understood that while high total monomer conversion is often limited by product viscosity or by product property targets, the conversion of some highly reactive monomer components present in some monomer feed blends may be higher than 90%. For example, the single-pass conversion of ethylene in ethylene-propylene or in ethylene-higher olefin feed blends may be nearly complete (approaching 100%) and is disclosed herein.

As mentioned above, another factor limiting the total monomer conversion is the MW-decreasing effect of conversion (see FIG. 4). Therefore, the production of the base polymer blend components with high MW requires the moderation of monomer conversion in a single pass beyond that of what viscosity and other practical operation considerations would dictate. Hence, for the production of base polymer blend components with high molecular weight (particularly those with higher than >200 kg/mol weight-averaged molecular weight—$M_w$), the total monomer conversion may need to be below 30%. Again, the conversion of some highly reactive components in a monomer feed blend may be higher, and may even approach 100%.

The single-pass conversion in the reactors disclosed herein may be adjusted by the combination of catalyst concentration and total feed flow rate. The total feed rate determines the average residence time (in a back-mixed reactor equal to the reactor volume divided by the total volumetric flow rate of the effluent). The same conversion may be achieved at lower residence time by increasing the catalyst concentration in the feed and vice versa. Lower catalyst concentration may reduce catalyst cost, but may also reduce volumetric productivity thus requiring higher residence times, and ultimately a larger reactor and thus higher investment cost for the same polymer production capacity. The optimum balance between residence time/reactor volumes and catalyst concentration may be determined by standard engineering methods known in the art. A wide-range of polymer and plasticizer blend components may be produced in the reactors disclosed herein at reactor residence times ranging from 1 sec to 120 min, particularly from 1 sec to 60 min, more particularly from 5 sec to 30 min, still more particularly from 30 sec to 30 min, and yet still more particularly from 1 min to 30 min. In yet another form of the in-line blending process embodiments disclosed herein, the residence time in the reactors disclosed herein may be less than 120, or less than 60, or less than 30, or less than 20, or less than 10, or less than 5, or less than 1 minute(s).

In certain embodiments, one or more of the polymer blend component and/or one or more of the plasticizer blend component reactor trains of the in-line blending process disclosed herein operate at supercritical conditions advantageously at homogeneous supercritical conditions, or more advantageously at bulk homogeneous supercritical conditions. The residence times in the supercritical polymerization reactors, particularly in the bulk homogeneous supercritical reactors disclosed herein are generally lower than the residence times in solution, gas phase, and slurry processes due to the high reaction rates achieved at the conditions of the supercritical polymerization process. In-line blending processes disclosed herein applying bulk homogeneous supercritical polymerizaton often choose residence times between 1 and 60 min, and more particularly between 1 and 30 min.

The reactors in the individual trains and in the entire bank can be of any type useful for making polymers (for a review of different polymerization reactors see Reactor Technology by B. L. Tanny in the ENCYCLOPEDIA OF POLYMER SCI. AND ENG., Vol. 14, H. F. Mark et al., Eds., Wiley, New York, 1988, and J. B. P. Soares, L. C. Simon in the HANDBOOK OF POLYMER REACTION ENGINEERING, T. Meyer and J. Keurentjes, Eds., Wiley-VCH, Weinheim, 2005, p. 365-430.) and can be constructed the same way or can be different. The optimal reactor type and configuration can be determined by standard techniques well known in the art of polymer reactor engineering.

It should be recognized that the catalytic activity and thus the volumetric productivity in the individual reactors may be different. If the reactor effluents for in-line blending are directly blended, the catalytic activity and the volumetric productivity may determine the reactor sizes required for the production of the individual polymer and plasticizer blend components. In order to reduce cost, a single plant may need to produce several plasticized polymer blends with different polymer and plasticizer components blended over a range of blend ratios. Consequently, a parallel reactor bank will often have reactors of different sizes allowing for a flexible and thus more cost effective configuration for the production of different plasticized polymer blend grades. The optimal reactor volumes may be determined from the combination of the composition of the target plasticized polymer blends and the volumetric reactor productivity data using optimization methods known in the art of chemical engineering.

In commercial practice, reactor productivity tends to vary to some degree, which in turn may lead to the corresponding level of variability in polymer-plasticizer blend ratios. In one embodiment, buffer tanks may be added to the process downstream of the reactors comprising the bank of parallel reactors, but before the polymer-plasticizer mixing or blending point to compensate for the fluctuations of the volumetric productivity in each reactor train producing the individual polymer and plasticizer blend components (see for example FIG. 8). The buffer tanks may improve the compositional control of the final product blends by homogenizing the individual reactor effluents and by allowing a more independent metering of the plasticized polymer blend components. When an individual reactor train effluent is stored in the buffer tank in its liquid state at a pressure below its bubble point, essentially the entire volume of the buffer tank is available for compensating for the differences in the blending and production rates. However, when the individual reactor effluent is stored in the buffer tank in its supercritical state or in its liquid state but at pressures above its bubble point, the dense liquid or supercritical fluid fills the entire tank. In such operation modes, the buffering capacity, i.e. the capacity to deviate from the instant reactor flow rate, is more limited and is associated with the pressure/density changes allowed in the buffer tank and with the size of the buffer tank. In the latter case, the process streams may be driven by a gradual pressure drop downstream of the reactor to avoid the cost of installing and operating booster pumps. However, booster pumps may be alternatively installed and operated within the process to increase the pressure range and thus the buffering capacity of the system. When no booster pumps are deployed, the pressure of the buffer tank should be lower than that of the reactor, but higher than that of the lines downstream of the blending point.

Apparently, while feasible, controlling this kind of buffer system is difficult and it is not very efficient. Thus, in another embodiment, when the individual reactor effluent is stored in the buffer tank in its supercritical state or in its liquid state but at pressures above its bubble point, the conditions in the buffer tanks may be set to achieve fluid-fluid phase separation (separator-buffer tank operation). Buffering in this mode can be achieved by allowing the fluid level of the denser polymer-rich and/or plasticizer-rich phase to move up and down between the minimum and maximum levels allowed for the desired level of separation while taking the monomer-rich upper phase out of the separator buffer via a pressure control valve. One skilled in the art can see that this operation mode is analogous to the operation of a buffer tank filled with a liquid phase containing the polymeric or plasticizer product and a vapor phase containing the more volatile components, such as monomer(s) and solvent(s). In the supercritical regime, the upper phase is a monomer-rich supercritical fluid, while the lower phase is a polymer-rich or plasticizer-rich supercritical fluid, the latter of which can be withdrawn for blending at a controlled rate required for is making a constant blend ratio, independent of the short-term fluctuations in the production ratios of the individual blend components. A similar analogy may be derived for liquid-filled operations. The polymer or plasticizer content, and thus the viscosity of the polymer-rich or plasticizer-rich phase can be controlled by properly adjusting the temperature at constant pressure or by adjusting the pressure at constant temperature in the separator-buffer tank(s). In this embodiment, the polymer-rich and/or plasticizer-rich effluent(s) of the separator-buffer tank(s) are combined with the direct, unseparated effluent of one of the reactor trains upstream of the separator-blending vessel that recovers the monomer of the direct reactor effluent as a supernatant and the in-line plasticized polymer blend as the bottom phase. In this particular embodiment, one of the separators serves as a separator-blender, while the rest of the separators serve as separator-buffers. Advantageously, the separator-blender is connected to a reactor train making a polymer blending component while the separator-buffer vessels are connected to a plasticizer train. This configuration allows the recovery and recycle of a significant portion of plasticizer monomer without the need for separation from monomer from the polymer train.

As described before, certain embodiments recover the one or more in-line produced plasticizer blend components in their essentially pure liquid form before blending them with streams comprising the one or more high molecular weight base polymer components. In these embodiments, the disclosed processes may employ one or more storage tanks for storing and buffering the plasticizer blend components to increase blending flexibility and to improve composition control. These embodiments may include plasticizer export from the disclosed in-line blending plants further increasing their versatility and the value they may offer.

In another embodiment of the processes disclosed herein, polymer additives may be added to the in-line-produced plasticized polymer blends at ratios of up to 40 wt %, or up to 30 wt %, or up to 20 wt %, or up to 10 wt %, or up to 5 wt % to further improve product quality and product properties. Exemplary, but not limiting polymer additives, include specialty polymers including polar polymers, waxes, antioxidants, clarifiers, slip agents, flame retardants, heat and uv stabilizers, antiblocking agents, fillers, reinforcing fibers, antistatic agents, lubricating agents, coloring agents, foaming agents, tackifiers, organically modified clays such as are available from Southern Clay, etc. and masterbatches containing the above components. Hence, one or more polymer additive storage tanks containing liquid, molten, dissolved, or dispersed polymer components and polymer additives may be added to the processes disclosed herein. If solvent(s) is used in these polymer additive storage tanks, it may be advantageously the same as used in the polymerization and plasticizer reactors previously described in order to avoid an increase in separation costs in the solvent recovery and recycle section of the process. For example, when the polymer synthesis process is performed in supercritical propylene, the off-line produced polymer additives may also be advantageously dissolved in supercritical propylene. However, other solvent(s) or solvent-free introduction may be used with the polymer additives. Solvent-free introduction of the polymer additive components may be used when the additive component is brought into its molten state or when the additive component is a liquid at ambient temperatures.

The homogeneous supercritical polymerization and the solution polymerization processes are particularly suitable for providing both the product base polymer component(s) and the plasticizer component(s) of the plasticized polymer blend in a dissolved fluid state. In one particular embodiment, the supercritical polymerization process is performed in the substantial absence of an inert solvent/diluent (bulk homogeneous supercritical polymerization) and provides the product in a dissolved supercritical state for the downstream in-line separation-blending process. More particularly, the supercritical polymerization of propylene is performed in the substantial absence of an inert solvent/diluent (bulk homogeneous supercritical propylene polymerization) and provides the product in a dissolved supercritical state for the downstream in-line separation-blending process.

The total amount of inert solvents is generally not more than 80 wt % in the reactor feeds of the polymer and plasticizer reactor trains. In some embodiments, where the feed essentially comprises the monomer or monomer blend, like for example, bulk slurry, or bulk supercritical, or bulk solution polymerizations, the minimization of solvent use is desired to reduce the cost of monomer recycling. In these cases, the typical solvent concentration in the reactor feed is often below 40 wt %, or below 30 wt %, or below 20 wt %, or below 10 wt %, or below 5 wt % or even below 1 wt %. In one form disclosed herein, the polymerization system of the polymer and plasticizer reactor trains comprise less than 20 wt % aromatic hydrocarbons and advantageously less than 20 wt % toluene. In another form disclosed herein, the polymerization system of the polymer and plasticizer reactor trains comprise less than 40 wt % saturated aliphatic hydrocarbons and advantageously less than 40 wt % of hexanes, or pentanes, or butanes, and propane, or their mixtures.

Fluid Phase In-Line Blending Process Configuration:

The disclosed fluid phase in-line blending processes for making in-line-plasticized polyolefins may have different detailed process configurations. For example, the number of parallel reactor trains and their configurations in the parallel reactor bank may be varied. Typically, each reactor train serves to produce a single in-line polymer or plasticizer blend component. A given train of the parallel reactor bank may be configured as a single reactor or two or more reactors in series. From a practical commercial plant design standpoint, however, there should be a minimum number of reactors for a given train of the parallel reactor bank in order to make a given polymer or plasticizer blend component. Generally, not more than ten series reactors are utilized and more particularly not more than three series reactors are generally utilized in a given reactor train. The number of parallel trains in the parallel reactor bank may be two, three, four or five or more. The number of reactors in the parallel reactor bank may be any number, although for economic reasons the number of reactors should be maintained as low as the desired product grade slate and plant capacity allows. The optimum number of parallel reactor trains (also referred to as legs of the reactor bank) may be determined by standard chemical engineering optimization methods well known in the art. Most typically, the polymerization-blending plant will have two or three parallel polymerization reactor trains or legs in the reactor bank producing product blends with the corresponding number of in-line polymer blend components. However, more than three parallel reactors/legs may be employed if the production of the target product blends so requires. Besides the in-line base polymer and plasticizer blend components, the final plasticized polymer blends often contain additives and modifiers that are not produced within the same polymerization process. Therefore, it should be understood that the number of components in the final product blend typically is higher than the number of reactor trains or the number of in-line plasticized polymer blend components.

Based on the source of the in-line blend components, the disclosed in-line blending processes producing in-line-plasticized polyolefins may be grouped into three options: (1) all plasticizer blending components produced in-line, i.e., in the reactor bank of the in-line blending process, (2) one or more plasticizer blending components produced in-line and one or more additional plasticizer blending components produced off-line, and (3) all plasticizer blending components produced off-line. Furthermore, the processes falling under options (1) and (2), may deliver the one or more in-line-produced plasticizer blend components to the blending point with the base polymer containing stream (a) without removing any of the light components from the one or more plasticizer reactor effluents, such as the unreacted monomers and optional inert solvents/diluents (unreduced reactor effluent), (b) after partial recovery of the said light components from the said one or more plasticizer-containing reactor effluents (reduced reactor effluent), and (c) after full recovery of the essentially pure plasticizer blending component, i.e., after removing essentially all of the said light components from the said plasticizer-containing one or more reactor effluents (fully recovered plasticizer). As stated before, the plasticized polyolefin product may contain one or more high molecular weight base polymer components for options (1) and (2), and may contain two or more high molecular weight base polymer components for option (3).

The fluid phase in-line blending processes disclosed herein may also optionally incorporate other polymers, other plasticizers and other polymer additives that were produced outside the reactor bank of the processes disclosed herein. The optional other polymer, other plasticizer, and polymer additive components may first be transferred into solution or molten fluid state before being blended with the in-line produced polymer and plasticizer blend components. These other polymer, other plasticizer, and polymer additive components may be stored in polymer additive storage tanks containing liquid, molten, or dissolved polymer components, plasticizer components and polymer additives prior to being transferred and metered to the separation-blending vessel or to a mixing point upstream or downstream of the separation-blending vessel. Other polymer, other plasticizer, and polymer additive components may be accurately metered to the blending vessel or to another mixing point by one or more pumps or if the downstream pressure is lower, through the use of one or more pressure letdown valves. The optional other polymer, other plasticizer, and polymer additives and modifiers can be mixed into the product upstream of or directly in the separator-blending vessel or downstream of the separator-blending vessel of the processes disclosed herein. In order to simplify monomer treatment in the monomer recycle train and thus to reduce the cost of monomer recycle, it may be advantageous to add the other polymer, other plasticizer and polymer additives and modifiers downstream of the separator-blending vessel. In such embodiments, the additives and modifiers may be mixed with the in-line produced plasticized polymer blend in dedicated pieces of equipment or in the hardware of the product finishing section of the processes disclosed herein, for example, in a low-pressure separator or in a devolatizer extruder.

Figure 6:
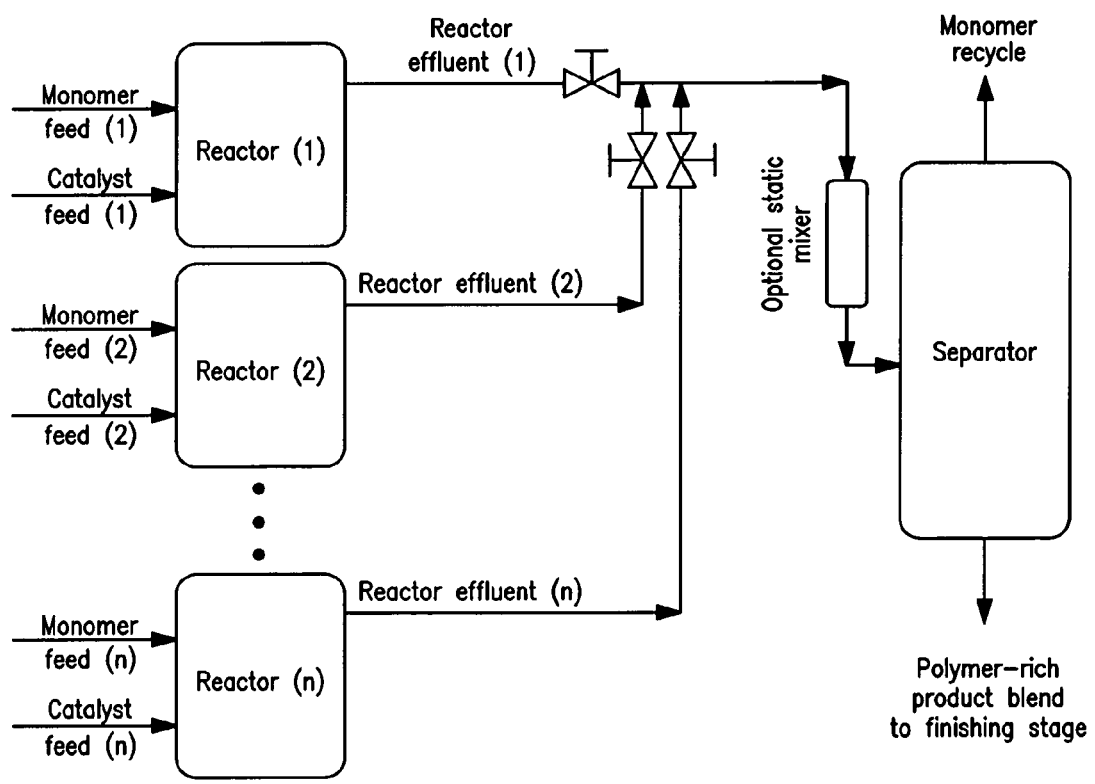
FIG. 6 presents an exemplary in-line plasticized polymer blending process schematic with a single separation vessel.

Referring to FIG. 6, in one exemplary embodiment of the fluid phase in-line blending process disclosed herein, the effluents of all parallel reactor trains in the reactor bank are brought into a single high-pressure separator-blending vessel (also referred to as separator-blender or high-pressure separator). One or more of the parallel reactor trains produce polymer blend components and optionally (as in options (1) and (2) described earlier) one or more of the parallel reactor trains produce plasticizer blend components. The separator-blender separates some or most of the low molecular weight components, such as monomer(s), optional solvent(s), and product lights (monomer-rich phase) from the (monomer-lean) polymer-rich phase, but also blends the polymeric and optional plasticizer blend components made in different reactor trains of the in-line process forming a polymer-rich blend effluent that also comprise the optional in-line produced plasticizer. In some embodiments (not shown in FIG. 6), one or more off-line-produced plasticizers may also be blended at the same point of the process, i.e., in which case the polymer-rich blend effluent will also carry the one or more off-line-produced plasticizer blend components. This mode is also referred to as single separation vessel operation even if the process employs one or more low-pressure separators. The number of reactor trains in the parallel bank may be 2, 3, 4, and up to n. The effluents of the different reactor trains and thus the individual polymer and the optionally in-line-produced plasticizer blend components are combined upstream of the separation vessel after individual pressure let down valves, which function to bring the reactor train effluents to the common pressure of the separator-blending vessel. Catalyst killing agent(s), may be optionally introduced prior to or into the separator-blending vessel to minimize further polymerization outside the polymerization reactors. Optionally, one or more static mixers positioned before the separator-blending vessel, but downstream of the mixing point, may also be utilized to enhance mixing between the reactor train effluents. Optionally, some or all reactor train effluents may be heated before the pressure letdown (not shown in FIG. 6) in order to maintain the temperature in the downstream lines and in the separation-blending vessel at the desired value, i.e., above the solid-fluid phase transition temperature of the polymer-rich phase and plasticizer-rich phase of the separator-blender, but below the cloud point of the combined effluents entering the separator-blending vessel to allow the formation of a plasticized polymer-rich denser fluid phase and a monomer-rich lighter fluid phase.

After the combined reactor train effluent streams enter the separator-blending vessel, monomer recycle (monomer-rich phase) emerges from the top of the separator-blending vessel and an optionally plasticized (as in the aforementioned options (1) and (2) and when optional off-line-produced plasticizers introduced) polymer-rich blend emerges from the bottom of the vessel. The optionally plasticized polymer-rich blend may then be conveyed to a downstream finishing stage for further monomer stripping, drying and/or pelletizing. As described earlier, modifiers and additives (i.e. other polymers, other plasticizers, and polymer additives) may also be introduced either before or into the separator-blending vessel or downstream of it. However, a downstream introduction of these modifiers and additives typically simplifies monomer recycle, and is thus advantageous. In this embodiment, the single separator-blending vessel serves as both a separator and a blender. One advantage of this exemplary embodiment is the utilization of a single separator-blending vessel, which provides for process simplicity because it functions for both separation and blending purposes. One disadvantage of this exemplary embodiment is that because all reactor train effluent streams are combined, the recovered monomer stream from the separator-blending vessel may need to be separated prior to recycle to the individual reactor trains in the bank of parallel reactors. In summary, this embodiment may be simpler and thus lower cost in the separator section, but may be more costly in the monomer separation and recycling loop section of the process.

Figure 7:
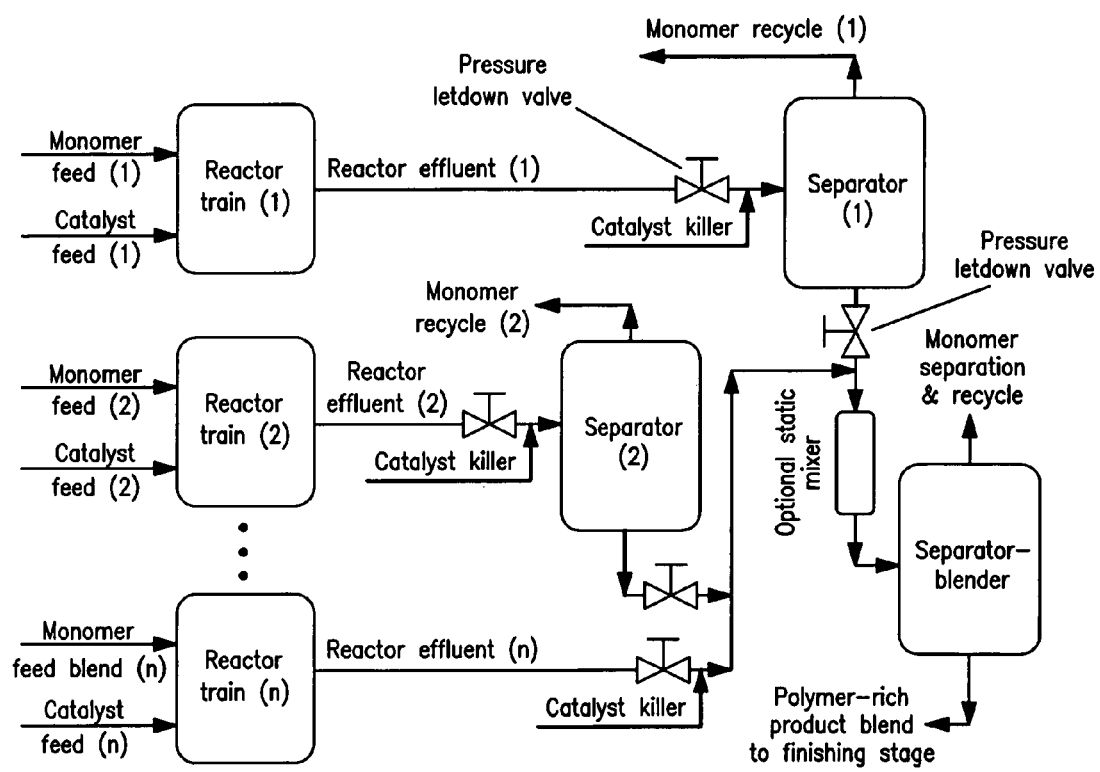
FIG. 7 presents an exemplary in-line plasticized polymer blending process schematic with multiple separation vessels.

FIG. 7 depicts an alternative exemplary embodiment of the fluid phase in-line blending process disclosed herein in which each reactor train has a dedicated separator vessel with the exception of one reactor effluent train where all polymer-rich and the optional plasticizer-rich phases (as in the aforementioned options (1) and (2)) from the other reactors are combined in a high-pressure separator that also serves as a blending vessel (also referred to as multiple separation vessel operation). In this embodiment, for all but one of the reactor trains (all but train n in FIG. 7), the single-stream high-pressure separator serves as a separator to separate a polymer-enriched phase or plasticizer-enriched phase from a monomer-rich phase in the reactor effluent stream. In order to keep the content of low molecular weight components higher and thus to keep the viscosity of the optionally plasticized polymer-enriched phase lower, the single-stream high-pressure separators dedicated to the individual reactor trains often operate at a somewhat higher pressure than the one downstream high-pressure separator that serves both as a separator and as a blender (separator-blender). Therefore, there is an optional pressure letdown between these separators and the separator-blender. For the one high-pressure separator (separator-blender) where the other polymer-rich phases and plasticizer-rich phases are combined and the reactor train effluent from one of the reactor trains is introduced (reactor train n in FIG. 7), the separator serves both product blending and product-feed separating functions. Catalyst killing agent may be optionally introduced prior to or into each separator vessel, including the separator-blender to minimize further polymerization outside the polymerization reactors. One or more off-line-produced plasticizers, and other additives may optionally also be blended in at the same mixing point (not shown in FIG. 7). Optionally, one or more static mixers positioned before the separator-blending vessel, but downstream of the mixing point may be utilized to enhance mixing between the polymer-rich phases, the optional plasticizer-rich phases of the reactor trains, the optional off-line-produced plasticizers and other optional additives, and the reactor train effluent of the reactor train associated with the separator-blender. Optionally, some or all reactor train effluents may be heated before the first pressure letdown (not shown in FIG. 7) in order to maintain the temperature in the downstream lines and in the separators, including the separation-blending vessel, at the desired value, i.e., above the solid-fluid phase transition temperatures of the polymer-rich phases and plasticizer-rich phases but below the cloud point of the streams entering the separators, including the separator-blender, to allow the formation of plasticized polymer-rich denser fluid phase and monomer-rich lighter fluid phase. The optional off-line-produced plasticizer and other optional additive feed streams may also be heated before their introduction for the same purpose. The process of this embodiment may be advantageous in the production of plasticized polymer blends that include one or more in-line-produced plasticizers and one or more high molecular weight polymers. In this embodiment, the plasticizer train(s) has/have its (their) own separator(s) and the polymerization train to produce a high molecular weight polyolefin serves as a blender. The process of this embodiment may also be advantageous in the production of plasticized polymer blends that include different homopolymers or homopolymer(s) and copolymer(s) as blend components. In this embodiment, the homopolymerization train(s) and the plasticizer train(s) has/have its (their) own separator(s) and the copolymerization train (or one of the copolymerization trains in case of more than one copolymer trains used) serves as a blender. The monomer(s) recovered in the separator(s) dedicated to individual reactor train(s) may be recycled to the corresponding reactor train(s) without the complex separation from other monomers as was associated with single separation-blending vessel operation previously described. Hence, one advantage of this embodiment is that monomer recycle is simplified and thus affords lower cost in the monomer recycle loop. While multiple separation vessel operation increases cost in the separator section, it adds flexibility in the monomer recycle loops. In summary, this embodiment may be more complicated and higher cost in the separator section, but may be simpler in the monomer recycle loops.

In one particular embodiment similar to the process scheme depicted in FIG. 7, one or more of the in-line-produced plasticizers may be fully recovered in their essentially pure form before blending them with the effluent streams carrying the one or more high molecular weight base polymer in-line blending components. The full recovery of the one or more plasticizer blend components may include one or more fluid-fluid phase separation, or distillative separations comprising one or more liquid-vapor equilibrium conditions, and any combination thereof. The operation of fluid-fluid phase separators is disclosed in details in U.S. Patent Application No. 60/876,193 filed on Dec. 20, 2006, herein incorporated by reference in its entirety. Distillative separations comprising one or more liquid-vapor equilibrium conditions employing flash drums, knock-out pots, or distillation columns, or vacuum stripping, etc., are well-known in the art of chemical engineering. The full recovery of the in-line-produced plasticizer blending component may be advantageous when in-line-produced plasticizer blending component is a liquid at ambient temperature and/or when some fraction of it is exported from the in-line blending plant disclosed herein since plasticizer liquids readily blend with the process streams comprising the high molecular weight base polymer. Further advantages may arise from the full recovery of one or more in-line-produced plasticizers before blending them with the effluent streams carrying the one or more high molecular weight base polymer in-line blending components when the combined monomer pool of the one or more optional plasticizer reactor trains has no common monomer members with the combined monomer pools of the reactor trains producing the high molecular weight base polymer in-line blending components.

Since both embodiments of FIGS. 6 and 7 serve the same function of product blending and separation of the polymer-rich and plasticizer-rich phases from the monomer-rich phases, the choice between them is driven by the economics of a given plant producing a given product slate and may be determined by standard engineering optimization techniques known in the art.

Figure 8:
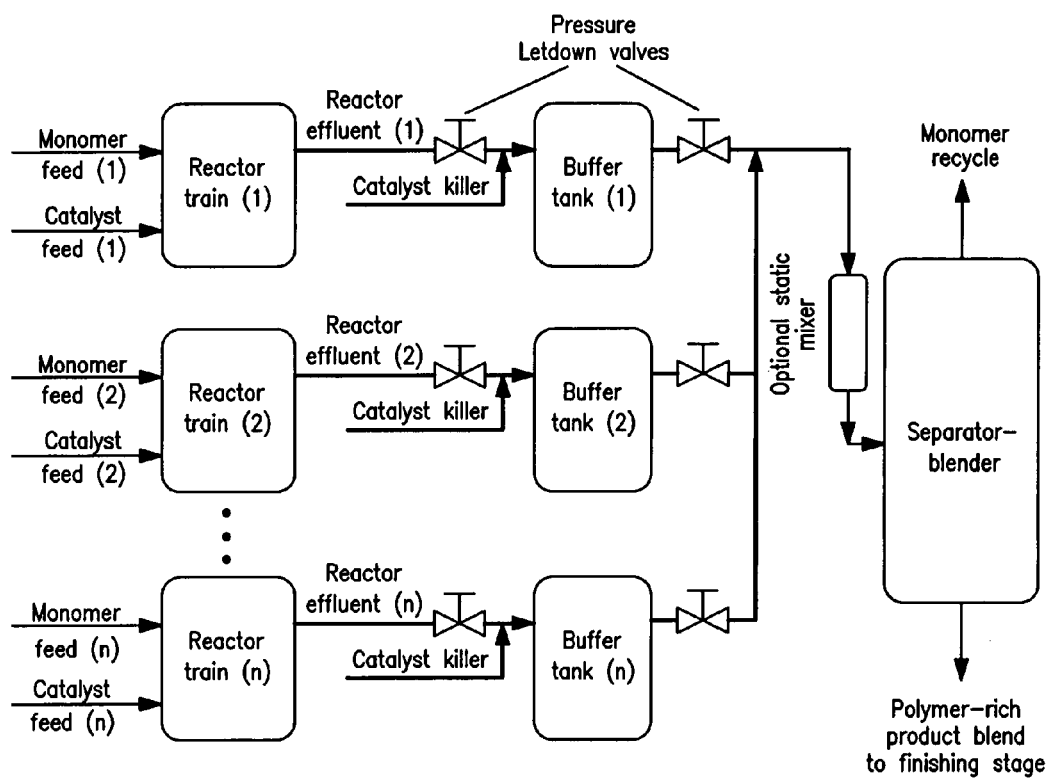
FIG. 8 presents an exemplary in-line plasticized polymer blending process schematic with product effluent buffer tanks for improved blend ratio control.

FIG. 8 presents another alternative exemplary embodiment of the fluid phase in-line blending process disclosed herein in which is provided a dedicated buffer tank in which no phase separation occurs for each reactor train and in which the reactor train effluents are combined in a single separator-blending vessel (also referred to as single separation vessel operation with buffer tanks). Each of the n parallel reactor trains in the reactor bank is provided with its own buffer tank to enable the fine-tuning of the mixing ratio of the polymer and plasticizer blend components. Pressure let down valves may be positioned on the inlet and outlet side of each buffer tank to control the in-line polymer or plasticizer blend component flow. Optionally, the reactor effluents may be heated to maintain the desired temperature in the downstream separator-blender as described above. Catalyst killing agent may be optionally introduced prior to or into each buffer tank to minimize further polymerization outside the polymerization reactors. Optionally, one or more static mixers positioned after the mixing point but before the separation vessel for blending may be utilized to enhance mixing between the reactor effluents being fed from the buffer tanks. In comparison to the single separation vessel operation of FIG. 6, this alternative exemplary embodiment allows for more precise control of the blend ratio and quality but without the benefit of dedicated monomer recovery provided by the configuration depicted in FIG. 7. As previously discussed, this embodiment may improve the control of product blend ratio and hence product quality, but its buffer capacity may be limited, particularly when the reactor effluent is in its supercritical state or when its pressure is above its bubble point.

Figure 9:
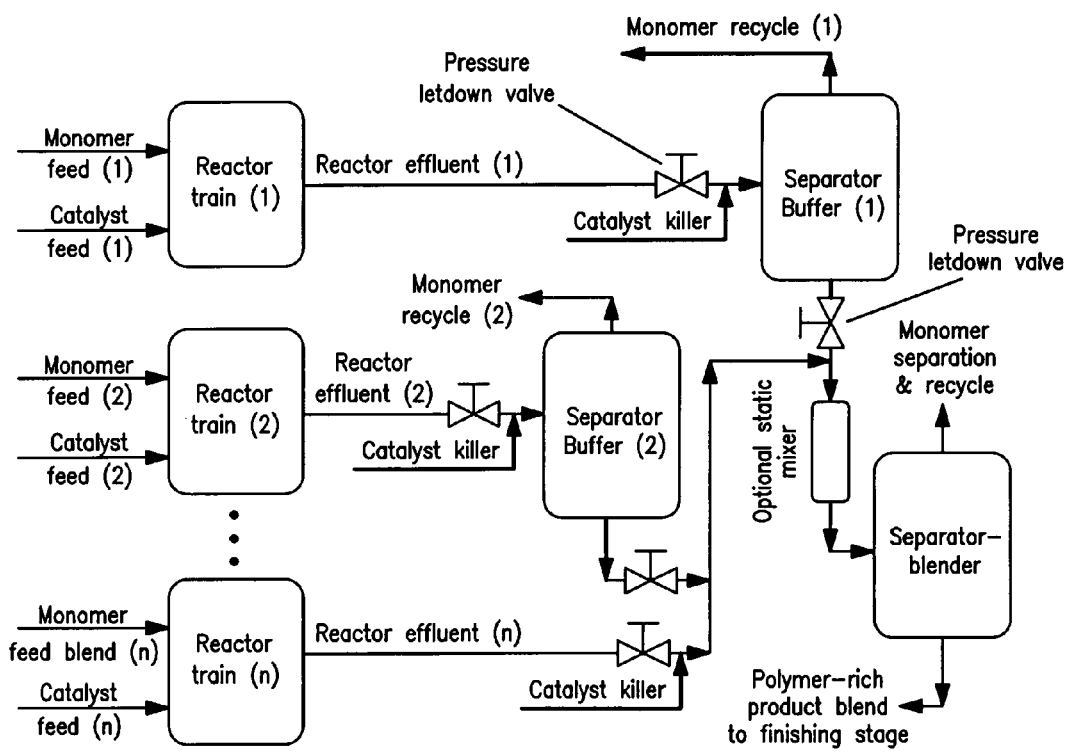
FIG. 9 presents an exemplary in-line plasticized polymer blending process schematic with product effluent buffer tanks that also serve as monomer/product separators for improved blend ratio control.

An alternative design employing buffering capability is depicted in FIG. 9. FIG. 9, a variation of the multiple separation vessel operation depicted in FIG. 7, and an advantageous version of the buffer-only operation shown in FIG. 8, presents yet another alternative exemplary embodiment of the fluid phase in-line blending process disclosed herein. In this exemplary embodiment the single-stream high-pressure separators dedicated to the individual reactor trains also serve as buffer tanks. Referring to FIG. 9, for all reactor trains but n, the reactor train effluent is fed to a dual-purpose separator-buffer for both separation of the polymer-rich phase or plasticizer-rich phase from the supernatant monomer-rich phase and storage of polymer-rich phase or the optional plasticizer-rich phase prior to conveyance to a downstream blending separator. These single-stream separators dedicated to individual reactor trains afford buffering by allowing the level of the denser polymer-rich and plasticizer-rich phases to move between an upper and a lower limit. This buffer capacity allows for the correction in the potential fluctuations in the production rates of the individual in-line blend components and thus provides a means for a more precise control of the polymer-plasticizer blend ratio. For reactor train n, the high-pressure separator (separator-blender) functions to separate the polymer-rich phase from the monomer-rich phase for the reactor effluent from reactor n and also to blend the polymer-rich phases and plasticizer-rich phases from all reactors (1, 2, through n in FIG. 9). From a blend control point of view, there is no buffering for the in-line component n, and thus all other blend component flows to the separator-blending vessel, and ultimately their production rates, are controlled by the production rate in reactor train n in order to maintain the desired blend ratios. Catalyst killing agent may be optionally introduced prior to or into each separator vessel to minimize further polymerization within the separator. Optionally, one or more static mixers positioned before the separation vessel for blending may be utilized to enhance mixing between polymer-rich phases of the reactors and the reactor effluent of the reactor associated with the blending separator. For heat and pressure management, the same considerations, configurations, and controls may be applied as described for the previous embodiments. As in all process configurations, optional modifiers and additives may be introduced either prior or into the separator-blending vessel or downstream of it.

Figure 10:
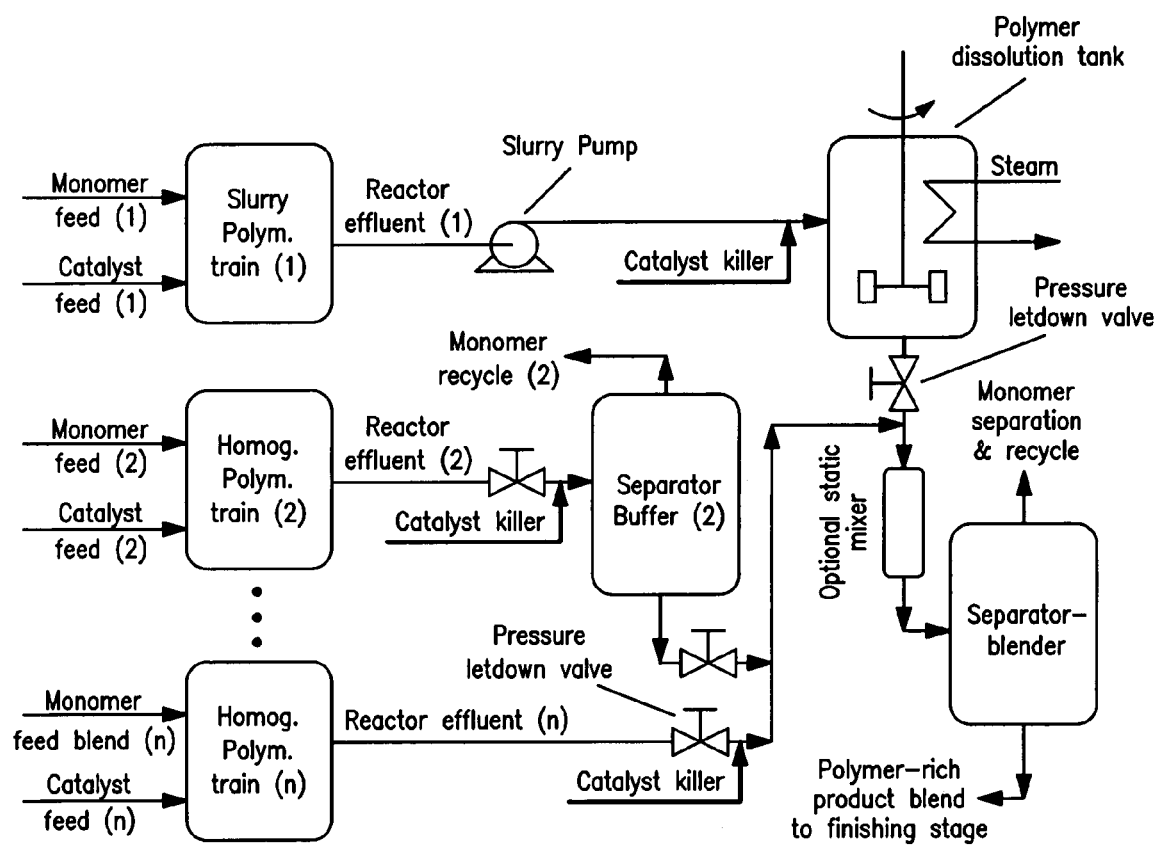
FIG. 10 presents an exemplary in-line plasticized polymer blending process schematic with one slurry reactor train.

FIG. 10 presents yet another exemplary embodiment of the fluid-phase in-line blending process disclosed herein in which one of the parallel polymerization trains (train 1 in FIG. 10) produces a high molecular weight base polymer blending component in the form of solid pellets, i.e. operates in the slurry polymerization regime. Thus in order to bring the polymer into a dissolved state before in-line blending, the reactor effluent is brought into a heated stirred vessel. In order to keep the entire reactor effluent in a dense fluid phase, the pressure of the reactor effluent is increased by a slurry pump. Slurry polymerization typically operates at lower temperatures than supercritical and solution polymerizations and thus may afford products with higher molecular weight and melting peak temperatures, which may provide advantages in certain plasticized polymer blend applications. However, the dissolution of polymer pellets adds cost and tends to be prone to fouling and other operational issues. Other aspects of the in-line blending process disclosed herein, such as catalyst killing, additive blending, heat and pressure management, as described in the previously described embodiments, apply hereto as well.

Figure 11:
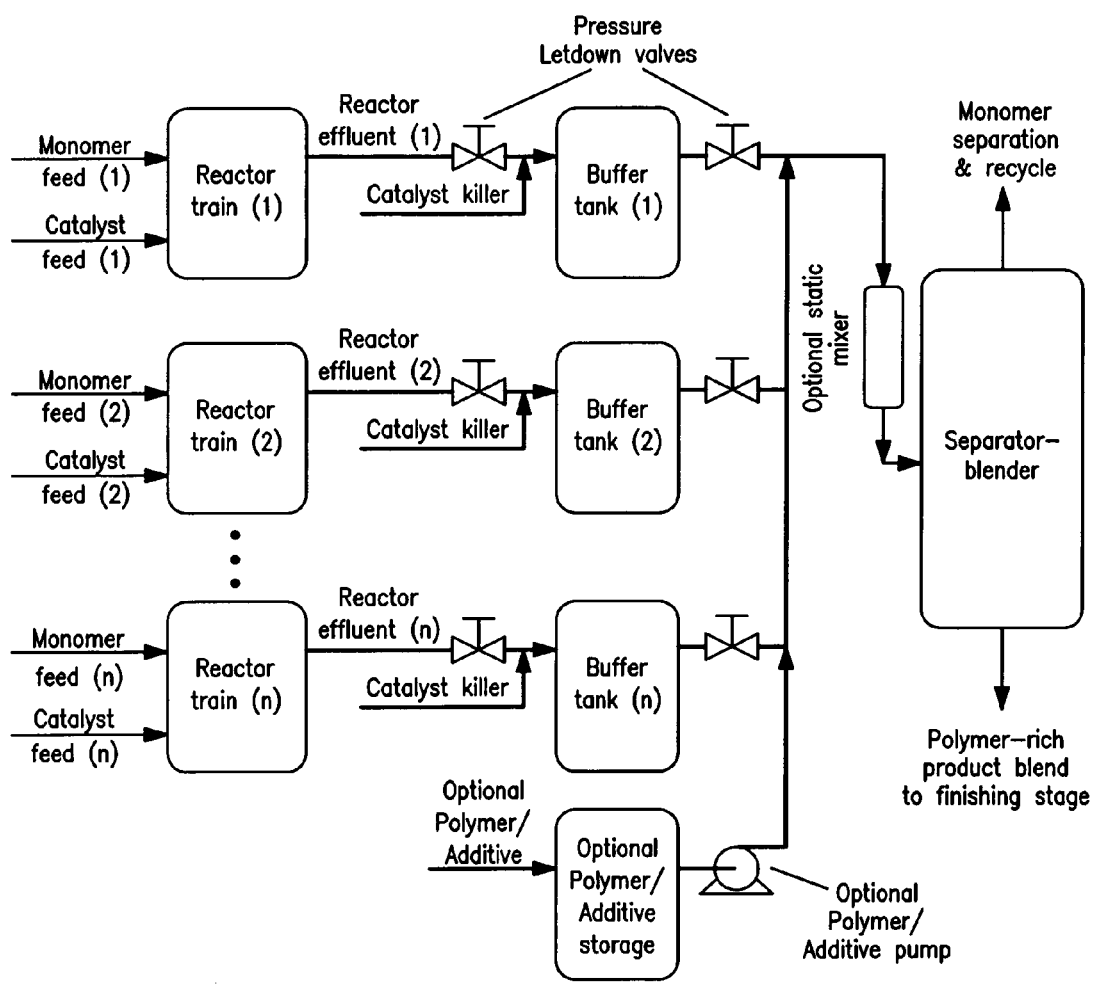
FIG. 11 presents an exemplary in-line plasticized polymer blending process schematic with buffer tanks for improved blend ratio control and with the option for additive/polymer blending component.
Figure 12:
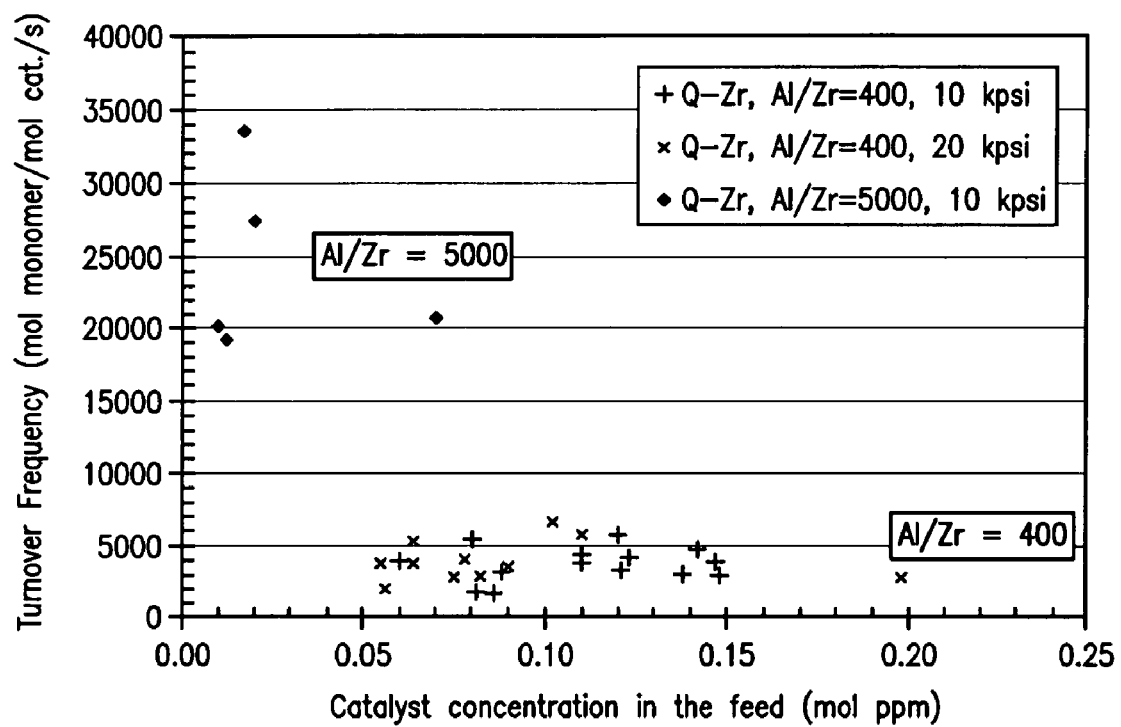
FIG. 12 presents a plot of turnover frequency versus catalyst concentration in the feed.
Figure 13:
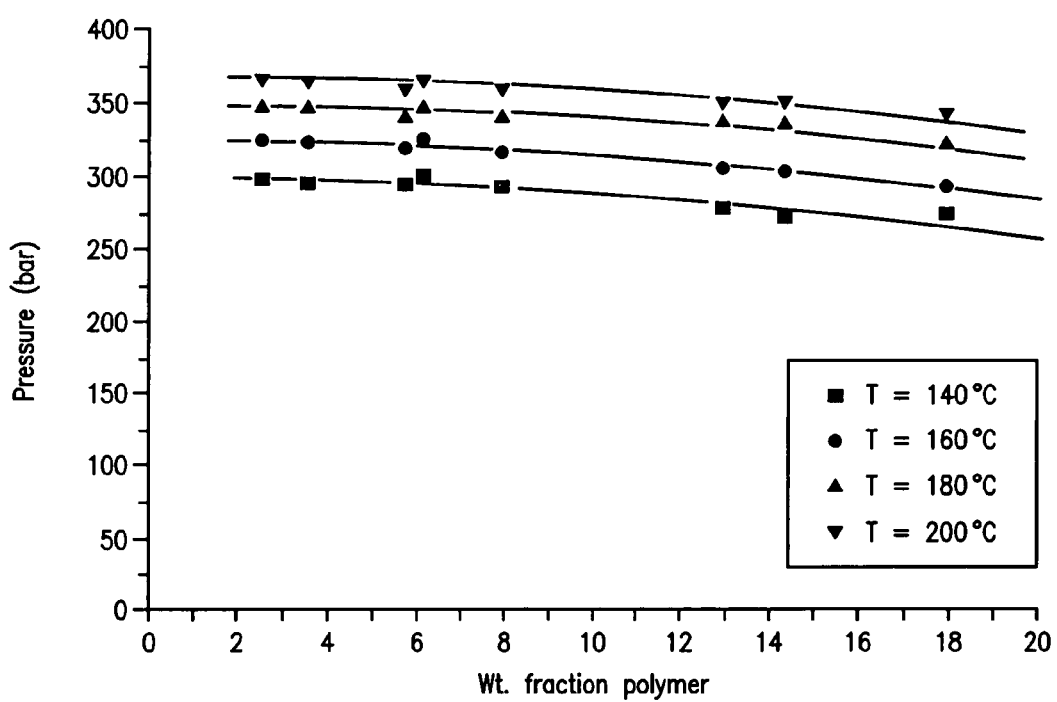
FIG. 13 presents cloud point isotherms for Polymer Achieve™ 1635.
Figure 14:
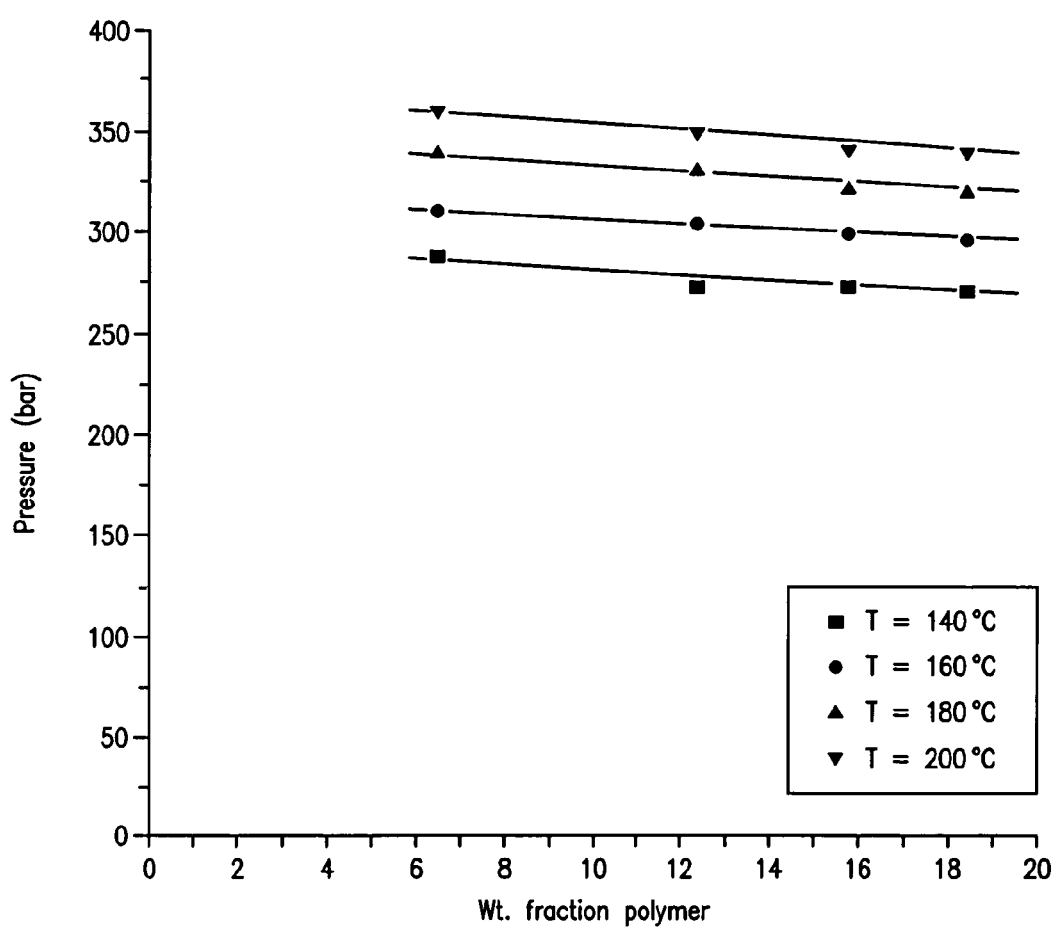
FIG. 14 presents cloud point isotherms for Polymer PP 45379 dissolved in bulk propylene.
Figure 15:
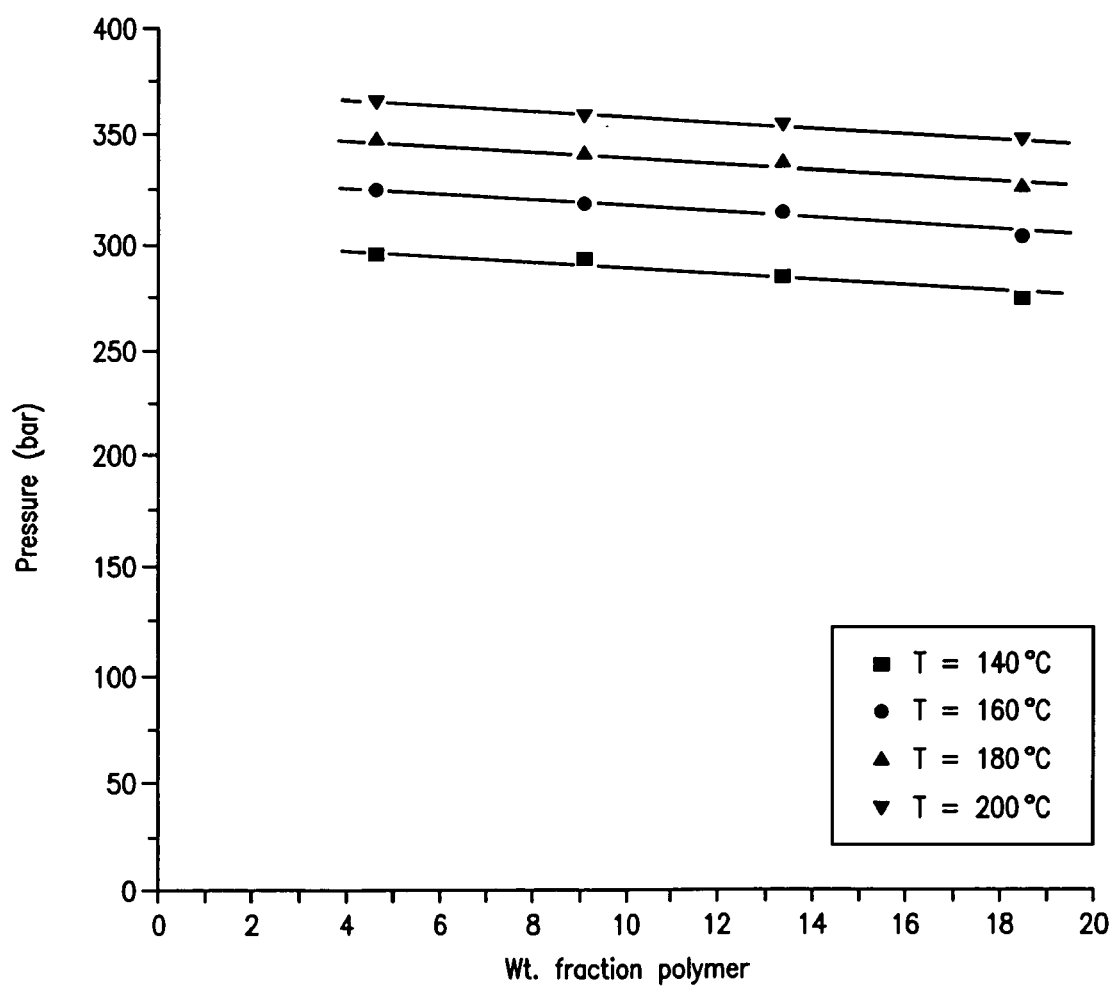
FIG. 15 presents cloud point isotherms for Polymer PP 4062 dissolved in bulk propylene.
Figure 16:
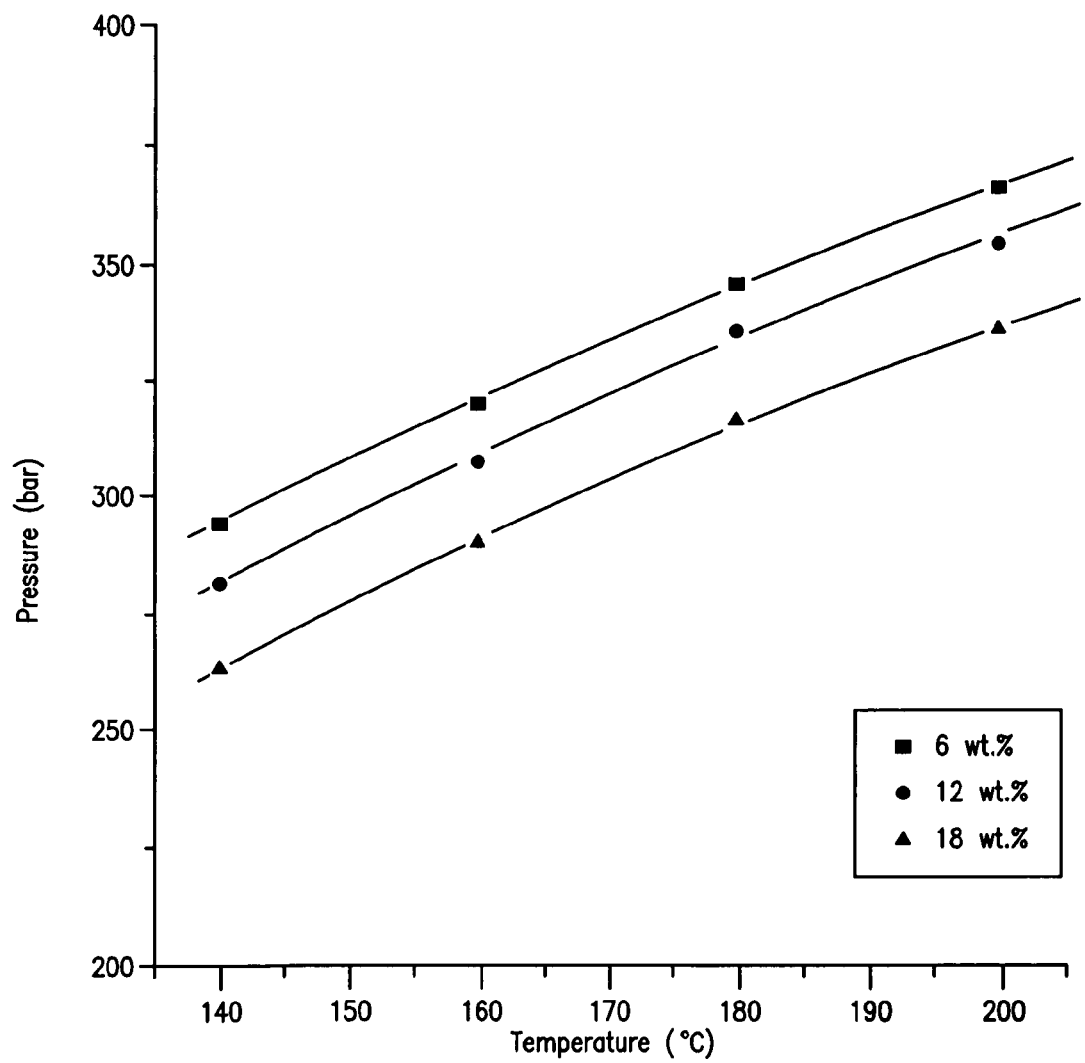
FIG. 16 presents cloud point isotherms for Polymer Achieve™ 1635 dissolved in bulk propylene.
Figure 17:
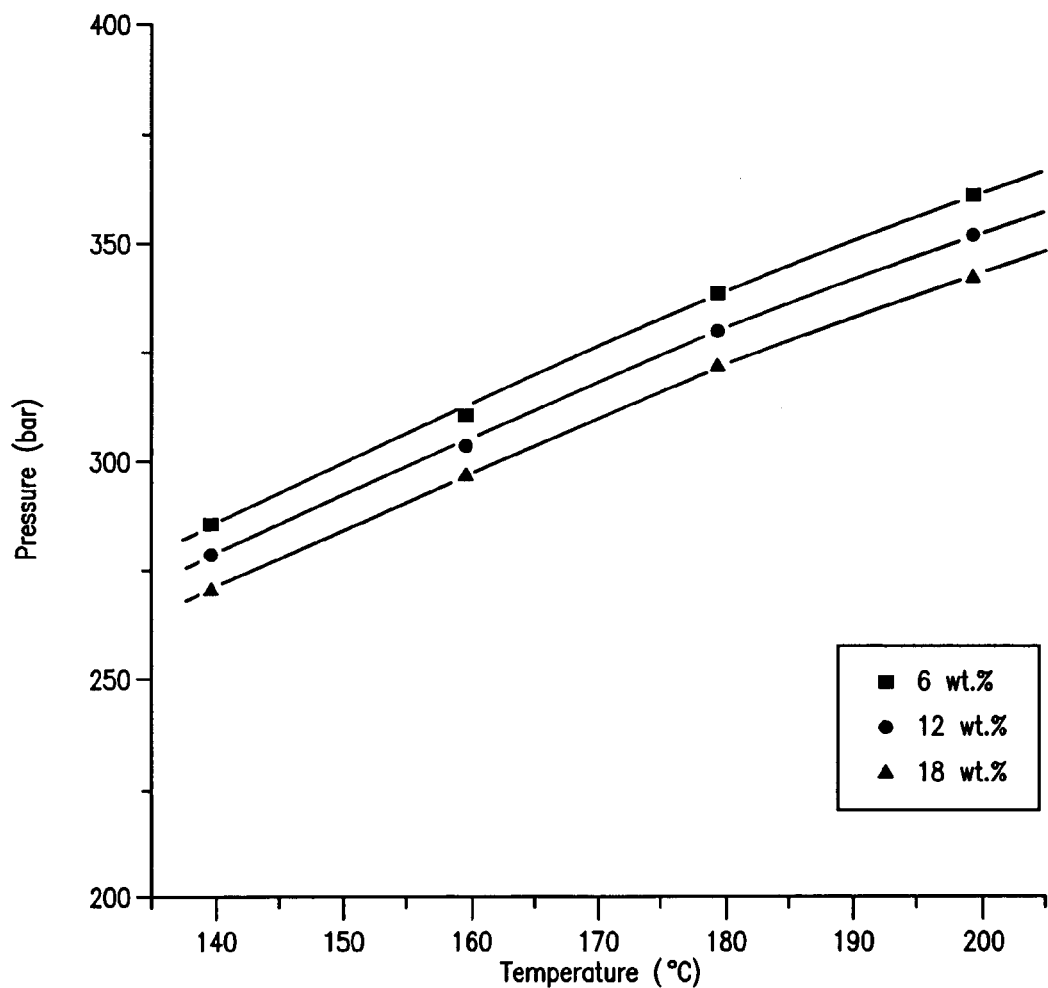
FIG. 17 presents cloud point isotherms for Polymer PP 45379 dissolved in bulk propylene.
Figure 18:
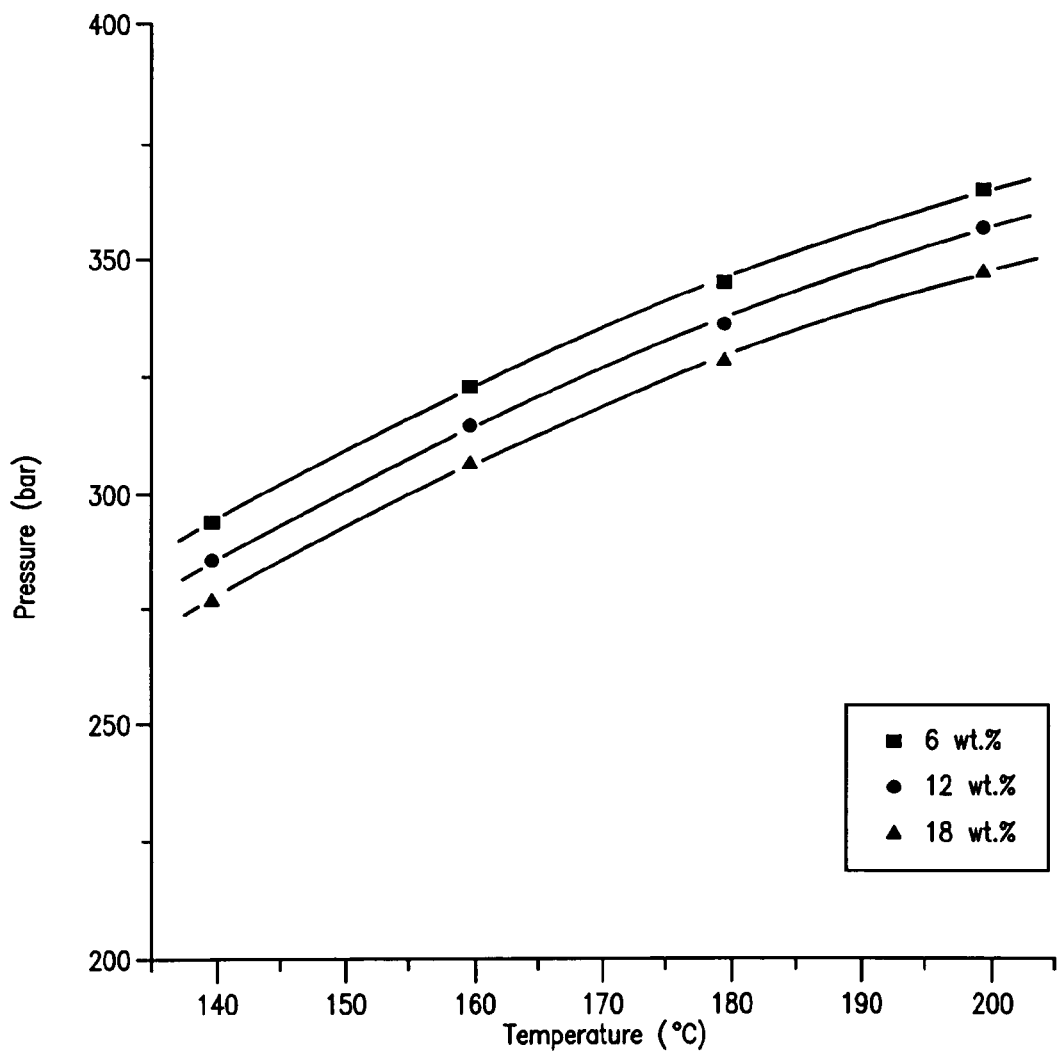
FIG. 18 presents cloud point isotherms for Polymer PP 4062 dissolved in bulk propylene.
Figure 19:
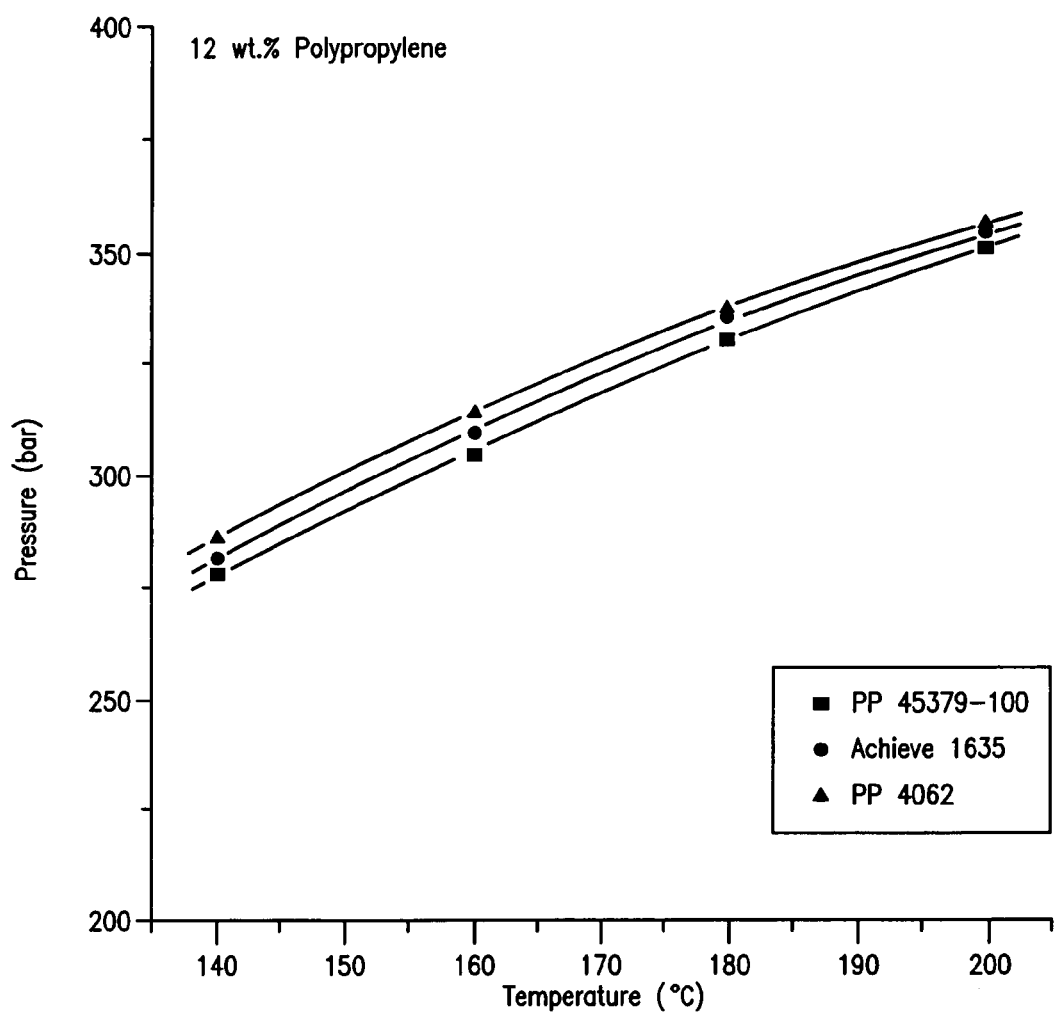
FIG. 19 presents a comparison of isopleths for PP 45379, Achieve™ 1635, and PP 4062 dissolved in bulk propylene.
Figure 20:
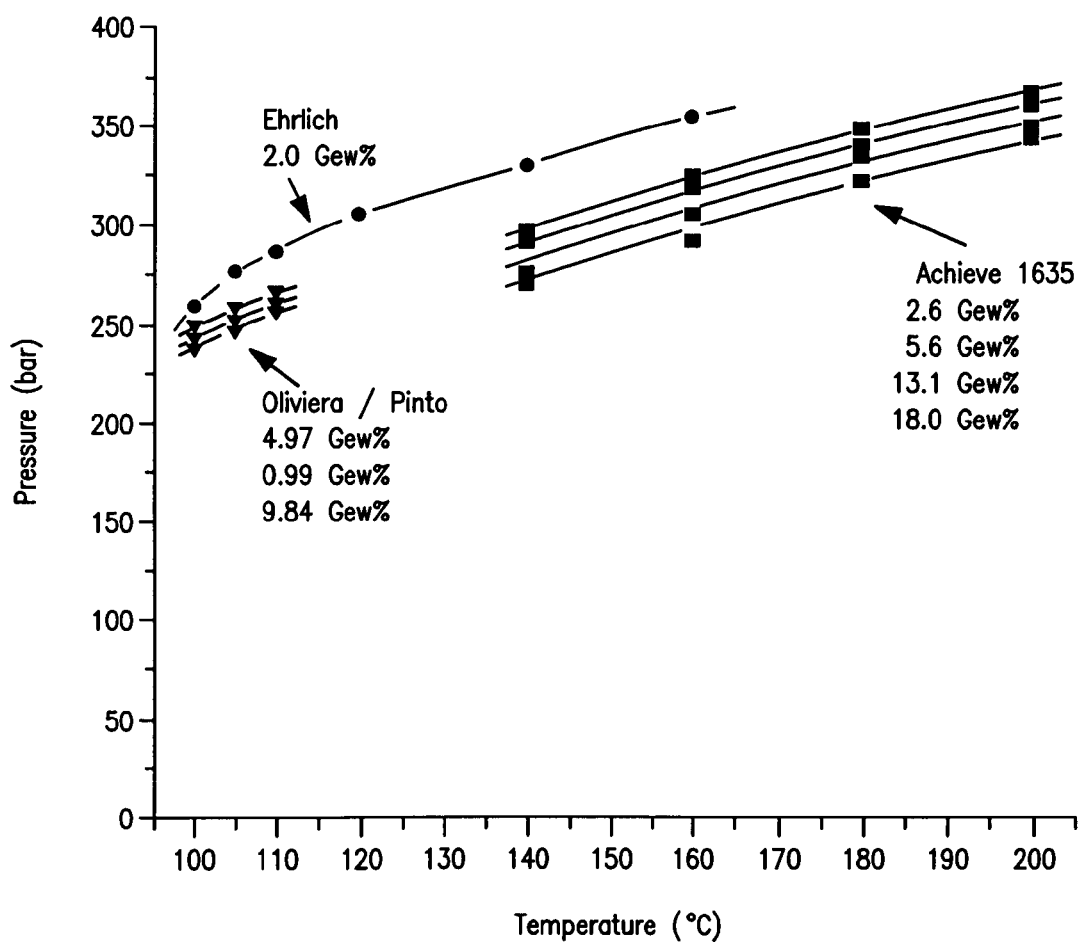
FIG. 20 presents a comparison of isopleths for Achieve™ 1635 and literature data as described in J. Vladimir Oliveira, C. Dariva and J. C. Pinto, Ind. Eng, Chem. Res. 29, 2000, 4627.
Figure 21:
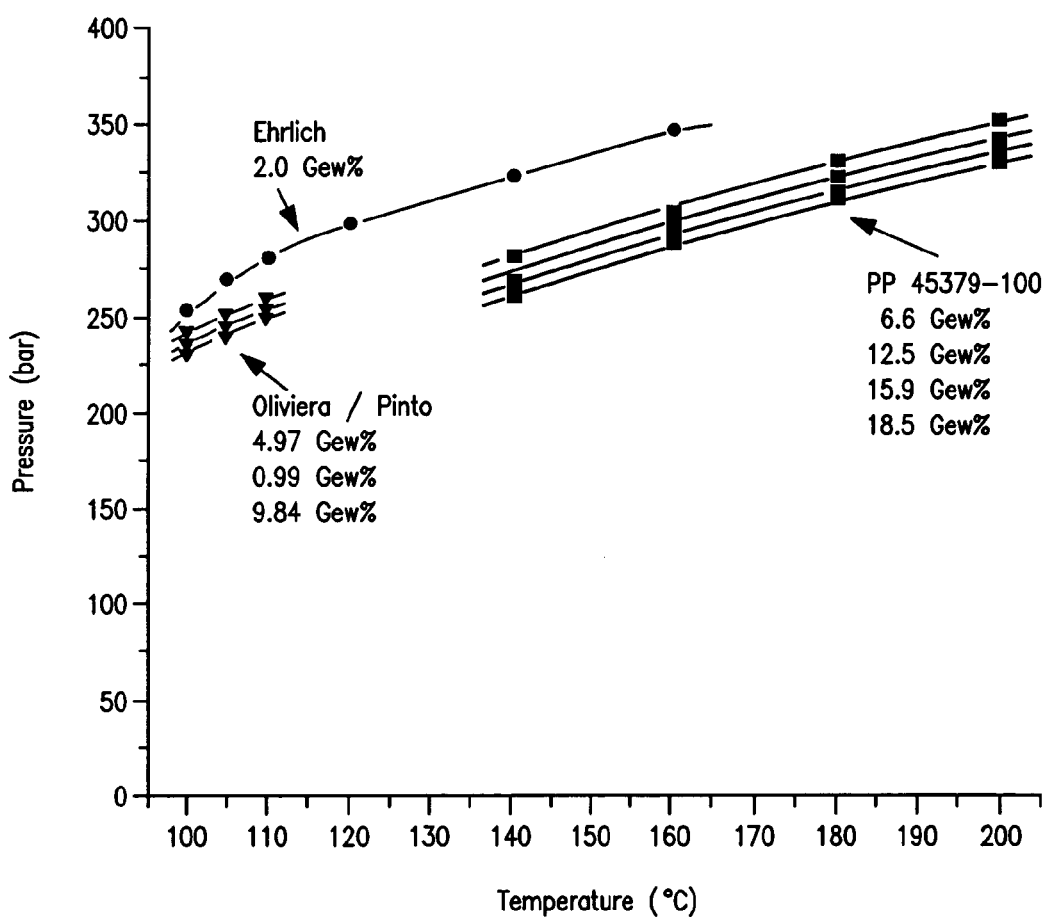
FIG. 21 presents a comparison of isopleths for PP 45379 and literature data as described in J. Vladimir Oliveira, C. Dariva and J. C. Pinto, Ind. Eng, Chem. Res. 29 (2000), 4627.
Figure 22:
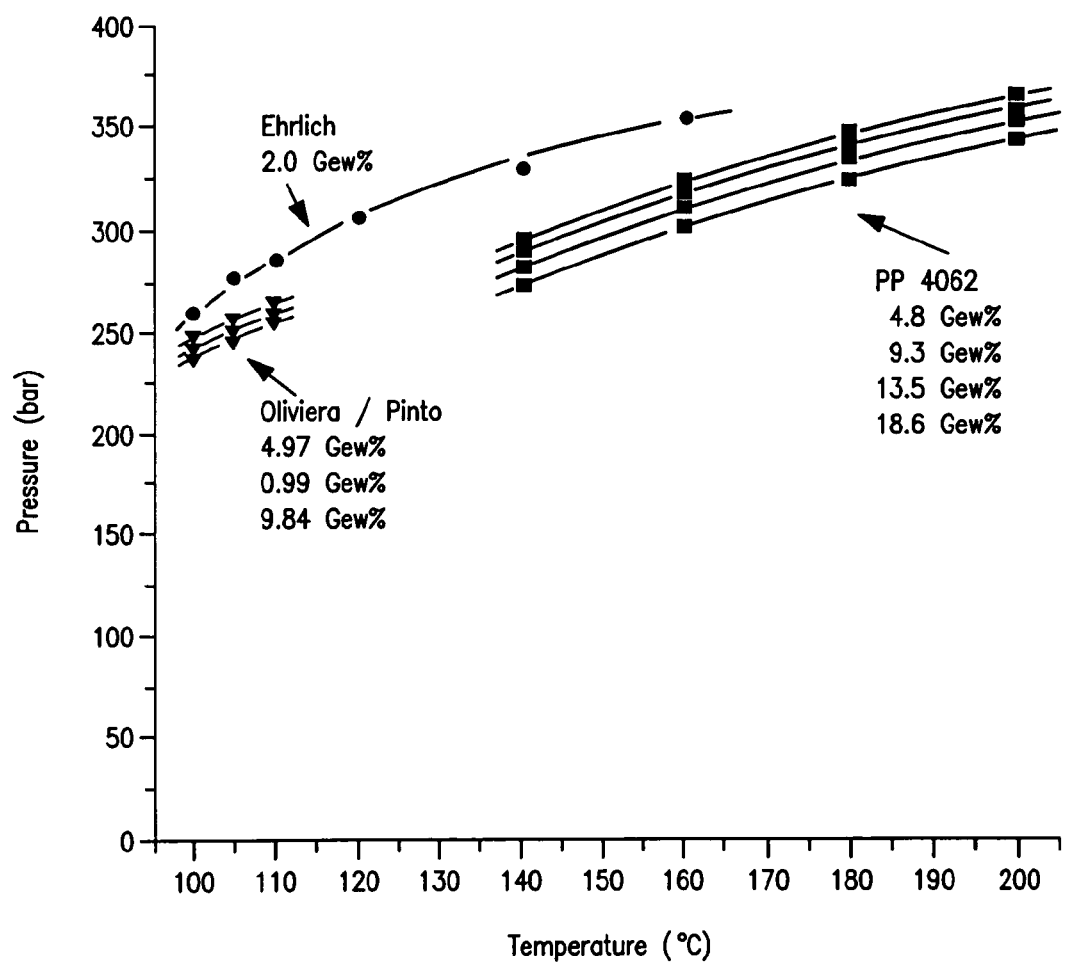
FIG. 22 presents a comparison of isopleths for PP 4062 and literature data as described in J. Vladimir Oliveira, C. Dariva and J. C. Pinto, Ind. Eng, Chem. Res. 29, 2000, 4627.

FIG. 11 presents still yet another exemplary embodiment of the fluid phase in-line blending process disclosed herein in which one or more optional polymer, and/or plasticizer, and/or other polymer additive storage tanks may be added to the process for the storage and metering of other fluid polymers and polymer additives to the blending vessel. Optional pump(s) may be used to convey the one or more polymers, plasticizers or other polymer additives to the separator vessel for blending. Note that FIG. 11 presents the particular embodiment wherein the one or more optional polymer, and/or plasticizer, and/or more polymer additive storage tanks are added to the single separation-blending vessel operation with buffer tanks configuration of FIG. 8. However, the one or more optional polymer, and/or plasticizer, and/or one or more polymer additive storage tanks may be added to the processes depicted in FIG. 6, FIG. 7, and/or FIG. 9 without deviating from the spirit of the fluid phase in-line blending process disclosed herein. Similarly, optional off-line produced polymers, plasticizers, modifiers, and additives may be introduced in any part of the polymer finishing section or in a dedicated section prior to the product finishing section of the process disclosed herein. Other aspects of the in-line blending process disclosed herein, such as catalyst killing, additive blending, heat and pressure management, as described in the previously described embodiments, apply hereto as well.

As will be appreciated by one skilled in the art of chemical engineering, the process schematic details of the design of the fluid phase in-line blending process in terms of reactor configuration, separator configuration, valving, heat management, etc. may be set differently without deviating from the spirit of the fluid-phase in-line blending process disclosed herein. The choice between different embodiments of the processes disclosed herein will be driven by product performance requirements and process economics, which can be readily determined by standard engineering techniques. However, the in-line blending processes disclosed herein are advantageous relative to the prior art by the virtue of reduced blending cost due to savings in investment and operation costs, and enabling well-controlled and cost-effective molecular-level blending to yield enhanced plasticized polymer blend performance.

The processes disclosed herein provide an effective recycle pathway for monomer separation from the products. They are particularly advantageous in homogeneous olefin polymerization processes such as, for example, bulk homogeneous supercritical propylene polymerization (SCPP), solution polymerization, and bulk solution polymerization. As will be discussed in more detail below for bulk homogeneous polymerization processes, the efficient separation of monomer and polymer is achieved by advantageously utilizing the cloud point pressure and temperature relationships for the relevant (polymer/olefinic monomer) or (copolymer/olefinic monomer blend); e.g. (polypropylene/propylene monomer), (ethylene-propylene copolymer/ethylene-propylene monomer blend), etc. mixtures.

For illustration, cloud point curves are shown in FIGS. 13-22 for three different polypropylene samples having different molecular weights and crystallinities dissolved in propylene (at 18 wt %). (Achieve 1635 PP is a commercially available metallocene-catalyzed isotactic polypropylene having a Melt Flow Rate, MFR, ($I_{10}/I_2$-ASTM 1238, 230° C., 2.16 kg) of 32 g/10 min available from ExxonMobil Chemical Company, Houston, Tex. ESCORENE PP 4062 is a commercially available isotactic polypropylene having an MFR of 3.7 g/10 mm, available from ExxonMobil Chemical Company, Houston, Tex. PP 45379 is an isotactic polypropylene having an MFR of 300 g/10 min produced using a supported metallocene in a slurry polymerization process.

Plasticized Polymer Blend Formulations and Products:

Many different types of plasticized polymer blends may be made by the fluid-phase in-line blending process disclosed herein. A major fraction of a blend is defined as 50% or more by weight of the blend. A minor fraction of a blend is defined as less than 50% by weight of the blend. The plasticized polymer blend formulation produced by the in-line processes disclosed herein generally include a major fraction of one or more high molecular weight polymer components and a minor fraction of one or more plasticizers.

Besides achieving plasticization, i.e., increasing softness and/or cold temperature flexibility and/or processability, etc., by in-line blending of plasticizers, plasticized polymer blends produced by the fluid phase in-line blending process disclosed herein may also be used to blend base polymer components and thus, for example, to provide bi- or multi-modality to the distributions of the molecular characteristics of resins encompassed herein. Non-limiting examples of such materials are blends with similar polymer components, but having different molecular weights, different levels of incorporation of comonomers, different levels of molecular defects like stereo- and regio-defects, and the like. The result of such bimodality is to produce an improved suite of properties in the blend as compared to any of the polymer components alone. Processing ease and melt strength may be improved by such blending as well as the balance between stiffness-toughness, heat resistance, tolerance of exposure to high energy radiation and other properties of the resins.

The weight fractions of the individual base polymer components in the blends made by the fluid phase in-line blending process disclosed herein may be similar or different. The polymer blends disclosed herein may also derive similar improvements from combinations of different materials in similar or different proportions. One non-limiting example of a useful polymer blend made by the fluid phase in-line blending process disclosed herein includes a major fraction of a highly crystalline moderate molecular weight polymer and a minor fraction of a very high molecular weight, elastomeric polymer with low or no inherent crystallinity. Another non-limiting example of a useful polymer blend made by the fluid phase in-line blending process disclosed herein includes a major fraction of a soft, tough, low melting polymer with a minor fraction of a highly crystalline, high melting polymer. Still another non-limiting example of a useful polymer blend made by the fluid phase in-line blending process disclosed herein includes a major fraction of a highly crystalline polymer with a minor fraction of a low or non-crystalline polymer where the low or non-crystalline polymer is non-elastomeric. This example also encompasses plasticized polymer blends.

The plasticized polymer blends made by the fluid phase in-line blending process disclosed herein provide for improved properties, and hence use in a wide array of applications. One such exemplary, but non-limiting application, is in medical applications requiring improved resistance to sterilizing doses of high-energy radiation. A polymer blend useful for this particular application may include from 75 to 99 wt % moderate molecular weight propylene homopolymer with 1 to 25 wt % of an ethylene plastomer, which acts as a plasticizing component. Alternatively, the ethylene plastomer may be replaced by a propylene-ethylene copolymer containing from 8-16 wt % ethylene, which also acts as a plasticizing component. The plastomer or high propylene copolymer component of the blend provides superior initial ductility as well as retention of ductility and tolerance of the sterilizing radiation to the blend while the homopolymer component imparts excellent strength, stiffness and resistance to deformation at elevated temperature to the blend. Polymer blends of propylene homopolymer and ethylene plastomer or propylene-ethylene copolymer are generally clearer or nearly as clear as the unblended propylene homopolymer component.

Another exemplary, but non-limiting application of where the plasticized polymer blends made by the fluid phase in-line blending process disclosed herein find application is in various conversion processes. In particular, by combining high and low molecular weight propylene polymers in either similar or different proportion, the molecular weight distribution of the blend may be significantly broader than of either individual component. The ratio for blending the high and low molecular weight propylene polymers depends upon the desired final melt flow rate and molecular weight distribution. Such broader molecular weight distribution polymers are easier to extrusion blow mold, blow into film, thermoform, orient into film, and stretch blow mold than narrower molecular weight distribution polymers. Optionally, one of the polymer components can have long chain branching introduced through addition of a small quantity of alpha-omega-diene.

Still another exemplary, but non-limiting application of where the plasticized polymer blends made by the fluid phase in-line blending process disclosed herein find application is in devices and packaging materials requiring good impact resistance, and particularly in low temperature environments. Plasticized polymer blends useful for this particular application may include from 80 to 99 wt % of a propylene impact copolymer (a blend of high crystallinity propylene homopolymer and low crystallinity propylene-ethylene copolymer) and 1-20 wt % of plasticizer.

In applications requiring clarity, incorporating into the plasticized polymer blend a minor fraction of a highly compatible ethylene plastomer or propylene copolymer known to have a minimal deleterious effect or even a positive effect on the clarity of blends with polypropylene may provide for such. Such plastomers comprise those with a refractive index and viscosity similar to the polypropylene with which they are to be blended. Compatible propylene copolymers are exemplified by propylene-ethylene copolymers containing less than 16 wt %, or less than 11 wt %, or less than 6 wt % ethylene.

Still yet another exemplary, but non-limiting application of where the plasticized polymer blends made by the fluid phase in-line blending process disclosed herein find application are those where materials requiring a combination of stiffness and impact resistance and/or a combination of heat resistance and impact resistance. A plasticized polymer blend useful for these applications are similar in composition to the blends specified for impact resistant devices and packages. More particularly, plasticized polymer blends useful for this particular application may include from 51 to 99 wt % of a stiff propylene homopolymer and/or a relatively stiff, low comonomer containing propylene copolymer and 1-49 wt % of a plasticizer. The stiffness and heat resistance may be increased by increasing the homopolymer or stiff copolymer portion of the polymer blend. Correspondingly, the impact resistance may be improved by increasing the plasticizer portion of the blend. The desired balance of product attributes may be accomplished by a careful balancing of the two components.

Still yet another exemplary, but non-limiting application of where the plasticized polymer blends made by the fluid phase in-line blending process disclosed herein find application are those where a device and/or package must be sterilized by high temperature and also must be soft and able to withstand impact abuse even at low temperatures. Plasticized polymer blends useful for this particular application may include from 75-99 wt % of one or more stiff homopolymer and/or copolymer components and 1-25 wt % of one or more plasticizers. Where increasing softness of packages and device is desired, one may use a greater fraction of plasticizer in the blend, including to the point that the plasticizer is the majority component of the blend. Hence the range of polymer blends may include 10-95 wt % of the plasticizer component.

Still yet another exemplary, but non-limiting application of where the plasticized polymer blends made by the fluid phase in-line blending process disclosed herein find application are films which are required to melt and form a seal at relatively low elevated temperature yet still maintain integrity at much higher temperature. The range of blend compositions previously specified for soft, elevated temperature resistant devices and/or packages would apply for this particular type of film application. Similar relationships between competing properties and the relative usages of the relative components would also apply for this application. More particularly, a greater fraction of the stiff polymer component may increase the seal integrity at higher temperatures, whereas a greater fraction of the plasticizer component may improve seal formation at lower temperatures and seal strength at normal temperatures.

As will be appreciated by one skilled in the art of polymer engineering, variations to the aforementioned plasticized polymer blends and their advantageous applications may be made without deviating from the spirit of the plasticized polymer blends provided by fluid phase in-line blending process disclosed herein.

Catalyst System Overview:

The in-line process for blending polymers disclosed herein may utilize any number of catalyst systems (also referred to as catalysts) in any of the reactors of the polymerization reactor section of the process. The in-line process for blending polymers disclosed herein may also utilize the same or different catalysts or catalyst mixtures in the different individual reactors of the reactor bank of the present invention. It should be understood that by using different catalyst systems we mean that any part of the catalyst system can vary and any combination is allowed. For example, the invention process may use unsupported catalyst systems in some trains while using supported catalyst systems in other trains. In other embodiments, the catalyst systems in some reactor trains may comprise aluminoxane (for example, MAO) activator, while comprising non-coordinating anion activators in some other trains. In another embodiments, the catalyst systems in some reactor trains may comprise Ziegler-Natta catalysts, while the catalyst systems in other reactor trains of the invention process may comprise metallocenes or nonmetallocene catalysts used for the production of Versify™ family of polymers activated by aluminoxane or non-coordinating anion activators or any combinations thereof. While the number of different catalyst systems deployed in the invention processes can be any number, the use of no more than five different catalysts and more particularly, no more than three different catalysts in any given reactor is advantageous for economic reasons. The deployment of no more than ten catalysts or the deployment of no more than six catalysts in the reactor bank of the polymerization process is advantageous for economic reasons. The one or more catalysts deployed in the reactors may be homogeneously dissolved in the fluid reaction medium or may form a heterogeneous solid phase in the reactor. In one particular embodiment, the catalyst(s) is (are) homogeneously dissolved in the fluid reaction medium. When the catalyst is present as a solid phase in the polymerization reactor, it may be supported or unsupported.

The process disclosed herein may use any combination of homogeneous and heterogeneous catalyst systems simultaneously present in one or more of the individual reactors of the polymerization reactor section, i.e., any reactor of the polymerization section of the present invention may contain one or more homogeneous catalyst systems and one or more heterogeneous catalyst systems simultaneously. The process disclosed herein may also use any combination of homogeneous and heterogeneous catalyst systems deployed in the polymerization reactor section. These combinations comprise scenarios when some or all reactors use a single catalyst and scenarios when some or all reactors use more than one catalyst. The one or more catalysts deployed in the process disclosed herein may be supported on particles, which either can be dispersed in the fluid polymerization medium or may be contained in a stationary catalyst bed. When the supported catalyst particles are dispersed in the fluid reaction medium, they may be left in the polymeric product or may be separated from the product prior to its crystallization from the fluid reactor effluent in a separation step that is downstream of the polymerization reactor section. If the catalyst particles are recovered, they may be either discarded or may be recycled with or without regeneration.

The catalyst may also be supported on structured supports, such as for example, monoliths comprising straight or tortuous channels, reactor walls, internal tubing. When the catalysts are supported, operation may take place on dispersed particles. When the catalyst is supported on dispersed particles, operations may take place without catalyst recovery i.e., the catalyst is left in the polymeric product. In another embodiment, unsupported catalysts may be dissolved in the fluid reaction medium.

Catalyst systems may be introduced into the reactor by any number of methods. For example, the catalyst may be introduced with the monomer-containing feed or separately. Also, the catalyst(s) may be introduced through one or multiple ports to the reactor. If multiple ports are used for introducing the catalyst, those ports may be placed at essentially the same or at different positions along the length of the reactor. If multiple ports are used for introducing the catalyst, the composition and the amount of catalyst feed through the individual ports may be the same or different. Adjustment in the amounts and types of catalyst through the different ports enables the modulation of polymer properties, such as for example, molecular weight distribution, composition, composition distribution, and crystallinity.

Catalyst Compounds and Mixtures:

The processes described herein may use any polymerization catalyst capable of polymerizing the monomers disclosed herein if that catalyst is sufficiently active under the polymerization conditions disclosed herein. Thus, Group-3-10 transition metals may form suitable polymerization catalysts. A suitable olefin polymerization catalyst will be able to coordinate to, or otherwise associate with, an alkenyl unsaturation. Illustrative, but not limiting, olefin polymerization catalysts include Ziegler-Natta catalyst compounds, metallocene catalyst compounds, late transition metal catalyst compounds, and other non-metallocene catalyst compounds.

Distinction should made between active catalysts, also referred to as catalyst systems herein, and catalyst precursor compounds. Catalyst systems are active catalysts comprising one or more catalyst precursor compounds, one or more catalyst activators, and optionally, one or more supports. Catalytic activity is often expressed based on the concentration of the catalyst precursor compounds without implying that the active catalyst is the precursor compound alone. It should be understood that the catalyst precursor is inactive without being contacted or being treated with a proper amount of activator. Similarly, the catalyst activator is inactive without combining it with a proper amount of precursor compound. As will become clear from the following description, some activators are very efficient and can be used stoichiometrically, while some others are used in excess, and in sometimes large excess, to achieve high catalytic activity as expressed based on the concentration of the catalyst precursor compounds. Since some of these activators, for example methylaluminoxane (MAO), increase catalytic activity as expressed based on the concentration of the catalyst precursor compounds, they are sometimes referred to as "cocatalysts" in the technical literature of polymerization.

As disclosed herein, Ziegler-Natta catalysts are those referred to as first, second, third, fourth, and fifth generation catalysts in the PROPYLENE HANDBOOK, E. P. Moore, Jr., Ed., Hanser, New York, 1996. Metallocene catalysts in the same reference are described as sixth generation catalysts. One exemplary non-metallocene catalyst compound comprises nonmetallocene metal-centered, heteroaryl ligand catalyst compounds (where the metal is chosen from the Group 4, 5, 6, the lanthanide series, or the actinide series of the Periodic Table of the Elements).

Just as in the case of metallocene catalysts, these nonmetallocene metal-centered, heteroaryl ligand catalyst compounds are typically made fresh by mixing a catalyst precursor compound with one or more activators. Nonmetallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52), WO 03/040442 (pages 21 to 54), WO 2006/38628, and U.S. patent application Ser. No. 11/714,546 (U.S. Patent Publication No. 2008-0153997), each of which is herein incorporated by reference.

Particularly useful metallocene catalyst and non-metallocene catalyst compounds are those disclosed in paragraphs [0081] to [0111] of U.S. Ser. No. 10/667,585 U.S. Pat. No. 7,354,979) and paragraphs [0173] to [0293] of U.S. Ser. No. 11/177,004 (U.S. Patent Publication No. 2006-0025545), the paragraphs of which are herein incorporated by reference.

The processes disclosed herein can employ mixtures of catalyst compounds to tailor the properties that are desired from the polymer. Mixed catalyst systems prepared from more than one catalyst precursor compounds can be employed in the in-line blending processes to alter or select desired physical or molecular properties. For example, mixed catalyst systems can control the molecular weight distribution of isotactic polypropylene when used with the invention processes or for the invention polymers. In one embodiment of the processes disclosed herein, the polymerization reaction(s) may be conducted with two or more catalyst precursor compounds at the same time or in series. In particular, two different catalyst precursor compounds can be activated with the same or different activators and introduced into the polymerization system at the same or different times. These systems can also, optionally, be used with diene incorporation to facilitate long chain branching using mixed catalyst systems and high levels of vinyl terminated polymers.

As disclosed herein, two or more of the above catalyst precursor compounds can be used together.

Activators and Activation Methods for Catalyst Compounds:

The catalyst precursor compounds described herein are combined with activators for use as active catalysts herein.

An activator is defined as any combination of reagents that increases the rate at which a metal complex polymerizes unsaturated monomers, such as olefins. An activator may also affect the molecular weight, degree of branching, comonomer content, or other properties of the polymer.

A. Aluminoxane and Aluminum Alkyl Activators:

In one form, one or more aluminoxanes, such as methylaluminoxane, or trialkylaluminum compounds, such as triisobutyl aluminum or tri-n-octyl aluminum are utilized as an activator in the in-line blending processes disclosed herein. Alkyl aluminoxanes, sometimes called alumoxanes in the art, are generally oligomeric compounds containing —Al(R)—O— subunits, where R is an alkyl group. Examples of aluminoxanes include methylaluminoxane (MAO), modified methylaluminoxane (MMAO), ethylaluminoxane and isobutylaluminoxane. Alkylaluminoxanes and modified alkylaluminoxanes are suitable as catalyst activators, particularly when the abstractable ligand is a halide. Mixtures of different aluminoxanes and modified aluminoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and European and PCT Patent Publication Nos. EP 0 561 476 A1, EP 0 279 586 B1, EP 0 516 476 A, EP 0 594 218 A1 and WO 94/10180, all of which are herein incorporated by reference in their entirety.

When the activator is an aluminoxane (modified or unmodified), some embodiments select the maximum amount of activator at a 5000-fold molar excess, or at a 1000-fold molar excess, or at a 500-fold molar excess Al/Transition Metal over the catalyst compound (per metal catalytic site). The minimum activator-to-catalyst-compound is typically a 1:1 molar ratio.

B. Ionizing Activators:

It is contemplated to use an ionizing or stoichiometric activator, neutral or ionic, such as tri(n-butyl)ammonium tetrakis (pentafluorophenyl)boron, a trisperfluorophenyl borone metalloid precursor or a trisperfluoronaphtyl borone metalloid precursor, polyhalogenated heteroborane anions (PCT patent publication no. WO 98/43983), boric acid (U.S. Pat. No. 5,942,459) or combination thereof as an activator herein. Also contemplated for use herein are neutral or ionic activators alone or in combination with aluminoxane or modified aluminoxane activators.

Examples of neutral stoichiometric activators include trisubstituted boron, aluminum, gallium and indium or mixtures thereof. The three substituent groups are each independently selected from alkyls, alkenyls, halogen, substituted alkyls, aryls, arylhalides, alkoxy and halides. The three groups are independently selected from halogen, mono or multicyclic (including halosubstituted) aryls, alkyls, and alkenyl compounds and mixtures thereof, advantageous are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternately, the three groups are alkyls having 1 to 4 carbon groups, phenyl, napthyl or mixtures thereof. Alternately, the three groups are halogenated, or fluorinated, aryl groups. Alternately, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European patent publication Nos. EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference. Some of the useful activators chosen from trimethylammonium tetraphenylborate, trisperfluorophenyl borane, trisperfluoronaphtyl borane, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis (pentafluorophenyl)borate, triethylammonium tetrakis (pentafluorophenyl)-borate, tripropylammonium tetrakis (pentafluorophenyl)borate, tri(n-butyl)ammonium tetrakis (pentafluorophenyl)borate, tri(sec-butyl)ammonium tetrakis (pentafluorophenyl) borate, N,N-dimethylanilinium tetrakis (pentafluorophenyl) borate, N,N-diethylanilinium tetrakispentafluorophenyl) borate, N,N-dimethyl-(2,4,6-trimethylanilinium) tetrakis(pentafluorophenyl) borate, trimethylammonium tetrakis-(2,3,4,6-tetrafluorophenylborate, triethylammonium tetrakis-(2,3,4,6-tetrafluorophenyl) borate, tripropylammonium tetrakis-(2,3,4,6-tetrafluorophenyl) borate, tri(n-butyl)-ammonium tetrakis-(2,3,4,6-tetrafluoro-phenyl) borate, dimethyl(t-butyl)ammonium tetrakis-(2,3,4,6-tetrafluorophenyl) borate, N,N-dimethylanilinium tetrakis-(2,3,4,6-tetrafluorophenyl) borate, N,N-diethylanilinium tetrakis-(2,3,4,6-tetrafluorophenyl) borate, N,N-dimethyl-(2,4,6-trimethylanilinium)tetrakis-(2,3,4,6-tetrafluorophenyl) borate, di-(1-propyl)ammonium tetrakis(pentafluorophenyl) borate, dicyclohexylammonium tetrakis(pentafluorophenyl) borate, triphenylphosphonium tetrakis(pentafluorophenyl) borate, tri (o-tolyl)phosphonium tetrakis(pentafluoro-phenyl) borate, tri(2,6-dimethylphenyl)phosphonium tetrakis(pentafluorophenyl) borate, N,N-dimethyl-anilinium tetra(perfluorophenyl)borate, triphenylcarbenium tetra(perfluorophenyl)borate, and combinations thereof. Some of the useful activators are represented by the following formula:

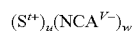

wherein:

$S'^+$ is a cation component having the charge t+

$NCA^{V-}$ is a non-coordinating anion having the charge v− t is an integer from 1 to 3;

v is an integer from 1 to 3;

u and v are constrained by the relationship: $(u) \times (t) = (v) \times (w)$;

where $S'^+$ is a Bronsted acids or a reducible Lewis acids capable of protonating or abstracting a moiety.

C. Non-Ionizing Activators:

Activators are typically strong Lewis-acids which may play either the role of ionizing or non-ionizing activator. Activators previously described as ionizing activators may also be used as non-ionizing activators.

Abstraction of formal neutral ligands may be achieved with Lewis acids that display an affinity for the formal neutral ligands. These Lewis acids are typically unsaturated or weakly coordinated. Examples of non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene. Non-ionizing activators also include weakly coordinated transition metal compounds such as low valent olefin complexes.

Non-limiting examples of non-ionizing activators include $BMe_3$, $BEt_3$, $B(iBu)_3$, $BPh_3$, $B(C_6F_5)_3$, $AlMe_3$, $AlEt_3$, $Al(iBu)_3$, $AlPh_3$, $B(C_6F_5)_3$, aluminoxane, CuCl, $Ni(1,5$-cyclooctadiene$)_2$.

Additional neutral Lewis-acids are known in the art and will be suitable for abstracting formal neutral ligands. See in particular the review article by E. Y.-X. Chen and T. J. Marks, "Cocatalysts for Metal-Catalyzed Olefin Polymerization Activators, Activation Processes, and Structure-Activity Relationships", Chem. Rev., 100, 1391-1434 (2000).

Suitable non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene.

Other non-ionizing activators include $B(R^{12})_3$, where $R^{12}$ is an arene or a perfluorinated arene. Alternately, non-ionizing activators include $B(C_6H_5)_3$ and $B(C_6F_5)_3$. Another non-ionizing activator is $B(C_6F_5)_3$. Alternatively, activators include ionizing and non-ionizing activators based on perfluoroaryl borane and perfluoroaryl borates such as PhNMe$_2$H$^+$B(C$_6$F$_5$)$_4$$^-$, (C$_6$H$_5$)$_3$C$^+$B(C$_6$F$_5$)$_4$$^-$, and B(C$_6$F$_5$)$_3$.

Additional activators that may be used with the catalyst compounds disclosed herein include those described in PCT patent publication No. WO 03/064433A1, which is incorporated by reference herein in its entirety.

Additional useful activators for use in the processes disclosed herein include clays that have been treated with acids (such as H$_2$SO$_4$) and then combined with metal alkyls (such as triethylaluminum) as described in U.S. Pat. No. 6,531,552 and EP Patent No. 1 160 261 A1, which are incorporated by reference herein.

Activators also may be supports and include ion-exchange layered silicate having an acid site of at most −8.2 pKa, the amount of the acid site is equivalent to at least 0.05 mmol/g of 2,6-dimethylpyridine consumed for neutralization. Non-limiting examples include chemically treated smectite group silicates, acid-treated smectite group silicates. Additional examples of the ion-exchange layered silicate include layered silicates having a 1:1 type structure or a 2:1 type structure as described in "Clay Minerals (Nendo Kobutsu Gaku)" written by Haruo Shiramizu (published by Asakura Shoten in 1995).

Examples of an ion-exchange layered silicate comprising the 1:1 layer as the main constituting layer include kaolin group silicates such as dickite, nacrite, kaolinite, metahalloysite, halloysite or the like, and serpentine group silicates such as chrysotile, lizaldite, antigorite or the like. Additional non-limiting examples of the ion-exchange layered silicate include ion-exchange layered silicates comprising the 2:2 layer as the main constituting layer include smectite group silicates such as montmorillonite, beidellite, nontronite, saponite, hectorite, stephensite or the like, vermiculite group silicates such as vermiculite or the like, mica group silicates such as mica, illite, sericite, glauconite or the like, and attapulgite, sepiolite, palygorskite, bentonite, pyrophyllite, talc, chlorites and the like. The clays are contacted with an acid, a salt, an alkali, an oxidizing agent, a reducing agent or a treating agent containing a compound intercalatable between layers of an ion-exchange layered silicate. The intercalation means to introduce other material between layers of a layered material, and the material to be introduced is called as a guest compound. Among these treatments, acid treatment or salt treatment is particularly advantageous. The treated clay may then be contacted with an activator compound, such as TEAL, and the catalyst compound to polymerize olefins.

In another form, the polymerization systems comprise less than 5 weight % polar species, or less than 4 weight %, or less than 3 weight %, or less than 2 weight %, or less than 1 weight %, or less than 1000 ppm, or less than 750 ppm, or less than 500 ppm, or less than 250 ppm, or less than 100 ppm, or less than 50 ppm, or less than 10 ppm. Polar species include oxygen containing compounds (except for alumoxanes) such as alcohols, oxygen, ketones, aldehydes, acids, esters and ethers.

In yet another form, the polymerization systems comprise less than 5 weight % trimethylaluminum and/or triethylaluminum, or less than 4 weight %, or less than 3 weight %, or less than 2 weight %, or less than 1 weight %, or less than 1000 ppm, or less than 750 ppm, or less than 500 ppm, or less than 250 ppm, or less than 100 ppm, or less than 50 ppm, or less than 10 ppm.

In still yet another form, the polymerization systems comprise methylaluminoxane and less than 5 weight % trimethylaluminum and or triethylaluminum, or less than 4 weight %, or less than 3 weight %, or less than 2 weight %, or less than 1 weight %, or less than 1000 ppm, or less than 750 ppm, or less than 500 ppm, or less than 250 ppm, or less than 100 ppm, or less than 50 ppm, or less than 10 ppm.

The in-line blending processes disclosed herein may use finely divided, supported catalysts to prepare propylene/1-hexene copolymers with greater than 1.0 mole % 1-hexene. In addition to finely divided supports, in-line blending processes disclosed herein may use fumed silica supports in which the support particle diameter may range from 200 angstroms to 1500 angstroms, small enough to form a colloid with reaction media.

Catalyst Supports:

In another form, the catalyst compositions of fluid phase in-line blending processes disclosed herein may include a support material or carrier. For example, the one or more catalyst components and/or one or more activators may be deposited on, contacted with, vaporized with, bonded to, or incorporated within, adsorbed or absorbed in, or on, one or more supports or carriers.

The support material may be any of the conventional support materials. In one form, the supported material may be a porous support material, for example, talcs, inorganic oxides, and inorganic chlorides, polystyrene, polystyrene divinyl benzene polyolefins, zeolites, clays, silica, fumed silica, alumina, silica-alumina, magnesia, titania, zirconia, magnesium chloride, montmorillonite phyllosilicate, porous acrylic polymers, nanocomposites, spherulites, polymeric beads and combinations thereof. Other support materials may include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

Useful support materials are inorganic oxides that include those Group 2, 3, 4, 5, 13 or 14 metal oxides. In one form, the supports include silica, which may or may not be dehydrated, fumed silica, alumina (PCT patent publication No. WO 99/60033), silica-alumina and mixtures thereof. Other useful supports include magnesia, titania, zirconia, magnesium chloride (U.S. Pat. No. 5,965,477), montmorillonite (European Patent No. EP-B 10 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in European Patent No. EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

The support material, for example an inorganic oxide, has a surface area in the range of from about 10 to about 700 m$^2$/g, pore volume in the range of from about 0 to about 4.0 cc/g and average particle size in the range of from about 0.02 to about 50 μm. Alternatively, the surface area of the support material is in the range of from about 50 to about 500 m$^2$/g, pore volume of from about 0 to about 3.5 cc/g and average particle size of from about 0.02 to about 20 μm. In another form, the surface area of the support material is in the range is from about 100 to about 400 m$^2$/g, pore volume from about 0 to about 3.0 cc/g and average particle size is from about 0.02 to about 10 μm.

Non-porous supports may also be used as supports in the processes described herein. For example, in a one embodiment the nonporous, fumed silica supports described in U.S. Pat. No. 6,590,055 may be used and is incorporated by reference herein.

Scavengers:

Compounds that destroy impurities are referred to as scavengers by one skilled in the art of polymerization. Impurities may harm catalysts by reducing their activity. Scavengers may be optionally fed to the reactor(s) of the in-line blending process disclosed herein. Catalytic activity may be defined many different ways. For example, catalytic activity can be expressed as turnover frequency, i.e., the number of moles of monomers converted to the product in a unit time by one mole of catalyst precursor employed in preparing the active catalyst system. For a given reactor operating at the same residence time, catalytic activity may also be measured in terms of catalyst productivity, customarily expressed as the weight of polymer made by a unit weight of catalyst precursor with or without the weight of the activator.

The scavengers for use in the processes disclosed herein may be different chemical compound(s) from the catalyst activator. Non-limiting exemplary scavengers include diethyl zinc, and alkyl aluminum compounds, such as trimethyl aluminum, triethyl aluminum, tri-isobutyl aluminum, and trioctyl aluminum. The scavenger may also be the same as the catalyst activator and is generally applied in excess of what is needed to fully activate the catalyst. These scavengers include, but are not limited to, aluminoxanes, such as methyl aluminoxane. The scavenger may also be introduced to the reactor with the monomer feed or with any other feed stream. In one particular embodiment, the scavenger is introduced with the monomer-containing feed. The scavenger may be homogeneously dissolved in the polymerization reaction medium or may form a separate solid phase. In one particular embodiment, scavengers are dissolved in the polymerization medium.

Reaction Monomers and Comonomers:

The processes disclosed herein may be used to polymerize any monomer having one or more (non-conjugated) aliphatic double bond(s) and two or more carbon atoms. In the embodiments producing one or more plasticizers in-line, the monomers used for making the base polymer and for making the plasticizer components of the in-line-plasticized polymers, polymer blends, and polymer masterbatches are often of the same type, for example, the base polymer may be made of propylene (an aliphatic olefin) and the plasticizer may be made of ethylene and propylene or higher alpha-olefins. The most commonly used monomers for making the base polymer components are ethylene and propylene and their combinations with each other or (to a smaller degree) with lower concentrations of monomers that modify the parent polymer by, for example, introducing long-chain branching as done with alpha-omega dienes. These combinations are well known in the art of olefin polymerization. Useful monomers for producing and blending plasticizers in-line include mixed $C_6$-$C_{14}$ linear 1-olefins, ethylene-butene, ethylene-hexene, ethylene-octene, propylene, propylene-butene, propylene-hexene mixtures, styrene and alpha-methyl styrene. Monomers for use in the in-line blending process thus include ethylene, propylene, $C_4$ and higher α-olefins (non-limiting examples include butene-1, hexene-1, octene-1, and decene-1); substituted olefins (non-limiting examples include styrene, and vinylcyclohexane); non-conjugated dienes (non-limiting examples include vinylcyclohexene, dicyclopentadiene); α,ω-dienes (non-limiting examples include 1,5-hexadiene, 1,7-octadiene); cycloolefins (non-limiting examples include cyclopentene, cyclohexene); and norbornene.

The processes disclosed herein may be used to polymerize any unsaturated monomer or monomers including $C_3$ to $C_{100}$ olefins, alternatively $C_3$ to $C_{60}$ olefins, alternatively $C_3$ to $C_{40}$ olefins, alternatively $C_3$ to $C_{20}$ olefins, and alternately $C_3$ to $C_{12}$ olefins. The processes disclosed herein may also be used to polymerize linear, branched or cyclic alpha-olefins including $C_3$ to $C_{100}$ alpha-olefins, alternatively $C_3$ to $C_{60}$ alpha-olefins, alternately $C_3$ to $C_{40}$ alpha-olefins, alternatively $C_5$ to $C_{20}$ alpha-olefins, and alternatively $C_5$ to $C_{12}$ alpha-olefins. Suitable olefin monomers may be one or more of propylene, butene, pentene, hexene, heptene, octene, nonene, decene, dodecene, 4-methyl-pentene-1,3-methyl pentene-1,3,5,5-trimethyl-hexene-1, and 5-ethylnonene-1. $C_5$ to $C_{20}$ alpha-olefins and their mixtures are particularly useful for making plasticizer poly(alpha-olefins) also referred to as PAOs. The mixtures of ethylene and propylene are particularly useful for making ethylene-propylene plasticizer copolymers such as plastomers, elastomers, and other ethylene-propylene plasticizer copolymers.

In another embodiment of the processes disclosed herein, the polymer produced herein is a copolymer of one or more linear or branched $C_3$ to $C_{30}$ prochiral alpha-olefins or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

Other monomers for use with the in-line blending process disclosed herein may also include aromatic-group-containing monomers containing up to 30 carbon atoms. Suitable aromatic-group-containing monomers comprise at least one aromatic structure, alternately from one to three, and alternately a phenyl, indenyl, fluorenyl, or naphthyl moiety. The aromatic-group-containing monomer further comprises at least one polymerizable double bond such that after polymerization, the aromatic structure is pendant from the polymer backbone. The aromatic-group containing monomer may further be substituted with one or more hydrocarbyl groups including but not limited to $C_1$ to $C_{10}$ alkyl groups. Additionally two adjacent substitutions may be joined to form a ring structure. Aromatic-group-containing monomers may also contain at least one aromatic structure appended to a polymerizable olefinic moiety. Non-limiting exemplary aromatic monomers include styrene, alpha-methylstyrene, para-alkylstyrenes, vinyltoluenes, vinylnaphthalene, allyl benzene, and indene, and alternatively styrene, paramethyl styrene, 4-phenyl-1-butene and allyl benzene.

Non aromatic cyclic group containing monomers may also be used in the processes disclosed herein. These monomers may include up to 30 carbon atoms. Suitable non-aromatic cyclic group containing monomers may have at least one polymerizable olefinic group that is either pendant on the cyclic structure or is part of the cyclic structure. The cyclic structure may also be further substituted by one or more hydrocarbyl groups, for example, but not limited to, $C_1$ to $C_{10}$ alkyl groups. Non-limiting exemplary non-aromatic cyclic group containing monomers include vinylcyclohexane, vinylcyclohexene, vinylnorbornene, ethylidene norbornene, cyclopentadiene, cyclopentene, cyclohexene, cyclobutene, and vinyladamantane.

Diolefin monomers may also be used in the processes disclosed herein. These diolefin monomers include any hydrocarbon structure, or alternatively $C_4$ to $C_{30}$, having at least two unsaturated bonds, wherein at least two of the unsaturated bonds are readily incorporated into a polymer by either a stereospecific or a non-stereospecific catalyst(s). The diolefin monomers may also be selected from alpha, omega-diene monomers (i.e. di-vinyl monomers), alternatively linear di-vinyl monomers containing from 4 to 30 carbon atoms. Non-limiting exemplary dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly advantageous dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Non-limiting exemplary cyclic dienes include cyclopentadiene, vinylnorbornene, norbornadiene, ethylidene norbornene, divinylbenzene, dicyclopentadiene or higher ring containing diolefins with or without substituents at various ring positions.

Non-limiting examples of polar unsaturated monomers include 6-nitro-1-hexene, N-methylallylamine, N-allylcyclopentylamine, N-allyl-hexylamine, methyl vinyl ketone, ethyl vinyl ketone, 5-hexen-2-one, 2-acetyl-5-norbornene, 7-syn methoxymethyl-5-norbornen-2-one, acrolein, 2,2-dimethyl-4-pentenal, undecylenic aldehyde, 2,4-dimethyl-2,6-heptadienal, acrylic acid, vinylacetic acid, 4-pentenoic acid, 2,2-dimethyl-4-pentenoic acid, 6-heptenoic acid, trans-2,4-pentadienoic acid, 2,6-heptadienoic acid, nona-fluoro-1-hexene, allyl alcohol, 7-octene-1,2-diol, 2-methyl-3-buten-1-ol, 5-norbornene-2-carbonitrile, 5-norbornene-2-carboxaldehyde, 5-norbornene-2-carboxylic acid, cis-5-norbornene-endo-2,3-dicarboxylic acid, 5-norbornene-2,2,-dimethanol, cis-5-norbornene-endo-2,3-dicarboxylic anhydride, 5-norbornene-2-endo-3-endo-dimethanol, 5-norbornene-2-endo-3-exo-dimethanol, 5-norbornene-2-methanol, 5-norbornene-2-ol, 5-norbornene-2-yl acetate, 1-[2-(5-norbornene-2-yl)ethyl]-3,5,7,9,11,13,15-heptacyclopentylpentacyclo-[9.5.1.1$^{3,9}$.1$^{5,15}$.1$^{7,13}$] octasiloxane, 2-benzoyl-5-norbornene, allyl 1,1,2,2,-tetrafluoroethyl ether, acrolein dimethyl acetal, butadiene monoxide, 1,2-epoxy-7-octene, 1,2-epoxy-9-decene, 1,2-epoxy-5-hexene, 2-methyl-2-vinyloxirane, allyl glycidyl ether, 2,5-dihydrofuran, 2-cyclopenten-1-one ethylene ketal, allyl disulfide, ethyl acrylate, methyl acrylate.

Polymerizations may be carried out with any suitable feed composition to yield the desired product composition at an economical single-pass conversion. Monomer concentrations are generally lower when substantial amounts of inert solvents/diluents are cofed with the monomers and catalyst. Although inert solvents/diluents may be used if so desired, low solvent/diluent concentration is often advantageous due to reduced solvent and monomer recovery-recycle cost. In one embodiment, olefin polymerization is carried out in the presence of less than 60 wt % of inert solvent/diluent affording olefin concentrations in the combined feeds of the individual reators of 40 wt % or more, or even 55 wt % or more, and advantageously 75 wt % or more.

In another embodiment, polymerizations yielding the in-line blend components are carried out in bulk monomer phases, i.e., with combined reactor feeds comprising inert solvent/diluent at less than 40 wt %, or less than 30 wt %, or less than 20 wt %, or less than 15 wt %, or less than 10 wt %, or less than 5 wt %, or even less than 1 wt %.

In a particular embodiment, ethylene-propylene copolymer blend components are made with essentially diluent-free monomer feeds containing 1-18 wt % ethylene and 75-99 wt % propylene. In another embodiment, ethylene-propylene copolymer blend components are produced with essentially diluent-free monomer feeds containing 5-30 wt % of butene-1, or hexene-1 and 65-95 wt % of propylene or ethylene.

The processes disclosed herein may be used to produce homopolymers or copolymers. A copolymer refers to a polymer synthesized from two, three, or more different monomer units. Polymers produced by the processes disclosed herein include homopolymers or copolymers of any of the above monomers.

In one embodiment of the processes disclosed herein, the polymer is a homopolymer of any $C_3$ to $C_{12}$ alpha-olefin, or a homopolymer of propylene. In another embodiment the polymer is a copolymer comprising propylene and ethylene wherein the copolymer comprises less than 70 weight % ethylene, or less than 60 weight % ethylene, or less than 40 weight % ethylene, or less than 20 weight % ethylene. In another embodiment the polymer is a copolymer comprising propylene and one or more of any of the monomers listed above. In another embodiment, the copolymers comprise one or more diolefin comonomers, alternatively one or more $C_6$ to $C_{40}$ non-conjugated diolefins, alternatively one or more $C_6$ to $C_{40}$ α,ω-dienes.

In another embodiment of the processes disclosed herein, the one or more polymer blend components are a copolymer of ethylene, propylene, or other higher olefin and optionally any third monomer, typically another higher olefin, such as $C_4$ to $C_{20}$ linear, branched or cyclic monomers. In another embodiment, the one or more polymer blend components produced herein are a copolymer of ethylene and one or more of propylene, butene, pentene, hexene, heptene, octene, nonene, decene, dodecene, 4-methyl-pentene-1,3-methyl pentene-1, and 3,5,5-trimethyl-hexene-1. In still another embodiment, the one or more polymer blend components produced herein are a copolymer of propylene and one or more of ethylene, butene, pentene, hexene, heptene, octene, nonene, decene, dodecene, 4-methyl-pentene-1,3-methyl-pentene-1, and 3,5,5-trimethyl-hexene-1. In still yet another embodiment, the one or more polymer blend components produced herein are a copolymer of a $C_4$ or higher olefin and one or more of ethylene, propylene, butene, pentene, hexene, heptene, octene, nonene, decene, dodecene, 4-methyl-pentene-1, 3-methyl-pentene-1, and 3,5,5-trimethyl-hexene-1.

In another embodiment of the processes disclosed herein, the copolymers described comprise at least 50 mole % of a first monomer and up to 50 mole % of other monomers. In another embodiment, the polymer comprises: a first monomer present at from 40 to 95 mole %, or 50 to 90 mole %, or 60 to 80 mole %, and a comonomer present at from 5 to 40 mole %, or 10 to 60 mole %, or 20 to 40 mole %, and a termonomer present at from 0 to 10 mole %, or from 0.5 to 5 mole %, or from 1 to 3 mole %. Such copolymer blending components can be readily produced when the comonomer(s) is (are) present between 0.1 and 85 mole % in the combined feeds to the reactor making the copolymers.

In another embodiment of the processes disclosed herein, the first monomer comprises one or more of any $C_3$ to $C_8$ linear branched or cyclic alpha-olefins, including propylene, butene, (and all isomers thereof), pentene (and all isomers thereof), hexene (and all isomers thereof), heptene (and all isomers thereof), and octene (and all isomers thereof). Advantageous monomers include propylene, 1-butene, 1-hexene, 1-octene, cyclohexene, cyclooctene, hexadiene, cyclohexadiene and the like.

In another embodiment of the processes disclosed herein, the comonomer comprises one or more of any $C_2$ to $C_{40}$ linear, branched or cyclic alpha-olefins (provided ethylene, if present, is present at 5 mole % or less), including ethylene, propylene, butene, pentene, hexene, heptene, and octene, nonene, decene, undecene, dodecene, hexadecene, butadiene, hexadiene, heptadiene, pentadiene, octadiene, nonadiene, decadiene, dodecadiene, styrene, 3,5,5-trimethylhexene-1,3-methylpentene-1,4-methylpentene-1, cyclopentadiene, and cyclohexene.

In another embodiment of the processes disclosed herein, the termonomer comprises one or more of any $C_2$ to $C_{40}$ linear, branched or cyclic alpha-olefins, (provided ethylene, if present, is present at 5 mole % or less), including ethylene, propylene, butene, pentene, hexene, heptene, and octene, nonene, decene, un-decene, dodecene, hexadecene, butadiene, hexadiene, heptadiene, pentadiene, octadiene, nonadiene, decadiene, dodecadiene, styrene, 3,5,5-trimethyl-hexene-1,3-methylpentene-1,4-methylpentene-1, cyclopentadiene, and cyclohexene.

In another embodiment of the processes disclosed herein, the polymers described above further comprise one or more dienes at up to 10 weight %, or at 0.00001 to 1.0 weight %, or at 0.002 to 0.5 weight %, or at 0.003 to 0.2 weight %, based upon the total weight of the composition. In some embodiments 500 ppm or less of diene is added to the combined feed of one or more polymerization trains, alternately 400 ppm or less, alternatively 300 ppm or less. In other embodiments at least 50 ppm of diene is added to the combined feed of one or more polymerization trains, or 100 ppm or more, or 150 ppm or more. In yet another embodiment the concentration of diene in the combined feed to the reactor is between 50 wt ppm and 10,000 wt ppm.

In another embodiment of the processes disclosed herein, the processes used to produce propylene copolymers with other monomer units, such as ethylene, other α-olefin, α-olefinic diolefin, or non-conjugated diolefin monomers, for example $C_4$-$C_{20}$ olefins, $C_4$-$C_{20}$ diolefins, $C_4$-$C_{20}$ cyclic olefins, $C_8$-$C_{20}$ styrenic olefins. Other unsaturated monomers besides those specifically described above may be copolymerized using the processes disclosed herein, for example, styrene, alkyl-substituted styrene, ethylidene norbornene, norbornadiene, dicyclopentadiene, vinylcyclohexane, vinylcyclohexene, acrylates, and other olefinically-unsaturated monomers, including other cyclic olefins, such as cyclopentene, norbornene, and alkyl-substituted norbornenes. Copolymerization can also incorporate α-olefinic macromonomers produced in-situ or added from another source. Some embodiments limit the copolymerization of α-olefinic macromonomers to macromonomers with 2000 or less mer units. U.S. Pat. No. 6,300,451 discloses many useful comonomers. That disclosure refers to comonomers as "a second monomer."

In another embodiment of the processes disclosed herein, when propylene copolymers are desired, the following monomers can be copolymerized with propylene: ethylene, but-1-ene, hex-1-ene, 4-methylpent-1-ene, dicyclopentadiene, norbornene, $C_4$-$C_{2000}$, $C_4$-$C_{200}$, or $C_4$-$C_{40}$ linear or branched, α,ω-dienes; $C_4$-$C_{2000}$, $C_4$-$C_{200}$, or $C_4$-$C_{40}$ cyclic olefins; and $C_4$-$C_{2000}$, $C_4$-$C_{200}$, or $C_4$-$C_{40}$ linear or branched α-olefins.

Other Primary Monomer:

The polymerization processes disclosed herein may polymerize butene-1 ($T_c$=146.5° C.; $P_c$=3.56 MPa), pentene-1 ($T_c$=191.8° C.; $P_c$=3.56 MPa), hexene-1 ($T_c$=230.8° C.; $P_c$=3.21 MPa), 3-methyl-butene-1 ($T_c$=179.7° C.; $P_c$=3.53 MPa), and 4-methyl-pentene-1 using these monomers or mixtures comprising the monomers at supercritical conditions or as a liquid. These processes may employ at least one of butene-1, pentene-1, or 3-methyl-butene-1 as monomer. These processes may also employ reaction media that comprise butene-1, pentene-1,3-methyl-butene-1 or 4-methyl-pentene-1. These processes can employ polymerization feeds that contain greater than 50 mole % of butene-1, pentene-1, or 3-methyl-butene-1 and their concentration can vary between 0.1 and 85 mole %. Of course, these compounds can be freely mixed with each other and with propylene as monomer, bulk reaction media, or both.

Reaction Solvents/Diluents:

Solvent and or diluent may be present in the polymerization system. Any hydrocarbon, fluorocarbon, or fluorohydrocarbon inert solvent or their mixtures may be used at concentrations not more than 80 wt % in the feeds to any individual polymerization reactor of the in-line blending process disclosed herein. The concentration of the inert solvent in the reactor feed and thus in the polymerization system in certain embodiments utilizing bulk polymerization processes is not more than 40 wt %, or not more than 30 wt %, or not more than 20 wt %, alternatively not more than 10 wt %, alternatively not more than 5 wt %, and alternatively not more than 1 wt %.

Diluents for use in the in-line blending process disclosed herein may include one or more of $C_2$-$C_{24}$ alkanes, such as ethane, propane, n-butane, i-butane, n-pentane, i-pentane, n-hexane, mixed hexanes, cyclopentane, cyclohexane, etc., single-ring aromatics, such as toluene and xylenes. In some embodiments, the diluent comprises one or more of ethane, propane, butane, isobutane, pentane, isopentane, and hexanes. In other embodiments, the diluent is recyclable.

Other diluents may also include $C_4$ to $C_{150}$ isoparaffins, or $C_4$ to $C_{100}$ isoparaffins, or $C_4$ to $C_{25}$ isoparaffins, or $C_4$ to $C_{20}$ isoparaffins. By isoparaffin is meant that the paraffin chains possess $C_1$ to $C_{10}$ alkyl branching along at least a portion of each paraffin chain. More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and advantageously wherein the total number of carbon atoms per molecule is in the range between 6 to 50, and between 10 and 24 in another embodiment, and from 10 to 15 in yet another embodiment. Various isomers of each carbon number will typically be present. The isoparaffins may also include cycloparaffins with branched side chains, generally as a minor component of the isoparaffin. The density of these isoparaffins may range from 0.70 to 0.83 g/cm$^3$; the pour point is −40° C. or less, alternately −50° C. or less, the kinematic viscosity at 25° C. is from 0.5 to 20 cSt; and number-averaged molecular weight (Mn) in the range of 100 to 300 g/mol. Some suitable isoparaffins are commercially available under the tradename is ISOPAR (ExxonMobil Chemical Company, Houston Tex.), and are described in, for example in U.S. Pat. Nos. 6,197,285, 3,818,105 and 3,439,088, and sold commercially as ISOPAR series of isoparaffins. Other suitable isoparaffins are also commercial available under the trade names SHELLSOL, SOLTROL and SASOL. SHELLSOL is a product of the Royal Dutch/Shell Group of Companies, for example Shellsol™ (boiling point=215-260° C.). SOLTROL is a product of Chevron Phillips Chemical Co. LP, for example SOLTROL 220 (boiling point=233-280° C.). SASOL is a product of Sasol Limited (Johannesburg, South Africa), for example SASOL LPA-210, SASOL-47 (boiling point=238-274° C.).

In another embodiment of the in-line blending process disclosed herein, diluents may include $C_4$ to $C_{25}$ n-paraffins, or $C_4$ to $C_{20}$ n-paraffins, or $C_4$ to $C_{15}$ n-paraffins having less than 0.1%, or less than 0.01% aromatics. Some suitable n-paraffins are commercially available under the tradename NORPAR (ExxonMobil Chemical Company, Houston Tex.), and are sold commercially as NORPAR series of n-paraffins. In another embodiment, diluents may include dearomaticized aliphatic hydrocarbon comprising a mixture of normal paraffins, isoparaffins and cycloparaffins. Typically they are a mixture of $C_4$ to $C_{25}$ normal paraffins, isoparaffins and cycloparaffins, or $C_5$ to $C_{18}$, or $C_5$ to $C_{12}$. hey contain very low levels of aromatic hydrocarbons, or less than 0.1, or less than 0.01 aromatics. Suitable dearomatized aliphatic hydrocarbons are commercially available under the tradename EXXSOL (ExxonMobil Chemical Company, Houston Tex.), and are sold commercially as EXXSOL series of dearomaticized aliphatic hydrocarbons.

In another embodiment of the in-line blending process disclosed herein, the inert diluent comprises up to 20 weight % of oligomers of $C_6$ to $C_{14}$ olefins and/or oligomers of linear olefins having 6 to 14 carbon atoms, or 8 to 12 carbon atoms, or 10 carbon atoms having a Kinematic viscosity at 100° C. of 2 cSt or more, or 4 cSt or more, or 6 cSt or more, or 8 cSt or more, or 10 cSt or more.

In another embodiment of the fluid phase in-line process for blending disclosed herein, the inert diluent comprises up to 20 weight % of oligomers of $C_{20}$ to $C_{1500}$ paraffins, alternately $C_{40}$ to $C_{1000}$ paraffins, alternately $C_{50}$ to $C_{750}$ paraffins, alternately $C_{50}$ to $C_{500}$ paraffins. In another embodiment of the fluid phase in-line process for blending disclosed herein, the diluent comprises up to 20 weight % of oligomers of 1-pentene, 1-hexene, 1-heptene, 1-octene, 1-nonene, 1-decene, 1-undecene and 1-dodecene. Such oligomers are commercially available SpectraSyn (ExxonMobil Chemical Company, Houston Tex.). Other useful oligomers include those sold under the tradenames Synfluid™ available from ChevronPhillips Chemical Co. in Pasedena Tex., Durasyn™ available from Ineos in London England, Nexbase™ available from Fortum Oil and Gas in Finland, Synton™ available from Chemtura Corporation in Middlebury Conn., USA, EMERY™ available from Chemtura in Ohio, USA.

In another embodiment of the fluid phase in-line process for blending disclosed herein, the diluent comprises a flourinated hydrocarbon. Exemplary fluorocarbons include perfluorocarbons ("PFC" or "PFC's") and or hydrofluorocarbons ("HFC" or "HFC's"), collectively referred to as "fluorinated hydrocarbons" or "fluorocarbons" ("FC" or "FC's"). Fluorocarbons are defined to be compounds consisting essentially of at least one carbon atom and at least one fluorine atom, and optionally hydrogen atom(s). A perfluorocarbon is a compound consisting essentially of carbon atom and fluorine atom, and includes for example linear branched or cyclic, $C_1$ to $C_{40}$ perfluoroalkanes. A hydrofluorocarbon is a compound consisting essentially of carbon, fluorine and hydrogen. FC's include those represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, alternatively from 1 to 3, wherein y is an integer greater than or equal to 0 and z is an integer and at least one, alternatively, y and z are integers and at least one. For purposes of the in-line blending processes disclosed herein and the claims thereto, the terms hydrofluorocarbon and fluorocarbon do not include chlorofluorocarbons.

In one embodiment of the fluid phase in-line process for blending disclosed herein, a mixture of fluorocarbons are used, alternatively a mixture of a perfluorinated hydrocarbon and a hydrofluorocarbon, and alternatively a mixture of a hydrofluorocarbons. In yet another embodiment, the hydrofluorocarbon is balanced or unbalanced in the number of fluorine atoms in the HFC used.

With regard to the polymerization media, suitable diluents and solvents are those that are soluble in and inert to the monomer and any other polymerization components at the polymerization temperatures and pressures.

Reactor Configuration:

The polymer and plasticizer reaction processes of the fluid phase in-line process for blending disclosed herein may be carried out in two or more reactors making the polymers and plasticizers for downstream blending. The reactors may be fed with essentially the same or different feeds and can run at essentially the same or different reactor conditions. The reactors may also produce essentially the same or different polymeric products.

When multiple reactors are used in the processes disclosed herein, the production of plasticized polymer blends including two or more polymers is possible. In one embodiment, homopolymer and copolymer blends are made by using at least two reactor trains in a parallel configuration. Non-limiting exemplary homopolymers include polyethylene, polypropylene, polybutene, polyhexene, and polyoctane. In one embodiment, the homopolymer comprises polyethylene, polypropylene, polybutylene, polyhexene, and polystyrene. In another embodiment, the homopolymer is polyethylene or polypropylene. The copolymers may be any two- or three-component combinations of ethylene, propylene, butene-1, hexene-1, octene-1, styrene, norbornene, 1,5-hexadiene, and 1,7-octadiene. In one embodiment, the copolymers are made from a two-component combination of ethylene, propylene, butene-1, hexene-1, styrene, norbornene, 1,5-hexadiene, and 1,7-octadiene. In another embodiment, the copolymer is an ethylene-propylene, propylene-butene-1, propylene-hexene-1, propylene-octene-1, ethylene-butene-1, ethylene-hexene-1, and/or ethylene-octene-1 copolymer.

As previously described, the in-line blending polymer components are produced in a reactor bank composed of at least two parallel reactor trains. A reactor train of the parallel reactor bank may include one or more reactors that may be configured in series configuration. The number of parallel reactors trains or branches in a parallel bank may be any number, but for practical reasons, is generally limited to less than ten, alternatively not more than six parallel reactor trains, alternatively not more than five or not more than four reactor trains, alternatively not more than three parallel reactor trains, and alternatively not more than two parallel reactor trains. The number of series cascade reactors constituting a given reactor train or branch of a parallel configuration may be any number, but for practical reasons, is generally limited to not more than ten reactors in series, alternatively not more than six reactors in series, alternatively not more than three reactors in series, and alternatively not more than two reactors in series.

In one embodiment, the base polymer containing effluent and plasticizer-containing effluent from two or more reactor trains configured in a parallel configuration are combined yielding a plasticized polymer blend comprising the base polymer and plasticizer products of the individual reactors without first recovering the base polymer and plasticizer products of the individual reactors in solid or liquid forms. The two or more reactor trains constituting the parallel configuration generally include a single reactor, or alternatively, two or more reactors in series.

Another embodiment of the processes disclosed herein, blends the base polymer containing effluent with one or more in-line-produced plasticizer and optionally one or more off-line-produced plasticizers in-line. The base polymer is blended in the form of a diluted effluent stream that contains at least some of the light components of the reactor effluent, such as the monomers and optional inert solvent/diluents. Such streams are advantageous for in-line blending due to their lower viscosity and thus enhanced ability for fluid phase blending. However, unlike in the previously described embodiment, the in-line-produced plasticizer is blended as a fully recovered plasticizer fluid, i.e, in its essentially pure form. The full recovery of the in-line-produced plasticizer may be advantageous when the plasticizer is a liquid at ambient temperature, and/or when some of the in-line-produced plasticizer product is exported from the in-line blending process for sales or for other uses. The base polymer and in-line-produced plasticizer components are produced in two or more parallel reactor trains. The reactor trains constituting the parallel configuration generally include a single reactor, or alternatively, two or more reactors in series.

The reactors of the polymerization system for the fluid phase in-line process for blending disclosed herein may be stirred or unstirred. When a reactor train comprises two or more reactors, the members of the reactor train are not necessarily constructed the same way, for example, the individual members of a reactor train may be stirred, unstirred, or a combination thereof. The individual reactors may also be of equal or different size. The same is true for the reactors in the entire reactor bank. The optimal reactor configuration and sizes may be determined by standard engineering techniques known to those skilled in the art of chemical engineering.

Any type of reactor may be deployed in the fluid phase in-line process for blending disclosed herein. The optimal reactor design may be determined by standard engineering techniques known to those skilled in the art of chemical engineering. Non-limiting exemplary reactor designs include stirred tank with or without an external loop, tubular reactor, and loop reactor. The reactors may operate adiabatically or may be cooled. The cooling may be achieved within the reactor, or through the reactor jacket, or dedicated heat exchange loops may be applied.

Reaction Process Details:

The fluid phase in-line process for blending disclosed herein relates to processes to polymerize or oligomerize olefins comprising contacting one or more olefins having at least two carbon atoms with a suitable catalyst compound and an activator in a fluid reaction medium comprising one or two fluid phases in a reactor. Polymerization in a single fluid phase may be advantageous due to improved heat transfer and reduced tendency for fouling. In one embodiment, the fluid reaction medium is in its supercritical state. Catalyst compound and activator may be delivered as a solution or slurry, either separately to the reactor, mixed in-line just prior to the reactor, or mixed and pumped as an activated solution or slurry to the reactor. In one particular embodiment, two solutions are mixed in-line. For a given reactor train of the parallel configuration, polymerizations may be carried out in either single reactor operation, in which monomer, comonomers, catalyst(s)/activator(s), scavenger(s), and optional solvent(s) are added continuously to a single reactor or in series reactor operation, in which the above components are added to two or more reactors connected in series. The catalyst components may be added to the first reactor in the series. The catalyst component may also be added to each reactor in the series reactor train. The fresh catalyst feed if added to more than one reactor in the series train may be the same or different to each reactor and their feed rates may be the same or different.

Some embodiments of the polymerization processes of the fluid phase in-line process for blending disclosed herein also comprehend high-pressure reactors where the reactor is substantially unreactive with the polymerization reaction components and is able to withstand the high pressures and temperatures that occur during the polymerization reaction. Withstanding these high pressures and temperatures may allow the reactor to maintain the fluid reaction medium in its supercritical condition. Suitable reaction vessel designs include those necessary to maintain supercritical or other high-pressure ethylene polymerization reactions. Non-limiting exemplary reactors include autoclave, pump-around loop or autoclave, tubular, and autoclave/tubular reactors.

The polymerization processes of the fluid phase in-line process for blending disclosed herein may operate efficiently in autoclave (also referred to as stirred tank) and tubular reactors. Autoclave reactors may be operated in either a batch or continuous mode, although the continuous mode is advantageous. Tubular reactors always operate in continuous mode. Typically, autoclave reactors have length-to-diameter ratios of 1:1 to 20:1 and are fitted with a high-speed (up to 2000 RPM) multiblade stirrer and baffles arranged for optimal mixing. Commercial autoclave pressures are typically greater than 5 MPa with a maximum of typically less than 260 MPa. The maximum pressure of commercial autoclaves, however, may become higher with advances in mechanical and material science technologies.

When the autoclave has a low length-to-diameter ratio (such as less than four), the feed streams may be injected at one position along the length of the reactor. Reactors with large diameters may have multiple injection ports at nearly the same or different positions along the length of the reactor. When they are positioned at the same length of the reactor, the injection ports are radially distributed to allow for faster intermixing of the feed components with the reactor content. In the case of stirred tank reactors, the separate introduction of the catalyst and monomer(s) may be advantageous in preventing the possible formation of hot spots in the unstirred feed zone between the mixing point and the stirred zone of the reactor. Injections at two or more positions along the length of the reactor is also possible and may be advantageous. In one exemplary embodiment, in reactors where the length-to-diameter ratio is from 4 to 20, the reactor may contain up to six different injection positions along the reactor length with multiple ports at some or each of the lengths.

Additionally, in the larger autoclaves, one or more lateral mixing devices may support the high-speed stirrer. These mixing devices can also divide the autoclave into two or more zones. Mixing blades on the stirrer may differ from zone to zone to allow for a different degree of plug flow and back mixing, largely independently, in the separate zones. Two or more autoclaves with one or more zones may connect in a series reactor cascade to increase residence time or to tailor polymer structure in a reactor train producing a polymer blending component. As previously described, a series reactor cascade or configuration consists of two or more reactors connected in series, in which the effluent of at least one upstream reactor is fed to the next reactor downstream in the cascade. Besides the effluent of the upstream reactor(s), the feed of any reactor in the series reactor cascade of a reactor train can be augmented with any combination of additional monomer, catalyst, or solvent fresh or recycled feed streams. Therefore, it should be understood that the polymer blending component leaving a reactor train of the process disclosed herein may itself be a blend of the same polymer with increased molecular weight and/or compositional dispersion or even a blend of homo- and copolymers.

Tubular reactors may also be used in the fluid phase in-line process for blending disclosed herein and more particularly tubular reactors capable of operating up to about 350 MPa. Tubular reactors are fitted with external cooling and one or more injection points along the (tubular) reaction zone. As in autoclaves, these injection points serve as entry points for monomers (such as propylene), one or more comonomer, catalyst, or mixtures of these. In tubular reactors, external cooling often allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Alternatively, tubular reactors may be fabricated with smooth, unpolished internal surfaces to address wall deposits. Tubular reactors generally may operate at pressures of up to 360 MPa, may have lengths of 100-2000 meters or 100-4000 meters, and may have internal diameters of less than 12.5 cm. Typically, tubular reactors have length-to-diameter ratios of 10:1 to 50,000:1 and include up to 10 different injection positions along its length.

Reactor trains that pair autoclaves with tubular reactors are also contemplated within the scope of the fluid phase in-line process for blending disclosed herein. In this reactor system, the autoclave typically precedes the tubular reactor or the two types of reactors form separate trains of a parallel reactor configuration. Such reactor systems may have injection of additional catalyst and/or feed components at several points in the autoclave, and more particularly along the tube length. In both autoclaves and tubular reactors, at injection, feeds are typically cooled to near ambient temperature or below to provide maximum cooling and thus maximum polymer production within the limits of maximum operating temperature. In autoclave operation, a preheater may operate at startup, but not after the reaction reaches steady state if the first mixing zone has some back-mixing characteristics. In tubular reactors, the first section of double-jacketed tubing may be heated (especially at start ups) rather than cooled and may operate continuously. A well-designed tubular reactor is characterized by plug flow wherein plug flow refers to a flow pattern with minimal radial flow rate differences. In both multizone autoclaves and tubular reactors, catalyst can not only be injected at the inlet, but also optionally at one or more points along the reactor. The catalyst feeds injected at the inlet and other injection points can be the same or different in terms of content, density, and concentration. Catalyst feed selection allows polymer design tailoring within a given reactor or reactor train and/or maintaining the desired productivity profile along the reactor length.

At the reactor outlet valve, the pressure drops to begin the separation of polymer and unreacted monomer, co-monomers, solvents and inerts, such as for example ethane, propane, hexane, and toluene. More particularly, at the reactor outlet valve, the pressure drops to levels below that which critical phase separation allowing for a polymer-rich phase and a polymer-lean phase in the downstream separation vessel. Typically, conditions remain above the polymer product's crystallization temperature. The autoclave or tubular reactor effluent may be depressurized on entering the downstream high-pressure separator (HPS or also referred to as a separator, separator vessel, separation vessel, separator/blender vessel, or separation/blending vessel).

As will be subsequently described in detail, the temperature in the separation vessel is maintained above the solid-fluid phase separation temperature, but the pressure may be below the critical point. The pressure need only be high enough such that the monomer may condense upon contacting standard cooling water. The liquid recycle stream may then be recycled to the reactor with a liquid pumping system instead of the hyper-compressors required for polyethylene units. The relatively low pressure in separator reduces the monomer concentration in the liquid polymer phase which results in a lower polymerization rate. The polymerization rate may be low enough to operate the system without adding a catalyst poison or "killer". If a catalyst killer is required (e.g., to prevent reactions in the high pressure recycle) then provision must be made to remove any potential catalyst poisons from the recycled polymer rich monomer stream for example, by the use of fixed bed adsorbents or by scavenging with an aluminum alkyl.

In an alternative embodiment, the HPS may be operated over the critical pressure of the monomer or monomer blend but within the dense fluid-fluid two phase region, which may be advantageous if the polymer is to be produced with a revamped high-pressure polyethylene (HPPE) plant. The recycled HPS overhead is cooled and dewaxed before being returned to the suction of the secondary compressor, which is typical of HPPE plant operation. The polymer from this intermediate or high-pressure vessel then passes through another pressure reduction step to a low pressure separator. The temperature of this vessel is maintained above the polymer melting point so that the polymer from this vessel can be fed as a liquid directly to an extruder or static mixer. The pressure in this vessel is kept low by using a compressor to recover the unreacted monomers, etc. to the condenser and pumping system referenced above.

In addition to autoclave reactors, tubular reactors, or a combination of these reactors, loop-type reactors may be utilized in the fluid phase in-line process for blending disclosed herein. In this reactor type, monomer enters and polymer exits continuously at different points along the loop, while an in-line pump continuously circulates the contents (reaction liquid). The feed/product takeoff rates control the total average residence time. A cooling jacket removes reaction heat from the loop. Typically feed inlet temperatures are near to or below ambient temperatures to provide cooling to the exothermic reaction in the reactor operating above the crystallization temperature of the polymer product. The loop reactor may have a diameter of 41 to 61 cm and a length of 100 to 200 meters and may operate at pressures of 25 to 30 MPa. In addition, an in-line pump may continuously circulate the polymerization system through the loop reactor.

The polymerization processes of the fluid phase in-line process for blending polymers disclosed herein may have residence times in the reactors as short as 0.5 seconds and as long as several hours, alternatively from 1 sec to 120 min, alternatively from 1 second to 60 minutes, alternatively from 5 seconds to 30 minutes, alternatively from 30 seconds to 30 minutes, alternatively from 1 minute to 60 minutes, and alternatively from 1 minute to 30 minutes. More particularly, the residence time may be selected from 10, or 30, or 45, or 50, seconds, or 1, or 5, or 10, or 15, or 20, or 25, or 30 or 60 or 120 minutes. Maximum residence times may be selected from 1, or 5, or 10, or 15, or 30, or 45, or 60, or 120 minutes.

The monomer-to-polymer conversion rate (also referred to as the conversion rate) is calculated by dividing the total quantity of polymer that is collected during the reaction time by the amount of monomer added to the reaction. Lower conversions may be advantageous to limit viscosity although increase the cost of monomer recycle. The optimum total monomer conversion thus will depend on reactor design, product slate, process configuration, etc., and can be determined by standard engineering techniques. Total monomer conversion during a single pass through any individual reactor of the fluid phase in-line process for blending disclosed herein may be up to 90%, or below 80%, or below 60% or 3-80%, or 5-80%, or 10-80%, or 15-80%, or 20-80%, or 25-60%, or 3-60%, or 5-60%, or 10-60%, or 15-60%, or 20-60%, or 10-50%, or 5-40%, or 10-40%, or 40-50%, or 15-40%, or 20-40%, or 30-40% or greater than 5%, or greater than 10%. In one embodiment, when the product is isotactic polypropylene and long-chain branching (LCB) of the polypropylene is desired (g'≦0.97 based on GPC-3D and using an isotactic polypropylene standard), single pass conversions may be above 30% and alternatively single-pass conversions may be above 40%. In another embodiment, when isotactic polypropylene essentially free of LCB is desired (0.97<g'<1.05), single-pass conversions may be not higher than 30% and alternatively single-pass-conversions may be not higher than 25%. To limit the cost of monomer separation and recycling, single-pass conversions may be above 3%, or above 5%, or above 10%. It should be understood that the above exemplary conversion values reflect total monomer conversion, i.e., the conversion obtained by dividing the combined conversion rate of all monomers by the total monomer feed rate. When monomer blends are used, the conversion of the more reactive monomer component(s) will always be higher than that of the less reactive monomer(s). Therefore, the conversion of the more reactive monomer component(s) can be substantially higher than the total conversion values given above, and can be essentially complete, approaching 100%.

Product Separation and Downstream Processing:

The base polymer and the optionally in-line-produced plasticizer reactor effluents of the processes disclosed herein are depressurized to a pressure significantly below the cloud point pressure. This allows separation of a polymer-rich phase for further purification and a monomer-rich phase for optional separation and recycle compression back to the reactor(s). The base polymer and the optional plasticizer reactor effluents may be optionally heated before pressure let down to avoid the separation of a solid polymer phase, which causes fouling of the separators and associated reduced-pressure lines. The blending of the base polymer and optional in-line-produced plasticizer containing streams and the separation of the plasticized polymer-rich phase and the monomer-rich phase in the processes disclosed herein is carried out in a vessel known as a high-pressure separator (also referred to as an HPS, separator, separator vessel, or separation vessel). The high-pressure separator located after the mixing point of the polymer-containing product streams and plasticizer-containing product streams of all reactor trains of the parallel reactor bank is also referred to as, separator-blender, separator-blender vessel, or separation-blending vessel recognizing its dual function of blending the said polymer-containing and plasticizer-containing product streams while also separating a monomer-rich phase and solvent-rich phase from a plasticized polymer-rich phase, the latter of which comprises the plasticized polymer blend of the in-line blending processes disclosed herein.

In certain embodiments, single-stream high-pressure separators employed to partially recover the monomer(s) and optional solvent(s) from the effluent of a single reactor train before sending the polymer-enriched stream and plasticizer-enriched stream to the downstream separator-blender. In such embodiments, the separator-blender blends one or more base polymer-enriched stream optionally (as in options (1) and (2) of the process examples described earlier) with one or more unreduced plasticizer reactor train effluent to yield a monomer-rich phase and a plasticized polymer-rich phase, the latter of which comprises the plasticized polymer blend of the in-line blending process disclosed herein. In another embodiment, the single-stream high-pressure separator placed upstream of the separator-blender also functions as a buffer vessel (separator-buffer vessel) by allowing the fluid level of the polymer-enriched phase or plasticizer-enriched phase to vary in the separator-buffer vessel. Such buffering enables a more precise control of the blend ratios by compensating for the momentary fluctuations in the production rates in the individual reactor trains of the in-line blending process disclosed herein.

The plasticized polymer rich phase of the separator-blender may then be transferred to one or more low-pressure separators (LPS also referred to as a low-pressure separation vessel) running at just above atmospheric pressure for a simple flash of light components, reactants and oligomers thereof, for producing a low volatile-containing polymer melt entering the finishing extruder or optional static mixer. The one or more low-pressure separators are distinguished from the one or more high-pressure separators in generally operating at lower pressures relative to the high-pressure separators. The one or more low-pressure separators also are located downstream of the one or more high-pressure separators including the separator-blender. In some embodiments of the processes described herein, the plasticized polyolefin-containing stream are mixed with the optional off-line-produced plasticizer and/or other polymer additive feeds upstream of or in the low-pressure separator. As previously stated, a high-pressure separator may be alternatively referred to herein as an HPS, separator, separator vessel, separation vessel, separator-blender vessel, or separation-blending vessel, or separator-blender even if some blend components are introduced in the low-pressure separator section of the in-line blending processes disclosed herein. The use of the term "pressure" in conjunction with low-pressure separator and high-pressure separator is not meant to identify the absolute pressure levels at which these separators operate at, but is merely intended to given the relative difference in pressure at which these separators operate. Generally, separators located downstream in the in-line blending processes disclosed herein operate at lower pressure relative to separators located upstream.

In one embodiment of the fluid phase in-line process for blending polymers disclosed herein, polymerization is conducted in two or more reactors of a type described herein above under agitation and above the cloud point for the polymerization system. Then, the polymer-monomer mixtures are transferred into a high-pressure separation-blending vessel, where the pressure is allowed to drop below the cloud point. This advantageously results in the denser, polymer-rich phase separating from the lighter monomer-rich phase. As may be appreciated by those skilled in the art, it may optionally be necessary to increase the temperature before or in the high-pressure separation vessel to prevent the formation of a solid polymer phase as the polymer becomes more concentrated. The monomer-rich phase is then separated and recycled to the reactors while the polymer-rich phase is fed to a coupled devolatilizer—such as a LIST dryer (DTB) or devolatizing extruder.

Figure 23:
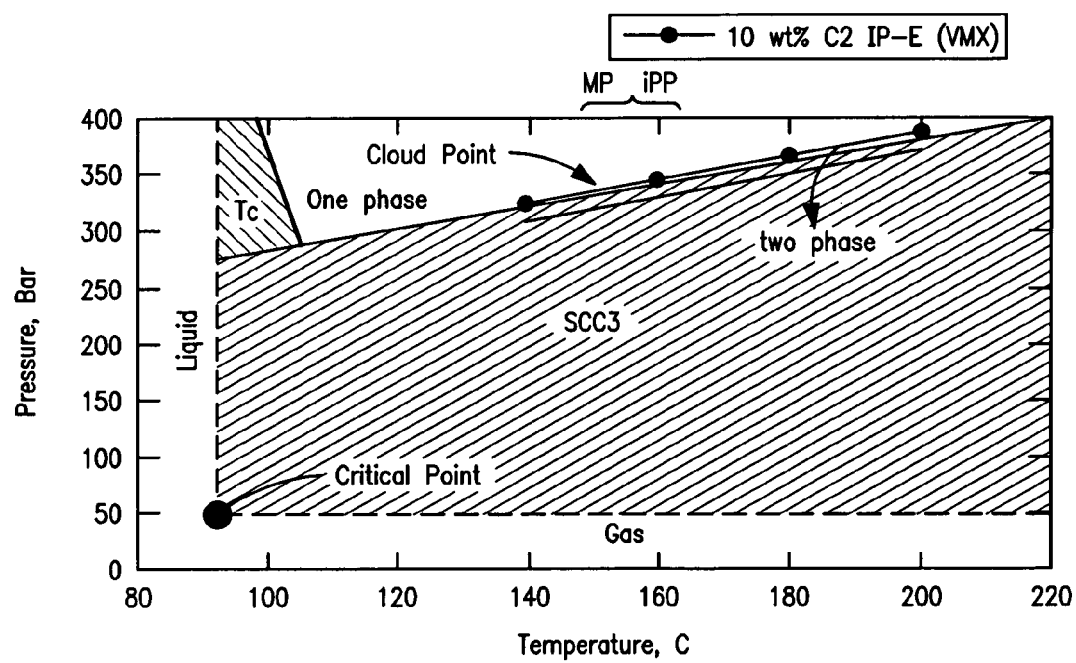
FIG. 23 presents a basic phase diagram for mixture of propylene monomer with selected polymers (isotactic polypropylene—iPP, syndiotactic polypropylene—sPP, atactic polypropylene—aPP, or propylene-ethylene copolymer)
Figure 24:
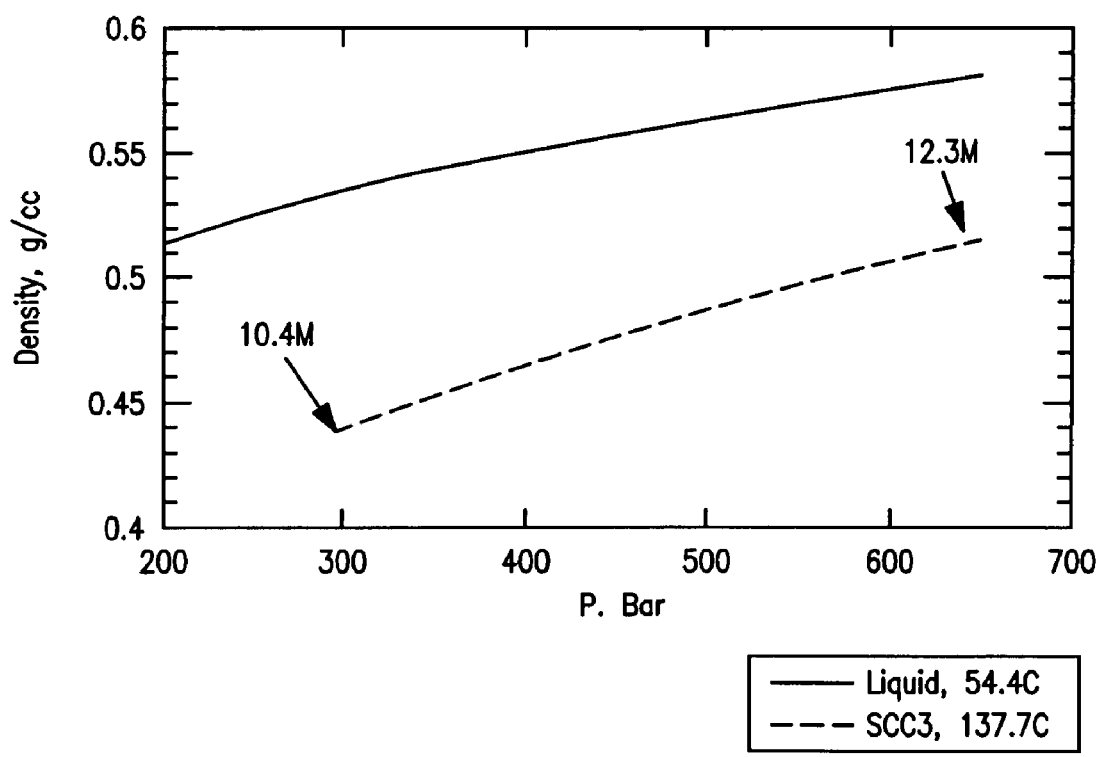
FIG. 24 presents a comparison of the density of supercritical propylene at 137.7° C. with liquid propylene at 54.4° C.

The recycle runs through a separator, where the pressure depends on the pressure-temperature relationship existing within the reactor. For example, supercritical propylene polymerization can be carried out under agitation in the single-phase region in the reactor at 40-200 MPa and 95-180° C. (see FIG. 23). The product mixture can be discharged into a separator vessel, where the pressure is dropped to a level of 25 MPa or lower, in which case, the mixture is below its cloud point, while the monomer has not yet flashed off (again, see FIG. 23). Under such conditions, it would be expected from Radosz et al., Ind. Eng. Chem. Res. 1997, 36, 5520-5525 and Loos et al., Fluid Phase Equil. 158-160, 1999, 835-846 that the monomer-rich phase would comprise less than about 0.1 wt % of low molecular weight polymer and have a density of approximately 0.3-0.7 g/mL (see FIG. 24). The polymer-rich phase would be expected to have a density of approximately 0.4-0.8 g/mL.

Assuming that the pressure is dropped rapidly enough, for example, greater than or equal to about 6 MPa/sec, the phases will separate rapidly, permitting the recycle of the monomer-rich phase as a liquid, without the issue of having the monomer-rich phase return to the gas phase. As may be appreciated by those skilled in the art, this eliminates the need for the energy-intensive compression and condensation steps.

The plasticized polymer-rich phase is sent directly to a coupled devolatilizer. Suitable devolatilizers may be obtained, for example, from LIST USA Inc., of Charlotte, N.C. The devolatilization is a separation process to separate remaining volatiles from the final plasticized polymer, eliminating the need for steam stripping. Working under low vacuum, the polymer solution flashes into the devolatilizer, exits the unit and is then transferred on for further processing, such as pelletization.

Any low or very low molecular weight polymer present in the monomer-rich phase to be recycled may optionally be removed through "knock-out" pots, standard hardware in reactors systems, or left in the return stream depending upon product requirements and the steady-state concentration of the low molecular weight polymer fraction in the product.

In solution reactor processes, present practices employed by those skilled in the art typically effect separation by flashing monomer and solvent or accessing the high-temperature cloud point.

In another form, polymerization is conducted at conditions below the cloud point, with the polymer-monomer mixture transported to a gravimetric separation vessel, where the pressure could be further lowered if desired to enhance phase separation of the polymer-rich and monomer-rich phases. In either of the forms herein described, the monomer, for example, propylene, is recycled while staying in a relatively high density, liquid-like (dense supercritical fluid or bulk liquid) state. Once again, one or more knock-out pots may be employed to aid in the removal of low molecular weight polymer from the recycle stream.

Figure 25:
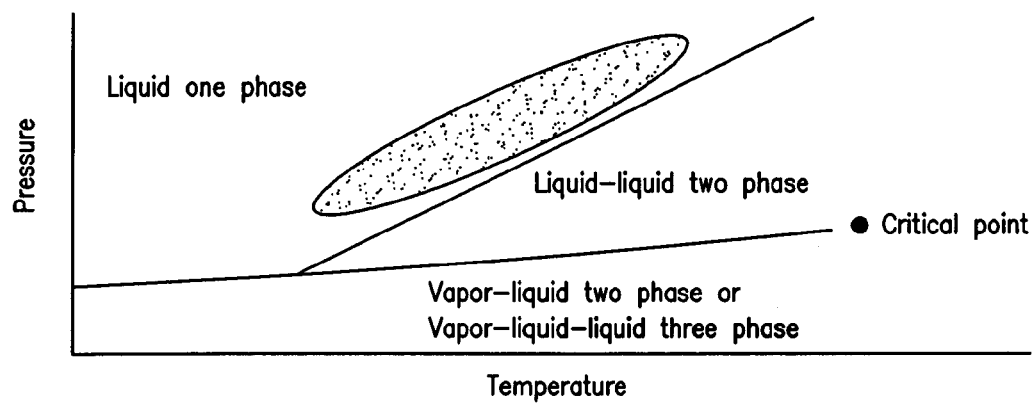
FIG. 25 presents an operating regime in accordance with the process disclosed herein for a reactor operating in a single liquid phase.

As may be appreciated, there are possible and optimal operating regimes for the polymer blend and plasticizer blend component reactors and for the gravity (lower critical solution temperature (LCST)) separator. Referring now to FIG. 25, for reactors operating in a single liquid phase regime, a possible region for operation is just above the LCST and vapor pressure (VP) curves. The optimal region (shown within the shaded oval) for operation occurs at temperatures just above the lower critical end point (LCEP) and at pressures slightly above the LCST curve.

Figure 26:
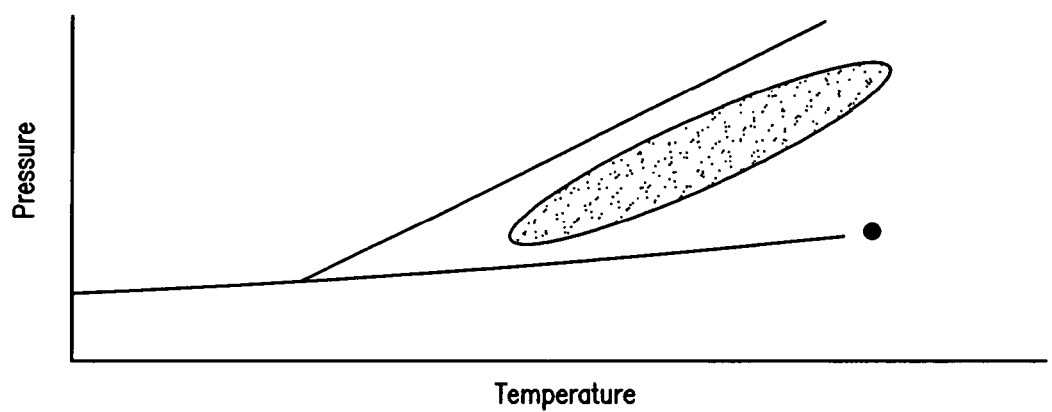
FIG. 26 presents an operating regime in accordance with the process disclosed herein for a reactor operating in a liquid-liquid phase.

Referring now to FIG. 26, for reactors operating within a two-phase fluid-fluid regime, the possible region for operation occurs basically anywhere below the LCST curve. The optimal region (again, shown within the shaded oval) occurs just below the LCST and above the VP curve, although, as may be appreciated, many factors could have a bearing on what actually is optimal, such as the final properties of the desired product. As recognized by those skilled in the art, the two-phase liquid-liquid regime is the economically advantageous method if polypropylene is to be produced with a revamped HPPE plant.

Figure 27:
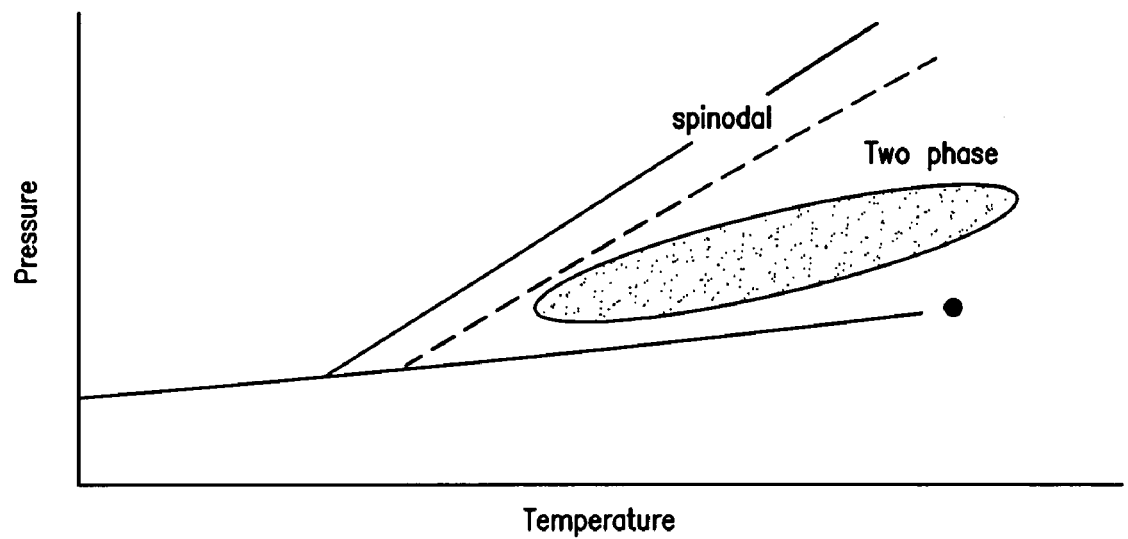
FIG. 27 presents an operating regime in accordance with the process disclosed herein for a gravity separator.

Referring now to FIG. 27, for the case where polymerization is conducted at conditions below the cloud point and the polymer-monomer mixture transported to a gravimetric LCST separator, the possible region of operation is anywhere below the LCST curve and above the VP curve. The optimal region (again, shown within the shaded oval) occurs within that portion that is below the spinodal, but not too low in pressure, as shown. Operating in this regime assures that the energy use is optimized. It is also desirable to avoid operation in the region between the LCST and spinodal curves in order to obtain good gravity settling performance. Moreover, it is desirable that the separation is effected at sufficiently high temperatures, so that crystallization does not occur in the polymer-rich phase. This may require that the temperature of the mixture in the separator be higher than the temperature in the reactor(s).

Advantageously, the liquid monomer-rich recycle stream can be recycled to the reactor using a liquid pumping system instead of a hyper-compressor, required for conventional polyethylene units.

In another embodiment of the invention, polymerization is as described in WO2004/026921, and with the pressure above the cloud point pressure for the polymerization medium. The polymerization medium is continuously transferred without heating to a pressure reducing device (which may be a letdown valve), where the pressure is reduced below the cloud point pressure. This advantageously results in the formation of a denser, polymer-rich phase and a less dense monomer-rich phase, which are then transferred to a fluid-liquid separation vessel called a High Pressure Separator (HPS), where the monomer-rich phase and polymer-rich phase form and separate into two layers via gravity settling.

In another embodiment, it may be necessary to increase the temperature of the polymerization medium by a heating device located upstream of the pressure reducing device (letdown valve) to prevent a solid-liquid phase transition (crystallization) of the polymer-rich phase in the HPS, which could occur as the polymer concentration increases, or to allow operation of the HPS at a higher pressure and thereby avoid full or partial vaporization of the monomer-rich phase. The monomer-rich phase is then recycled from the top of the HPS to the reactor while the polymer-rich phase is fed to optional low-pressure phase separators (LPS) placed downstream of the first phase separator, and ultimately to a coupled devolatilizer—such as a LIST dryer (DTB) or devolatizing extruder. The operating pressures of the separators are decreasing in the separator cascade causing the polymer-rich phase in a downstream separator to become more concentrated in the polymer and depleted in the light components of the polymerization system such as monomers and optional inert solvents diluents as compared to the corresponding phase concentrations upstream.

Phase Separation Temperature:

In all embodiments of the current invention, the optional heating of the polymerization medium upstream of the pressure letdown device is minimized within the constraints imposed by the phase diagram for the polymerization medium. For efficient phase separation, the temperature of the polymerization medium at the entrance to the pressure reducing device (letdown valve) must be high enough to prevent a solid-liquid phase separation from taking place upstream of, or inside, the fluid-liquid phase separation vessel (HPS). The efficient phase separation temperature must also be high enough such that when the pressure is reduced across the pressure reducing device (letdown valve), that there exists a pressure where an efficient separation of the polymerization medium into a monomer-rich phase and a polymer-rich phase can occur at a high enough pressure to prevent full or partial vaporization of the monomer-rich phase. The applicable operating range of temperatures and pressures that satisfy these criteria may be determined from a T,P phase diagram of the polymerization medium of the type depicted in FIG. 29. Because heating of the polymerization medium increases investment costs (installation of heaters), and also increases operating cost (consumption of a heating utility), the preferred embodiments of the process generally employ no heating if the polymerization system is already operating at a temperature that exceeds the efficient phase separation temperature criteria. Alternatively, embodiments where the polymerization medium is at a temperature lower than that required to satisfy the efficient phase separation criteria will employ minimal heating to raise the temperature at the inlet of the pressure reducing device (letdown valve) to 0-100° C., or 5-50° C., or 10-30° C. above minimum required temperature for efficient phase separation.

In consideration of the efficient phase separation temperature criteria, the process of the current invention can be carried out at the following temperatures. In one embodiment, the temperature of the polymerization system is above the solid-fluid phase transition temperature of the polymer-containing fluid reaction medium at the reactor pressure, preferably at least 5° C. above the solid-fluid phase transition temperature of the polymer-containing fluid reaction medium at the reactor pressure, more preferably, at least 10° C. above the solid-fluid phase transformation point of the polymer-containing fluid reaction medium at the reactor pressure. In another embodiment, the temperature is between 50 and 350° C., or between 60 and 250° C., or between 70 and 200° C., or between 80 and 180° C., or between 90 and 160° C., or between 100 and 140° C.

Spinodal Decomposition:

In preferred embodiments of the current invention, the pressure reducing device is designed to drop the pressure rapidly enough, and to an optimal pressure, via the process of spindoal decomposition, which results in a phase morphology of an interpenetrating network of the two phases (also called a co-continuous morphology), with the desirable result that the polymer-rich and monomer-rich phases disengage easily and settle rapidly in the fluid-liquid gravity separation vessel (HPS). Spinodal decomposition prevents the formation of a very slow disengaging and slow settling mixture of monomer-rich and polymer-rich phases with a morophology that has droplets of monomer-rich phase dispersed in a continuous polymer-rich phase, which tends to occur naturally when the polymer concentration in the fluid exceeds a critical value, and when temperature and pressure in the phase separating vessel are in the region of the phase diagram between the fluid-liquid phase boundary (bindoal boundary) and the spindoal boundary as illustrated by the cross-hatched area in FIG. 29. In the preferred embodiments of the current invention, the polymer concentration in the polymerization medium is always higher than the critical concentration described above (and conceptually illustrated in FIG. 28) and thus these embodiments utilize the process of spindoal decomposition to avoid gravity settling problems. In one embodiment of the spinodal decomposition process for polymerization systems described in WO2004/026921, the rate of pressure reduction across the pressure reducing device (letdown valve) is 1 MPa/sec or more, or 2 Mpa/sec or more, or 4 MPa/sec or more, or 6 MPa/sec or more.

Phase Separation Pressure:

In all embodiments of the current invention, the pressure downstream of the pressure reducing device (letdown valve) and inside the fluid-liquid phase separation vessel (HPS) is selected to be below the cloud point pressure to ensure that a fluid-liquid phase separation will take place, but high enough to be above the vapor pressure of the monomer-rich phase to prevent full or partial vaporization of the monomer-rich phase. In preferred embodiments, to induce rapid phase separation and settling, the pressure in the fluid-liquid phase separation vessel (HPS) is lower than the spinodal boundary pressure. Within this preferred pressure range, ie. below the spinodal boundary pressure and above the vapor pressure of the monomer-rich phase, an operating pressure can be chosen that will prove to be most economical. Higher pressures reduce the cost of pumping or compression of the monomer-rich phase for recycle, but higher pressures also reduce the rate of phase disengagement and result in higher density of the monomer-rich phase, which reduces the density difference between polymer-rich and monomer-rich phases, thereby slowing the rate of settling in the fluid-liquid phase separation vessel (HPS), and ultimately requiring a larger HPS vessel. Thus, at some experimentally determined pressure within the preferred pressure range, the lowest total cost of pumping/compression and HPS vessel size will be achieved. In one embodiment of the invention, the pressure downstream of the pressure reducing device (letdown valve) and inside the fluid-liquid phase separation vessel (HPS) is below the spinodal boundary pressure, or at least 1 MPa lower than the spinodal boundary pressure, or at least 5 MPa lower than the spinodal boundary pressure, or at least 10 MPa lower than the spinodal boundary pressure. In one embodiment, the pressure is no lower than the vapor pressure of monomer-rich phase, no lower than 0.2 MPa above, no lower than 1 MPa above, or no lower than 10 MPa above the vapor pressure of the monomer-rich phase. In another embodiment, the difference in density between the polymer-rich phase and the monomer-rich phase is 0.1 g/mL, or 0.2 g/mL, or 0.4 g/mL, or 0.6 g/mL. In another embodiment, the pressure is between 2 and 40 MPa, 5 and 30 MPa, 7 and 20 MPa, or between 10 and 18 MPa.

Polymer Recovery:

The polymer-rich phase may be sent directly to a coupled devolatilization system, which may be comprised of one or more flash vessels, low pressure separators (LPS), in series, each operating at a successively lower pressure, and said devolatization system may include as a final step a devolatizing extruder or other devolatizing devices such as a LIST DTB, which may be obtained from LIST USA Inc., of Charlotte, N.C. The low pressure separator vessel(s) may operate adiabatically, or optionally may have internal heaters of the thin film or falling strand type. This devolatilization is a separation process to separate remaining volatiles from the final polymer, without resorting to older, inefficient processes such as steam stripping. The final devolatizing device (extruder, LIST DTB, etc.) may operate under a strong vacuum, and may optionally use stripping agents such as water or nitrogen, to further reduce the volatiles content of the polymer. Once devolatized, the product exits the final devolatizing step and is then transferred on for further processing, such as pelletization and packaging.

Efficient and Economical Recycle of Monomer-Rich Phase:

In preferred embodiments of the invention, the monomer-rich phase is recycled to the polymerization system with minimal processing to avoid costly investment in recycle equipment, and also to avoid consumption of costly utilities including heating media (steam, hot oil, electricity, etc.) and cooling media (cooling water, brine, cooling air, etc.). In embodiments where the temperature of the monomer-rich phase in the fluid-liquid separation vessel (HPS) is higher than the polymerization system feed temperature, some cooling of the monomer-rich phase will be required. If removal of water or other polar contaminants is not required to maintain an economical catalyst productivity in the polymerization system, then cooling of the monomer-rich recycle stream to the polymerization system feed temperature may be all that is required. One embodiment of this type involves cooling the monomer-rich recycle stream to −40 to 100° C., or −20 to 90° C., or 0 to 90° C., or 20 to 90° C., or 50 to 90° C. Where removal of water or polar contaminants is required to maintain an economical catalyst productivity in the polymerization system, then drying over desiccant beds may be used, and the monomer-rich recycle stream must be a cooled to the lower of the polymerization feed temperature or the temperature where the desiccant has an acceptable capacity for removing water and/or other polar impurities (eg. catalyst poisons). In this case where desiccant drying is required, one embodiment involves cooling the monomer-rich recycle stream to −40 to 80° C., or −20 to 60° C., or 0 to 40° C., or 20 to 40° C. When cooling the monomer-rich recycle stream, low or very low molecular weight polymer present in the monomer-rich stream may precipitate as solids, which may optionally be removed through filters, "knock-out" pots, etc. or left in the return stream depending upon product requirements and the steady-state concentration of the low molecular weight polymer fraction in the product.

Heat Integration:

In embodiments of the invention where heating of the polymerization medium and cooling of the monomer-rich recycle stream are both required, it is often advantageous to install a heat integrating exchanger, which will be defined as any device that exchanges heat between the monomer-rich phase leaving the fluid-liquid separator and the polymerization medium upstream of the pressure reducing device. This exchange of heat simultaneously heats the polymerization medium and cools the monomer-rich recycle stream. In embodiments where this exchange of heat is insufficient to raise the polymerization medium to its desired temperature and/or to cool the monomer-rich recycle stream to its desired temperature, supplemental heating and cooling systems may be employed in conjunction with the heat integrating exchanger. In such embodiments, preferred heating media for the polymerization medium include, but are not restricted to, steam, hot oil systems, and electric heater systems. Preferred supplemental cooling media for the monomer-rich recycle stream include, but are not restricted to, fresh water cooling systems, salt water cooling systems, air-cooled exchangers, and the like.

Application to Two-Phase Polymerization System:

In another embodiment of the invention, the polymerization system of WO2004/026921 is operated at a pressure below the cloud point pressure, with the two phase (fluid-liquid) polymerization medium transported directly to a gravimetric separation vessel, optionally by way of a pressuring reducing device where the pressure may be further lowered if desired to enhance phase separation of the polymer-rich and monomer-rich phases. In this embodiment, the monomer-rich phase is recycled to the polymerization system in the same manner as described for a polymerization system operating above the cloud point pressure. Other aspects of the current invention, including spinodal decomposition, supplemental cooling of the monomer-rich recycle stream, desiccant drying of the monomer-rich recycle stream, removal of low molecular weight polymer that precipitates from the monomer-rich recycle stream, hydrogen removal, and catalyst killing may also be employed in this embodiment.

Hydrogen Removal from Monomer-Rich Recycle Stream:

Many of the catalyst systems of the polymerization system of WO2004/026921, and thus of the current invention, produce small amounts of hydrogen as a byproduct of the polymerization reaction. Additionally, hydrogen is disclosed as one of the possible reactor feeds for this polymerization process. For these two reasons, in all embodiments of the polymerization process where the hydrogen is not totally consumed in the polymerization process, there will be small amounts of hydrogen in the polymerization medium, and most of this hydrogen will remain in the monomer-rich phase leaving the fluid-liquid phase separation vessel (HPS). In one embodiment, this amount of hydrogen in the monomer-rich recycle stream is less than the amount of hydrogen added to the combined feed stream to the polymerization process, and in this embodiment, the fresh makeup of hydrogen to the polymerization process feed can be reduced to compensate for this recycled hydrogen, and no further processing of the monomer-rich recycle stream to remove hydrogen is required. In another embodiment, the amount of hydrogen in the monomer-rich recycle stream is greater than the total amount of hydrogen desired in the combined feed stream to the polymerization process, and in this embodiment, an additional treatment step may be added to the process for recycling the monomer-rich phase. This additional treatment step may comprise, but is not restricted to, single or multiple stage flash vessels, fractionation towers, or hydrogenation beds. Treatment for removal of hydrogen may be applied to the entire monomer-rich recycle stream, or in instances where the hydrogen removal requirements permit, to only a portion, or slip-stream of the monomer-rich recycle stream.

Catalyst Killing:

The use of the processes disclosed herein and the relatively low pressure in the separator vessel greatly reduces the monomer concentration in the liquid polymer-rich phase, which, in turn, results in a much lower polymerization rate. This polymerization rate may be low enough to operate this system without adding a catalyst poison or "killer". If no killing compounds are added then the killer removal step may be eliminated.

If a catalyst killer is required, then provision must be made to remove any potential catalyst poisons from the recycled monomer-rich stream (e.g. by the use of fixed bed adsorbents or by scavenging with an aluminum alkyl). The catalyst activity may be killed by addition of a polar species. Non-limiting exemplary catalyst killing agents include water, alcohols (such as methanol and ethanol), sodium/calcium stearate, CO, and combinations thereof. The choice and quantity of killing agent will depend on the requirements for clean up of the recycle propylene and comonomers as well as the product properties, if the killing agent has low volatility. The catalyst killing agent may be introduced into the polymer blend and plasticizer blend component reactor effluent stream after the pressure letdown valve, but before the HPS. The choice and quantity of killing agent may depend on the requirements for clean up of the recycle propylene and comonomers as well as the product properties, if the killing agent has low volatility.

Base Polymer Blending Components:

The base polymer and plasticizer blending components produced by the in-line blending processes disclosed herein may have any type of chain architecture, including, but not limited to, block, linear, radial, star, branched, hyper-branched, dendritic, and combinations thereof. Exemplary base polymers include, high density polyethylene (HDPE), low density polyethylene (LDPE), linear low density polyethylene (LLDPE), very low density polyethylene (vLDPE), isotactic polypropylene (iPP), syndiotactic polypropylene (sPP), ethylene-propylene random copolymers typically containing less than 10 wt % ethylene (RCPs), ethylene-propylene plastomers typically containing 65-85 wt % ethylene, ethylene-propylene elastomers typically containing 10-20 wt % ethylene, impact copolymers of ethylene and propylene (ICPs), ethylene-propylene rubbers (EPRs), ethylene-propylene-diene terpolymers (EPDs), ethylene-propylene-butene-1 (EPB) terpolymers, olefin block copolymers, poly (1-butene), styrenic block copolymers, butyl, halobutyl, thermoplastic vulcanizers, and blends thereof. Advantageously, the base polymer comprises isotactic polypropylene or ethylene-propylene random copolymers.

Some forms produce polypropylene and copolymers of polypropylene with a unique microstructure. The processes disclosed herein can be practiced such that novel isotactic and syndiotactic compositions are made. In other forms, low crystallinity polymers are made.

In other forms, the copolymer includes from 90 to 99.999 weight % of propylene units, from 0.000 to 8 weight % of olefin units other than propylene units and from 0.001 to 2 weight % α,ω-diene units. Copolymer forms may have weight-average molecular weights from 20,000 to 2,000,000, crystallization temperatures (without the addition of external nucleating agents) from 115° C. to 135° C. and melt flow rates (MFRs) from 0.1 dg/min to 100 g/10 min. The accompanying olefin may be any of $C_2$-$C_{20}$ α-olefins, diolefins (with one internal olefin) and their mixtures thereof. More specifically, olefins include ethylene, butene-1, pentene-1, hexene-1, heptene-1,4-methyl-1-pentene, 3-methyl-1-pentene, 4-methyl-1-hexene, 5-methyl-1-hexene, 1-octene, 1-decene, 1-undecene, and 1-dodecene.

Plasticizer copolymers of propylene made under supercritical conditions include ethylene and $C_4$-$C_{12}$ comonomers such as butene-1,3-methylpentene-1, hexene-1,4-methylpentene-1, and octene-1. The in-line blending processes disclosed herein can prepare these copolymers without the use of solvent or in an environment with low solvent concentration.

Propylene-based polymers produced typically comprise 0 to 60 weight % of a comonomer, or 1 to 50 weight %, or 2 to 40 weight %, or 4 to 30 weight %, or 5 to 25 weight %, or 5 to 20 weight %, and have one or more of:

1. a heat of fusion, $\Delta H_f$, of 30 J/g or more, or 50 J/g or more, or 60 or more, or 70 or more, or 80 or more, or 90 or more, or 95 or more, or 100 or more, or 105 or more or an $\Delta H_f$ of 30 J/g or less, or 20 J/g or 0;
2. a weight-averaged molecular weight (as measured by GPC DRI) of 20,000 or more, or 30,000 to 1,000,000, or 50,000 to 500,000, or 50,000 to 400,000;
3. a melt flow rate of 0.1 g/10 min or more, or 0.5 g/10 min or more, or 1.0 g/10 min or more, or between 0.1 and 10,000 g/10 min;
4. a melting peak temperature of 55° C. or more, or 75° C. or more, or 100° C. or more, or 125° C. or more, or 150° C. or more, between 145 and 165° C.;
5. an $M_w/M_n$ (as measured by GPC DRI) of about 1.5 to 20, or about 1.5 to 10, or 1.8 to 4.

In another form, the polymer blend components produced by the in-line blending processes disclosed herein have a melt viscosity of less than 10,000 centipoises at 180° C. as measured on a Brookfield viscometer, or between 1000 to 3000 cP for some forms (such as packaging and adhesives) or between 5000 and 10,000 cP for other applications.

Plasticizer Blending Components:

The plasticizer blend component is any compound which improves particular properties of the in-line produced plasticized polymer blend directed towards softness, impact strength (e.g., Gardner impact), toughness, flexibility (e.g., lower flexural modulus), and or processability (e.g., higher melt flow) and the like. In certain embodiments, the plasticizer blend component has a lower glass transition temperature (Tg) than the base polymer, such that the Tg of the plasticized polymer blend is lower than the Tg of the base polymer. In other embodiments, the plasticizer has a lower crystallinity than the base polymer, such that the total crystallinity of the plasticized polymer blend is lower than the crystallinity of the base polymer. Advantageous plasticizers are characterized in that, when blended with the base polymer to form a blend, the plasticizer and the polymer form a homogeneous composition, also referred to as a homogeneous blend. Advantageously, the plasticizer is miscible with the one or more polymers, as indicated by no change in the number of peaks in the Dynamic Mechanical Thermal Analysis trace (DMTA), as compared to the DMTA trace of the one or more polymers in the absence of the plasticizer.

It should be understood that any plasticizer component conducive to in-line production and in-line blending may also be produced off-line and then blended in-line. However, plasticizer components that are not conducive to in-line production, advantageously are produced off-line and then are blended in-line.

I. In-Line-Produced In-Line Blended Plasticizers

Advantageous plasticized polymer blends are composed of a blend of one or more high molecular weight base polymer blend components and one or more plasticizer blend components. One or more the plasticizer blend components for the in-line blending process may be produced (formed, reacted) in-line, i.e., in a one or more reactor trains parallel to the one or more reactor trains that polymerize the high molecular weight polymer components. The one or more plasticizers polymerized in-line are then subsequently in-line blended with the one or more high molecular weight polymer components. Non-limiting exemplary plasticizers for in-line reacting and blending with one or more high molecular weight polymers include polyolefin oligomers and soft polyolefins.

I.A. In-Line-Produced In-Line Blended Soft Polyolefin Plasticizers

The in-line produced plasticizer may comprise, or may consist essentially of one or more soft polyolefins acting as plasticizers that are either produced in-line, off-line or a combination thereof (i.e. one or more soft polyolefin produced in-line and one or more soft polyolefins produced in an off-line process, outside the process boundary of the disclosed processes). If produced off-line, the one or more soft polyolefins are in-line blended from one or more polymer/additive storage tanks with the plasticized polymer blend components of the in-line blending process disclosed herein. In an advantageous embodiment, the one or more soft polyolefins are reacted in-line and subsequently blended in-line with the one or more high molecular weight polyolefin components, which avoids the necessity for one or more separate polymer/additive storage tanks dedicated for soft polyolefins.

In one embodiment, the soft polyolefin plasticizers have a density of 0.88 g/mL or less, more preferably 0.87 g/mL or less, most preferably 0.86 g/mL or less. In another embodiment, the soft polyolefin plasticizers has a weight % crystallinity of 15% or less, preferably 10% or less, preferably 5% or less. In another embodiment, the soft polyolefin plasticizers comprise at least 50 mole % ethylene and has a weight % crystallinity of 15% or less, preferably 10% or less, preferably 5% or less. In yet another embodiment, the soft polyolefin comprises at least 50 mole % propylene and has a weight % crystallinity of 25% or less, preferably 20% or less, preferably 15% or less. Suitable ethylene copolymers have a weight-averaged molecular weight (Mw) of 0.5 to 10 kg/mol, a weight-/number-averaged molecular weight ratio (Mw/Mn) of 1.5 to 3.5, and a comonomer content of 20 to 70 mol %. Comonomers for the said ethylene copolymers are selected from $C_3$ to $C_{20}$ linear or branched alpha-olefins and diolefins. Specific examples of ethylene copolymers include, but are not limited to, ethylene-propylene, ethylene-butene, ethylene-hexene, and ethylene-octene copolymers. In one embodiment, the ethylene copolymer desirably has a Tg of from −80 to −30° C., or from −75 to −40° C., or from −70 to −45° C. In another embodiment, the ethylene copolymer has an ethylene crystallinity, as determined by DSC, of less than 10%, or less than 5%.

In one embodiment, the soft polyolefin plasticizer may comprise, or consist essentially of one or more ethylene-rich soft polyolefin. In another embodiment, the soft polyolefin plasticizer may comprise, or may consist essentially of one or more propylene-rich soft polyolefin. In another embodiment, the soft polyolefin plasticizer may comprise, or consist essentially of one or more butene-1-rich soft polyolefin.

I.B. In-Line-Produced In-Line Blended Polyolefin Oligomer Plasticizers

In one embodiment, the plasticizer may comprise, or may consist essentially of one or more polyolefin oligomers that are either produced in-line, off-line or a combination thereof (i.e. one or more type of polyolefin oligomer reacted in-line and one or more type of polyolefin oligomer reacted in an off-line process). If produced off-line, the one or more polyolefin oligomers are in-line blended from one or more additive storage tanks with the plasticized polymer blend components of the in-line blending process disclosed herein. In an advantageous embodiment, the one or more polyolefin oligomers are reacted in-line and subsequently blended in-line with the one or more base polyolefin components, which avoids the necessity for one or more separate additive storage tanks dedicated for the polyolefin oligomers.

In another embodiment, the polyolefin oligomers have a density of less than 0.90 g/cm$^3$, or less than 0.89 g/cm$^3$, or less than 0.88 g/cm$^3$, or less than 0.87 g/cm$^3$, or less than 0.86 g/cm$^3$.

In another embodiment, the polyolefin oligomers have a $H_f$ of less than 70 J/g, or less than 60 J/g, or less than 50 J/g, or less than 40 J/g, or less than 30 J/g, or less than 20 J/g, or less than 10 J/g, or less than 5 J/g, or the Hf can not be reliably measured.

I.B.1. In-Line-Produced In-Line Blended Ethylene-Based Polyolefin Oligomer Plasticizers The polyolefin oligomer plasticizer may comprise $C_{10}$ to $C_{2000}$, or $C_{15}$ to $C_{1500}$, or $C_{20}$ to $C_{1000}$, or $C_{30}$ to $C_{800}$, or $C_{35}$ to $C_{400}$, or $C_{40}$ to $C_{250}$ oligomers (dimers, trimers, etc.) manufactured by the catalytic polymerization of ethylene and optionally one or more $C_3$ to $C_{20}$ alpha-olefins. Ethylene-based polyolefin oligomers comprise greater than 50 wt % ethylene.

In one embodiment, the ethylene-based polyolefin oligomers comprise greater than 60 wt % ethylene, or greater than 70 wt % ethylene, or greater than 80 wt % ethylene, or greater than 90 wt % ethylene, or 100 wt % ethylene.

I.B.2. In-Line-Produced In-Line Blended Propylene-Based Polyolefin Oligomer Plasticizers The polyolefin oligomer plasticizer may comprise $C_{10}$ to $C_{2000}$, or $C_{15}$ to $C_{1500}$, or $C_{20}$ to $C_{1000}$, or $C_{30}$ to $C_{800}$, or $C_{35}$ to $C_{400}$, or $C_{40}$ to $C_{250}$ oligomers (dimers, trimers, etc.) manufactured by the catalytic polymerization of propylene and optionally one or more $C_5$ to $C_{20}$ alpha-olefins. Propylene-based polyolefin oligomers comprise greater than 50 wt % propylene.

In one embodiment, the propylene-based polyolefin oligomers comprise greater than 60 wt % propylene, or greater than 70 wt % propylene, or greater than 80 wt % propylene, or greater than 90 wt % propylene, or 100 wt % propylene.

I.B.3. In-Line-Produced In-Line Blended Butene-Based Polyolefin Oligomer Plasticizers The polyolefin oligomer plasticizer may comprise $C_{10}$ to $C_{2000}$, or $C_{15}$ to $C_{1500}$, or $C_{20}$ to $C_{1000}$, or $C_{30}$ to $C_{800}$, or $C_{35}$ to $C_{400}$, or $C_{40}$ to $C_{250}$ oligomers (dimers, trimers, etc.) manufactured by the catalytic polymerization of butene olefins, including 1-butene, 2-butene, and isobutylene, and optionally one or more olefins selected from $C_5$ to $C_{20}$ alpha-olefins.

In one embodiment, the polyolefin oligomer comprises a "polybutenes" liquid, which comprises oligomers of $C_4$ olefins (including 1-butene, 2-butene, isobutylene, and butadiene, and mixtures thereof) and up to 10 wt % other olefins, and most often comprises primarily isobutylene and 1-butene. As used herein, the term "polybutenes" also includes homopolymer oligomers of isobutylene or 1-butene, copolymer oligomers of a $C_4$ raffinate stream, and copolymer oligomers of $C_4$ olefins with a minority amount of ethylene and/or propylene and/or $C_5$ olefins. Polybutenes are described in, for example, SYNTHETIC LUBRICANTS AND HIGH-PERFORMANCE FLUIDS, L. R. Rudnick & R. L. Shubkin, eds., Marcel Dekker, 1999, p. 357-392.

Preferred polybutenes include those in which isobutylene derived units comprise 40 to 100 wt % (preferably 40 to 99 wt %, preferably 40 to 96 wt %) of the polymer; and/or the 1-butene derived units comprise 0 to 40 wt % (preferably 2 to 40 wt %) of the copolymer; and/or the 2-butene derived units comprise 0 to 40 wt % (preferably 0 to 30 wt %, preferably 2 to 20 wt %) of the polymer.

Suitable polybutenes may have a kinematic viscosity at 100° C. of 3 to 50,000 cSt (more commonly 5 to 3000 cSt), a pour point of −60 to 10° C. (more commonly −40 to 0° C.), and a number-average molecular weight of 300 to 10,000 g/mol (more commonly 500 to 2,000 g/mol).

Desirable polybutenes liquids are commercially available from a variety of sources including Innovene (Indopol™ grades) and Infineum (C-Series grades). When the $C_4$ olefin is exclusively isobutylene, the material is referred to as "polyisobutylene" or PIB. Commercial sources of PIB include Texas Petrochemical (TPC Enhanced PIB grades). When the $C_4$ olefin is exclusively 1-butene, the material is referred to as "poly-n-butene" or PNB. Properties of some polybutenes liquids made from $C_4$ olefin(s) are summarized in the table below.

| Commercial Examples of Oligomers of $C_4$ olefin(s) | | | | |
|---|---|---|---|---|
| Grade | KV @ 100° C., cSt | VI | Pour Point, ° C. | Specific gravity | Flash Point, ° C. |
| TPC 137 (PIB) | 6 | 132 | −51 | 0.843 | 120 |
| TPC 1105 (PIB) | 220 | 145 | −6 | 0.893 | 200 |
| TPC 1160 (PIB) | 660 | 190 | +3 | 0.903 | 230 |
| Innovene Indopol H-25 | 52 | 87 | −23 | 0.869 | ~150 |
| Innovene Indopol H-50 | 108 | 90 | −13 | 0.884 | ~190 |
| Innovene Indopol H-100 | 218 | 121 | −7 | 0.893 | ~210 |
| Infineum C9945 | 11 | 74* | −34 | 0.854 | 170 |
| Infineum C9907 | 78 | 103* | −15 | 0.878 | 204 |
| Infineum C9995 | 230 | 131* | −7 | 0.888 | 212 |
| Infineum C9913 | 630 | 174* | +10 | 0.888 | 240 |

*Estimated based on the kinematic viscosity at 100° C. and 38° C.

1.B.4. In-Line-Produced In-Line Blended Higher-Alphaolefin-Based Polyolefin Oligomer Plasticizers In one or more embodiments, the polyolefin oligomer plasticizer component comprises $C_{10}$ to $C_{2000}$, or $C_{15}$ to $C_{1500}$, or $C_{20}$ to $C_{1000}$, or $C_{30}$ to $C_{800}$, or $C_{35}$ to $C_{400}$, or $C_{40}$ to $C_{250}$ oligomers (dimers, trimers, etc.) manufactured by the catalytic polymerization of $C_5$— to $C_{20}$ alpha-olefins. Such polyolefin oligomers are "polyalphaolefin" or "PAO" fluids, or simply "PAO".

PAO fluids (or simply, PAOs) are described in, for example, U.S. Pat. Nos. 3,149,178; 4,827,064; 4,827,073; 5,171,908;

and 5,783,531 and in SYNTHETIC LUBRICANTS AND HIGH-PERFORMANCE FUNCTIONAL FLUIDS, Leslie R. Rudnick & Ronald L. Shubkin, ed. Marcel Dekker, Inc. 1999, p. 3-52. PAOs are high purity hydrocarbons, with a fully paraffinic structure and a high degree of branching. PAO liquids can be conveniently prepared by the oligomerization of alpha-olefins in the presence of a polymerization catalyst, including Lewis acid catalysts such as aluminum trichloride and polyolefin polymerization catalysts such as Ziegler-Natta catalysts, metallocene or other single-site catalysts, and chromium catalysts.

In one or more embodiments, the PAO comprises oligomers of $C_5$ to $C_{18}$, or $C_6$ to $C_{14}$, or $C_8$ to $C_{12}$ alpha-olefins. The use of linear alpha-olefins (LAOs) is advantageous and the use of $C_8$ to $C_{12}$, are particularly advantageous. Suitable LAOs include 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof.

In one or more embodiments, the PAO comprises oligomers of two or more $C_5$ to $C_{18}$ LAOs, to make 'bipolymer' or 'terpolymer' or higher-order copolymer combinations. An advantageous embodiment involves oligomerization of a mixture of LAOs selected from $C_6$ to $C_{18}$ LAOs with even carbon numbers. Another advantageous embodiment involves oligomerization of 1-octene, 1-decene, and 1-dodecene.

In one or more embodiments, the PAO comprises oligomers of a single alpha-olefin species having a carbon number of 5 to 24, or 6 to 18, or 8 to 12, or 10. Oligomers of a single alpha-olefin species having a carbon number of 10 are advantageous. In one or more embodiments, the NFP comprises oligomers of mixed alpha-olefins (i.e., two or more alpha-olefin species), each alpha-olefin having a carbon number of 5 to 24, or 6 to 18, or 8 to 12. In one or more embodiments, the PAO comprises oligomers of mixed alpha-olefins (i.e., involving two or more alpha-olefin species) where the weighted average carbon number for the alpha-olefin mixture is 6 to 14, or 8 to 12, or 9 to 11. Mixed alpha-olefins with weighted average carbon number for the alpha-olefin mixture of 8 to 12, or 9 to 11 are advantageous, and with weighted average carbon number for the alpha-olefin mixture of 9 to 11 are particularly advantageous.

In one or more embodiments, the PAO comprises oligomers of one or more alpha-olefin with repeat unit formulas of —[CHR—CH$_2$]— where R is a $C_3$ to $C_{18}$ saturated hydrocarbon branch. In one or more embodiments, R is constant for all oligomers. In one or more embodiments, there is a range of R substituents covering carbon numbers from 3 to 18. Advantageously, R is linear, i.e., R is (CH$_2$)$_n$CH$_3$, where n is 3 to 17, or 4 to 11, and or 5 to 9. Linear R groups with n of 4 to 11, and or 5 to 9 are advantageous, and with n of 5 to 9 are particularly advantageous. Optionally, R can contain one methyl or ethyl branch, i.e., R is (CH$_2$)$_m$[CH(CH$_3$)](CH$_2$)$_z$CH$_3$ or R is (CH$_2$)[CH(CH$_2$CH$_3$)](CH$_2$)$_y$CH$_3$, where (m+z) is 1 to 15, advantageously 1 to 9, or 3 to 7, and (x+y) is 1 to 14, advantageously 1 to 8, or 2 to 6. Advantageously m>z; m is 0 to 15, advantageously 2 to 15, or 3 to 12, more advantageously 4 to 9; and n is 0 to 10, advantageously 1 to 8, or 1 to 6, more advantageously 1 to 4. Advantageously x>y; x is 0 to 14, advantageously 1 to 14, or 2 to 11, more advantageously 3 to 8; and y is 0 to 10, advantageously 1 to 8, or 1 to 6, more advantageously 1 to 4. Advantageously, the repeat units are arranged in a head-to-tail fashion with minimal head-to-head connections.

The PAO can be atactic, isotactic, or syndiotactic. In one or more embodiments, the PAO has essentially the same population of meso and racemic diads, on average, making it atactic. In certain embodiments, the PAO has more than 50%, or more than 60%, or more than 70%, or more than 80%, advantageously more than 90% meso triads (i.e., [mm]) as determined by $^{13}$C-NMR. In other embodiments, the PAO has more than 50%, or more than 60%, or more than 70%, or more than 80%, advantageously more than 90% racemic triads (i.e., [rr]) as determined by $^{13}$C-NMR. In other embodiments, the ratio of meso to racemic diads, [m]/[r], as determined by $^{13}$C-NMR is between 0.9 and 1.1. In another embodiment, [m]/[r] is greater than 1.0 and [m]/[r] is less than 1.0 in yet another embodiment.

The PAO plasticizer can include one or more distinct PAO components. In one or more embodiments, the plasticizer is a blend of one or more PAOs with different compositions (e.g., when different alpha-olefin pools were used in two or more reactor trains of the in-line blending processes disclosed in U.S. Patent Application No. 60/876,193, filed on Dec. 20, 2006 to make the oligomers) and/or different physical properties (e.g., kinematic viscosity, pour point, and/or viscosity index).

In one or more embodiments, the PAO or blend of PAOs has a number-averaged molecular weight ($M_n$) of from 400 to 15,000 g/mol, advantageously 400 to 12,000 g/mol, or 500 to 10,000 g/mol, or 600 to 8,000 g/mol, more advantageously 800 to 6,000 g/mol, or 1,000 to 5,000 g/mol). In one or more embodiments, the PAO or blend of PAOs has a $M_n$ greater than 1,000 g/mol, or greater than 1,500 g/mol, advantageously greater than 2,000 g/mol, or greater than 2,500 g/mol).

In one or more embodiments, the PAO or blend of PAOs has a kinematic viscosity at 100° C. (KV100° C.) of 3 cSt or more, or 4 cSt or more, or 5 cSt or more, or 6 cSt or more, or 8 cSt or more, or 10 cSt or more, or 20 cSt or more, or 30 cSt or more, or 40 cSt or more, advantageously 100 or more, or 150 cSt or more. In one or more embodiments, the PAO has a KV100° C. of 3 to 3,000 cSt, or 4 to 1,000 cSt, advantageously 6 to 300 cSt, or 8 to 150 cSt, or 8 to 100 cSt, or 8 to 40 cSt). In one or more embodiments, the PAO or blend of PAOs has a KV100° C. of 10 to 1000 cSt, advantageously 10 to 300 cSt, or 10 to 100 cSt. In yet another embodiment, the PAO or blend of PAOs has a KV100° C. of 4 to 8 cSt. In yet another embodiment, the PAO or blend of PAOs has a KV100° C. of 25 to 300 cSt, advantageously 40 to 300 cSt, or 40 to 150 cSt. In one or more embodiments, the PAO or blend of PAOs has a KV100° C. of 100 to 300 cSt.

In one or more embodiments, the PAO or blend of PAOs has a Viscosity Index (VI) of 120 or more, advantageously 130 or more, or 140 or more, or 150 or more, or 170 or more, or 190 or more, or 200 or more, preferably 250 or more, or 300 or more. In one or more embodiments, the PAO or blend of PAOs has a VI of 120 to 350, advantageously 130 to 250.

In one or more embodiments, the PAO or blend of PAOs has a pour point of −10° C. or less, advantageously −20° C. or less, or −25° C. or less, or −30° C. or less, or −35° C. or less, or −40° C. or less, or −50° C. or less. In one or more embodiments, the PAO or blend of PAOs has a pour point of −15 to −70° C., advantageously −25 to −60° C.

In one or more embodiments, the PAO or blend of PAOs has a glass transition temperature ($T_g$) of −40° C. or less, advantageously −50° C. or less, or −60° C. or less, or −70° C. or less, or −80° C. or less. In one or more embodiments, the PAO or blend of PAOs has a glass transition temperature (Tg) measured by differential-thermal calorimetry of −50 to −120° C., advantageously −60 to −100° C., or −70 to −90° C.

In one or more embodiments, the PAO or blend of PAOs has a flash point of 200° C. or more, advantageously 210° C. or more, or 220° C. or more, or 230° C. or more, more advantageously between 240° C. and 290° C.

In one or more embodiments, the PAO or blend of PAOs has a specific gravity (15.6° C.) of 0.86 or less, advantageously 0.855 or less, or 0.85 or less, or 0.84 or less.

In one or more embodiments, the PAO or blend of PAOs has a molecular weight distribution as characterized by the ratio of the weight- and number-averaged molecular weights ($M_w/M_n$) of 2 or more, advantageously 2.5 or more, or 3 or more, or 4 or more, or 5 or more, or 6 or more, or 8 or more, or or more. In one or more embodiments, the PAO or blend of PAOs has a $M_w/M_n$ of 5 or less, advantageously 4 or less, or 3 or less and a KV100° C. of 10 cSt or more, advantageously 20 cSt or more, or 40 cSt or more, or 60 cSt or more.

Particularly advantageous PAOs and blends of PAOs are those having a) a flash point of 200° C. or more, advantageously 210° C. or more, or 220° C. or more, or 230° C. or more; and b) a pour point less than −20° C., advantageously less than −25° C., or less than −30° C., or less than −35° C. or less than −40° C.) and/or a KV100° C. of 10 cSt or more, advantageously 35 cSt or more, or 40 cSt or more, or 60 cSt or more.

Further advantageous PAOs or blends of PAOs have a KV100° C. of at least 3 cSt, advantageously at least 4 cSt, or at least 6 cSt, or at least 8 cSt, or at least 10 cSt; a VI of at least 120, advantageously at least 130, or at least 140, or at least 150; a pour point of −10° C. or less, advantageously −20° C. or less, or −30° C. or less, or −40° C. or less; and a specific gravity (15.6° C.) of 0.86 or less advantageously 0.855 or less, or 0.85 or less, or 0.84 or less.

Advantageous blends of PAOs include blends of two or more PAOs where the ratio of the highest KV100° C. to the lowest KV100° C. is at least 1.5, advantageously at least 2, or at least 3, or at least 5. In an additional embodiment, KV100° C. of the PAOs are less than 1000 cSt, advantageously less than 300 cSt, or less than 150 cSt, or less than 100 cSt, or less than 40 cSt, or less than 25 cSt, or less than 10 cSt, or less than 8 cSt.

Advantageous blends of PAO also include: blends of two or more PAOs where at least one PAO has a KV100° C. of 300 cSt or more and at least one PAO has a KV100° C. of less than 300 cSt, advantageously 150 cSt or less, or 100 cSt or less, or 40 cSt or less; blends of two or more PAOs where at least one PAO has a KV100° C. of 150 cSt or more and at least one PAO has a KV100° C. of less than 150 cSt, advantageously 100 cSt or less, or 40 cSt or less); blends of two or more PAOs where at least one PAO has a KV100° C. of 100 cSt or more and at least one PAO has a KV100° C. of less than 100 cSt, advantageously 40 cSt or less, or 25 cSt or less, or 10 cSt or less; blends of two or more PAOs where at least one PAO has a KV100° C. of 40 cSt or more and at least one PAO has a KV100° C. of less than 40 cSt, advantageously 25 cSt or less, or 10 cSt or less, or 8 cSt or less; blends of two or more PAOs where at least one PAO has a KV100° C. of 10 cSt or more and at least one PAO has a KV100° C. of less than 10 cSt, advantageously 8 cSt or less, or 6 cSt or less, or 4 cSt or less); blends of two or more PAOs where at least one PAO has a KV100° C. of 8 cSt or more and at least one PAO has a KV100° C. of less than 8 cSt, advantageously 6 cSt or less, or 4 cSt or less); and blends of two or more PAOs where at least one PAO has a KV100° C. of 6 cSt or more and at least one PAO has a KV100° C. of less than 6 cSt, advantageously 4 cSt or less).

Examples for PAO plasticizer components with desirable properties include commercial products, such as Spectra-Syn™ and SpectraSyn Ultra™ from ExxonMobil Chemical (USA), some of which are summarized in Table A. Other useful PAOs include those available as Synfluid™ from ChevronPhillips Chemical (USA), as Durasyn™ from Ineos (UK), as Nexbase™ from Neste Oil (Finland), and as Synton™ from Chemtura (USA).

| Commercial Examples of PAOs | | | | | | |
|---|---|---|---|---|---|---|
| | KV 40° C., cSt | KV 100° C., cSt | VI | Pour Point, ° C. | Specific gravity | Flash Point, ° C. |
| SpectraSyn 4 | 19 | 4 | 126 | −66 | 0.820 | 220 |
| SpectraSyn Plus 4 | 17 | 4 | 126 | −60 | 0.820 | 228 |
| SpectraSyn 6 | 31 | 6 | 138 | −57 | 0.827 | 246 |
| SpectraSyn Plus 6 | 30 | 6 | 143 | −54 | 0.827 | 246 |
| SpectraSyn 8 | 48 | 8 | 139 | −48 | 0.833 | 260 |
| SpectraSyn 10 | 66 | 10 | 137 | −48 | 0.835 | 266 |
| SpectraSyn 40 | 396 | 39 | 147 | −36 | 0.850 | 281 |
| SpectraSyn 100 | 1240 | 100 | 170 | −30 | 0.853 | 283 |
| SpectraSyn Ultra 150 | 1,500 | 150 | 218 | −33 | 0.850 | >265 |
| SpectraSyn Ultra 300 | 3,100 | 300 | 241 | −27 | 0.852 | >265 |
| SpectraSyn Ultra 1000 | 10,000 | 1,000 | 307 | −18 | 0.855 | >265 |

The disclosed novel processes for making in-line plasticized polymers can make polymer blends with many different in-line produced and blended plasticizer components. These plasticizer components are made in one or more parallel reactor trains of the in-line polymer blending process disclosed in U.S. Patent Application No. 60/876,193 filed on Dec. 20, 2006. Some embodiments for making in-line plasticized polymers can make polymer blends comprising PAO plasticizer components.

II. Off-Line-Produced In-Line-Blended Plasticizers

The plasticizer component may comprise, or may consist essentially of one or more fluids and/or polymers that are produced off-line, but are in-line blended from one or more polymer/additive storage tanks with the plasticized polymer blend components of the in-line blending process disclosed herein. Suitable off-line-produced plasticizers are capable of being codissolved with the base polymer in the high-pressure separator and have a glass transition temperature (Tg) of −20 or less and at least one of the following: a Mw of 10 kg/mol or less, or a flexural modulus of 20 MPa or less. Non-limiting exemplary plasticizers conducive to in-line blending include paraffin oils and waxes (e.g., isoparaffins or n-paraffins), mineral oils, vegetable or other bio-derived oils, and other synthetic or natural oils such as described in SYNTHETICS, MINERAL OILS, AND BIO-BASED LUBRICANTS: CHEMISTRY AND TECHNOLOGY, L. S. Rudnick, Ed., CRC Press, 2006. Particularly preferred plasticizers include isoparaffins, process oils, high purity hydrocarbon fluids derived from a so-called Gas-To-Liquids processes, and Group III lubricant basestocks.

II.A. Off-Line-Produced In-Line-Blended Paraffins

The off-line produced plasticizer may comprise, or may consist essentially of one or more $C_6$ to $C_{200}$ paraffins. In one embodiment, the paraffin plasticizer may comprise $C_6$ to $C_{100}$ paraffins, or $C_6$ to $C_{200}$ paraffins, or $C_8$ to $C_{100}$ paraffins. In yet another embodiment, the paraffin plasticizer may comprise $C_{20}$ to $C_{1500}$ paraffins, or $C_{20}$ to $C_{500}$ paraffins, or $C_{30}$ to $C_{400}$ paraffins, or $C_{40}$ to $C_{250}$ paraffins.

In another embodiment, an paraffin plasticizer may comprise, or may consist essentially of one or more linear or normal paraffins (n-paraffins). Advantageous paraffin plasticizers comprise at least 50 weight %, or at least 60 wt %, or at least 70 wt %, or at least 80 wt %, or at least 90 wt %, or at least 95 wt % or essentially 100 wt % of $C_5$ to $C_{25}$ n-paraffins, or $C_5$ to $C_{20}$ n-paraffins, or $C_5$ to $C_{15}$ n-paraffins. Advantageous n-paraffins may also comprise less than 0.1 wt %, or less than 0.01 wt % aromatics.

In another embodiment, an paraffin plasticizer may comprise, or may consist essentially of one or more branched paraffins (isoparaffins). Advantageous paraffin plasticizers comprise at least 50 wt %, or at least 60 wt at least 70 wt %, or at least 80 wt %, or at least 90 wt %, or at least 95 wt % or essentially 100 wt % of $C_6$ to $C_{150}$ isoparaffins. The paraffin plasticizer may also comprise $C_6$ to $C_{100}$ isoparaffins, or $C_6$ to $C_{25}$ isoparaffins, or $C_8$ to $C_{20}$ isoparaffins. Advantageous isoparaffins may have: a density of 0.70 to 0.83 g/mL; and/or a pour point of −40° C. or less, or −50° C. or less; and/or a viscosity at 25° C. of 0.5 to 20 cSt; and/or a weight-averaged molecular weight (Mw) of 100 to 300 g/mol.

The isoparaffins may include greater than 50 wt % (by total weight of the isoparaffin) mono-methyl species, for example, 2-methyl, 3-methyl, 4-ethyl, 5-methyl or the like, with minimum formation of branches with substituent groups of carbon number greater than 1, (e.g., ethyl, propyl, butyl and the like). In one embodiment, the isoparaffin includes greater than 70 wt % mono-methyl species, based on the total weight of the isoparaffin present. Advantageously, the isoparaffin has a boiling point of from 100° C. to 350° C., or 110° C. to 320° C. In preparing different grades of isoparaffin, a paraffinic mixture may be fractionated into cuts having narrow boiling ranges, for example, of about 35° C.

Suitable isoparaffins are commercially available under the tradename ISOPAR (ExxonMobil Chemical Company, Houston Tex.), and are described in, for example, U.S. Pat. No. 6,197,285 (column 5, lines 1-18), U.S. Pat. Nos. 3,818, 105 and 3,439,088, and sold commercially as ISOPAR series of isoparaffins, examples of which are summarized in the table below.

| Commercial Examples of Isoparaffins | | | | | |
|---|---|---|---|---|---|
| Name | Distillation range (° C.) | Pour point (° C.) | Avg. Specific Gravity | KV 25° C. (cSt) | Saturates & aromatics (wt %) |
| ISOPAR E | 117-136 | −63 | 0.72 | 0.85 | <0.01 |
| ISOPAR G | 161-176 | −57 | 0.75 | 1.46 | <0.01 |
| ISOPAR H | 178-188 | −63 | 0.76 | 1.8 | <0.01 |
| ISOPAR K | 179-196 | −60 | 0.76 | 1.85 | <0.01 |
| ISOPAR L | 188-207 | −57 | 0.77 | 1.99 | <0.01 |
| ISOPAR M | 223-254 | −57 | 0.79 | 3.8 | <0.01 |
| ISOPAR V | 272-311 | −63 | 0.82 | 14.8 | <0.01 |

II.B. Off-Line-Produced In-Line-Blended Mineral and Process Oils

The off-line produced plasticizer may comprise, or may consist essentially of one or more mineral oils (also called process oils).

Characteristics of some commercially available mineral oils used as process oils are listed in the table below. Such fluids typically have a viscosity index less than 110, and many have a viscosity index of 100 or less. Advantageously, the mineral oil plasticizer has a kinematic viscosity at 40° C. of 80 cSt or more and a pour point of −15° C.

| Commercial Examples of Process Oils | | | | | |
|---|---|---|---|---|---|
| | KV @ 40° C. cSt | KV @ 100° C. cSt | VI | Pour Point ° C. | Specific gravity | Flash Point ° C. |
| Drakeol 34[1] | 76 | 9 | 99 | −12 | 0.872 | 254 |
| Paralux 1001R[2] | 20 | 4 | 99 | −17 | 0.849 | 212 |
| Paralux 2401R[2] | 43 | 6 | 101 | −12 | 0.866 | 234 |
| Paralux 6001R[2] | 118 | 12 | 102 | −21 | 0.875 | 274 |
| Sunpar 120[3] | 41 | 6 | 106 | −15 | 0.872 | 228 |
| Sunpar 150[3] | 94 | 11 | 97 | −12 | 0.881 | 245 |
| Sunpar 2280[3] | 475 | 31 | 95 | −9 | 0.899 | 305 |
| Plastol 135[4] | 24 | 5 | 104 | −9 | 0.865 | 210 |
| Plastol 537[4] | 103 | 11 | 97 | −3 | 0.880 | 240 |
| Plastol 2105[4] | 380 | 30 | 110 | −15 | 0.885 | 270 |
| Flexon 843[4] | 30 | 5 | 91 | −12 | 0.869 | 218 |
| Flexon 865[4] | 106 | 11 | 93 | −3 | 0.879 | 252 |
| Flexon 815[4] | 457 | 32 | 101 | −9 | 0.895 | 310 |
| Shellflex 210[5] | 19 | 4 | 95 | −18 | 0.860 | 216 |
| Shellflex 330[5] | 70 | 9 | 95 | −10 | 0.875 | 256 |
| Shellflex 810[5] | 501 | 33 | 95 | −9 | 0.896 | 324 |
| Diana PW32[6] | 31 | 5 | 104 | −18 | 0.862 | 226 |
| Diana PW90[6] | 90 | 11 | 105 | −22 | 0.872 | 262 |
| Diana PW380[6] | 376 | 26 | 106 | −19 | 0.877 | 293 |

[1]Available from Penreco (USA).
[2]Available from Chevron (USA).
[3]Available from Sunoco (USA).
[4]Available from ExxonMobil (USA).
[5]Available from Royal Dutch Shell (UK/Netherlands).
[6]Available from Idemitsu (Japan).

In certain embodiments, the mineral oil plasticizer has a viscosity index less than 120 (preferably 90 to 119); and a kinematic viscosity at 40° C. of 80 cSt or more (preferably 90 cSt or more, or 100 cSt or more, or 120 cSt or more, or 150 cSt or more, or 200 cSt or more, or 250 cSt or more, or 300 cSt or more); and a pour point of 15° C. or less (preferably 18° C. or less, or 20° C. or less, or 25° C. or less, or 30° C. or less, or 35° C. or less).

In other embodiments, the mineral oil plasticizer comprises one or more Group I or II lubricant basestocks. Group I basestocks are mineral oils that may have been refined using solvent extraction of aromatics, solvent dewaxing, and hydrofining; they may have sulfur levels greater than 0.03 weight %, saturates levels of 60 to 80%, and a VI of about 90. Group II basestocks are mineral oils that have been mildly hydrocracked with conventional solvent extraction of aromatics, solvent dewaxing, and more severe hydrofining to reduce sulfur levels to less than or equal to 0.03 weight %, as well as removing double bonds from some of the olefinic and aromatic compounds such that saturate levels are greater than 95-98%; they have a VI of about 80-120.

II.C. Off-Line-Produced In-Line-Blended High-Purity Hydrocarbon Fluids

The off-line produced plasticizer may comprise, or may consist essentially of one or more "high purity" hydrocarbon fluids.

In one embodiment, the "high purity" hydrocarbon fluids comprise one or more paraffins having 6 to 1500 carbon atoms, or 8 to 1000 carbon atoms, or 10 to 500 carbon atoms, or 12 to about 200 carbon atoms, or 14 to 150 carbon atoms, or 16 to 100 carbon atoms, or 20 to 500 carbon atoms, or 30 to 400 carbon atoms, or 40 to 200 carbon atoms, or 20 to 100 carbon atoms. The high purity hydrocarbon fluid composition may have an isoparaffin:n-paraffin ratio of about 0.5:1 to about 9:1, or about 1:1 to about 4:1. The isoparaffins of the "high purity" hydrocarbon fluid composition may contain greater than fifty percent mono-methyl species, e.g., 2-methyl, 3-methyl, 4-methyl, ≧5-methyl or the like, with minimum formation of branches with substituent groups of carbon number greater than one, i.e., ethyl, propyl, butyl or the like, based on the total weight of isoparaffins in the mixture. Advantageously, the isoparaffins of the "high purity" hydrocarbon fluid composition contain greater than 70 percent of the mono-methyl species, based on the total weight of the composition.

An advantageous high purity hydrocarbon fluid may have: a KV at 25° C. of 1 to 100,000 cSt, or 10 cSt to 2000 cSt; and/or a KV at 40° C. of 1 to 30,000 cSt, or 10 cSt to 2000 cSt; and/or a pour point below −10° C., or below −20° C., or below −30° C., or from about −20° C. to about −70° C. In an advantageous embodiment, a high purity hydrocarbon fluid may comprise paraffins having: a number average molecular weight of 500 to 21,000 g/mol; and/or less than 10% side chains having 4 or more carbons, or less than 8 weight %, or less than 5 weight %, or less than 3 weight %, or less than 2 weight %, or less than 1 weight %, or less than 0.5 weight %, or less than 0.1 weight %, or at less than 0.1 weight %, or at 0.001 weight %; and/or at least 1 or 2 carbon branches present at 15 weight % or more, or 20 weight % or more, or 25 weight % or more, or 30 weight % or more, or 35 weight % or more, or 40 weight % or more, or 45 weight % or more, or 50 weight % or more; and/or less than 2.5 weight % cyclic paraffins, or less than 2 weight %, or less than 1 weight %, or less than 0.5 weight %, or less than 0.1 weight %, or at less than 0.1 weight %, or at 0.001 weight %.

In another advantageous embodiment, a high purity hydrocarbon fluid may comprise paraffins having: a KV of 2 cSt or more at 100° C.; and/or a viscosity index of 120 or more, or 130 or more, or 140 or more, or 150 or more, or 170 or more, or 190 or more, or 200 or more, or 250 or more, or 300 or more; and/or a mixture of paraffins of carbon number ranging from about $C_8$ to $C_{20}$, or from about $C_8$ to $C_{500}$; and/or a molar ratio of isoparaffins to n-paraffins of about 0.5:1 to about 9:1; and/or greater than 50 percent of mono-methyl species, based on the total weight of the isoparaffins; and/or a pour point of about −20° F. to about −70° F., or −10 to −70° C.; and/or a kinematic viscosity at 25° C. of about 1 cSt to about 10 cSt; and/or a kinematic viscosity at 100° C. of about 3 to about 25 cSt; and/or a carbon number of $C_{10}$ to about $C_{16}$, or of about $C_{20}$ to about $C_{100}$; and/or greater than 70 percent mono-methyl species; and/or a boiling temperature of about 320° F. to about 650° F., or of about 350° F. to about 550° F.

In an advantageous embodiment, the high-purity hydrocarbon fluid comprises a mixture of paraffins having a carbon number of $C_{10}$ to about $C_{16}$, or of about $C_{20}$ to about $C_{100}$; contains greater than 70 percent mono-methyl species; has a boiling temperature of about 350° F. to about 550° F., and has a molar ratio of isoparaffins to n-paraffins of about 1:1 to about 4:1. The high purity hydrocarbon fluid may also be derived from a Fischer-Tropsch process followed by a wax isomerization process, such as those disclosed in U.S. Pat. No. 5,906,727.

In another embodiment, the off-line plasticizer is a high-purity hydrocarbon fluid of lubricating viscosity comprising a mixture of $C_{20}$ to $C_{120}$ paraffins, 50 wt % or more being isoparaffinic hydrocarbons and less than 50 wt % being hydrocarbons that contain naphthenic and/or aromatic structures. Or, the mixture of paraffins comprises a wax isomerate lubricant base stock or oil, which includes:
1. hydroisomerized natural and refined waxes, such as slack waxes, deoiled waxes, normal alpha-olefin waxes, microcrystalline waxes, and waxy stocks derived from gas oils, fuels hydrocracker bottoms, hydrocarbon raffinates, hydrocracked hydrocarbons, lubricating oils, mineral oils, polyalphaolefins, or other linear or branched hydrocarbon compounds with carbon number of about 20 or more; and
2. hydroisomerized synthetic waxes, such as Fischer-Tropsch waxes (i.e., the high boiling point residues of Fischer-Tropsch synthesis, including waxy hydrocarbons); or mixtures thereof.

Particularly advantageous are lubricant base stocks or oils derived from hydrocarbons synthesized in a Fischer-Tropsch process as part of an overall Gas-to-Liquids (GTL) process.

In one embodiment, the mixture of paraffins useful as an off-line plasticizer has:
1. a naphthenic content of less than 40 wt %, or less than 30 wt %, or less than 20 wt %, or less than 15 wt %, or less than 10 wt %, or less than 5 wt %, or less than 2 wt %, or less than 1 wt % (based on the total weight of the hydrocarbon mixture); and/or
2. a normal paraffins content of less than 5 wt %, or less than 4 wt %, or less than 3 wt %, or less than 1 wt % (based on the total weight of the hydrocarbon mixture); and/or
3. an aromatic content of 1 wt % or less, or 0.5 wt % or less; and/or
4. a saturates level of 90 wt % or higher, or 95 wt % or higher, or 98 wt % or higher, or 99 wt % or higher; and/or
5. a branched paraffin:normal paraffin ratio greater than about 10:1, or greater than 20:1, or greater than 50:1, or greater than 100:1, or greater than 500:1, or greater than 1000:1; and/or
6. sidechains with 4 or more carbons making up less than 10% of all sidechains, or less than 5%, or less than 1%; and/or
7. sidechains with 1 or 2 carbons making up at least 50% of all sidechains, or at least 60%, or at least 70%, or at least 80%, or at least 90%, or at least 95%, or at least 98%; and/or
8. a sulfur content of 300 ppm or less, or 100 ppm or less, or 50 ppm or less, or ppm or less (where ppm is on a weight basis.

In another embodiment, the mixture of paraffins useful as an off-line plasticizer has:
1. a number-averaged molecular weight of 300 to 1800 g/mol, or 400 to 1500 g/mol, or 500 to 1200 g/mol, or 600 to 900 g/mol; and/or
2. a kinematic viscosity at 40° C. of 10 cSt or more, or 25 cSt or more, or between about 50 and 400 cSt; and/or
3. a kinematic viscosity at 100° C. ranging from 2 to 50 cSt, or 3 to 30 cSt, or 5 to 25 cSt, or 6 to 20 cSt, more or 8 to 16 cSt; and/or
4. a viscosity index (VI) of 80 or greater, or 100 or greater, or 120 or greater, or 130 or greater, or 140 or greater, or 150 or greater, or 160 or greater, or 180 or greater; and/or
5. a pour point of −5° C. or lower, or −10° C. or lower, or −15° C. or lower, or −20° C. or lower, or −25° C. or lower, or −30° C. or lower; and/or
6. a flash point of 200° C. or more, or 220° C. or more, or 240° C. or more, or 260° C. or more; and/or
7. a specific gravity (15.6° C./15.6° C.) of 0.86 or less, or 0.85 or less, or 0.84 or less.

In an advantageous embodiment, the off-line plastizier is a mixture of paraffins comprising a GTL base stock or oil. GTL base stocks and oils are fluids of lubricating viscosity that are generally derived from waxy synthesized hydrocarbons, that are themselves derived via one or more synthesis, combination, transformation, and/or rearrangement processes from gaseous carbon-containing compounds and hydrogen-containing compounds as feedstocks. Advantageously, the feedstock is "syngas" (synthesis gas, essentially CO and $H_2$) derived from a suitable source, such as natural gas and/or coal. GTL base stocks and oils include wax isomerates, comprising, for example, hydroisomerized synthesized waxes, hydroisomerized Fischer-Tropsch (F-T) waxes (including waxy hydrocarbons and possible analogous oxygenates), or mixtures thereof. GTL base stocks and oils may further comprise other hydroisomerized base stocks and base oils. Particularly advantageous GTL base stocks or oils are those comprising mostly hydroisomerized F-T waxes and/or other liquid hydrocarbons obtained by a F-T synthesis process. The production of lube base stocks by GTL is well known in the art. The in-line blending processes disclosed herein may use off-line-produced GTL base stocks from any one of the known GTL processes. Desirable GTL-derived fluids are expected to become broadly available from several commercial sources, including Chevron, ConocoPhillips, ExxonMobil, Sasol, SasolChevron, Shell, Statoil, and Syntroleum.

II.D. Off-Line-Produced In-Line-Blended Group III Lubricant Basestocks

The off-line produced plasticizer may comprise, or may consist essentially of one or more Group III lubricant basestock, which also herein includes mineral oils with a VI of 120 or more (a "Group III mineral oil").

In one embodiment, the Group III mineral oil plasticizer has a saturates levels of 90% or more, or 92% or more, or 94% or more, or 95% or more, or 98% or more; a sulfur content of less than 0.03%, or between 0.001 and 0.01%; and a VI of 120 or more, or 130 or more, or 140 or more. In another embodiment, the Group III mineral oil plasticizer has a kinematic viscosity at 100° C. of 3 to 50, or 4 to 40 cSt, or 6 to 30 cSt, or 8 to 20; and/or a Mn of 300 to 5,000 g/mol, or 400 to 2,000 g/mol, or 500 to 1,000 g/mol. In another embodiment, the Group III mineral oil plasticizer has a pour point of –10° C. or less, a flash point of 200° C. or more, and a specific gravity (15.6° C.) of 0.86 or less.

Desirable Group III basestocks are commercially available from a number of sources and include those described in the table below.

| Commercial Examples of Group III Basestocks | | | | |
|---|---|---|---|---|
| | KV @ 100° C., cSt | VI | Pour Point, ° C. | Specific gravity | Flash Point, ° C. |
| UCBO 4R[1] | 4.1 | 127 | −18 | 0.826 | 216 |
| UCBO 7R[1] | 7.0 | 135 | −18 | 0.839 | 250 |
| Nexbase 3043[2] | 4.3 | 124 | −18 | 0.831 | 224 |
| Nexbase 3050[2] | 5.1 | 126 | −15 | 0.835 | 240 |
| Nexbase 3060[2] | 6.0 | 128 | −15 | 0.838 | 240 |
| Nexbase 3080[2] | 8.0 | 128 | −15 | 0.843 | 260 |
| Yubase YU-4[3] | 4.2 | 122 | −15 | 0.843 | 230 |
| Yubase YU-6[3] | 6.5 | 131 | −15 | 0.842 | 240 |
| Yubase YU-8[3] | 7.6 | 128 | −12 | 0.850 | 260 |
| Ultra-S 4[4] | 4.3 | 123 | −20 | 0.836 | 220 |
| Ultra-S 6[4] | 5.6 | 128 | −20 | 0.839 | 234 |
| Ultra-S 8[4] | 7.2 | 127 | −15 | 0.847 | 256 |
| VHVI 4[5] | 4.6 | 128 | −21 | 0.826 | |
| VHVI 8[5] | 8.0 | 127 | −12 | 0.850 | 248 |
| Visom 4[6] | 4.0 | | | | 210 |
| Visom 6[6] | 6.6 | 148 | −18 | 0.836 | 250 |

[1]Available from ChevronTexaco (USA).
[2]Available from Neste Oil (Finland).
[3]Available from SK Corp (South Korea).
[4]Available from ConocoPhillips (USA)/S-Oil (South Korea).
[5]Available from PetroCanada (Canada).
[6]Available from ExxonMobil (USA).

II.E. Other Off-Line-Produced In-Line-Blended Plasticizers

The off-line produced in-line-blended plasticizers may also include any other compounds used for plasticizing polymers. These include phthalate esters, such as di-isononyl phthalate (DINP), di-isoctyl phthalate (DOP), trimellitites, citrates, etc. Examples for polymeric plasticizers can be found in J. K. Sears, J. R. Darby, THE TECHNOLOGY OF PLASTICIZERS, Wiley, New York, 1982.

III. Advantageous Properties for Liquid Plasticizers

Certain embodiments will use plasticizers that are liquids at ambient temperature. The advantageous properties for such liquid plasticizers can be defined as follows.

In an advantageous embodiment, any of the plasticizers described above has a flash point of 200° C. or more (or 220° C., or more, or 230° C. or more, or 250° C. or more). In a particularly advantageous embodiment any of the plasticizers described above has a flash point of 200° C. or more (or 220° C., or more, or 230° C. or more, or 250° C. or more) and a pour point of –20° C. or less (or less than –25° C., or less than –30° C., or less than –35° C., or less than –40° C.), and/or a kinematic viscosity at 100° C. of 35 cSt or more (or 40 cSt or more, or 50 cSt or more, or 60 cSt or more).

In another advantageous embodiment, any of the plasticizers described above has flash point of 200° C. or greater, or 220° C. or greater, or 200 to 350° C., or 210 to 300° C., or 215 to 290° C., or 220 to 280° C., or 240 to 280° C., wherein a desirable range may be any combination of any lower limit with any upper limit described herein.

In still another advantageous embodiment, any of the plasticizers described above has a pour point of –10° C. or less, or –20° C. or less, or –30° C. or less, or –40° C. or less, or –45° C. or less, or –50° C. or less, or –10 to –80° C., or –15 to –75° C. or –0 to –70° C., or –25 to –65° C., wherein a desirable range may be any combination of any lower limit with any upper limit described herein.

In still yet another advantageous embodiment, any of the plasticizers described above has a viscosity index (VI) of 100 or more, or 110 or more, or 120 or more, or 120 to 350, or 135 to 300, or 140 to 250, or 150 to 200, wherein a desirable range may be any combination of any lower limit with any upper limit described herein.

In still yet another advantageous embodiment, any of the plasticizers described above has a specific gravity of 0.86 or less, or 0.855 or less, or 0.84 or less, or 0.78 to 0.86, or 0.80 to 0.85, or 0.82 to 0.845, wherein a desirable range may be any combination of any lower limit with any upper limit described herein.

In still yet another advantageous embodiment, any of the plasticizers described above has a kinematic viscosity at 100° C. (KV100° C.) of 4 cSt or more, or 5 cSt or more, or 6 to 5000 cSt, or 8 to 3000 cSt, or 10 to 1000 cSt, or 12 to 500 cSt, or 15 to 350 cSt, or 35 cSt or more, or 40 cSt or more, wherein a desirable range may be any combination of any lower limit with any upper limit described herein.

In still yet another advantageous embodiment, any of the plasticizers described above has a number-averaged molecular weight (Mn) of 300 g/mol or more, or 500 g/mol or more, or 300 to 21,000 g/mol, or 300 to 10,000 g/mol, or 400 to 5,000 g/mol, or 500 to 3,000 g/mol, or less than 1,000 g/mol, wherein a desirable range may be any combination of any lower limit with any upper limit described herein.

In still yet another advantageous embodiment, any of the plasticizers described above has a specific gravity of 0.86 or less (or 0.855 or less, or 0.85 or less), and one or more of the following:
a) a VI of 120 or more (or 135 or more, or 140 or more), and/or
b) a flash point of 200° C. or more (or 220° C. or more, or 240° C. or more).

In still yet another advantageous embodiment, any of the plasticizers described above has a pour point of –10° C. or less (or –15° C. or less, or –20° C. or less, or –25° C. or less), a VI of 120 or more (or 135 or more, or 140 or more), and optionally a flash point of 200° C. or more (or 220° C. or more, or 240° C. or more).

In still yet another advantageous embodiment, any of the plasticizers described above has a pour point of −20° C. or less (or −25° C. or less, or −30° C. or less, or −40° C. or less) and one or more of the following:
a) a flash point of 200° C. or more (or 220° C. or more, or 240° C. or more), and/or
b) a VI of 120 or more (or 135 or more, or 140 or more), and/or
c) a KV100° C. of 4 cSt or more (or 6 cSt or more, or 8 cSt or more, or 10 cSt or more), and/or
d) a specific gravity of 0.86 or less (or 0.855 or less, or 0.85 or less).

In another advantageous embodiment, any of the plasticizers described above has a KV100° C. of 4 cSt or more (or 5 cSt or more, or 6 cSt or more, or 8 cSt or more, or 10 cSt or more), a specific gravity of 0.86 or less (or 0.855 or less, or 0.85 cSt or less), and a flash point of 200° C. or more (or 220° C. or more, or 240° C. or more).

In yet another advantageous embodiment, any of the plasticizers described above has a flash point of 200° C. or more (or 220° C. or more, or 240° C. or more), a pour point of 110° C. or less (or 15° C. or less, or 20° C. or less, or 25° C. or less), a specific gravity of 0.86 or less (or 0.855 or less, or 0.85 or less), a KV100° C. of 4 cSt or more (or 5 cSt or more, or 6 cSt or more, or 8 cSt or more, or 10 cSt or more), and optionally a VI of 100 or more (or 120 or more, or 135 or more).

In still yet another advantageous embodiment, any of the plasticizers described above has a KV100° C. of 35 cSt or more (or 40 or more) and a specific gravity of 0.86 or less (or 0.855 or less), and optionally one or more of the following:
a) a flash point of 200° C. or more (or 220° C. or more, or 240° C. or more), and/or
b) a pour point of 10° C. or less (or 15° C. or less, or 20° C. or less, or 25° C. or less).

In yet another advantageous embodiment, any of the plasticizers described above has a flash point of 200° C. or more (or 210° C. or more, or 220° C. or more), a pour point of 10° C. or less (or 20° C. or less, or 30° C. or less), and a KV100° C. of 6 cSt or more (or 8 cSt or more, or 10 cSt or more, or 15 cSt or more).

In still yet another advantageous embodiment, any of the plasticizers described above has a pour point of 40° C. or less (or 50° C. or less) and a specific gravity of 0.84 or less (or 0.83 or less).

It should be understood that sometimes even soft polyolefins need plasticizer to further soften them while the same soft polyolefins may serve as plasticizers, particularly with highly crystalline, hard polyolefins, such as, for example, ethylene and propylene homopolymers. Therefore, such soft polyolefins may serve both as plasticizers and base polymers. The description of such dual-purpose soft polyolefin (SPO) polymers is given below.

IV. Soft Polyolefin (SPO) Polymers

Preferred SPOs have a percent crystallinity of 0.1% to less than 35%. Advantageously, within this range, the SPO comprises less than 30% crystallinity, or less than 25% crystallinity, or less than 20% crystallinity, or less than 15% crystallinity, or less than 10% crystallinity. Also advantageously, the SPO comprises at least 0.5% crystallinity, or at least 1% crystallinity, or at least 2% crystallinity, or at least 5% crystallinity.

Advantageously, SPOs have a DSC melting point of 105° C. or less, or 90° C. or less, or between 25 and 90° C., or between 30 and 80° C., or between 35 and 75° C., as measured by DSC and have a Mw/Mn ratio of less than 5, or between 1.5 and 4, or between 1.5 and 3.

In one embodiment, a useful SPO comprises a first monomer consisting of at least 50 wt % ethylene or at least 50 wt % propylene, and less than 50 wt % of at least one other monomer selected from $C_2$-$C_{20}$ olefins, or $C_2$-$C_6$ alpha-olefins, which is different from the first monomer. Suitable olefin comonomers may be any polymerizable olefin monomer and are preferably a linear, branched or cyclic olefin, even more preferably an alpha-olefin. Examples of suitable olefins include butene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isodecene, 4-methyl-pentene-1,3-methyl-pentene-1,3,5,5-trimethyl hexene-1. Suitable comonomers also include dienes, trienes, and styrenic monomers such as styrene, alpha-methyl styrene, para-alkyl styrene (such as para-methyl styrene), hexadiene, norbornene, vinyl norbornene, ethylidene norbornene, butadiene, isoprene, heptadiene, octadiene, and cyclopentadiene.

IV.A. Propylene-Rich Soft Polyolefins

A propylene-rich soft polyolefin (prSPO) is a propylene copolymer or a propylene homopolymer with a low level of isotactic or syndiotactic monomer orientation in the polymer chain comprising at least 50 wt % propylene and having the properties of a soft polyolefin. In some embodiments, the prSPO comprises at least 60 wt % propylene, or at least 70 wt % propylene, or at least 80 wt % propylene, or at least 90 wt % propylene, or 100 wt % propylene.

In one embodiment, the prSPO has a mm triad tacticity index of 75% or more (or 80% or more, or 85% or more, or 90% or more). In another embodiment, the prSPO has a melt flow rate (MFR) of 0.1 to 2000 dg/10 min (preferably 100 dg/10 min or less). In another embodiment, the prSPO has an intermolecular compositional distribution as determined by thermal fractionation in hexane such that 85% by weight or more of the polyolefin is isolated as one or two adjacent, soluble fractions with the balance of the polyolefin in immediately preceding or succeeding fractions; and wherein each of these fractions has a wt % comonomer content with a difference of no greater than 20 wt % relative to the average wt % co-monomer content of the copolymer polyolefin. In another embodiment, the prSPO has an Mw/Mn of 1.5 to 40, preferably 1.6 to 20, preferably 1.8 to 10, even more preferably 1.8 to 2.5.

In one embodiment, a prSPO has a heat of fusion of less than 70 J/g and a mm triad tacticity index of 75% or more; and/or a MFR of 0.1 to 2000 dg/min (preferably 100 dg/min or less); and/or an intermolecular compositional distribution as determined by thermal fractionation in hexane such that 85% by weight or more of the polymer is isolated as one or two adjacent, soluble fractions with the balance of the polymer in immediately preceding or succeeding fractions; and wherein each of these fractions has a wt % comonomer content with a difference of no greater than 20 wt % relative to the average wt % comonomer content of the copolymer; and/or an Mw/Mn of 1.5 to 4.

Advantageous prSPOs useful in this invention preferably have a Melt Flow Rate (MFR) of 0.1 to 200 g/10 min, preferably 0.1 to 100, preferably 0.5 to 50, preferably 1 to 25, preferably 1 to 15, preferably 2 to 10 g/10 min; alternately the MFR is from 15 to 50 g/10 min.

Advantageous prSPOs useful in the processes of this disclosure have an intermolecular composition distribution of 75% or more, preferably 80% or more, preferably 85% or more, preferably 90% or more by weight of the polymer isolated as one or two adjacent, soluble fractions with the balance of the polymer in immediately preceding or succeeding fractions; and wherein each of these fractions has a weight % comonomer content with a difference of no greater than 20 wt % (relative), preferably 10% (relative), of the average weight % comonomer of the copolymer. The fractions are obtained at temperature increases of approximately 8° C. between stages.

The intermolecular composition distribution of the prSPO may be determined by thermal fractionation in hexane as follows: about 30 grams of the prSPO is cut into small cubes of about ⅛ inch (0.32 cm) on the side and is then introduced into a thick walled glass bottle closed with screw cap along with 50 mg of Irganox1076, an antioxidant commercially available from Ciba-Geigy Corporation. Then, 425 mL of hexane (a principal mixture of normal and iso-isomers) is added to the contents of the bottle and the sealed bottle is maintained at about 23° C. for 24 hours. At the end of this period, the solution is decanted and the residue is treated with additional hexane for an additional 24 hours at 23° C. At the end of this period, the two hexane solutions are combined and evaporated to yield a residue of the polymer soluble at 23° C. To the residue is added sufficient hexane to bring the volume to 425 mL and the bottle is maintained at about 31° C. for 24 hours in a covered circulating water bath. The soluble polymer is decanted and the additional amount of hexane is added for another 24 hours at about 31° C. prior to decanting. In this manner, fractions of the prSPO soluble at 40° C., 48° C., 55° C., and 62° C. are obtained at temperature increases of approximately 8° C. between stages. The soluble polymers are dried, weighed and analyzed for composition, as wt % ethylene content. To produce a prSPO copolymer having the desired narrow composition, it is beneficial if (1) a single sited metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

In some advantageous embodiments, the prSPO may comprise a propylene-based copolymer referred to herein as a random copolymer of propylene or as a propylene-"comonomer" plastomer (e.g., propylene-ethylene plastomer). Suitable random copolymers of propylene have a heat of fusion of less than 70 J/g, and thus are low crystallinity, and advantageously comprise an average propylene content on a molar basis of from about 68 mol % to about 92 mol %, or from about 75 mol % to about 91 mol %, or from about 78 mol % to about 88 mol %, or from about 80 mol % to about 88 mol %. The balance of the random copolymer of propylene (i.e., the one or more comonomers) may be one or more alpha-olefins as specified above and/or one or more diene monomers. Advantageously, the balance of the random copolymer of propylene is ethylene.

The comonomer of the random copolymer of propylene may comprise about 8 to 32 mol % of ethylene ($C_2$) and/or a $C_4$-$C_{20}$ olefin, advantageously about 9 to about 25 mol %, or about 12 to about 22 mol %, or about 13 to 20 mol % being.

Advantageously, the random copolymer of propylene comprises about 8 to 32 mol % ethylene, more preferably about 9 to about 25 mol % ethylene, even more preferably about 12 to about 22 mol % ethylene, with about 13 to 20 mol % ethylene being still more preferred as the comonomer.

The random copolymer of propylene may have a weight-averaged molecular weight (Mw) of 5,000,000 g/mol or less, a number-averaged molecular weight (Mn) of about 3,000,000 g/mol or less, a z-average molecular weight (Mz) of about 5,000,000 g/mol or less, and a g' index of 1.5 or less measured at the weight-averaged molecular weight (Mw) of the polymer using isotactic polypropylene as the baseline, all of which may be determined by GPC, also known as size exclusion chromatography, e.g., 3D SEC.

In an embodiment, the random copolymer of propylene may have a Mw of about 5,000 to about 5,000,000 g/mole, more preferably a Mw of about 10,000 to about 1,000,000 g/mol, more preferably a Mw of about 20,000 to about 500,000, more preferably a Mw of about 50,000 to about 300,000 g/mol, wherein Mw is determined as described herein.

In another embodiment, the random copolymer of propylene may have a Mn of about 5,000 to about 3,000,000 g/mole, more preferably a Mn of about 10,000 to about 1,000,000 g/mol, more preferably a Mn of about 30,000 to about 500,000 g/mol, more preferably a Mn of about 50,000 to about 200,000 g/mol, wherein Mn is determined as described herein.

In a preferred embodiment, the random copolymer of propylene may have a Mz of about 10,000 to about 5,000,000 g/mole, more preferably a Mz of about 50,000 to about 1,000,000 g/mol, more preferably a Mz of about 80,000 to about 500,000 g/mol, more preferably a Mz of about 100,000 to about 300,000 g/mol, wherein Mz is determined as described herein.

The molecular weight distribution index (MWD=Mw/Mn) of the random copolymer of propylene may be about 1.5 to 40.0, more preferably about 1.8 to 5 and most preferably about 1.8 to 3. Techniques for determining the molecular weight (Mn and Mw) and molecular weight distribution (MWD) may be found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al.), which is herein incorporated by reference for purposes of U.S. practice, and references cited therein.

In a preferred embodiment, the random copolymer of propylene may have a g' index value of about 1 to about 1.5, more preferably a g' of about 1.25 to about 1.45, when measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the random copolymer of propylene and $\eta_l$ is the intrinsic viscosity of a linear polymer of the same viscosity-averaged molecular weight ($M_v$) of the random copolymer of propylene. $\eta_l = KM_v^\alpha$, K and α were measured values for linear polymers and should be obtained on the same instrument as the one used for the g' index measurement.

In some embodiments, the random copolymer of propylene may have a crystallization temperature (Tc) measured with differential scanning calorimetry (DSC) of about 200° C. or less, more preferably, 150° C. or less.

In other embodiments, the random copolymer of propylene may have a density of about 0.85 to about 0.95 g/ml, more preferably, about 0.87 to 0.92 g/ml, more preferably about 0.88 to about 0.91 g/ml as measured per the ASTM D-1505 test method at 25° C.

In a preferred embodiment, the random copolymer of propylene may have a melt flow rate (MFR) equal to or greater than 0.2 g/10 min, preferably between 2-500 g/10 ml. and more preferably between 20-200 g/10 min, as measured according to the ASTM D-1238 test method.

In a preferred embodiment, the random copolymer of propylene may have a heat of fusion (ΔHf) determined according to the procedure described in ASTM E 794-85, which is less than 70 J/g, preferably greater than or equal to about 0.5 Joules per gram (J/g), and is less than or equal to about 25 J/g. Preferably less than or equal to about 20 J/g, preferably less than or equal to about 15 J/g. Also preferably greater than or equal to about 1 J/g, preferably greater than or equal to about 5 J/g according to the procedure described in ASTM E 794-85.

A chiral metallocene catalyst may ensure methyl groups of the propylene residues in the random copolymer of propylene have predominantly the same tacticity. Both syndiotactic and isotactic configuration of the propylene are possible, though the isotactic polymers may be preferred. The tacticity of the propylene residues leads to an amount of crystallinity in the polymers. The relatively low levels of crystallinity in the random copolymer of propylene may be derived from isotactic polypropylene obtained by incorporating alpha-olefin comonomers as described above.

The random copolymer of propylene may be partially crystalline, which preferably arises from crystallizable stereoregular propylene sequences. For use herein, the crystallinity of the random copolymer of propylene can also be expressed in terms of percentage of crystallinity, based on the heat of fusion of the polymer divided by the thermal energy for the highest order of polypropylene, which is estimated at 189 J/g (i.e., 100% crystallinity is equal to 189 J/g.) for purposes herein.

The random copolymer of propylene of the present invention preferably has a polypropylene crystallinity of about 0.25% to about 15%, more preferably 0.5 to 25%, more preferably 1 to 20%, more preferably 2 to 15%, more preferably from about 0.5% to about 13%, and most preferably from about 0.5% to about 11%.

In addition to this level of crystallinity, the random copolymer of propylene preferably has a single broad melting transition. However, suitable random copolymer of propylene polymer may show secondary melting peaks adjacent to the principal peak, but for purposes herein, such secondary melting peaks are considered together as a single melting point, with the highest of these peaks being considered the melting point of the random copolymer of propylene. The random copolymer of propylene preferably has a melting point of less than 100° C., preferably from about 25° C. to about 75° C., preferably about 25° C. to about 65° C., more preferably about 30° C. to about 60° C.

The procedure for Differential Scanning Calorimetry (DSC) is described as follows: About 6 to 10 mg of a sheet of the polymer pressed at approximately 200° C. to 230° C. is removed with a punch die. This is annealed at room temperature for 240 hours. At the end of this period, the sample is placed in a Differential Scanning Calorimeter (Perkin Elmer 7 Series Thermal Analysis System) and cooled to about −50° C. to about −70° C. The sample is heated at 20° C./min to attain a final temperature of about 200° C. to about 220° C. The thermal output, recorded as the area under the melting peak of the sample which is typically peaked at about 30° C. to about 175° C. and occurs between the temperatures of about 0° C. and about 200° C. is a measure of the heat of fusion expressed in Joules per gram of polymer. The melting point is recorded as the temperature of the greatest heat absorption within the range of melting of the sample.

The random copolymer of propylene may have a Mooney viscosity ML (1+4)@125° C., as determined according to ASTM D1646, of less than 100, more preferably less than 75, even more preferably less than 60, most preferably less than 30.

The random copolymer of propylene of the present invention preferably comprises a random crystallizable copolymer having a narrow compositional distribution. The intermolecular composition distribution of may be determined by thermal fractionation in a solvent such as a saturated hydrocarbon e.g., hexane or heptane. This thermal fractionation procedure is described below. Typically, approximately 75% by weight and more preferably 85% by weight of the polymer is isolated as one or two adjacent, soluble fraction with the balance of the polymer in immediately preceding or succeeding fractions. Each of these fractions has a composition (wt % ethylene content) with a difference of no greater than 20% (relative) and more preferably 10% (relative) of the average weight percent (wt %) ethylene content of random copolymer of propylene. Thus the random polypropylene copolymer is said to have a narrow compositional distribution if it meets this fractionation test criteria.

The length and distribution of stereoregular propylene sequences in a preferred random copolymer of propylene is consistent with substantially random statistical copolymerization. It is well known that sequence length and distribution are related to the copolymerization reactivity ratios. By substantially random, we mean a copolymer for which the product of the reactivity ratios is generally 2 or less. In stereoblock structures, the average length of polypropylene sequences is greater than that of substantially random copolymers with a similar composition. Prior art polymers with stereoblock structure have a distribution of polypropylene sequences consistent with these blocky structures rather than a random substantially statistical distribution. The reactivity ratios and sequence distribution of the random copolymer of propylene polymer may be determined by $^{13}$C NMR in such as way so as to locate the ethylene residues in relation to the neighboring propylene residues.

As outlined herein, to produce random copolymer of propylene with the required randomness and narrow composition distribution, it is desirable to use (1) a single sited catalyst and (2) a well-mixed, continuous flow stirred tank polymerization reactor which allows only a single polymerization environment for substantially all of the polymer chains of preferred random copolymer of propylene polymers.

A preferred random copolymer of propylene used in the present invention is described in detail as the "Second Polymer Component (SPC)" in co-pending U.S. applications U.S. Ser. No. 60/133,966, filed May 13, 1999, and U.S. Ser. No. 60/342,854, filed Jun. 29, 1999, and described in further detail as the "Propylene Olefin Copolymer" in U.S. Ser. No. 90/346,460, filed Jul. 1, 1999, which are both fully incorporated by reference herein for purposes of U.S. practice.

In addition to one or more comonomers making up the major portion of the random copolymer of propylene polymer (i.e., alpha-olefins) selected such as, but not limited to, ethylene, alpha-olefins having 4 to 8 carbon atoms, and styrenes, random copolymer of propylene polymers, as described above can contain long chain branches, which can optionally be generated using one or more alpha, omega-dienes. Alternatively, random copolymer of propylene may comprise at least one diene, and more preferably at least one non-conjugated diene, which may aid in vulcanization and other chemical modification and/or cross-linking processes. The amount of diene in random copolymer of propylene may preferably be no greater than about 10 wt %, more preferably no greater than about 5 wt %.

In a preferred embodiment, the diene may be selected from the group consisting of those that are used for the vulcanization of ethylene propylene rubbers. Specific examples of preferred dienes include ethylidene norbornene, vinyl norbornene, dicyclopentadiene, and 1,4-hexadiene (available from DuPont Chemicals).

In another embodiment, the prSPO of the polymer concentrate may comprise random copolymer of propylene in the form of a blend of discrete random copolymers of propylene. Such blends can include two or more polyethylene copolymers (as described above), two or more polypropylene copolymers (as described above), or at least one of each such polyethylene copolymer and polypropylene copolymer, so long as each of the polymers of the random copolymer of propylene blend would individually qualify as a random copolymer of propylene. Each of the random copolymers of propylene are described above and the number of random copolymer of propylene in a preferred embodiment may be three or less, more preferably two or less.

In an embodiment of the invention, the random copolymer of propylene polymer may comprise a blend of two random copolymer of propylene polymers differing in the olefin content. Preferably, one random copolymer of propylene may comprise about 7 to 13 mole % olefin, while the other random copolymer of propylene may comprise about 14 to 22 mole % olefin. In an embodiment, the preferred olefin in the random copolymer of propylene is ethylene.

The random copolymer of propylene polymers useful in the instant invention preferably comprise a particular triad tacticity. The term "tacticity" refers to the stereogenicity in the polymer. For example, the chirality of adjacent monomers can be of either like or opposite configuration. The term "diad" is used herein to designate two contiguous monomers; thus, three adjacent monomers are referred to herein as a triad. In the instance wherein the chirality of adjacent monomers is of the same relative configuration, the diad is termed isotactic. In the instance wherein the chirality of adjacent monomers is in an opposite relative configuration, the diad is termed syndiotactic. Another way to describe the configurational relationship is to term contiguous pairs of monomers having the same chirality as meso (m) and those of opposite configuration racemic (r).

When three adjacent monomers are of the same configuration, the stereoregularity of the triad is abbreviated as "mm". If two adjacent monomers in a three-monomer sequence have the same chirality and that is different from the relative configuration of the third unit, this triad has 'mr' tacticity. An 'rr' triad has the middle monomer unit having an opposite configuration from either neighbor. The fraction of each type of triad in a polymer may be determined, and then multiplied by 100 to indicate the percentage of that type of triad found in the polymer. The reactivity ratios and sequence distribution of the polymer may be determined by $^{13}$C NMR, which locates the ethylene residues in relation to the neighboring propylene residues.

Random copolymers of propylene have unique propylene tacticity as measured by the % meso triad. As shown in detail in U.S. Ser. No. 09/108,772 (PCT Publication No. WO 2000/01745), filed Jul. 1, 1998, fully incorporated herein by reference, random copolymer of propylene polymers of this invention have a lower % meso triad for any given ethylene content when compared to U.S. Pat. No. 5,504,172. The lower content of % meso triads corresponds to relatively lower crystallinity that translates into better elastomeric properties such as high tensile strength and elongation at break coupled with very good elastic recovery. Good elastomeric properties are important for some of the potential applications of the present invention.

Preferred random copolymers of propylene used in embodiments of the present invention have a mm tacticity index (m/r), also referred to herein as a propylene tacticity index and/or as mm triad tacticity index, of at least 75%. The propylene tacticity index, expressed herein as "m/r", is determined by $^{13}$C nuclear magnetic resonance (NMR). The propylene tacticity index m/r is calculated as defined in H. N. Cheng, Macromolecules, 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, and an m/r ratio of 1.0 an atactic material, and an m/r ratio of greater than 1.0 an isotactic material. An isotactic material theoretically may have a ratio approaching infinity, and many by-product atactic polymers have sufficient isotactic content to result in ratios of greater than 50.

In a preferred embodiment, the random copolymers of propylene have isotactic stereoregular propylene crystallinity. The term "stereoregular" as used herein means that the predominant number, i.e. greater than 80%, of the propylene residues in the polypropylene exclusive of any other monomer such as ethylene, has the same 1,2 insertion and the stereochemical orientation of the pendant methyl groups is the same, either meso or racemic.

Advantaged random copolymers of propylene useful in this invention have an mm triad tacticity index of three propylene units, as measured by $^{13}$C NMR, of 75% or greater, 80% or greater, 82% or greater, 85% or greater, or 90% or greater. The mm triad tacticity index of a polymer is the relative tacticity of a sequence of three adjacent propylene units, a chain consisting of head to tail bonds, expressed as a binary combination of m and r sequences. For purposes herein, it is expressed for random copolymers of propylene of the present invention as the ratio of the number of units of the specified tacticity to all of the propylene triads in the copolymer. The tacticity index (mm fraction) of a propylene copolymer can be determined from a $^{13}$C NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

PPP(mm):

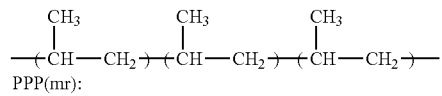

PPP(mr):

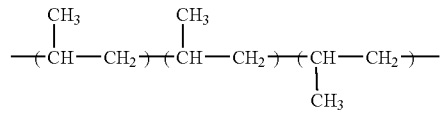

PPP(rr):

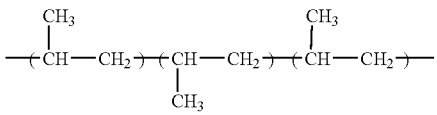

The $^{13}$C NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the mm triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined. The triad tacticity can be determined from a $^{13}$C-NMR spectrum of the polymer, as described by J. A. Ewen, "Catalytic Polymerization of Olefins", (the Ewen method); and Eds. T. Keii, K. Soga; Kodanska Elsevier Pub.; Tokyo, 1986, P 271, and as described in detail in U.S. Patent Application US2004/054086 filed Mar. 18, 2004 on page 8, in numbered paragraphs [0046] to [0054], all of which are incorporated by is reference herein.

Propylene polymers useful as prSPOs herein are available commercially under the trade name Vistamaxx™ (ExxonMobil, Baytown Tex.). Suitable examples include: VM 1100, VM1120, VM2100, VM2120, VM2125, VM2210, VM2260, VM2320, VM2330, VM2371, VM3000, VM6100, VM6200.
Preparation of prSPOs:

Random copolymer of propylene useful as soft polyolefins herein can be prepared either in-line or off-line by polymerizing propylene with one or more of a $C_2$ or $C_5$-$C_{20}$ alpha olefin, most preferably the random copolymer of propylene comprises propylene and ethylene. The monomers are advantageously polymerized in the presence of a chiral metallocene catalyst with an activator and optionally a scavenger. The comonomer or comonomers used in combination with propylene may be linear and/or branched. Advantageous linear alpha-olefins include ethylene or $C_4$ to $C_8$ alpha-olefins, more advantageously ethylene, 1-butene, 1-hexene, and 1-octene, ethylene or 1-butene are particularly advantageous. Advantageous branched alpha-olefins include 4-methyl-1-pentene, 3-methyl-1-pentene, and 3,5,5-trimethyl-1-hexene.

In one embodiment, a continuous polymerization process may be used to produce random copolymer of propylene in-line comprising, for example, propylene and one or more of ethylene, octene, or a diene. The polymerization process may use a metallocene catalyst, for example, one prepared by reacting dimethyl 1,1'-bis(4-triethylsilylphenyl)methylene-(cyclopentadienyl)(2,7-di-tertiary-butyl-9-fluorenyl) hafnium precursor with dimethylaniliniumtetrakis(pentafluorophenyl)borate as an activator. An organo-aluminum compound, namely, tri-n-octylaluminum, may be added as a scavenger to the monomer feed streams prior to introduction into the polymerization process. For production of more crystalline polymers, dimethylsilylbis(indenyl)hafnium dimethyl precursor may be used in combination with dimethylaniliniumtetrakis(pentafluorophenyl)borate. Hexane or bulk monomers may be employed as solvent. In addition, toluene may be added to increase the solubility of the co-catalyst. The feed is fed to the first reactor where the exothermic polymerization reaction is conducted at a reaction temperature between about 50° C. to about 220° C. Hydrogen gas may also be added to the reactors as a further molecular weight regulator. If desired, polymer product is transferred to the second reactor in series, which is also operated at a temperature between about 50° C. to 200° C. Note that the one reactor or two reactors in series represent a single reactor train (in this particular case a plasticizer reactor train) of the disclosed processes. Additional monomers, solvent, metallocene catalyst, and activators can be fed to the second and/or additional reactors.

In some embodiments, the polymer content leaving the second reactor is preferably from 8 to 22 weight percent. A heat exchanger then heats the polymer solution to a temperature of about 220° C. The polymer solution is then brought to a Lower Critical Solution Temperature (LCST) liquid-liquid phase separator which causes the polymer solution to separate into two liquid phases—an upper lean phase and a lower polymer-rich phase. The upper lean phase contains about 70 wt % of the solvent and the lower polymer rich phase contains about 30 wt % polymer. The polymer solution then enters a low pressure separator vessel which operates at a temperature of about 150° C. and a pressure of 4-10 bar-g (400 to 1000 Pa) and flashes the lower polymer rich phase to remove volatiles and to increase the polymer content to about 76 wt %. A gear pump at the bottom of the flash vessel drives the polymer rich solution to a List devolatilizer. An extruder is coupled to the end of the List devolatilizer whereby the polymer material is transferred to a gear pump which pushes the polymer material through a screen pack. Then the polymer may be cut into pellets and fed to a water bath. A spin dryer may be used to dry the polymer pellets, which preferably have a final solvent content of less than about 0.5 wt %.

As stated above, advantageous random copolymers of propylene of the present invention may be prepared by polymerizing propylene and at least one $C_2$ or $C_4$-$C_{20}$ alpha olefin in the presence of a chiral metallocene catalyst with an activator and optional scavenger, most preferably ethylene and propylene. The terms "metallocene" and "metallocene catalyst precursor" are terms known in the art to mean compounds possessing a Group IV, V, or VI transition metal M, with a cyclopentadienyl (Cp) ligand or ligands which may be may be substituted, at least one non-cyclopentadienyl-derived ligand X, and zero or one heteroatom-containing ligand Y, the ligands being coordinated to M and corresponding in number to the valence thereof. The metallocene catalyst precursors generally require activation with a suitable activator (also referred to as an co-catalyst) in order to yield an active metallocene catalyst or catalyst system. An active metallocene catalyst refers generally to an organometallic complex with a vacant coordination site that can coordinate, insert, and polymerize olefins.

Metallocenes for making soft random copolymers of propylene herein include bridged and unbridged biscyclopentadienyl complexes where the cyclopentadienyl group are, independently, a substituted or unsubstituted cyclopentadienyl group, a substituted or unsubstituted indenyl group, or a substituted or unsubstituted fluorenyl group. Metallocenes include those represented by the formula: $TCpCpMX_2$, where T is a bridging group such as a dialkyl silicon group (such as dimethylsilyl) or a hydrocarbyl group (such as methyl, ethyl, or propyl), each Cp is, independently a substituted or unsubstituted cyclopentadienyl group, a substituted or unsubstituted indenyl group (preferably a 2, 4 or 2, 4, 7 substituted indenyl group), or a substituted or unsubstituted fluorenyl group, M is a group 4 metal (preferably Hf, Zr or Ti) and each X is independently a halogen or hydrocarbyl group (such as chlorine, bromine, methyl, ethyl, propyl, butyl, or phenyl).

Metallocenes for making soft random copolymers of propylene herein include cyclopentadienyl (Cp) complexes which have two Cp ring systems for ligands. The Cp ligands preferably form a "bent sandwich complex" with the metal and are preferably locked into a rigid configuration through a bridging group. Such preferred cyclopentadienyl complexes may have the general formula:

$$(Cp^1R^1m)R^3n(Cp^2R^2p)MXq$$

wherein $Cp^1$ of ligand $(Cp^1R^1m)$ and $Cp^2$ of ligand $(Cp^2R^2p)$ are preferably the same, $R^1$ and $R^2$ each are, independently, a halogen or a hydrocarbyl, halocarbyl, hydrocarbyl-substituted organometalloid or halocarbyl-substituted organometalloid group containing up to 20 carbon atoms;

m is preferably 1 to 5;

p is preferably 1 to 5;

preferably two $R^1$ and/or $R^2$ substituents on adjacent carbon atoms of the cyclopentadienyl ring associated there can be joined together to form a ring containing from 4 to 20 carbon atoms;

$R^3$ is a bridging group;

n is the number of atoms in the direct chain between the two ligands and is preferably 1 to 8, most preferably 1 to 3;

M is a transition metal having a valence of from 3 to 6, preferably from group 4, 5, or 6 of the periodic table of the elements and is preferably in its highest oxidation state;

each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and q is equal to the valence of M minus 2.

Numerous examples of the biscyclopentadienyl metallocenes described above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,5,278,264; 5,296,434; and 5,304,614, all of which are incorporated by reference for purposes of U.S. patent practice. Illustrative, but not limiting examples of preferred biscyclopentadienyl metallocenes of the type described above for the invention include the racemic isomers of:

μ-$(CH_3)_2$Si(indenyl)$_2$M(Cl)$_2$
μ-$(CH_3)_2$Si(indenyl)$_2$M(CH$_3$)$_2$
μ-$(CH_3)_2$Si(tetrahydroindenyl)$_2$M(Cl)$_2$
μ-$(CH_3)_2$Si(tetrahydroindenyl)$_2$M(CH$_3$)$_2$
μ-$(CH_3)_2$Si(indenyl)$_2$M(CH$_2$CH$_3$)$_2$
μ-$(C_6H_5)_2$C(indenyl)$_2$M(CH$_3$)$_2$;

wherein M may include Zr, H$_f$, and/or Ti.

These metallocenes may advantageously be used in combination with one or more aluminoxanes (preferably methyl aluminoxane, or modified methyl aluminoxane) and or one or more ionic activators such as N,N-dimethylanilinium tetraphenylborate, N,N-dimethylanilinium tetrakis(penta-fluorophenyl)borate, diphenylcarbenium tetra(perfluorophenyl) borate, or N,N-dimethylanilinium tetrakis (heptafluoronaphthyl)borate.

IV.B. Ethylene-Rich Soft Polyolefins

An ethylene-rich soft polyolefin (erSPO) is an ethylene copolymer comprising at least 50 wt % ethylene and having the properties of a soft polyolefin. In some embodiments, the erSPO comprises at least 60 wt % ethylene, or at least 70 wt % ethylene, or at least 80 wt % ethylene, or at least 90 wt % ethylene.

In one embodiment, the erSPO may comprise 10 to 50 wt %, or 10 to 40 wt %, or 10 to 30 wt %, or 10 to 20 wt % of a $C_3$-$C_{20}$ comonomer. In another embodiment, erSPOs advantageously have a composition distribution breadth index (CDBI) above 90%, even more preferably above 95%. In another embodiment, erSPOs has a density of 0.86 to 0.925 g/mL and a CDBI of over 90%, preferably between 95% and 99%. In another embodiment, erSPOs has a MI of 0.1 to 100 g/10 min, preferably 0.5 to 50 g/10 min, more preferably 0.8 to 30 g/10 min.

In one embodiment, the erSPOs are metallocene polyethylenes (mPE's). The mPE homopolymers or copolymers may be produced using mono- or bis-cyclopentadienyl transition metal catalysts in combination with an activator of aluminoxane and/or a non-coordinating anion in homogeneous supercritical, solution, or slurry process. Advantageously, the polymerization is performed in a homogeneous supercritical or solution process. The catalyst and activator may be supported or unsupported and the cyclopentadienyl rings by may substituted or unsubstituted. Several commercial products produced with such catalyst/activator combinations are commercially available from ExxonMobil Chemical Company in Baytown, Tex. under the tradename EXACT™. For more information on the methods and catalysts/activators to produce such mPE homopolymers and copolymers see WO 94/26816; WO 94/03506; EPA 277 003; EPA 277 004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129 368; U.S. Pat. No. 5,264,405; EPA 520 732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO 91/09882; WO 94/03506 and U.S. Pat. No. 5,055,438.

Examples of Exact Plastomers suitable for use herein as soft polyolefins include:

| EXACT-Plastomers Grade | Composition | Density (g/mL) | Melt-Index (g/10 min) | DSC-Melting Peak (° C.), 10° C./min |
|---|---|---|---|---|
| 3024 | Ethylene/butene | 0.905 | 4.5 | 98 |
| 3035 | Ethylene/butene | 0.900 | 3.5 | 88 |
| 3128 | Ethylene/butene | 0.900 | 1.2 | 92 |
| 4006 | Ethylene/butene | 0.880 | 10 | 60 |
| 4011 | Ethylene/butene | 0.888 | 2.2 | 70 |
| 4033 | Ethylene/butene | 0.880 | 0.8 | 60 |
| 4049 | Ethylene/butene | 0.873 | 4.5 | 55 |
| 3040 | Ethylene/hexene | 0.900 | 16.5 | 96 |
| 3131 | Ethylene/hexene | 0.900 | 3.5 | 95 |

-continued

EXACT-Plastomers

| EXACT-Plastomers Grade | Composition | Density (g/mL) | Melt-Index (g/10 min) | DSC-Melting Peak (° C.), 10° C./min |
|---|---|---|---|---|
| 3132 | Ethylene/hexene | 0.900 | 1.2 | 96 |
| 3139 | Ethylene/hexene | 0.900 | 7.5 | 95 |
| 4056 | Ethylene/hexene | 0.883 | 2.2 | 72 |
| 4151 | Ethylene/hexene | 0.895 | 2.2 | 89 |
| 0201 | Ethylene/octene | 0.902 | 1.1 | 95 |
| 0203 | Ethylene/octene | 0.902 | 3.0 | 95 |
| 0210 | Ethylene/octene | 0.902 | 10 | 96 |
| 0230 | Ethylene/octene | 0.902 | 30 | 95 |
| 5061 | Ethylene/octene | 0.868 | 0.5 | 53 |
| 5062 | Ethylene/octene | 0.860 | 0.5 | 43 |
| 5101 | Ethylene/octene | 0.902 | 1.1 | 98 |
| 5171 | Ethylene/octene | 0.870 | 1.0 | 55 |
| 5181 | Ethylene/octene | 0.882 | 1.1 | 73 |
| 5361 | Ethylene/octene | 0.860 | 3.0 | 36 |
| 5371 | Ethylene/octene | 0.870 | 5.0 | 64 |
| 8201 | Ethylene/octene | 0.882 | 1.1 | 67 |
| 8203 | Ethylene/octene | 0.882 | 3.0 | 73 |
| 8210 | Ethylene/octene | 0.882 | 10 | 67 |
| 8230 | Ethylene/octene | 0.882 | 30 | 77 |

Other suitable erSPOs include low-density polyethylene (LDPE), linear-low density polyethylene (LLDPE), and very-low density polyethylene (vLDPE) type polyethylene polymers and copolymers which have the properties of a soft polyolefin.

III.C. Elastomeric Soft Polyolefins

The SPO may be a cross-linkable polyolefin elastomer containing ethylene, propylene, and optionally one or more diene. Illustrative examples include ethylene-propylene (EP) elastomers and ethylene-propylene-diene (EPDM) elastomers.

A suitable EP elastomer can have an ethylene content of 40 to 80 wt % (preferably 45 to 75 wt %, preferably 50 to 70 wt %). A suitable EP elastomer can also have an ethylene content of 5 to 25 wt % (preferably 10 to 20 wt %). A suitable EPDM elastomer can have an ethylene content of 40 to 80 wt % (preferably 45 to 75 wt %, preferably 50 to 70 wt %) and a diene content of less than 15 wt % (preferably 0.5 to 15 wt %, preferably 1 to 12 wt %, preferably 2 to 10 wt %, preferably 3 to 9 wt %). In one or more embodiments, a suitable EPDM elastomer can have an ethylene content of 5 to 25 wt % (preferably 10 to 20 wt %). In other embodiments, a suitable EPDM elastomer can have a diene content of 0.1 to 3 wt % (preferably 0.3 to 2 wt %), or 0.3 to 10 wt % (preferably 1 to 5 wt %). Suitable dienes can have at least two unsaturated bonds, at least one of which can be incorporated into a polymer, and can be straight chained, branched, cyclic, bridged ring, bicyclic, etc.; preferably the unsaturated bonds are non-conjugated. Preferred dienes include 5-ethylidene-2-norbornene (ENB), 5-vinyl-2-norbornene (VNB), divinyl benzene (DVB), dicyclopentadiene (DCPD), and 1,4-hexadiene.

Preferred EP and EPDM elastomers can have one or more of the following properties: a density of 0.885 g/cm³ or less (preferably 0.88 g/cm³, preferably 0.87 g/cm³ or less, preferably 0.865 g/cm³ or less, preferably 0.86 g/cm³ or less, preferably 0.855 g/cm³ or less); and/or a heat of fusion ($H_f$) of less than 70 J/g (preferably less than 60 J/g, preferably less than 50 J/g, preferably less than 40 J/g, preferably less than 30 J/g, preferably less than 20 J/g, preferably less than 10 J/g, preferably less than 5 J/g, preferably indiscernible); and/or an ethylene or propylene crystallinity of less than 15 wt % (preferably less than 10 wt %, preferably less than 5 wt %, preferably less than 2 wt %, preferably undetectable); and/or a melting point ($T_m$) of 120° C. or less (preferably 100° C. or less, preferably 80° C. or less, preferably 70° C. or less, preferably 60° C. or less, preferably 50° C. or less, preferably 40° C. or less, preferably 35° C. or less, preferably undetectable); and/or a glass transition temperature ($T_g$) of −20° C. or less (preferably −30° C. or less, preferably −40° C. or less, preferably −50° C. or less, preferably −60° C. or less); and/or a $M_w$ of 50 to 5,000 kg/mol (preferably 100 to 3,000 kg/mol, preferably 150 to 2,000 kg/mol, preferably 200 to 1,000 kg/mol); and/or a $M_w/M_n$ of 1.5 to 40 (preferably 1.6 to 30, preferably 1.7 to 20, preferably 1.8 to 10); and/or a Mooney viscosity, ML(1+4) at 125° C. of 1 to 100 (preferably 5 to 95, preferably 10 to 90, preferably 15 to 85, preferably 20 to 80).

In one or more embodiments, the EP or EPDM elastomer can be functionalized. For example, the ethylene-propylene elastomers can be functionalized by reacting with organic compounds with polar moieties, such as amine-, carboxy-, and/or epoxy-moieties. Examples include maleated EP and EPDM elastomers.

Suitable ethylene-propylene elastomers include those available from ExxonMobil Chemical under the Vistalon®, and Exxelor™ tradenames.

III.D. Other Soft Polyolefins

Other suitable soft polyolefins include propylene homopolymer and/or propylene copolymers that have been contacted with less than about 10 wt % of a highly crystalline branched or coupled polymeric nucleating agent under nucleation conditions. Such polymers may be produced with an activated non metallocene, metal-centered, heteroaryl ligand catalyst, as described in WO 03/040095 on pages 21-52. Examples include a propylene-ethylene copolymer comprising at least about 60 weight percent of units derived from propylene and at least about 0.1 weight percent of units derived from ethylene.

Particular embodiments of such polymers include a propylene-ethylene copolymer comprising at least about 60 weight percent of units derived from propylene and at least about 0.1 weight percent of units derived from ethylene, as disclosed in WO 03/040095 A2 at page 9.

Other polymers useful as the soft polyolefin include one or more polypropylene copolymers having elastic properties. Such preferred propylene copolymers having elastic properties may be prepared according the procedures in WO 02/36651 which is incorporated by reference here. Likewise, the SPO may comprise polymers consistent with those described in WO 03/040202, WO 03/040095, WO 03/040201, WO 03/040233, and/or WO 03/040442. Additionally, the SPO may comprise polymers consistent with those described in EP 1 233 191, and U.S. Pat. No. 6,525,157.

Other polymers useful as the soft polyolefin include homopolymer and copolymers of butene-1; isobutylene-based elastomers such as butyl, halobutyl, and functionalized (e.g., by halogenation) or unfunctionalized copolymers of isobutylene and one or more styrenic comonomer such as p-methylstyrene; styrenic block copolymers such as SBS, SIS, SEBS, and SEPS; and thermoplastic vulcanizates. The SPO may also be a blend of one or more individual SPO components as described above.

The above identified composition and properties described for the various in-line produced and off-line produced plasticizers of the instant invention may also be combined to form numerous combinations of plasticizer types and properties that have not be specifically set forth above, but still fall within the scope of the present disclosure.

Plasticized Polymer Blends and Polymer Additives:

In one embodiment, the plasticized polymer blends produced by the fluid phase in-line polymer blending process disclosed herein include a single high molecular base polymer blend component made in one of the parallel reactor trains and a single plasticizer blend component produced in a second parallel reactor train.

In one form, the plasticizer is an alpha-olefin oligomer fluid with a molecular weight of 20,000 g/mol or less, 15,000 g/mol or less, 10,000 g/mol or less, or 5,000 g/mol or less. In another embodiment, the alpha-olefin oligomer has a molecular weight of 500 to 5,000 g/mol. At these low molecular weights, the alpha olefin oligomer fluids are miscible to a degree with the polymer blend components disclosed herein to provide a plasticizing effect. In another embodiment, the plasticizer is a low glass transition temperature polymeric material with a glass transition temperature of less than 0° C., or less than −5° C., or less than −25° C. Partial miscibility of the low glass transition temperature polymeric material with the high molecular polymer blend component is advantageous.

In another embodiment, the plasticized polymer blends produced produced by the fluid phase in-line polymer blending process disclosed herein include a single high molecular weight base polymer blend component made in one of the parallel reactor trains and two or more In-Line-Produced Plasticizer blend components.

In another embodiment, the plasticized polymer blends produced by the fluid phase in-line polymer blending process disclosed herein include two or more high molecular weight base polymer components, including but not limited to, thermoplastic polymer(s) and/or elastomer(s) blended with one or more In-Line-Produced Plasticizer blend components.

In yet another embodiment, any of the preceding embodiments including one or more high molecular weight base polymers and one or more plasticizer components produced and blended in-line may further include one or more other plasticizer components that are not produced in-line (off-line-produced plasticizer component), but blended in-line. These plasticizers which are not produced in-line because they are not conducive to such may still be in-line blended with the plasticized polymer components from the previous three embodiments from one or more polymer/additive storage tanks. Plasticizers that may not be reacted in-line, but may be in-line blended, include, but are not limited to the following: paraffin oils and waxes (n-paraffins, isoparaffins, paraffin blends), dearomatized aliphatic hydrocarbons, process oils, high purity hydrocarbon fluids, lubricant basestocks, other oils, phthalates, mellitates and adipates, etc.

A "thermoplastic polymer(s)" is a polymer that can be melted by heat and then cooled with out appreciable change in properties. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. The disclosed processes make and blend polyolefin base polymer components in-line. Polyolefins include, but are not limited to, polymers comprising one or more linear, branched or cyclic $C_2$ to $C_{40}$ olefins, polymers comprising propylene copolymerized with one or more $C_2$ or $C_4$ to $C_{40}$ olefins, $C_3$ to $C_{20}$ alpha olefins, or $C_3$ to $C_{10}$ α-olefins. Also, polyolefins include, but are not limited to, polymers comprising ethylene including but not limited to ethylene copolymerized with a $C_3$ to $C_{40}$ olefin, a $C_3$ to $C_{20}$ alpha olefin, propylene and/or butene.

"Elastomers" encompass all natural and synthetic rubbers, including those defined in ASTM D1566). Examples of useful elastomers include, but are not limited to, ethylene propylene rubber, ethylene propylene diene monomer rubber, styrenic block copolymer rubbers (including SI, SIS, SB, SBS, SEBS and the like, where S=styrene, I=isobutylene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another form, the plasticized polymer blends produced herein may include one or more of isotactic polypropylene, highly isotactic polypropylene, syndiotactic polypropylene, random copolymer of propylene and ethylene and/or butene and/or hexene, polybutene, ethylene vinyl acetate, low density polyethylene (density 0.915 to less than 0.935 g/mL), linear low density polyethylene, ultra low density polyethylene (density 0.86 to less than 0.90 g/mL), very low density polyethylene (density 0.90 to less than 0.915 g/mL), medium density polyethylene (density 0.935 to less than 0.945 g/mL), high density polyethylene (density 0.945 to 0.98 g/mL), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, crosslinked polyethylene, polymers that are a hydrolysis product of EVA that equate to an ethylene vinyl alcohol copolymer, polymers of aromatic monomers such as polystyrene, poly-1 esters, polyacetal, polyvinylidine fluoride, polyethylene glycols and/or polyisobutylene.

In another form, elastomers are blended using the processes disclosed herein to form rubber-toughened compositions. In some forms, the rubber toughened composition is a two (or more) phase system where the elastomer is a discontinuous phase and the polymer produced herein is a continuous phase. This blend may be combined with tackifiers and/or other additives as described herein.

In another form, the plasticized polymer blends produced by the processes disclosed herein may include elastomers or other soft polymers to form impact copolymers. In some forms, the blend is a two (or more) phase system where the elastomer or soft polymer is a discontinuous phase and other polymer(s) is a continuous phase. The blends produced herein may be combined with tackifiers and/or other additives as described herein.

In some forms, the plasticized polymers blends disclosed herein include metallocene polyethylenes (mPEs) or metallocene polypropylenes (mPPs). The mPE and mPP homopolymers or copolymers are typically produced using mono- or bis-cyclopentadienyl transition metal catalysts in combination with an activator of aluminoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/-activator combinations are commercially available from ExxonMobil Chemical Company in Baytown, Tex. under the tradenames EXCEED™, ACHIEVE™ and EXACT™. For more information on the methods and catalysts/activators to produce such homopolymers and copolymers see WO 94/26816; WO 94/03506; EPA 277 003; EPA 277 004; U.S. Pat. No. 5,153,157; U.S. Pat. No. 5,198,401; U.S. Pat. No. 5,240,894; U.S. Pat. No. 5,017,714; CA 1,268, 753; U.S. Pat. No. 5,324,800; EPA 129 368; U.S. Pat. No.

5,264,405; EPA 520 732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO 91/09882; WO 94/03506 and U.S. Pat. No. 5,055,438.

In some forms the plasticized polymer blends produced by the processes disclosed herein include one or more high molecular weight base polymers at from 10 to 99.9 wt %, based upon the weight of the plasticizer and polymers in the blend, or 20 to 99.9 wt %, or at least 30 to 99.9 wt %, or at least 40 to 99.9 wt %, or at least 50 to 99.9 wt %, or at least 60 to 99.9 wt %, or at least 70 to 99.9 wt % with plasticizers and other polymer additives constituting the remainder of the blend. In one form, the one or more plasticizer blend components are present in the plasticized polymer blend at lower limits of 0.1 wt %, or 0.25 wt %, or 0.5 wt %, or 0.75 wt %, or 1 wt %, or 2 wt %, or 5 wt %, or 10 wt %, 15 wt %, or 20 wt %, or 30 wt %, or 40 wt %, or 50 wt % based on the overall weight of the plasticized polymer blend. In another form, the one or more plasticizer blend components are present in the plasticized polymer blend at upper limits of 20 wt %, or 25 wt %, or 30 wt %, or 35 wt %, or 40 wt %, or 45 wt %, or 50 wt %, or 60 wt %, 70 wt %, or 80 wt %, or 90 wt % based on the overall weight of the plasticized polymer blend.

In another form, in-line plasticized polymer blends are produced from propylene-based base polymers and plasticizers made at homogeneous polymerization conditions, particularly at bulk homogeneous polymerization conditions, such as bulk homogeneous supercritical or bulk solution polymerization, and comprise the following:

(a) 10-20 wt % of isotactic polypropylene with 0.8-10,000 g/10 min MFR and melting peak temperatures of 80-165° C. plus 80-90 wt % crystallizable ethylene-propylene copolymer comprising 10-16 wt % ethylene content and 0.8-100 g/10 min MFR or (b) 15-90 wt % of isotactic polypropylene with 0.8-10,000 dg/min MFR and melting peak temperatures of 80-165° C. plus 10-85 wt % propylene copolymer of isotactic polypropylene crystallinity comprising 1-20 wt % ethylene or 1-40 wt % hexene-1 or 1-30 wt butene-1 content and 0.8-100 g/10 min MFR or (c) 10-30 wt % of isotactic polypropylene with 0.8-10,000 dg/min MFR and melting peak temperatures of 80-165° C. plus 90-70 wt % low-crystallinity (0-30 J/g) homo- or copolymer with MFR of 0.8-500 g/10 min or The in-line-plasticized polymer blends produced by the process disclosed herein may be also blended with other polymers and additives using the in-line blending process for other polymers and additives depicted in FIG. 11, in an extrusion process downstream of in-line polymerization/separation/blending processes disclosed herein, or blended in an off-line compounding process.

Any of the above polymers included in the in-line polymer blends produced by the processes disclosed herein may be functionalized. Functionalized means that the polymer has been contacted with an unsaturated acid or anhydride. Forms of unsaturated acids or anhydrides include any unsaturated organic compound containing at least one double bond and at least one carbonyl group. Representative acids include carboxylic acids, anhydrides, esters and their salts, both metallic and non-metallic. The organic compound contains an ethylenic unsaturation conjugated with a carbonyl group (—C=O). Non-limiting examples include maleic, fumaric, acrylic, methacrylic, itaconic, crotonic, alpha-methyl crotonic, and cinnamic acids as well as their anhydrides, esters and salt derivatives. Maleic anhydride is one particular form. The unsaturated acid or anhydride is present at about 0.1 wt % to about 5 wt %, or at about 0.5 wt % to about 4 wt %, or at about 1 to about 3 wt %, based upon the weight of the hydrocarbon resin and the unsaturated acid or anhydride.

Tackifiers may also be blended either in-line by the processes disclosed herein (see FIG. 11), in-line via an extrusion process downstream of in-line polymerization/separation/blending processes disclosed herein, or in an off-line compounding process. Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. Non-polar tackifiers are substantially free of monomers having polar groups. The polar groups are generally not present; however, if present, they are not present at more that 5 wt %, or not more that 2 wt %, or no more than 0.5 wt %. In some embodiments, the tackifier has a softening point (Ring and Ball, as measured by ASTM E-28) of 80° C. to 140° C., or 100° C. to 130° C. In some embodiments the tackifier is functionalized. By functionalized is meant that the hydrocarbon resin has been contacted with an unsaturated acid or anhydride. Useful unsaturated acids or anhydrides include any unsaturated organic compound containing at least one double bond and at least one carbonyl group. Representative acids include carboxylic acids, anhydrides, esters and their salts, both metallic and non-metallic. The organic compound may contain an ethylenic unsaturation conjugated with a carbonyl group (—C=O). Non-limiting examples include maleic, fumaric, acrylic, methacrylic, itaconic, crotonic, alpha-methyl crotonic, and cinnamic acids as well as their anhydrides, esters and salt derivatives. Maleic anhydride is particularly useful. The unsaturated acid or anhydride may be present in the tackifier at about 0.1 wt % to 10 wt %, or at 0.5 wt % to 7 wt %, or at 1 to 4 wt %, based upon the weight of the hydrocarbon resin and the unsaturated acid or anhydride.

The tackifier, if present, is typically present at 1 wt % to 50 wt %, based upon the weight of the blend, or 10 wt % to 40 wt %, or 20 wt % to 40 wt %. Generally however, tackifier is not present, or if present, is present at less than 10 wt %, or less than 5 wt %, or at less than 1 wt %.

In another form, the plasticized polymer blends produced by the processes disclosed herein further comprise a crosslinking agent. The crosslinking agent may be blended either in-line by the processes disclosed herein (see FIG. 11), in-line via an extrusion process downstream of in-line polymerization/separation/blending processes disclosed herein, or in an off-line compounding process. Useful crosslinking agents include those having functional groups that can react with the acid or anhydride group and include alcohols, multiols, amines, diamines and/or triamines. Non-limiting examples of crosslinking agents useful include polyamines such as ethylenediamine, diethylenetriamine, hexamethylenediamine, diethylaminopropylamine, and/or menthanediamine.

In another form, the plasticized polymer blends produced by the processes disclosed herein, and/or blends thereof, further comprise typical additives known in the art such as fillers, cavitating agents, antioxidants, surfactants, adjuvants, other plasticizers, block, antiblock, color masterbatches, pigments, dyes, processing aids, UV stabilizers, neutralizers, lubricants, waxes, nucleating agents and/or clarifying agents. These additives may be present in the typically effective amounts well known in the art, such as 0.001 wt % to 10 wt %. These additive may be blended either in-line by the processes disclosed herein (see FIG. 11), in-line via an extrusion process downstream of in-line polymerization/separation/blending processes disclosed herein, or in an off-line compounding process.

Useful fillers, cavitating agents and/or nucleating agents include titanium dioxide, calcium carbonate, barium sulfate, silica, silicon dioxide, carbon black, sand, glass beads, mineral aggregates, talc, clay and the like. Nucleating agents of the non-clarifying type include, but are not limited to, sodium benzoate, Amfine NA 11, Amfine NA 21, and Milliken HPN 68.

Useful antioxidants and UV stablilizers include phenolic antioxidants, such as Irganox 1010, Irganox 1076 both available from Ciba-Geigy. Oils may include paraffinic or naphthenic oils such as Primol 352, or Primol 876 available from ExxonMobil Chemical France, S. A. in Paris, France. The oils may include aliphatic naphthenic oils, white oils or the like.

Useful processing aids, lubricants, waxes, and/or oils include low molecular weight products such as wax, oil or low $M_n$ polymer, (low meaning below $M_n$ of 5000, or below 4000, or below 3000, or below 2500). Useful waxes include polar or non-polar waxes, functionalized waxes, polypropylene waxes, polyethylene waxes, and wax modifiers.

Useful functionalized waxes include those modified with an alcohol, an acid, or a ketone. Functionalized means that the polymer has been contacted with an unsaturated acid or anhydride. Useful unsaturated acids or anhydrides include any unsaturated organic compound containing at least one double bond and at least one carbonyl group. Representative acids include carboxylic acids, anhydrides, esters and their salts, both metallic and non-metallic. The organic compound may contain an ethylenic unsaturation conjugated with a carbonyl group (—C═O). Non-limiting examples include maleic, fumaric, acrylic, methacrylic, itaconic, crotonic, alpha-methyl crotonic, and cinnamic acids as well as their anhydrides, esters and salt derivatives. Maleic anhydride is particularly useful. The unsaturated acid or anhydride may be present at 0.1 wt % to 10 wt %, or at 0.5 wt % to 7 wt %, or at 1 to 4 wt %, based upon the weight of the hydrocarbon resin and the unsaturated acid or anhydride. Examples include waxes modified by methyl ketone, maleic anhydride or maleic acid. Low Mn polymers include polymers of lower alpha olefins such as propylene, butene, pentene, hexene and the like. A useful polymer includes polybutene having an Mn of less than 1000 g/mol. An example of such a polymer is available under the trade name PARAPOL™ 950 from ExxonMobil Chemical Company. PARAPOL™ 950 is a liquid polybutene polymer having an Mn of 950 g/mol and a kinematic viscosity of 220 cSt at 100° C., as measured by ASTM D 445.

Useful clarifying agents include, but are not limited to, the benzalsorbitol family of clarifiers, and more particularly dibenzalsorbitol (Millad 3905), di-p-methylbenzalsorbitol (Milliad 3940), and bis-3,4-dimethylbenzalsorbitol (Milliad 3988).

Applications:

The plasticized polymer blends produced by the processes disclosed herein are typically used in any known thermoplastic or elastomer application. Non-limiting examples include uses in molded parts, films, tapes, sheets, tubing, hose, sheeting, wire and cable coating, adhesives, shoe soles, bumpers, gaskets, bellows, films, fibers, elastic fibers, nonwovens, spunbonds, sealants, surgical gowns and medical devices. The plasticized polymer blends produced by the processes disclosed herein are particularly advantageous in applications requiring toughness, flexibility, and impact resistance at low temperatures. Non-limiting exemplary applications include polyolefin based parts used in appliances (i.e. refrigerators, and freezers) as wells as parts used in cold temperature environments.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. All numerical values within the detailed description and the claims herein are also understood as modified by "about."

What is claimed is:

1. An in-line blending process for plasticized polymers comprising:
    (a) providing two or more reactor trains configured in parallel and a high-pressure separator downstream fluidly connected to the two or more reactor trains configured in parallel, wherein one or more of the reactor trains produces one or more base polymers and one or more of the reactor trains produces one or more plasticizers;
    (b) contacting in the two or more reactor trains configured in parallel 1) olefin monomers having two or more carbon atoms 2) one or more catalyst systems, 3) optional one or more comonomers, 4) optional one or more scavengers, and 5) one or more diluents or solvents,
    wherein at least one of the reactor trains configured in parallel is at a temperature above the solid-fluid phase transition temperature of the polymerization system and a pressure no lower than 10 MPa below the cloud point pressure of the polymerization system and less than 1500 MPa,
    wherein the polymerization system for each reactor train is in its dense fluid state and comprises the olefin monomers, any comonomer present, any diluent or solvent present, any scavenger present, and the polymer product,
    wherein the catalyst system for each reactor train comprises one or more catalyst precursors, one or more activators, and optionally, one or more catalyst supports,
    wherein the one or more catalyst systems are chosen from Ziegler-Natta catalysts, metallocene catalysts, nonmetallocene metal-centered, heteroaryl ligand catalysts, late transition metal catalysts, and combinations thereof,
    wherein the polymerization system for one or more base polymer reactor trains and one or more plasticizer reactor trains includes more than 60 wt % of the one or more diluents or solvents;
    (c) forming an unreduced polymer or unreduced plasticizer reactor effluent including a homogeneous fluid phase polymer-monomer mixture in one or more parallel reactor trains and a homogeneous fluid phase plasticizer-monomer mixture in one or more parallel reactor trains;

(d) passing the reactor effluents comprising the homogeneous fluid phase polymer-monomer mixture and plasticizer-monomer mixture from each parallel reactor train through the high-pressure separator for product blending and product-feed separation;

(e) maintaining the temperature and pressure within the high-pressure separator above the solid-fluid phase transition point but below the cloud point pressure and temperature to form a fluid-fluid two-phase system comprising a plasticized polymer-rich blend phase and a monomer-rich phase; and (f) separating the monomer-rich phase from the plasticized polymer-rich blend phase in the high pressure separator to form a plasticized polymer blend and a separated monomer-rich phase.

2. The process of claim 1 wherein in (b) the polymerization systems for the two or more reactor trains configured in parallel are at temperatures above the solid-fluid phase transition temperatures and pressures no lower than 10 MPa below the cloud point pressures and less than 1500 MPa.

3. The process of claim 1 wherein the two or more reactor trains configured in parallel of (b) includes one or more reactor trains operating at a temperature below the solid-fluid phase transition temperature of the polymerization system forming solid polymer particles and the polymerization system comprises more than 60 wt % of the one or more diluents or solvents.

4. The process of claim 1 wherein the olefin monomers having two or more carbon atoms of (b) comprise propylene.

5. The process of claim 1 wherein the combined olefin monomers and optional one or more comonomers of (b) are present in a combined feed to the one or more polymerization reactors of one or more reactor trains is 40 wt % or less.

6. The process of claim 1 wherein the olefin monomers and optional one or more comonomers of (b) comprise one or more of ethylene, propylene, butenes, hexenes, octenes, decenes, or dodecenes.

7. The process of claim 1 further comprising removing low molecular weight oligomers, low molecular weight polymers, solvent/diluent or combinations thereof from the separated monomer-rich phase of (f) through the use of at least one knock-out pot, at least one separation tower, or a combination thereof.

8. The process of claim 1 further comprising providing one or more storage tanks, and feeding from the one or more storage tanks one or more polymers, one or more off-line produced plasticizers and/or one or more polymer additives to the process after (c).

9. The process of claim 8 further comprising feeding the polymer-rich phase of the high-pressure separator of (a) containing the plasticized polymer blend to one or more low-pressure separators to further separate the monomers and other volatiles from the plasticized polymer blend to form a further-enriched plasticized polymer blend.

10. The process of claim 9 further comprising feeding the further-enriched plasticized polymer blend to a coupled devolatilizer to further separate other volatiles from the further-enriched plasticized polymer blend to form a plasticized polymer product blend, wherein the coupled devolatilizer operates under vacuum enabling the further-enriched plasticized polymer blend to flash off the monomers and other volatiles, and wherein the coupled devolatilizer is a devolatilizing extruder.

11. The process of claim 10 wherein one or more polymers, one or more off-line produced plasticizer and/or one or more polymer additives are added to the plasticized polymer product blend at the high-pressure separator, the low-pressure separator, the devolatilizing extruder or combinations thereof.

12. The process of claim 1 wherein the high-pressure separator is a gravimetric separation vessel, wherein the monomer-rich phase has a density of about 0.3 to about 0.7 grams/mL and the polymer-rich phase has a density of about 0.4 to about 0.8 grams/mL.

13. The process of claim 11 wherein the one or more off-line produced plasticizers are chosen from ethylene-based polyolefin oligomers, propylene-based polyolefin oligomers, butene-based polyolefin oligomers, higher alphaolefin-based polyolefin oligomers, paraffins, mineral oils, process oils, high purity hydrocarbon fluids, Group III lubricant basestocks, esters, propylene-rich soft polyolefins, ethylene-rich soft polyolefins, elastomeric soft polyolefins, propylene homopolymers, propylene copolymers, butene-1 homopolymers, butene-1 copolymers, isobutylene-based elastomers, thermoplastic vulcanizates and combinations thereof.

14. The process of claim 1 wherein the one or more plasticizers comprise an ethylene-based polyolefin oligomer, a propylene-based polyolefin oligomer, a butene-based polyolefin oligomer, a higher-alphaolefin-based polyolefin oligomer, propylene-rich soft polyolefins, ethylene-rich soft polyolefins, elastomeric soft polyolefins, propylene homopolymers, propylene copolymers, butene-1 homopolymers, butene-1 copolymers, isobutylene-based elastomers, thermoplastic vulcanizates and combinations thereof.

15. The process of claim 14 wherein the propylene-rich soft polyolefins and ethylene-rich soft polyolefins have a Tg of $-20°$ C. or less and a crystallinity of 15% or less.

16. The process of claim 14 wherein the ethylene-based polyolefin oligomer has a Mn of 300 to 10,000 g/mol and a pour point of $-20°$ C. or less.

17. The process of claim 14 wherein the higher-alphaolefin-based polyolefin oligomer has a Mn of 300 to 10,000 g/mol and a pour point of $-20°$ C. or less.

18. The process of claim 1 wherein the one or more plasticizers comprise from 0.25 wt % to 90 wt % of the plasticized polymer blend.

19. The process of claim 1 wherein the one or more base polymers are chosen from HDPE, LDPE, LLDPE, vLDPE, isotactic PP, syndiotactic PP, ethylene-propylene random copolymer, ethylene-propylene plastomer, ethylene-propylene elastomer, ethylene-propylene impact copolymer, ethylene-propylene rubber, ethylene-propylene-diene terpolymer, ethylene-propylene-butene-1 terpolymer, olefin block copolymers, poly(1-butene), styrenic block copolymer, butyl, halobutyl, thermoplastic vulcanizates and combinations thereof.

20. A in-line blending process for plasticized polymers comprising:

(a) providing two or more reactor trains configured in parallel and two or more high-pressure separators fluidly connected to the two or more reactor trains configured in parallel, wherein one or more of the reactor trains produces one or more base polymers and one or more of the reactor trains produces one or more plasticizers;

(b) contacting in the two or more reactor trains configured in parallel 1) olefin monomers having two or more carbon atoms 2) one or more catalyst systems, 3) optional one or more comonomers, 4) optional one or more scavengers, and 5) one or more diluents or solvents, wherein at least one of the reactor trains configured in parallel is at a temperature above the solid-fluid phase-transition temperature of the polymerization system and a pressure no lower than 10 MPa below the cloud point pressure of the polymerization system and less than 1500 MPa, wherein the polymerization system for each reactor train is in its dense fluid state and comprises the olefin monomers, any comonomer present, any diluent or solvent present, any scavenger present, and the polymer product, wherein the catalyst system for each reactor train comprises one or more catalyst precursors, one or more activators, and optionally, one or more catalyst supports, wherein the one or more catalyst systems are chosen from Ziegler-Natta catalysts, metallocene catalysts, nonmetallocene metal-centered, heteroaryl ligand catalysts, late transition metal catalysts, and combinations thereof, wherein the polymerization system for one or more base polymer reactor trains and one or more plasticizer reactor trains includes more than 60 wt % of the one or more diluents or solvents;

(c) forming an unreduced polymer or unreduced plasticizer reactor effluent including a homogenous fluid phase polymer-monomer mixture or plasticizer-monomer mixture in each parallel reactor train;

(d) passing the reactor effluents from one or more of the parallel reactor trains through one or more high-pressure separators, maintaining the temperature and pressure within the one or more high-pressure separators above the solid-fluid phase transition point but below the cloud point pressure and temperature to form one or more fluid-fluid two-phase systems with each two-phase system comprising a polymer-enriched phase or plasticizer-enriched phase and a monomer-rich phase, and separating the monomer-rich phase from the polymer-enriched phase or plasticizer-enriched phase in each of the one or more high-pressure separators to form one or more separated monomer-rich phases, one or more polymer-enriched phases or one or more plasticizer-enriched phases;

(e) passing the one or more polymer-enriched phases and one or more plasticizer-enriched phases from the one or more high-pressure separators of (d), any unreduced polymer reactor effluents from the one or more parallel reactor trains through another high-pressure separator for product blending and product-feed separation;

(f) maintaining the temperature and pressure within the another high pressure separator of (e) above the solid-fluid phase transition point but below the cloud point pressure and temperature to form a fluid-fluid two-phase system comprising a plasticized polymer-rich blend phase and a monomer-rich phase; and (g) separating the monomer-rich phase from the plasticized polymer-rich blend phase in the high pressure separator to form a plasticized polymer blend and a separated monomer-rich phase.

21. An in-line blending process for plasticized polymers comprising:
(a) providing two or more reactor trains configured in parallel, a high-pressure separator downstream fluidly connected to the two or more reactor trains configured in parallel, and one or more storage tanks, wherein the two or more reactor trains produce one or more base polymers and the one or more storage tanks store one or more off-line produced plasticizers;
(b) contacting in the two or more reactor trains configured in parallel 1) olefin monomers having two or more carbon atoms 2) one or more catalyst systems, 3) optional one or more comonomers, 4) optional one or more scavengers, and 5) one or more diluents or solvents, wherein at least one of the reactor trains configured in parallel is at a temperature above the solid-fluid phase transition temperature of the polymerization system and a pressure no lower than 10 MPa below the cloud point pressure of the polymerization system and less than 1500 MPa, wherein the polymerization system for each reactor train is in its dense fluid state and comprises the olefin monomers, any comonomer present, any diluent or solvent present, any scavenger present, and the polymer product, wherein the catalyst system for each reactor train comprises one or more catalyst precursors, one or more activators, and optionally, one or more catalyst supports, wherein the one or more catalyst systems are chosen from Ziegler-Natta catalysts, metallocene catalysts, nonmetallocene metal-centered, heteroaryl ligand catalysts, late transition metal catalysts, and combinations thereof, wherein the polymerization system for one or more base polymer reactor trains includes more than 60 wt % of the one or more diluents or solvents;

(c) forming an unreduced polymer reactor effluent including a homogeneous fluid phase polymer-monomer mixture in each parallel reactor train;

(d) passing the polymer reactor effluent comprising the homogeneous fluid phase polymer-monomer mixture from each parallel reactor train through the high-pressure separator for product blending and product-feed separation;

(e) maintaining the temperature and pressure within the high-pressure separator above the solid-fluid phase transition point but below the cloud point pressure and temperature to form a fluid-fluid two-phase system comprising a polymer-rich blend phase and a monomer-rich phase;

(f) separating the monomer-rich phase from the polymer-rich blend phase in the high pressure separator to form a polymer blend and a separated monomer-rich phase; and (g) feeding the one or more off-line produced plasticizers from the one or more storage tanks to the process upstream, of the high-pressure separator of (d) to form a plasticized polymer blend.

22. An in-line blending process for plasticized polymers comprising:
(a) providing two or more reactor trains configured in parallel and two or more high-pressure separators fluidly connected to the two or more reactor trains configured in parallel, and one or more storage tanks, wherein two or more of the reactor trains produce one or more base polymers and the one or more storage tanks store one or more off-line-produced plasticizers;
(b) contacting in the two or more reactor trains configured in parallel 1) olefin monomers having two or more carbon atoms 2) one or more catalyst systems, 3) optional one or more comonomers, 4) optional one or more scavengers, and 5) one or more diluents or solvents, wherein at least one of the reactor trains configured in parallel is at a temperature above the solid-fluid phase-transition temperature of the polymerization system and a pressure no lower than 10 MPa below the cloud point pressure of the polymerization system and less than 1500 MPa, wherein the polymerization system for each reactor train is in its dense fluid state and comprises the olefin monomers, any comonomer present, any diluent or solvent present, any scavenger present, and the polymer product, wherein the catalyst system for each reactor train comprises one or more catalyst precursors, one or more activators, and optionally, one or more catalyst supports, wherein the one or more catalyst systems are chosen from Ziegler-Natta catalysts, metallocene catalysts, nonmetallocene metal-centered, heteroaryl ligand catalysts, late transition metal catalysts, and combinations thereof, wherein the polymerization system for one or more base polymer reactor trains includes more than 60 wt % of the one or more diluents or solvents;

(c) forming an unreduced polymer reactor effluent including a homogenous fluid phase polymer-monomer mixture in each parallel reactor train;

(d) passing the reactor effluents from one or more of the parallel reactor trains through one or more high-pressure separators, maintaining the temperature and pressure within the one or more high-pressure separators above the solid-fluid phase transition point but below the cloud point pressure and temperature to form one or more fluid-fluid two-phase systems with each two-phase system comprising a polymer-enriched phase and a monomer-rich phase, and separating the monomer-rich phase from the polymer-enriched phase in each of the one or more high-pressure separators to form one or more separated monomer-rich phases and one or more polymer-enriched phases;

(e) passing the one or more polymer-enriched phases from the one or more high-pressure separators of (d), any unreduced polymer reactor effluents from one or more parallel reactor trains through another high-pressure separator for product blending and product-feed separation;

(f) maintaining the temperature and pressure within the another high pressure separator of (e) above the solid-fluid phase transition point but below the cloud point pressure and temperature to form a fluid-fluid two-phase system comprising a polymer-rich blend phase and a monomer-rich phase;

(g) separating the monomer-rich phase from the polymer-rich blend phase in the high pressure separator to form a polymer blend and a separated monomer-rich phase; and (h) feeding the one or more off-line produced plasticizers from the one or more storage tanks to the process upstream, of the two or more high-pressure separators of (d) to form a plasticized polymer blend.

* * * * *